United States Patent
Adamson et al.

(10) Patent No.: US 10,892,524 B2
(45) Date of Patent: Jan. 12, 2021

(54) ELECTROLYTE FOR RECHARGEABLE ELECTROCHEMICAL CELL

(71) Applicant: Eos Energy Storage, LLC, Edison, NJ (US)

(72) Inventors: George W. Adamson, Edison, NJ (US); Sara S. Bowers, Edison, NJ (US); Francis W. Richey, Brooklyn, NY (US)

(73) Assignee: Eos Energy Storage, LLC, Edison, NJ (US)

( * ) Notice: Subject to any disclaimer, the term of this patent is extended or adjusted under 35 U.S.C. 154(b) by 217 days.

(21) Appl. No.: 16/089,587

(22) PCT Filed: Mar. 29, 2017

(86) PCT No.: PCT/US2017/024695
§ 371 (c)(1),
(2) Date: Sep. 28, 2018

(87) PCT Pub. No.: WO2017/172878
PCT Pub. Date: Oct. 5, 2017

(65) Prior Publication Data
US 2019/0131662 A1 May 2, 2019

Related U.S. Application Data

(63) Continuation-in-part of application No. 15/083,558, filed on Mar. 29, 2016, now Pat. No. 10,276,872.

(51) Int. Cl.
*H01M 10/36* (2010.01)

(52) U.S. Cl.
CPC ...... *H01M 10/365* (2013.01); *H01M 2300/00* (2013.01); *H01M 2300/0005* (2013.01); *H01M 2300/0091* (2013.01)

(58) Field of Classification Search
None
See application file for complete search history.

(56) References Cited

U.S. PATENT DOCUMENTS 3,408,232 A 10/1968 Blue et al.
3,640,770 A 2/1972 Zito, Jr.
(Continued)

FOREIGN PATENT DOCUMENTS

CN 1627554 6/2005
CN 103413992 11/2013
(Continued)

OTHER PUBLICATIONS

EPO Communication issued in European Application No. 17716386.2 dated May 27, 2020.
(Continued)

*Primary Examiner* — Tracy M Dove
(74) *Attorney, Agent, or Firm* — Botos Churchill IP Law LLP

(57) ABSTRACT

The present invention provides an aqueous electrolyte for use in rechargeable zinc-halide storage batteries that possesses improved stability and durability and improves zinc-halide battery performance (e.g., energy efficiency, Coulombic efficiency, and/or the like). One aspect of the present invention provides an electrolyte for use in a secondary zinc bromine electrochemical cell comprising from about 30 wt % to about 40 wt % of $ZnBr_2$ by weight of the electrolyte; from about 5 wt % to about 15 wt % of KBr; from about 5 wt % to about 15 wt % of KCl; and one or more quaternary ammonium agents, wherein the electrolyte comprises from about 0.5 wt % to about 10 wt % of the one or more quaternary ammonium agents.

29 Claims, 62 Drawing Sheets

(56) References Cited

U.S. PATENT DOCUMENTS

| | | | |
|---|---|---|---|
| 3,640,771 | A | 2/1972 | Zito, Jr. |
| 3,642,538 | A | 2/1972 | Zito, Jr. |
| 3,682,703 | A | 8/1972 | Smith |
| 3,806,368 | A | 4/1974 | Maricle et al. |
| 3,912,999 | A | 10/1975 | England |
| 4,038,459 | A | 7/1977 | Ajami et al. |
| 4,058,651 | A | 11/1977 | Will |
| 4,065,601 | A | 12/1977 | Ajami et al. |
| 4,096,318 | A | 6/1978 | Wurmb et al. |
| 4,246,324 | A | 1/1981 | De et al. |
| 4,306,003 | A | 12/1981 | Henriksen |
| 4,473,625 | A | 9/1984 | Watakabe et al. |
| 4,482,614 | A | 11/1984 | Zito, Jr. |
| 4,491,625 | A | 1/1985 | Katner |
| 4,505,994 | A | 3/1985 | Shimada et al. |
| 4,510,218 | A | 4/1985 | Ando et al. |
| 4,592,971 | A | 6/1986 | Walsh |
| 4,637,968 | A | 1/1987 | Grimes |
| 5,308,718 | A | 5/1994 | Eidler et al. |
| 5,591,538 | A | 1/1997 | Eidler et al. |
| 5,702,842 | A | 12/1997 | Tomazic |
| 6,562,514 | B1 | 5/2003 | Kazacos et al. |
| 8,911,612 | B2 | 12/2014 | Freiberg et al. |
| 2003/0165744 | A1 | 9/2003 | Schubert et al. |
| 2007/0003833 | A1 | 1/2007 | Li et al. |
| 2011/0253553 | A1 | 10/2011 | Freiberg et al. |
| 2012/0040254 | A1 | 2/2012 | Amendola et al. |
| 2017/0194666 | A1 | 7/2017 | Adamson et al. |
| 2018/0013185 | A1 | 1/2018 | Adamson et al. |

FOREIGN PATENT DOCUMENTS

| | | |
|---|---|---|
| EP | 0091521 | 10/1983 |
| EP | 0109807 A1 | 5/1984 |
| EP | 0101239 | 2/1987 |
| EP | 1057869 A1 | 12/2000 |
| EP | 1057869 | 6/2004 |
| EP | 2289851 | 3/2011 |
| GB | 1258502 | 12/1971 |
| GB | 2005064 | 4/1979 |
| JP | S57119461 A | 7/1982 |
| JP | S59111277 A | 6/1984 |
| JP | S59146171 | 8/1984 |
| JP | H04245172 | 9/1992 |
| JP | H07282795 A | 10/1995 |
| JP | H10270097 A | 10/1998 |
| JP | H11509035 A | 8/1999 |
| JP | 2001110461 | 4/2001 |
| JP | 2006333611 A | 12/2006 |
| JP | 2015506079 A | 2/2015 |
| WO | 2013/042103 | 3/2013 |
| WO | 2013042103 A1 | 3/2013 |
| WO | 2013/090680 | 6/2013 |
| WO | 2013/168145 | 11/2013 |
| WO | 2014/122641 | 8/2014 |
| WO | 2016/057477 | 4/2016 |
| WO | 2016057477 A1 | 4/2016 |
| WO | 2016057489 A1 | 4/2016 |
| WO | 2017/142990 | 8/2017 |
| WO | 2017/201124 | 11/2017 |

OTHER PUBLICATIONS

Office Action issued in Japanese Application No. 2017-538183 dated May 29, 2020.
Office Action issued in Japanese Application No. 2017-538183 dated Dec. 5, 2019.
Office Action issued in Japanese Application No. 2017-538180 dated May 15, 2020.
First Examination Report issued in Indian Application No. 201717011688 dated Jun. 5, 2020.
First Examination Report issued in Indian Application No. 201717011765 dated Mar. 17, 2020.
Advisory Action issued in Israeli Application No. 261910 dated May 6, 2020.
International Search Report for PCT/US2017/024695 dated May 24, 2017.
Written Opinion of the International Searching Authority for PCT/US2017/024695 dated May 24, 2017.
Yang, Jung Hoon et al., "Effect of a surface active agent on performance of zinc/bromine redox flow batteries: Improvement in current efficiency and system stability", Journal of Power Sources, Elsevier, vol. 275, 2015, pp. 294-297.
NIST Chemistry WebBook Printout for Cetrimonium bromide structure. 2011.
NIST Chemistry WebBook Printout for Dodecyltrimethylammonium chloride structure. 2011.
Eustace, Daniel J., "Bromine Complexation in Zinc-Bromine Circulating Batteries", Journal of the Electrochemical Society, vol. 127, No. 3, Jan. 1, 1980, pp. 528-532.
International Preliminary Report on Patentability for PCT/US2015/054179 dated Apr. 20, 2017.
International Search Report for PCT/US2015/054179 dated Dec. 22, 2015.
Wimby, J. Martin et al., "Viscosity and Density of Aqueous Solutions of LiBr, LiCl, ZnBr2, CaCl2, and LiNO3. 1. Single Salt Solutions", Journal of Chemical Engineering Data, vol. 39, No. 1, Jan. 1, 1994, pp. 68-72.
Written Opinion of the International Searching Authority for PCT/US2015/054179 dated Dec. 22, 2015.
International Preliminary Report on Patentability for PCT/US2017/024695 dated Oct. 11, 2018.
Evanko, Brian et al., "Stackable bipolar pouch cells with corrosionresistant current collectors enable high-power aqueous electrochemical energy storage", Electronic Supplementary Material (ESI), Royal Society of Chemistry, Energy & Environmental Science, 2018, pp. S1-S24.
Evanko, Brian et al., "Stackable bipolar pouch cells with corrosionresistant current collectors enable high-power aqueous electrochemical energy storage", Royal Society of Chemistry, Energy & Environmental Science, Paper, Jun. 14, 2018, Whole Document.
Kim, Donghyeon et al., "Study on Durability and Stability of an Aqueous Electrolyte Solution for Zinc Bromide Hybrid Flow Batteries", Journal of Physics, Conference Series 574, 2015, pp. 1-4.
Magnes, Ben-Zion et al., "Bromine Based Rechargeable Batteries: The Chemistry and the Electrochemistry", ResarchGate, Apr. 2015, Whole Document.
Wu, Maochun et al., "A novel high-energy-density positive electrolyte with multiple redox couples for redox flow batteries", Applied Energy, Elsevier, vol. 136, Dec. 31, 2014, pp. 576-581.
Morizono, Yasuhiro et al., "Surface Hardening of Titanium by Using a Simplified Carbon and Nitrogen Diffusion Technique with Steel and Carbon Powders", Materials Transactions, vol. 54. No. 8., 2003, pp. 1454-1459.
International Search Report for PCT/US2015/054203 dated Dec. 22, 2015.
Zinc Bromide Battery (ZBB), Technical Description, California Energy Commission and U.S. Department of Energy Joint Project [retrieved on Sep. 17, 2014].
Abbott, A. P. et al., "Electrolytic deposition of Zn coatings from ionic liquids based on choline chloride", Transactions of the Institute of Metal Finishing, Maney Publishing, Birmingham, GB, vol. 87, No. 4, Jul. 1, 2009, pp. 201-207.
International Preliminary Report on Patentability for PCT/US2017/018053 dated Aug. 30, 2018.
International Preliminary Report on Patentability for PCT/US2017/033028 dated Nov. 29, 2018.
International Search Report for PCT/US2017/018053 dated Apr. 18, 2017.
International Search Report for PCT/US2017/033028 dated Nov. 15, 2017.
Vieira, L. et al., "Mechanistic Studies of Zinc Electrodeposition from Deep Eutectic Electrolytes", Journal of the Electrochemical Society, vol. 161, No. 1, Oct. 30, 2013, pp. D7-D13.
Written Opinion of the International Searching Authority for PCT/US2017/018053 dated Apr. 18, 2017.

(56) References Cited

OTHER PUBLICATIONS

Written Opinion of the International Searching Authority for PCT/US2017/033028 dated Nov. 15, 2017.

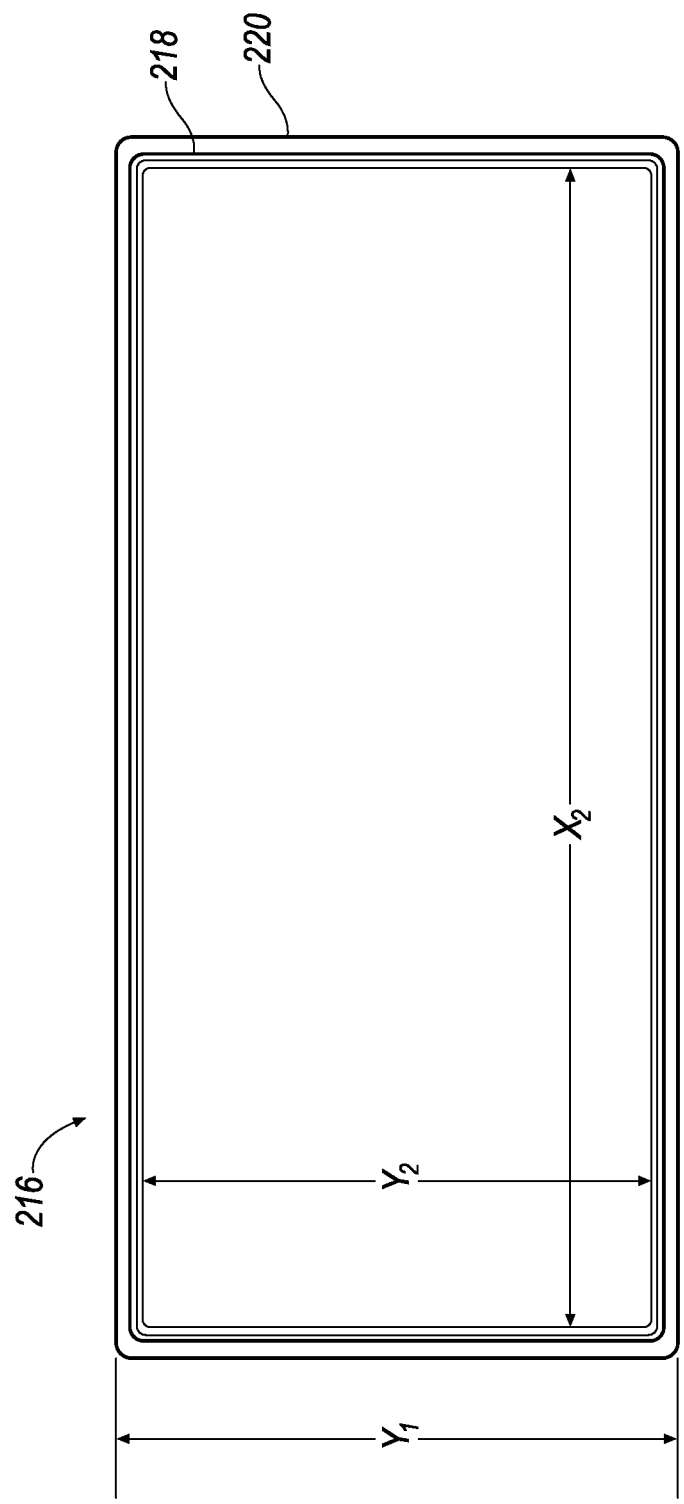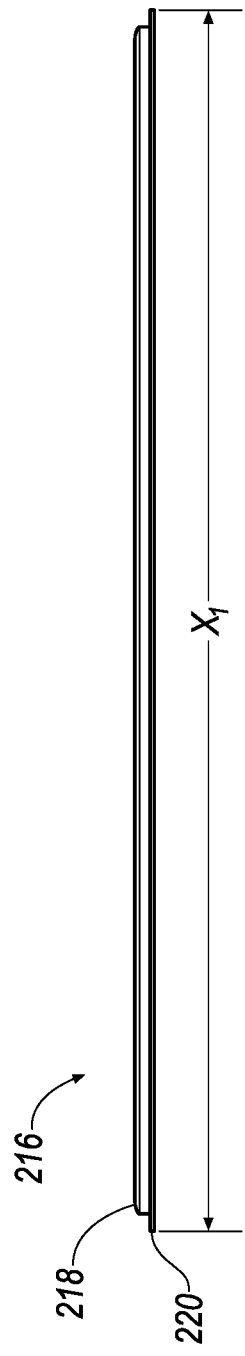

ELECTROLYTE FOR RECHARGEABLE ELECTROCHEMICAL CELL

CROSS REFERENCE TO RELATED APPLICATION

This U.S. nonprovisional application is the 35 USC § 371 national phase of PCT application No. PCT/US2017/024695, filed on Mar. 29, 2017, which is a continuation-in-part of U.S. application Ser. No. 15/083,558, filed on Mar. 29, 2016. Each of these documents is incorporated herein by reference in its entirety.

TECHNICAL FIELD

This invention relates to electrolytes that are useful in zinc halide rechargeable electrochemical cells (e.g., storage batteries). More specifically, this invention relates to aqueous electrolytes that reversibly electrolyze zinc halide in electrochemical storage cells or batteries.

BACKGROUND

Zinc-halide batteries were developed as devices for storing electrical energy. Traditional zinc-halide batteries (e.g., zinc-bromine batteries) employed bipolar electrodes disposed in a static, i.e., non-flowing, zinc-bromide aqueous solution. The process of charging and discharging electrical current in a zinc-halide battery is generally achieved through a reaction of redox couples like $Zn^{2+}/Zn(s)$ and $X^-/X_2$ in zinc halide electrolyte, where X is a halogen (e.g., Cl, Br, or I).

When the battery is charged with electrical current, the following chemical reactions occur:

$$Zn^{2+}+2e^- \rightarrow Zn$$

$$2X^- \rightarrow X_2+2e^-.$$

Conversely, when the battery discharges electrical current, the following chemical reactions occur:

$$Zn \rightarrow Zn^{2+}+2e^-$$

$$X_2+2e^- \rightarrow 2X^-.$$

Additionally, in some batteries, polyhalide reactions may also occur. Some of these examples are described by the following:

$$X_3^-+2e^- \rightarrow 3X^- \text{ or}$$

$$X_n^-+ne^- \rightarrow nX^- \text{ for } n \geq 3.$$

The polyhalide reactions pictured above can include reactions between like halogens, e.g. $Br_3$, and reactions between non-like halogens, e.g., mixed halogens such as $Br_2Cl$.

These zinc-halide storage batteries were typically configured in a bipolar electrochemical cell stack, wherein each electrode is disposed in an aqueous zinc salt electrolyte. However, the performance of these storage batteries was highly inefficient due to secondary reactions of the dissolved species in the aqueous electrolyte. For example, in solution, elemental bromine exists in equilibrium with bromide ions to form polybromide ions, $Br_m^-$, where m=3, 5, or 7. Secondary hydrolysis reactions are also problematic for these types of storage batteries when the electrolytes are formulated with excess free water, because bromate solids form, which in turn reduces the amount of available bromide/bromine that can under reduction or oxidation in the electrochemical cell.

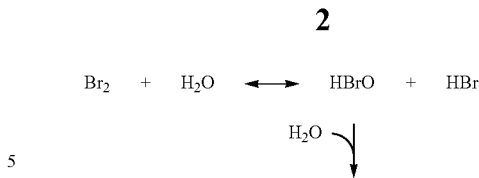

Elemental bromine also possesses an increased vapor pressure that promotes hazardous pressure in the batteries. Furthermore, when aqueous zinc halide salts are ionized, zinc ions can exist as various complex ions and ion pairs, which promotes zinc dendrite formation and increased incidence of self-discharge in the batteries. To improve electrolyte durability in the batteries, halogen sequestration agents were added (e.g., quaternary ammonium salts or heteroaryl salts (e.g., pyridinium)); however, these sequestration agents typically possessed reduced solubility and reduced the stability of the electrolyte over numerous charge cycles.

SUMMARY OF THE INVENTION

The present invention provides an aqueous electrolyte for use in rechargeable zinc-halide storage batteries that possesses improved stability and durability and improves zinc-halide battery performance. In one aspect, the electrolyte comprises from about 25 wt % to about 70 wt % of $ZnBr_2$; from about 5 wt % to about 50 wt % of water; and one or more quaternary ammonium agents, wherein the electrolyte comprises from about 0.05 wt % to about 10 wt % of the one or more quaternary ammonium agents.

In some embodiments, the electrolyte further comprises at least one alkaline halide salt selected from NaCl, NaBr, LiCl, LiBr, RbCl, RbBr, KCl, KBr, and the total concentration of the alkaline halide salt is from about 2 wt % to about 35 wt % by weight of the electrolyte. For example, the electrolyte further comprises from about 1 wt % to about 15 wt % of KBr; and from about 5 wt % to about 20 wt % of KCl.

In some embodiments, the electrolyte comprises from about 27 wt % to about 40 wt % of $ZnBr_2$. For example, the electrolyte comprises from about 28 wt % to about 37 wt % of $ZnBr_2$.

In some embodiments, the electrolyte comprises from about 1.5 wt % to about 7.5 wt % of $ZnCl_2$.

And, in some embodiments, the electrolyte comprises from about 30 wt % to about 45 wt % of water. For example, the electrolyte comprises from about 35 wt % to about 41 wt % of water.

In alternative embodiments, the electrolyte comprises from about 2 wt % to about 10 wt % of KBr. For example, the electrolyte comprises from about 7.3 wt % to about 9.2 wt % of KBr.

And, in some embodiments, the electrolyte comprises from about 7 wt % to about 17 wt % of KCl.

In some embodiments, the electrolyte comprises from about 0.5 wt % to about 10 wt % of a glyme. And, in some embodiments, the glyme comprises monoglyme, diglyme, triglyme, tetraglyme, pentaglyme, hexaglyme, or any combination thereof. For instance, the electrolyte comprises from about 2 wt % to about 4 wt % of tetraglyme.

In some embodiments, the electrolyte comprises from about 0.5 wt % to about 2.5 wt % of an ether selected from DME-PEG, dimethyl ether, or any combination thereof. For example, the electrolyte comprises DME-PEG, and the DME-PEG has an average molecular weight of from about 350 amu to about 3000 amu. In other examples, the DME-PEG has an average molecular weight of from about 1200 amu to about 3000 amu. And, in some embodiments, the DME-PEG is DME-PEG 2000, DME-PEG 1000, or a combination thereof. In other instances, the electrolyte comprises from about 1 wt % to about 2 wt % DME-PEG 2000. And, in some instances, the electrolyte comprises from about 0.25 wt % to about 0.75 wt % DME-PEG 1000. For example, the electrolyte comprises from about 1 wt % to about 2 wt % DME-PEG 2000 and from about 0.25 wt % to about 0.75 wt % DME-PEG 1000.

In some embodiments, the electrolyte further comprises from about 0.1 wt % to about 1.0 wt % of an alcohol, wherein the alcohol is substantially miscible in water. For example, the alcohol comprises a $C_{1-4}$ alcohol. In other examples, the alcohol comprises methanol, ethanol, 1-propanol, iso-propanol, 1-butanol, sec-butanol, iso-butanol, tert-butanol, or any combination thereof. For instance, the electrolyte comprises from about 0.25 wt % to about 0.75 wt % of tert-butanol.

In some embodiments, the electrolyte comprises from about 0.5 wt % to about 5 wt % of a $C_{1-10}$ glycol. In some examples, the glycol comprises ethylene glycol, propylene glycol, 1,3-butylene glycol, 1,4-butylene glycol, neopentyl glycol, hexalene glycol, or any combination thereof. And, in some embodiments, the electrolyte comprises from about 0.25 wt % to about 2.5 wt % of neopentyl glycol.

In some embodiments, the electrolyte further comprising from about 0.05 wt % to about 20 wt % of one or more quaternary ammonium agents. And, in some examples, the one or more quaternary ammonium agents comprises a quaternary ammonium agent selected from the group consisting of a chloride or bromide of ammonium, tetraethylammonium, trimethylpropylammonium, N-methyl-N-ethylmorpholinium (MEM), N-ethyl-N-methylmorpholinium, N-methyl-N-butylmorpholinium, N-methyl-N-ethylpyrrolidinium, N,N,N-triethyl-N-propylammonium, N-ethyl-N-propylpyrrolidinium, N-propyl-N-butylpyrrolidinium, N-methyl-N-butylpyrrolidinium, 1-methyl-1-butylpyrrolidinium, N-ethyl-N-(2-chloroethyl)pyrrolidinium, N-methyl-N-hexylpyrrolidinium, N-methyl-N-pentylpyrrolidinium, N-ethyl-N-pentylpyrrolidinium, N-ethyl-N-butylpyrrolidinium, trimethylene-bis(N-methylpyrrolidinium), N-butyl-N-pentylpyrrolidinium, N-methyl-N-propylpyrrolidinium, N-propyl-N-pentylpyrrolidinium, 1-ethyl-4-methylpyridinium, 1-ethyl-3-methylpyridinium, 1-ethyl-2-methylpyridinium, 1-butyl-3-methylpyridinium, cetyltrimethylammonium, triethylmethylammonium, and any combination thereof. In some examples, quaternary ammonium agents include a chloride or bromide of 1-ethyl-4-methylpyridinium, 1-ethyl-2-methylpyridinium, 1-ethyl-3-methylpyridinium, triethylmethylammonium, triethylmethylammonium, 1,1'-dioctadecyl-4-4'-bipyridinium, or any combination thereof. In some instances, the one or more quaternary ammonium agents comprises a quaternary ammonium agent selected from a chloride or bromide of ammonium, tetraethylammonium, trimethylpropylammonium, N-methyl-N-ethylmorpholinium (MEM), 1-ethyl-1-methylmorpholinium, N-methyl-N-ethylpyrrolidinium, 1-methyl-1-butylpyrrolidinium, 1-ethyl-4-methylpyridinium, 1-ethyl-2-methylpyridinium, 1-butyl-3-methylpyridinium, cetyltrimethylammonium, triethylmethyl ammonium, and any combination thereof.

In some embodiments, the electrolyte further comprising from about 0.05 wt % to about 20 wt % of one or more quaternary ammonium agents, and the one or more quaternary ammonium agents comprises a quaternary ammonium agent selected from the group consisting of ammonium bromide, ammonium chloride, tetraethylammonium bromide, trimethylpropylammonium bromide, N-methyl-N-ethylmorpholinium bromide, N-methyl-N-ethylmorpholinium bromide (MEMBr), N-methyl-N-butylmorpholinium bromide, N-methyl-N-ethylpyrrolidinium bromide, N,N,N-triethyl-N-propylammonium bromide, N-ethyl-N-propylpyrrolidinium bromide, N-propyl-N-butylpyrrolidinium bromide, N-methyl-N-butylpyrrolidinium bromide, 1-methyl-1-butylpyrrolidinium bromide, N-ethyl-N-(2-chloroethyl)pyrrolidinium bromide, N-methyl-N-hexylpyrrolidinium bromide, N-methyl-N-pentylpyrrolidinium bromide, N-ethyl-N-pentylpyrrolidinium bromide, N-ethyl-N-butylpyrrolidinium bromide, trimethylene-bis(N-methylpyrrolidinium) dibromide, N-butyl-N-pentylpyrrolidinium bromide, N-methyl-N-propylpyrrolidinium bromide, N-propyl-N-pentylpyrrolidinium bromide, 1-ethyl-4-methylpyridinium bromide, 1-ethyl-2-methylpyridinium bromide, 1-butyl-3-methylpyridinium bromide, cetyltrimethylammonium bromide, triethylmethylammonium bromide, and any combination thereof. In some examples, quaternary ammonium agents includes at least one of 1-ethyl-4-methylpyridinium bromide, 1-ethyl-2-methylpyridinium bromide, triethylmethylammonium bromide, triethylmethylammonium chloride, 1,1'-dioctadecyl-4-4'-bipyridinium dibromide, or 1-ethyl-4-methyl pyridinium bromide. In some instances, the one or more quaternary ammonium agents comprises a quaternary ammonium agent selected from the group consisting of ammonium chloride, tetraethylammonium bromide, trimethylpropylammonium bromide, N-methyl-N-ethylmorpholinium bromide (MEMBr), N-methyl-N-ethylpyrrolidinium bromide, 1-methyl-1-butylpyrrolidinium bromide, 1-ethyl-4-methylpyridinium bromide, 1-ethyl-2-methylpyridinium bromide, 1-butyl-3-methylpyridinium bromide, cetyltrimethylammonium bromide, decyltrimethylammonium bromide, tridecyltrimethylammonium bromide, or any combination thereof.

In some embodiments, the one or more quaternary ammonium agents include at least one agent selected from 1-ethyl-2-methylpyridinium bromide, 1-ethyl-3-methylpyridinium bromide, or 1-ethyl-4-methylpyridinium bromide.

In some embodiments, the one or more quaternary ammonium agents comprises about 3.5 wt % to about 4.5 wt % of 1-ethyl-2-methylpyridinium bromide, 1-ethyl-3-methylpyridinium bromide, or 1-ethyl-4-methylpyridinium bromide by weight of the electrolyte. In some embodiments, the one or more quaternary ammonium agents comprises about 1 wt % to about 7 wt % of 1-ethyl-2-methylpyridinium bromide by weight of the electrolyte. In some embodiments, the one or more quaternary ammonium agents comprises about 1.5 wt % to about 2.5 wt % of 1-methyl-1-butylpyrrolidinium bromide by weight of the electrolyte. In some embodiments, the one or more quaternary ammonium agents comprises about 1.5 wt % to about 2.5 wt % of 1-butyl-3-methylpyridinium bromide by weight of the electrolyte. In some embodiments, the one or more quaternary ammonium agents comprises about 1.5 wt % to about 5 wt % of 1-methyl-1-ethylmorpholinium bromide by weight of the electrolyte. In some embodiments, the one or more quaternary ammonium agents comprises about 0.5 wt % to about 1.5 wt % of N-methyl-N-ethylmorpholinium bromide (MEMBr) by weight of the electrolyte. In some embodiments, the one or more quaternary ammonium agents comprises about 14.5 wt % to about 16.5 wt % of N-methyl-N-ethylpyrrolidinium bromide by weight of the electrolyte. In some embodiments, the one or more quaternary ammonium agents comprises about 2 wt % to about 3 wt % of trimethylpropylammonium bromide by weight of the electrolyte. In some embodiments, the one or more quaternary ammonium agents comprises about 2 wt % to about 8 wt % tetraethylammonium bromide by weight of the electrolyte. In some embodiments, the one or more quaternary ammonium agents comprises about 0.05 wt % to about 0.2 wt % of cetyltrimethylammonium bromide by weight of the electrolyte.

And, in other embodiments, the electrolyte comprising less than 1 wt % of one or more additives selected from Sn, In, Ga, Al, Tl, Bi, Pb, Sb, Ag, Mn, or Fe by weight of the electrolyte. For example, the one or more additives are selected from about 0.0008 wt % to about 0.0012 wt % of Sn (e.g., provided as $SnCl_2$ or any hydrate thereof), from about 0.0008 wt % to about 0.0012 wt % of In (e.g., provided as $InCl_3$ or any hydrate thereof), and combinations thereof.

In some embodiments, the electrolyte comprising an acid, or the conjugate base of an acid, selected from acetic acid, nitric acid, hydrobromic acid, and citric acid. For example, the electrolyte comprises from about 0.3 wt % to about 0.6 wt % of acetic acid, sodium acetate, or potassium acetate by weight of the electrolyte. In another example, the electrolyte comprises from about 0.12 wt % to about 0.08 wt % nitric acid by weight of the electrolyte. And, in some examples, the electrolyte comprises from about 3.5 wt % to about 4.5 wt % citric acid by weight of the electrolyte. In alternative examples, the electrolyte comprises from about 3.5 wt % to about 4.5 wt % potassium dihydrogen citrate by weight of the electrolyte.

In other embodiments, the electrolyte comprises from about 0.05 wt % to about 0.75 wt % of a crown ether (e.g., 18 crown 6, 15 crown 5, 12 crown 4, or any combination thereof) by weight of the electrolyte. In some embodiments, the selection of the crown either depends on the cation formed from the dissolution of the alkaline halide salt in the electrolyte. For example, wherein one or more of the alkaline halide salts generates $Li^+$ cations in the electrolyte, the electrolyte comprises from about 0.05 wt % to about 0.75 wt % of a 12 crown 4 ether. In another example, wherein one or more of the alkaline halide salts generates $Na^+$ cations in the electrolyte, the electrolyte comprises from about 0.05 wt % to about 0.75 wt % of a 15 crown 5 ether. And, in some examples, wherein one or more of the alkaline halide salts generates $K^+$ cations in the electrolyte, the electrolyte comprises from about 0.05 wt % to about 0.75 wt % of a 18 crown 6 ether. In some instances, the electrolyte comprises from about 0.15 wt % to about 0.5 wt % of 18-crown-6 by weight of the electrolyte. In other instances, the electrolyte comprises from about 0.05 wt % to about 0.2 wt % of 15-crown-5 by weight of the electrolyte.

Another aspect of the present invention provides an electrolyte for use in a secondary zinc halide electrochemical cell comprising from about 27 wt % to about 40 wt % of $ZnBr_2$ by weight of the electrolyte; from about 35 wt % to about 41 wt % of water; from about 7.3 wt % to about 9.2 wt % of KBr; from about 7 wt % to about 17 wt % of KCl; from about 0.3 wt % to about 0.6 wt % acetic acid; and from about 2 wt % to about 8 wt % tetraethylammonium bromide, wherein these weight percents are by weight of the electrolyte.

Another aspect of the present invention provides an electrolyte for use in a secondary zinc halide electrochemical cell comprising from about 27 wt % to about 40 wt % of $ZnBr_2$ by weight of the electrolyte; and from about 1 wt % to about 10 wt % of 1-ethyl-4-methylpyridinium bromide or about 1 wt % to about 7 wt % of 1-ethyl-2-methylpyridinium bromide.

Another aspect of the present invention provides an electrolyte for use in a secondary zinc halide electrochemical cell comprising from about 27 wt % to about 40 wt % of $ZnBr_2$ by weight of the electrolyte; and from 5 ppm to about 15 ppm of In, Sn, or both. In some embodiments, the electrolyte further comprises 1-ethyl-4-methylpyridinium bromide.

In some embodiments, the electrolyte further comprises from about 0.05 wt % to about 0.2 wt % of cetyltriethylammonium bromide (CTAB) by weight of the electrolyte.

In some embodiments, the electrolyte comprises from about 3.5 wt % to about 4.5 wt % of citric acid monohydrate by weight of the electrolyte.

In some embodiments, the electrolyte comprises from about 3.5 wt % to about 4.5 wt % of potassium dihydrogen citrate monohydrate by weight of the electrolyte.

Another aspect of the present invention provides an electrolyte for use in a secondary zinc halide electrochemical cell comprising from about 27 wt % to about 40 wt % of $ZnBr_2$ by weight of the electrolyte; from about 35 wt % to about 41 wt % of water from about 7.3 wt % to about 9.2 wt % of KBr; from about 7 wt % to about 17 wt % of KCl; from about 0.15 wt % to about 0.5 wt % of 18-crown-6; and from about 0.05 wt % to about 0.2 wt % of cetyltrimethylammonium bromide, wherein the weight percents are by weight of the electrolyte.

In some embodiments, the electrolyte comprises from about 2 wt % to about 8 wt % tetraethylammonium bromide by weight of the electrolyte.

In some embodiments, the electrolyte comprises from about 0.3 wt % to about 0.6 wt % of acetic acid by weight of the electrolyte. In some embodiments, the electrolyte comprises from about 0.3 wt % to about 0.6 wt % of HBr by weight of the electrolyte.

In some embodiments, the electrolyte comprises from about 1 wt % to about 2 wt % DME-PEG 2000 (MPEG 2K). In some embodiments, the electrolyte comprises from about 0.25 wt % to about 0.75 wt % DME-PEG 1000 (MPEG 1K). In other embodiments, the electrolyte comprises from about 1 wt % to about 2 wt % DME-PEG 2000 (MPEG 2K) and from about 0.25 wt % to about 0.75 wt % DME-PEG 1000 (MPEG 1K).

Another aspect of the present invention provides a method of preparing an electrolyte for use in a secondary zinc halide electrochemical cell comprising mixing $ZnBr_2$, KBr, KCl, and one or more quaternary ammonium agents under aqueous conditions to generate a mixture and stirring the mixture until the solids have dissolved or are homogenously distributed throughout the mixture, wherein the mixture comprises from about 27 wt % to about 40 wt % of $ZnBr_2$; from about 7.3 wt % to about 9.2 wt % of KBr; from about 7 wt % to about 17 wt % of KCl; from about 0.05 wt % to about 20 wt % of the one or more quaternary ammonium agents; and from about 35 wt % to about 41 wt % of water.

Another aspect of the present invention provides an electrolyte for use in a secondary static zinc halide electrochemical cell comprising an aggregate concentration of from about 2.0 wt % to about 15.0 wt % of one or more quaternary ammonium agents, wherein the one or more quaternary ammonium agents comprises at least cetyltrimethylammonium chloride or cetyltrimethylammonium bromide.

In some embodiments, the electrolyte further comprises from about 0.2 wt % to about 1.2 wt % of the cetyltrimethylammonium chloride or cetyltrimethylammonium bromide, and at least one additional quaternary ammonium agent. For example, the electrolyte additionally comprises an alkyl substituted pyridinium chloride or an alkyl substituted pyridinium bromide. In some instances, the electrolyte comprises from about 1.8 wt % to about 7.5 wt % of the alkyl substituted pyridinium chloride or the alkyl substituted pyridinium bromide. In other instances, the electrolyte comprises from about 2.0 wt % to about 6.0 wt % of the alkyl substituted pyridinium chloride or the alkyl substituted pyridinium bromide. For example, the electrolyte comprises from about 2.0 wt % to about 6.0 wt % of alkyl substituted pyridinium bromide, wherein the alkyl substituted pyridinium bromide is selected from 1-ethyl-2-methylpyridinium bromide, 1-ethyl-3-methylpyridinium bromide, or 1-ethyl-4-methylpyridinium bromide.

In some embodiments, the electrolyte comprises from about 0.05 wt % to about 0.2 wt % of 1,1-dioctadecyl-4-4'bypyridinium chloride or from about 0.05 wt % to about 0.2 wt % of 1,1-dioctadecyl-4-4'bypyridinium bromide.

In some embodiments, the electrolyte further comprises from about 25 wt % to about 40 wt % of $ZnBr_2$. In some embodiments, the further electrolyte comprises from about 25 wt % to about 45 wt % of water. In some embodiments, the electrolyte further comprises from about 1 wt % to about 5 wt % of KBr. And, in some embodiments, the electrolyte further comprises from about 5 wt % to about 15 wt % of KCl.

In some embodiments, the electrolyte comprises from about 0.5 wt % to about 2.5 wt % of an ether selected from DME-PEG, dimethyl ether, or any combination thereof. In some examples, the ether is DME-PEG, and the DME-PEG has an average molecular weight of from about 350 amu to about 3000 amu. For instance, the DME-PEG has an average molecular weight of from about 750 amu to about 2500 amu. In some embodiments, the ether is DME-PEG, and the electrolyte comprises from about 0.1 wt % to about 0.5 wt % of DME-PEG having an average molecular weight of from about 750 amu to about 1250 amu. In some embodiments, the ether is DME-PEG, and the electrolyte comprises from about 1.0 wt % to about 2.0 wt % of DME-PEG having an average molecular weight of from about 1750 amu to about 2250 amu.

In some embodiments, the electrolyte further comprises from about 2 wt % to about 6 wt % of the tetraethylammonium chloride or tetraethylammonium bromide. For example, the electrolyte comprising from about 2 wt % to about 6 wt % of the tetraethylammonium bromide.

In some embodiments, the electrolyte further comprises N-ethyl-N-methylmorpholinium chloride or N-ethyl-N-methylmorpholinium bromide. For example, the electrolyte comprises from about 0.5 wt % to about 2.0 wt % of the N-ethyl-N-methylmorpholinium chloride or N-ethyl-N-methylmorpholinium bromide.

Another aspect of the present invention provides an electrolyte for use in a secondary zinc bromine electrochemical cell comprising from about 25 wt % to about 40 wt % of $ZnBr_2$; from about 25 wt % to about 45 wt % of water; and one or more quaternary ammonium agents, wherein the electrolyte has an aggregate concentration of from about 2.0 wt % to about 15.0 wt % of the one or more quaternary ammonium agents, and wherein the one or more quaternary ammonium agents comprises at least cetyltrimethylammonium bromide, and an alkyl substituted pyridinium bromide, wherein the alkyl substituted pyridinium bromide is selected from 1-ethyl-2-methylpyridinium bromide, 1-ethyl-3-methylpyridinium bromide, or 1-ethyl-4-methylpyridinium bromide.

In some embodiments, the electrolyte further comprises from about 0.2 wt % to about 1.2 wt % of cetyltrimethylammonium bromide and from about 1.8 wt % to about 7.5 wt % of the alkyl substituted pyridinium bromide.

In some embodiments, the electrolyte further comprises from about 0.05 wt % to about 0.2 wt % of 1,1-dioctadecyl-4-4'bypyridinium chloride or from about 0.05 wt % to about 0.2 wt % of 1,1-dioctadecyl-4-4'bypyridinium bromide.

In some embodiments, the electrolyte further comprises from about 1 wt % to about 5 wt % of KBr. In some embodiments, the electrolyte further comprises from about 5 wt % to about 15 wt % of KCl.

Another aspect of the present invention provides an electrolyte for use in a secondary zinc bromine electrochemical cell comprising from about 25 wt % to about 40 wt % of $ZnBr_2$; from about 25 wt % to about 45 wt % of water; and one or more quaternary ammonium agents, wherein the electrolyte has an aggregate concentration of from about 2.0 wt % to about 15.0 wt % of the one or more quaternary ammonium agents, and wherein the one or more quaternary ammonium agents comprises at least cetyltrimethylammonium bromide, and tetraethylammonium bromide.

In some embodiments, the electrolyte comprises from about 0.2 wt % to about 1.2 wt % of cetyltrimethylammonium bromide and from about 2.0 wt % to about 6.0 wt % of the tetraethylammonium bromide.

In some embodiments, the electrolyte comprises from about 0.5 wt % to about 2.0 wt % of the N-ethyl-N-methylmorpholinium chloride or N-ethyl-N-methylmorpholinium bromide.

In some embodiments, the electrolyte comprises from about 1 wt % to about 5 wt % of KBr. In some embodiments, the electrolyte comprises from about 5 wt % to about 15 wt % of KCl.

In some embodiments, the electrolyte comprising from about 1.0 wt % to about 5 wt % of a glyme, wherein the glyme is selected from diglyme, triglyme, or tetraglyme.

Another aspect of the present invention provides an electrolyte for use in a secondary zinc bromine electrochemical cell comprising from about 1.0 wt % to about 5 wt % of a tetra-alkyl ammonium chloride; from about 25 wt % to about 40 wt % of $ZnBr_2$; and from about 25 wt % to about 45 wt % of water.

In some embodiments, the tetra-alkyl ammonium chloride is $(C_{1-6}\ alkyl)_4N^+Cl^-$. In other embodiments, the tetra-alkyl ammonium chloride is selected from triethylmethylammonium chloride, trimethylpropylammonium chloride, butyltrimethyl ammonium chloride, tetraethylammonium chloride, trimethylethylammonium chloride, or any combination thereof. For example, the tetra-alkylammonium chloride is triethylmethylammonium chloride.

In some embodiments, the electrolyte comprises cetyltrimethylammonium bromide or cetyltrimethylammonium chloride.

In some embodiments, the electrolyte comprises tetraethylammonium bromide or tetraethylammonium chloride.

In some embodiments, the electrolyte comprises from about 0.2 wt % to about 1.2 wt % of cetyltrimethylammonium bromide and from about 1.5 wt % to about 5.0 wt % of the tetraethylammonium bromide.

In some embodiments, the electrolyte comprises from about 0.5 wt % to about 2.0 wt % of the N-ethyl-N-methylmorpholinium chloride or N-ethyl-N-methylmorpholinium bromide.

In some embodiments, the electrolyte comprises from about 2.5 wt % to about 7.5 wt % of KBr.

In some embodiments, the electrolyte comprises from about 5 wt % to about 15 wt % of KCl.

In some embodiments, the electrolyte comprises from about 0.1 wt % to about 0.5 wt % of DME-PEG having an average molecular weight of from about 750 amu to about 1250 amu.

In some embodiments, the electrolyte comprises from about 1.0 wt % to about 2.0 wt % of DME-PEG having an average molecular weight of from about 1750 amu to about 2250 amu.

In some embodiments, the electrolyte comprises an acid, or the conjugate base of an acid, selected from acetic acid, nitric acid, and citric acid. For example, the electrolyte comprises from about 0.1 wt % to about 1.0 wt % of glacial acetic acid or from about 0.1 wt % to about 1.0 wt % of HBr.

Another aspect of the present invention provides an electrolyte for use in a secondary static zinc halide electrochemical cell comprising from about 30.00 wt % to about 50.00 wt % (e.g., from about 35 wt % to about 47.5 wt % or from about 37 wt % to about 46 wt %) of $ZnBr_2$; from about 22.5 wt % to about 40 wt % (e.g., from about 23.75 to about 38 wt % or from about 24 wt % to about 36 wt %) of $H_2O$; from about 3.00 wt % to about 9.5 wt % (e.g., from about 4.00 wt % to about 8.5 wt %, from about 3.00 wt % to about 8.5 wt %, or from about 4.1 wt % to about 8 wt %) of KBr; from about 7.75 wt % to about 14.00 wt % (e.g., from about 7.9 wt % to about 13.25 wt % or from about 8 wt % to about 13 wt %) of KCl; from about 0.25 wt % to about 2.25 wt % (e.g., from about 0.35 wt % to about 2.0 wt % or from about 0.5 wt % to about 2 wt %) of MPEG 2K; and from about 0.075 wt % to about 1.25 wt % (e.g., from about 0.1 wt % to about 1 wt %) of MPEG 1K.

In some embodiments, the electrolyte further comprises at least two different quaternary ammonium agents, wherein both of the quaternary ammonium agents are of the formula $N^+(R^A)(R^B)_3X^-$, wherein $R^A$ is a $C_{1-6}$ alkyl, $R^B$ is a $C_{1-6}$ alkyl, and $X^-$ is $Br^-$ or $Cl^-$; and wherein the aggregate concentration of the at least two different quaternary ammonium agents is from about 3.50 wt % to about 20.00 wt %. In some examples, one of the at least two different quaternary ammonium agents is tetraethylammonium bromide, and the tetraethylammonium bromide has a concentration of from about 0.35 wt % to about 3.75 wt %. In other examples, one of the at least two different quaternary ammonium agents is triethylmethylammonium chloride, and the triethylmethylammonium chloride has a concentration of from about 3.50 wt % to about 15.0 wt %.

In some embodiments, the electrolyte further comprises a quaternary ammonium agent selected from trimethylpropylammonium bromide, and the trimethylpropylammonium bromide has a concentration of from about 0.25 wt % to about 0.75 wt %.

In some embodiments, the electrolyte further comprises from about 0.35 wt % to about 2.75 wt % of a glycol, wherein the glycol is selected from ethylene glycol, propylene glycol, 1,3-butylene glycol, 1,4-butylene glycol, neopentyl glycol, hexalene glycol, or any combination thereof. For example, the electrolyte comprises from about 0.35 wt % to about 2.75 wt % of neopentyl glycol.

In some embodiments, the electrolyte further comprises from about 2.00 wt % to about 4.00 wt % of a glyme, wherein the glyme is selected from monoglyme, diglyme, triglyme, tetraglyme, pentaglyme, hexaglyme, or any combination thereof. For example, the electrolyte comprises from about 2.00 wt % to about 4.00 wt % of tetraglyme.

Another embodiment of the present invention provides an electrolyte for use in a secondary static zinc halide electrochemical cell comprising from about 30.00 wt % to about 50.00 wt % (e.g., from about 35 wt % to about 47.5 wt % or from about 37 wt % to about 46 wt %) of $ZnBr_2$; from about 22.5 wt % to about 40 wt % (e.g., from about 23.75 to about 38 wt % or from about 24 wt % to about 36 wt %) of $H_2O$; from about 3.00 wt % to about 9.5 wt % (e.g., from about 4.00 wt % to about 8.5 wt %, from about 3.00 wt % to about 8.5 wt %, or from about 4.1 wt % to about 8 wt %) of KBr; from about 7.75 wt % to about 14.00 wt % (e.g., from about 7.9 wt % to about 13.25 wt % or from about 8 wt % to about 13 wt %) of KCl; from about 0.25 wt % to about 2.25 wt % (e.g., from about 0.35 wt % to about 2.0 wt % or from about 0.5 wt % to about 2 wt %) of MPEG 2K; from about 0.075 wt % to about 1.25 wt % (e.g., from about 0.1 wt % to about 1 wt %) of MPEG 1K; and from about 0.50 wt % to about 3.50 wt % of a first quaternary ammonium agent, wherein the first quaternary ammonium agent is selected from a tetra-$C_{1-6}$ alkyl ammonium chloride or a tetra-$C_{1-6}$ alkyl ammonium bromide.

In some embodiments, the first quaternary ammonium agent is selected from tetramethylammonium chloride, tetraethylammonium chloride, tetrapropylammonium chloride, tetrabutylammonium chloride, tetramethylammonium bromide, tetraethylammonium bromide, tetrapropylammonium bromide, or tetrabutylammonium bromide.

In some embodiments, the electrolyte further comprising a second quaternary ammonium agent wherein the second quaternary ammonium agent has the formula $N^+(R^A)(R^B)_3X^-$, wherein $R^A$ is a $C_{1-6}$ alkyl, $R^B$ is a $C_{1-6}$ alkyl different from $R^A$, and $X^-$ is $Br^-$ or $Cl^-$; and wherein the concentration of the second quaternary ammonium agent is from about 3.50 wt % to about 15.00 wt %. For example, the second quaternary ammonium agent is selected from a chloride or bromide of trimethylethylammonium, trimethyl propylammonium, trimethylbutylammonium, triethylmethylammonium, triethylpropylammonium, triethylbutylammonium, tripropylmethylammonium, tripropylethylammonium, or tripropylbutylammonium.

In some embodiments, the electrolyte further comprises a third quaternary ammonium agent, wherein the third quaternary ammonium agent has the formula $N+(R^A)(R^B)_3X^-$, wherein $R^A$ is a $C_{1-6}$ alkyl, $R^B$ is a $C_{1-6}$ alkyl different from $R^A$, and $X^-$ is $Br^-$ or $Cl^-$; the third quaternary ammonium agent is different than the second quaternary ammonium agent; and wherein the concentration of the third quaternary ammonium agent is from about 0.25 wt % to about 0.85 wt %. In some examples, the third quaternary ammonium agent is selected from a chloride or bromide of trimethylethylammonium, trimethyl propylammonium, trimethylbutylammonium, triethylmethylammonium, triethylpropylammonium, triethylbutylammonium, tripropylmethylammonium, tripropylethylammonium, or tripropylbutylammonium.

In some embodiments, the electrolyte further comprises from about 0.35 wt % to about 2.75 wt % (e.g., from about 0.4 wt % to about 2.65 wt % or from 0.5 wt % to about 2.5 wt %) of a glycol, wherein the glycol is selected from ethylene glycol, propylene glycol, 1,3-butylene glycol, 1,4-butylene glycol, neopentyl glycol, hexalene glycol, or any combination thereof. For example, the electrolyte further comprises from about 0.35 wt % to about 2.75 wt % (e.g., from about 0.4 wt % to about 2.65 wt % or from 0.5 wt % to about 2.5 wt %) of neopentyl glycol.

In some embodiments, the electrolyte further comprises from about 2.00 wt % to about 4.00 wt % of a glyme, wherein the glyme is selected from monoglyme, diglyme, triglyme, tetraglyme, pentaglyme, hexaglyme, or any combination thereof. For example, the electrolyte further comprises from about 2.00 wt % to about 4.00 wt % of tetraglyme.

Another aspect of the present invention provides an electrolyte for use in a secondary static zinc halide electrochemical cell comprising from about 30.00 wt % to about 50.00 wt % (e.g., from about 35 wt % to about 47.5 wt % or from about 37 wt % to about 46 wt %) of $ZnBr_2$; from about 22.5 wt % to about 40 wt % (e.g., from about 23.75 to about 38 wt % or from about 24 wt % to about 36 wt %) of $H_2O$; from about 3.00 wt % to about 9.5 wt % (e.g., from about 4.00 wt % to about 8.5 wt %, from about 3.00 wt % to about 8.5 wt %, or from about 4.1 wt % to about 8 wt %) of KBr; from about 7.75 wt % to about 14.00 wt % (e.g., from about 7.9 wt % to about 13.25 wt % or from about 8 wt % to about 13 wt %) of KCl; from about 0.25 wt % to about 2.25 wt % (e.g., from about 0.35 wt % to about 2.0 wt % or from about 0.5 wt % to about 2 wt %) of MPEG 2K; from about 0.075 wt % to about 1.25 wt % (e.g., from about 0.1 wt % to about 1 wt %) of MPEG 1K; and one or more quaternary ammonium agents, wherein each quaternary ammonium agent is independently selected from a quaternary ammonium agent having the formula $N^+(R^A)(R^B)_3X^-$ wherein $R^A$ is a $C_{1-6}$ alkyl, $R^B$ is a $C_{1-6}$ alkyl, and $X^-$ is $Br^-$ or $Cl^-$, and wherein the one or more quaternary ammonium agents has an aggregate concentration of from about 3.50 wt % to about 20.00 wt %.

In some embodiments, the electrolyte further comprises from about 0.50 wt % to about 3.50 wt % of a first quaternary ammonium agent, wherein the first quaternary ammonium agent is selected from a tetra-$C_{1-6}$ alkyl ammonium chloride or a tetra-$C_{1-6}$ alkyl ammonium bromide. For example, the first quaternary ammonium agent is selected from tetramethylammonium chloride, tetraethylammonium chloride, tetrapropylammonium chloride, tetrabutylammonium chloride, tetramethylammonium bromide, tetraethylammonium bromide, tetrapropylammonium bromide, or tetrabutylammonium bromide.

In some embodiments, the electrolyte further comprises a second quaternary ammonium agent wherein the second quaternary ammonium agent has the formula $N^+(R^A)(R^B)_3X^-$, wherein $R^A$ is a $C_{1-6}$ alkyl, $R^B$ is a $C_{1-6}$ alkyl different from $R^A$, and $X^-$ is $Br^-$ or $Cl^-$; and wherein the concentration of the second quaternary ammonium agent is from about 3.50 wt % to about 15.00 wt %. In some examples, the second quaternary ammonium agent is selected from a chloride or bromide of trimethylethylammonium, trimethylpropylammonium, trimethylbutylammonium, triethylmethylammonium, triethylpropylammonium, triethylbutylammonium, tripropylmethylammonium, tripropylethylammonium, or tripropylbutylammonium. For instance, the second quaternary ammonium agent is triethylmethylammonium chloride or triethylmethylammonium bromide.

In some embodiments, the electrolyte further comprises a third quaternary ammonium agent, wherein the third quaternary ammonium agent has the formula $N^+(R^A)(R^B)_3X^-$, wherein $R^A$ is a $C_{1-6}$ alkyl, $R^B$ is a $C_{1-6}$ alkyl different from $R^A$, and $X^-$ is $Br^-$ or $Cl^-$; the third quaternary ammonium agent is different than the second quaternary ammonium agent; and wherein the concentration of the third quaternary ammonium agent is from about 0.25 wt % to about 0.85 wt %. In some examples, the third quaternary ammonium agent is selected from a chloride or bromide of trimethylethylammonium, trimethylpropylammonium, trimethylbutylammonium, triethylmethylammonium, triethylpropylammonium, triethylbutylammonium, tripropylmethylammonium, tripropylethylammonium, or tripropylbutylammonium.

In some embodiments, the electrolyte further comprises from about 0.35 wt % to about 2.75 wt % (e.g., from about 0.4 wt % to about 2.65 wt % or from 0.5 wt % to about 2.5 wt %) of a glycol, wherein the glycol is selected from ethylene glycol, propylene glycol, 1,3-butylene glycol, 1,4-butylene glycol, neopentyl glycol, hexalene glycol, or any combination thereof. For example, the electrolyte further comprises from about 0.35 wt % to about 2.75 wt % (e.g., from about 0.4 wt % to about 2.65 wt % or from 0.5 wt % to about 2.5 wt %) of neopentyl glycol.

In some embodiments, the electrolyte further comprises from about 2.00 wt % to about 4.00 wt % of a glyme, wherein the glyme is selected from monoglyme, diglyme, triglyme, tetraglyme, pentaglyme, hexaglyme, or any combination thereof. For example, the electrolyte further comprises from about 2.00 wt % to about 4.00 wt % of tetraglyme.

Another aspect of the present invention provides an electrolyte for use in a secondary static zinc halide electrochemical cell comprising from about 30.00 wt % to about 50.00 wt % (e.g., from about 35 wt % to about 47.5 wt % or from about 37 wt % to about 46 wt %) of $ZnBr_2$; from about 22.5 wt % to about 40 wt % (e.g., from about 23.75 to about 38 wt % or from about 24 wt % to about 36 wt %) of $H_2O$; from about 3.00 wt % to about 9.5 wt % (e.g., from about 4.00 wt % to about 8.5 wt %, from about 3.00 wt % to about 8.5 wt %, or from about 4.1 wt % to about 8 wt %) of KBr; from about 7.75 wt % to about 14.00 wt % (e.g., from about 7.9 wt % to about 13.25 wt % or from about 8 wt % to about 13 wt %) of KCl; from about 0.25 wt % to about 2.25 wt % (e.g., from about 0.35 wt % to about 2.0 wt % or from about 0.5 wt % to about 2 wt %) of MPEG 2K; from about 0.075 wt % to about 1.25 wt % (e.g., from about 0.1 wt % to about 1 wt %) of MPEG 1K; from about 3.50 wt % to about 15.00 wt % of a chloride or a bromide of triethylmethylammonium; and from about 0.50 wt % to about 3.50 wt % of a chloride or a bromide of tetra-$C_{1-6}$ alkyl ammonium.

In some embodiments, the electrolyte further comprises from about 0.25 wt % to about 0.75 wt % of a quaternary ammonium agent having the formula $N^+(R^A)(R^B)_3X^-$, wherein $R^A$ is a $C_{1-6}$ alkyl, $R^B$ is a $C_{1-6}$ alkyl different from $R^A$, and $X^-$ is $Br^-$ or $Cl^-$; and the alkyl ammonium agent is not a chloride or bromide of triethylmethylammonium. For example, the quaternary ammonium agent is selected from a chloride or a bromide of trimethylethylammonium, trimethylpropylammonium, trimethylbutylammonium, triethylpropylammonium, triethylbutylammonium, tripropylmethylammonium, tripropylethylammonium, or tripropylbutylammonium.

In some embodiments, the electrolyte further comprises from about 0.35 wt % to about 2.75 wt % (e.g., from about 0.4 wt % to about 2.65 wt % or from 0.5 wt % to about 2.5 wt %) of a glycol, wherein the glycol is selected from ethylene glycol, propylene glycol, 1,3-butylene glycol, 1,4-butylene glycol, neopentyl glycol, hexalene glycol, or any combination thereof. For example, the electrolyte further comprises from about 0.35 wt % to about 2.75 wt % (e.g., from about 0.4 wt % to about 2.65 wt % or from 0.5 wt % to about 2.5 wt %) of neopentyl glycol.

In some embodiments, the electrolyte further comprises from about 2.00 wt % to about 4.00 wt % of a glyme, wherein the glyme is selected from monoglyme, diglyme, triglyme, tetraglyme, pentaglyme, hexaglyme, or any combination thereof. For example, the electrolyte further comprises from about 2.00 wt % to about 4.00 wt % of tetraglyme.

BRIEF DESCRIPTION OF THE DRAWINGS

These and other features, aspects, and advantages of the present invention will become better understood when the following detailed description is read with reference to the accompanying drawings.

FIGS. 6A and 6B show a front and side view, respectively, of a cathode cage according to an embodiment of the present invention.

FIG. 25A shows the runtime vs. the average discharge power of the battery. FIG. 25B shows energy efficiency vs. average discharge power of the battery.

FIG. 27A shows energy efficiency of the battery over several charge cycles. FIG. 27B shows discharge runtime of the battery over several charge cycles.

Figure 1:
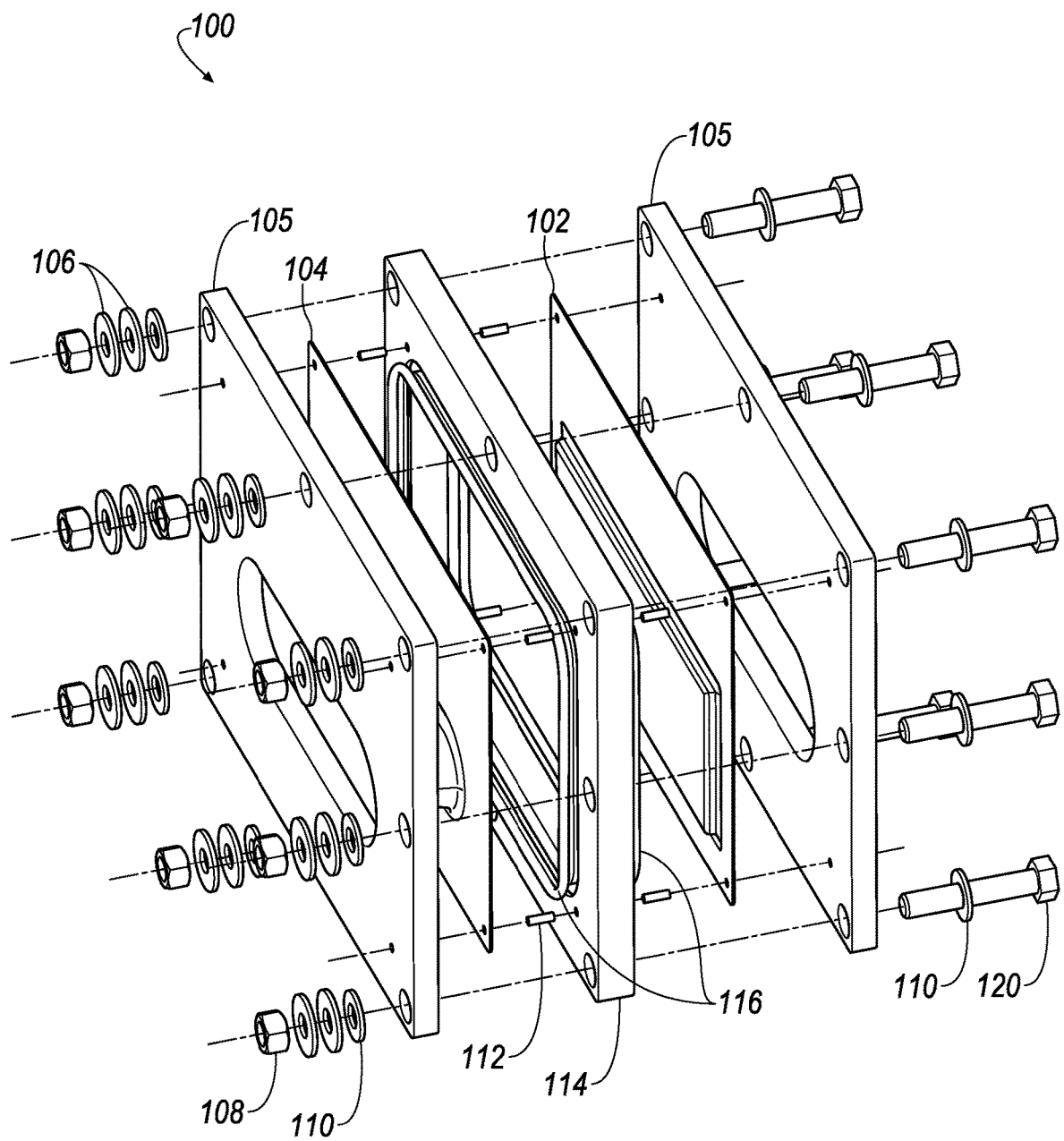
FIG. 1 shows an exploded view of an electrochemical cell according to an embodiment of the present invention.
Figure 2:
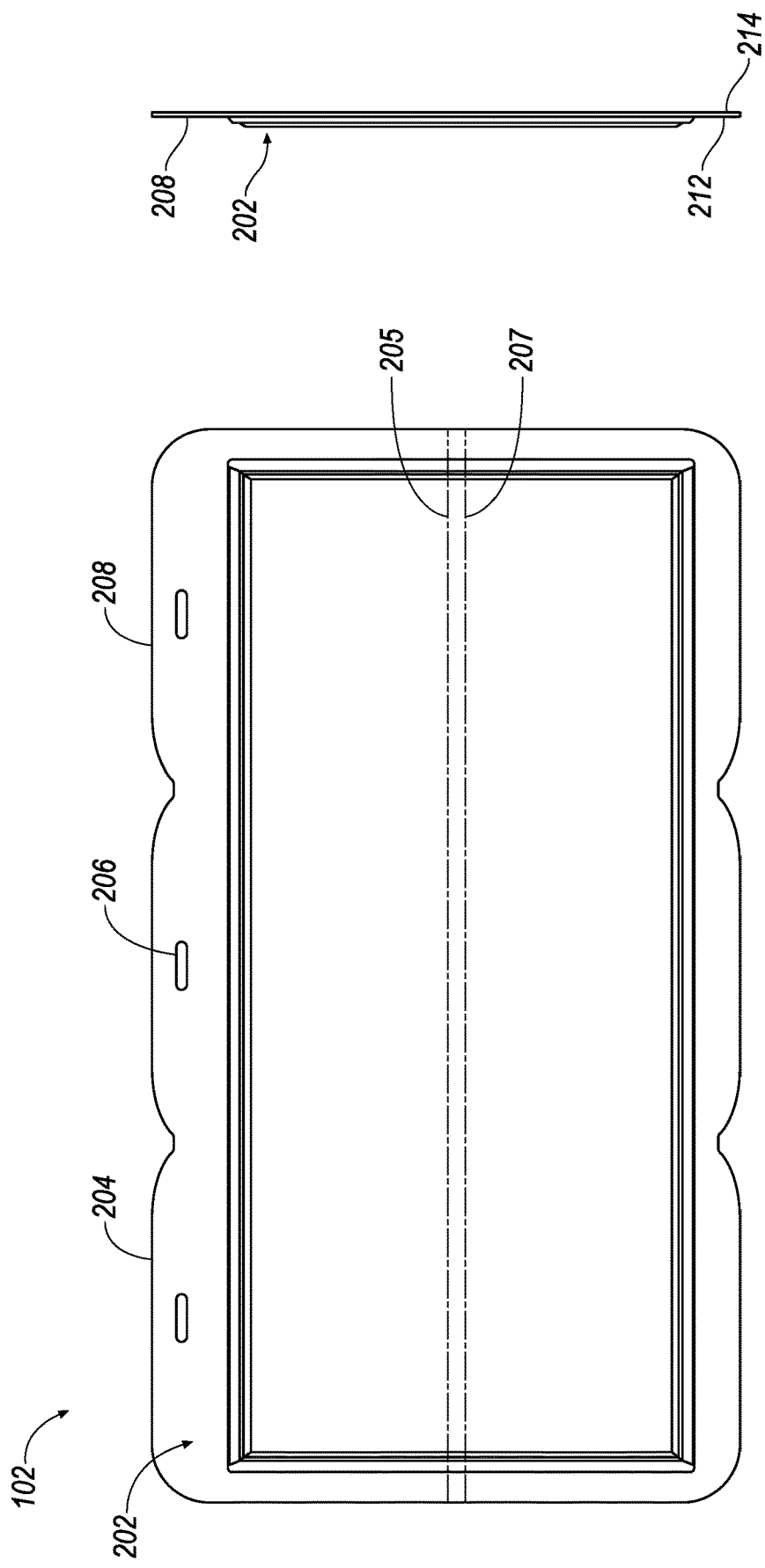
FIGS. 2A and 2B are front and side views, respectively, of a bipolar electrode according to an embodiment of the present invention.
Figure 3:
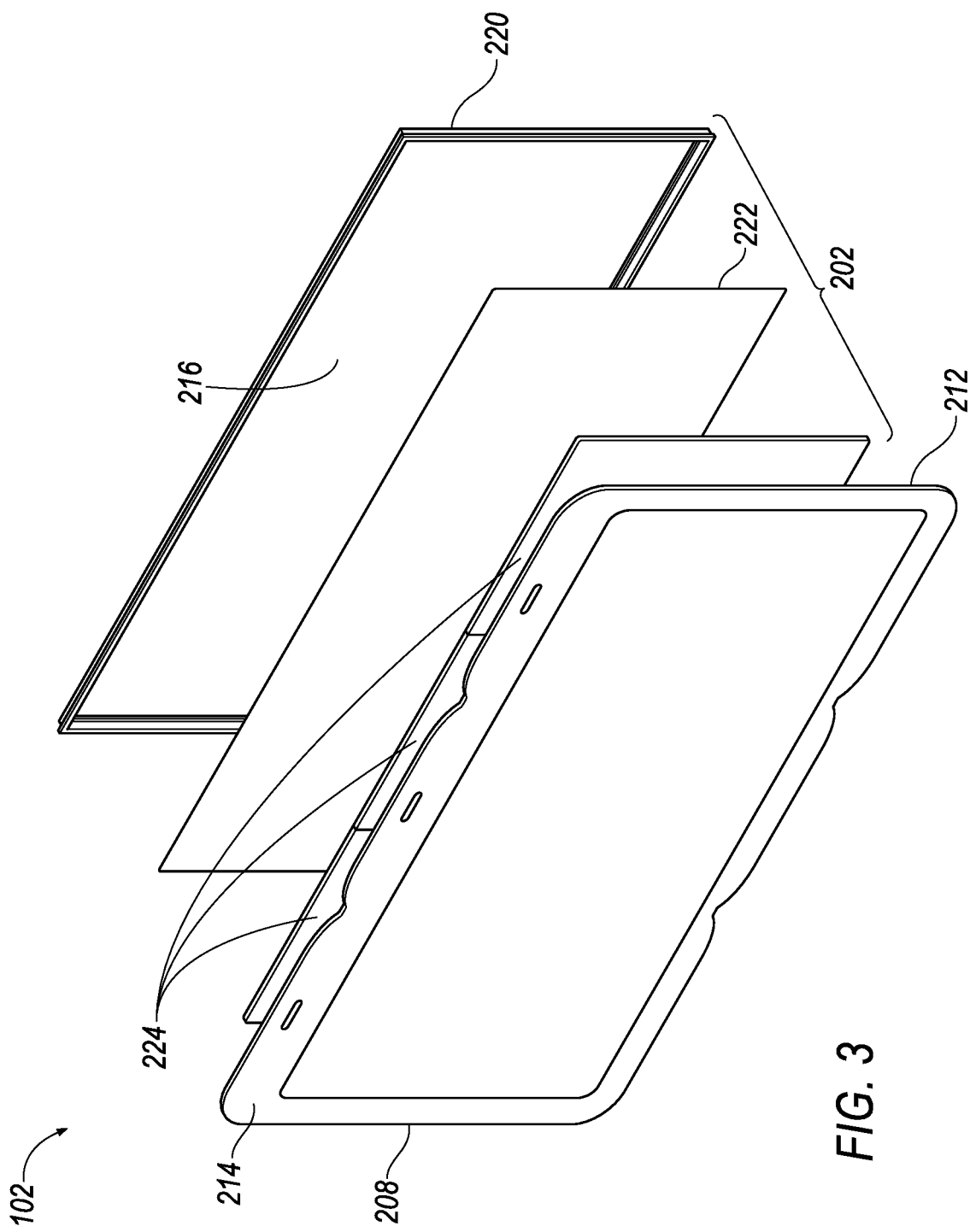
FIG. 3 shows an exploded view of a bipolar electrode according to an embodiment of the present invention.
Figure 4:
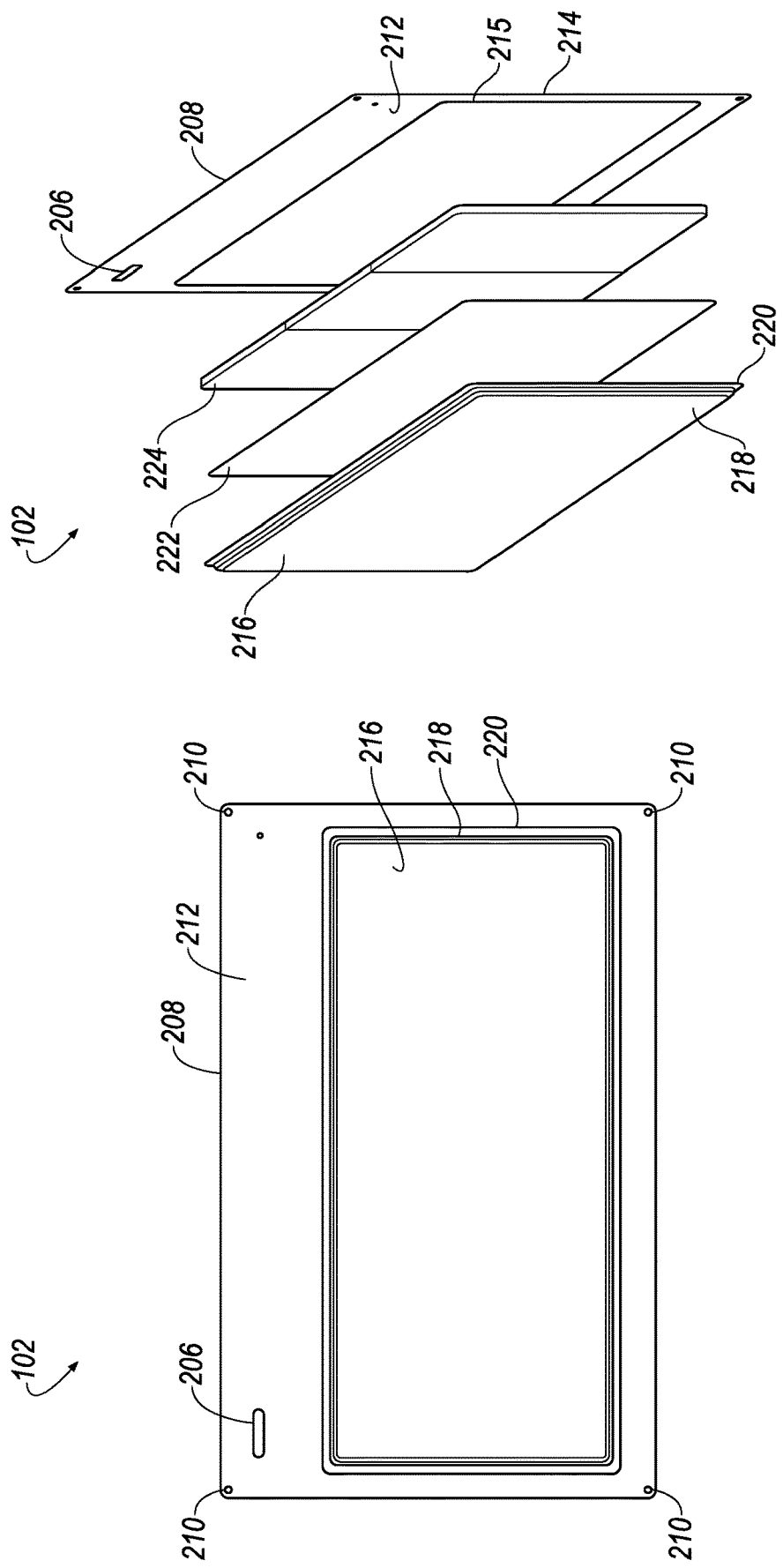
FIG. 4A shows a front view of a bipolar electrode according to an embodiment of the present invention.
FIG. 4B shows an exploded view of a bipolar electrode according to an embodiment of the present invention.
Figure 5:
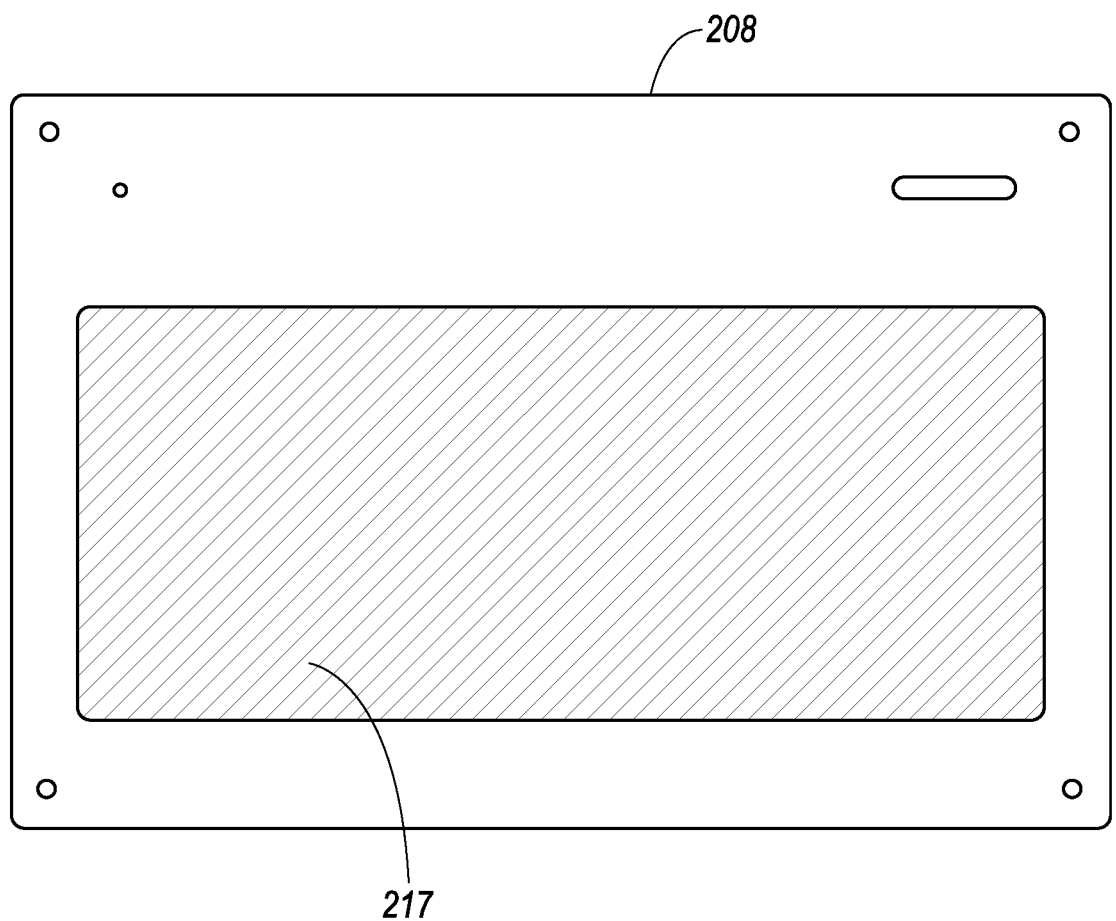
FIG. 5 shows a view of the back surface of an electrode plate having a sandblasted area according to an embodiment of the present invention.

The figures are provided by way of example and are not intended to limit the scope of the invention.

DETAILED DESCRIPTION

The present invention provides an electrolyte for use in secondary, i.e., rechargeable, zinc halide storage batteries (e.g., bipolar flow or non-flow batteries). In some embodiments, the electrolyte of the present invention is for use in non-flow batteries.

I. Definitions

As used herein, the term "electrochemical cell" or "cell" are used interchangeably to refer to a device capable of either generating electrical energy from chemical reactions or facilitating chemical reactions through the introduction of electrical energy.

As used herein, the term "battery" encompasses electrical storage devices comprising at least one electrochemical cell. A "secondary battery" is rechargeable, whereas a "primary battery" is not rechargeable. For secondary batteries of the present invention, a battery anode is designated as the positive electrode during discharge, and as the negative electrode during charge.

As used herein, an "electrolyte" refers to a substance that behaves as an ionically conductive medium. For example, the electrolyte facilitates the mobilization of electrons and cations in the cell. Electrolytes include mixtures of materials such as aqueous solutions of metal halide salts (e.g., ZnBr$_2$, ZnCl$_2$, or the like).

As used herein, the term "electrode" refers to an electrical conductor used to make contact with a nonmetallic part of a circuit (e.g., a semiconductor, an electrolyte, or a vacuum). An electrode may also refer to either an anode or a cathode.

As used herein in, the term "anode" refers to the negative electrode from which electrons flow during the discharging phase in the battery. The anode is also the electrode that undergoes chemical oxidation during the discharging phase. However, in secondary, or rechargeable, cells, the anode is the electrode that undergoes chemical reduction during the cell's charging phase. Anodes are formed from electrically conductive or semiconductive materials, e.g., metals (e.g., titanium or TiC coated titanium), metal oxides, metal alloys, metal composites, semiconductors, or the like.

As used herein, the term "cathode" refers to the positive electrode into which electrons flow during the discharging phase in the battery. The cathode is also the electrode that undergoes chemical reduction during the discharging phase. However, in secondary or rechargeable cells, the cathode is the electrode that undergoes chemical oxidation during the cell's charging phase. Cathodes are formed from electrically conductive or semiconductive materials, e.g., metals, metal oxides, metal alloys, metal composites, semiconductors, or the like.

As used herein, the term "bipolar electrode" refers to an electrode that functions as the anode of one cell and the cathode of another cell. For example, in a battery stack, a bipolar electrode functions as an anode in one cell and functions as a cathode in an immediately adjacent cell. In some examples, a bipolar electrode comprises two surfaces, a cathode surface and an anode surface, wherein the two surfaces are connected by a conductive material. For instance, a bipolar electrode plate may have opposing surfaces wherein one surface is the anode surface, the other surface is the cathode surface, and the conductive material is the thickness of the plate between the opposing surfaces.

As used herein, the term "halide" refers to a binary compound of a halogen with another element or radical that is less electronegative (or more electropositive) than the halogen, to make a fluoride, chloride, bromide, iodide, or astatide compound.

As used herein, the term "halogen" refers to any of the elements fluorine, chlorine, bromine, iodine, and astatine, occupying group VIIA (17) of the periodic table. Halogens are reactive nonmetallic elements that form strongly acidic compounds with hydrogen, from which simple salts can be made.

As used herein, the term "anion" refers to any chemical entity having one or more permanent negative charges. Examples of anions include, but are not limited to fluoride, chloride, bromide, iodide, arsenate, phosphate, arsenite, hydrogen phosphate, dihydrogen phosphate, sulfate, nitrate, hydrogen sulfate, nitrite, thiosulfate, sulfite, perchlorate, iodate, chlorate, bromate, chlorite, hypochlorite, hypobromite, carbonate, chromate, hydrogen carbonate (bicarbonate), dichromate, acetate, formate, cyanide, amide, cyanate, peroxide, thiocyanate, oxalate, hydroxide, and permanganate.

As used herein, "glyme" refers to an ether (e.g., a glycol ether). Examples include, but are not limited to, monoglyme (i.e., 1,2-dimethoxyethane), diglyme (i.e., bis(2-methoxyethyl) ether, tetraglyme (i.e., tetraethylene glycol dimethyl ether), pentaglyme, hexaglyme, heptaglyme, or any combination thereof.

As used herein, a "titanium material" may include, but is not limited to, titanium (in any oxidation state), TiC, alloys of TiC such as $TiC_xM$ (where x is 0, 1, 2, 3, or 4 and M is a metal), titanium carbohyrides, titanium oxycarbides, titanium oxynitrides, titanium oxycarbonitrides, titanium sub-oxides, non-stoichiometric titanium-carbon compounds, and any combination thereof.

As used herein, "titanium carbide" is used interchangeably with "titanium carbide material" and includes, but is not limited to TiC, alloys of TiC such as $TiC_xM$ (where x is 0, 1, 2, 3, or 4 and M is a metal), titanium carbohyrides, non-stoichiometric titanium-carbon compounds, and combinations thereof.

As used herein, the term "zinc metal" refers to elemental zinc, also commonly known as Zn(0) or $Zn^0$.

As used herein, the term "dimethyl ether poly(ethylene glycol)", "DME-PEG", and "MPEG" are used interchangeably to refer to a polymer having the structure

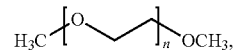

where n is an integer. DME-PEG 1000 (or MPEG 1K) refers to a DME-PEG polymer having a number average molecular weight ($M_n$) about 1000, and DME-PEG 2000 (or MPEG 2K) refers to a DME-PEG polymer having a number average molecular weight ($M_n$) of about 2000.

As used herein, the term "dimethyl ether" refers to an organic compound having the formula $CH_3OCH_3$.

As used herein, the term "aggregate concentration" refers to the sum total concentration (e.g., wt %) of each constituent of a class of ingredients or a class of agents (e.g., quaternary ammonium agents). In one example, the aggregate concentration of one or more quaternary ammonium agents in an electrolyte is the sum total of the concentrations (e.g., weight percents) of each constituent quaternary ammonium agent present in the electrolyte. Thus, if the electrolyte has three quaternary ammonium agents, the aggregate concentration of the three quaternary ammonium agents is the sum of the concentrations for each of the three quaternary ammonium agents present in the electrolyte. And, if the electrolyte has only one quaternary ammonium agent, the aggregate concentration of the quaternary ammonium agents is simply the concentration of the single quaternary ammonium agent present in the electrolyte.

As used herein, the term "alcohol" refers to any organic compound whose molecule contains one or more hydroxyl groups attached to a carbon atom. Examples of alcohols include methanol, ethanol, 1-propanol (i.e., n-propanol), 2-propanol (i.e., iso-propanol), 1-butanol (i.e., n-butanol), sec-butanol, iso-butanol, tert-butanol, 1-pentanol, or any combination thereof.

As used herein, the term "hydroxyl group" refers to an —OH group.

As used herein, the term "glycol" refers to any of a class of organic compounds belonging to the alcohol family. In the molecule of a glycol, two hydroxyl (—OH) groups are attached to different carbon atoms. Examples of glycols include $C_{1-10}$ glycols including ethylene glycol, propylene glycol, 1,3-butylene glycol, 1,4-butylene glycol, neopentyl glycol, hexalene glycol, or any combination thereof. Other examples of glycols include substituted ethylene and substituted propylene glycols.

As used herein, the term "weight percent" and its abbreviation "wt %" are used interchangeably to refer to the product of 100 times the quotient of mass of one or more components divided by total mass of a mixture or product containing said component:

$$\text{wt \%} = 100\% \times (\text{mass of component(s)/total mass})$$

When referring to the concentration of components or ingredients for electrolytes, as described herein, wt % is based on the total weight of the electrolyte.

As used herein, the term "quaternary ammonium agent" refers to any compound, salt, or material comprising a quaternary nitrogen atom. For example, quaternary ammonium agents include ammonium halides (e.g., $NH_4Br$, $NH_4Cl$, or any combination thereof), tetra-alkylammonium halides (e.g., tetramethylammonium bromide, tetramethylammonium chloride, tetraethylammonium bromide, tetraethylammonium chloride, alkyl-substituted pyridinium halides, alkyl-substituted morpholinium halides, combinations thereof or the like), heterocyclic ammonium halides (e.g., alkyl-substituted pyrrolidinium halide (e.g., N-methyl- N-ethylpyrrolidinium halide or N-ethyl-N-methylpyrrolidinium halide), alkyl-substituted pyridinium halides, alkyl-substituted morpholinium halides, viologens having at least one quaternary nitrogen atom, combinations thereof, or the like), or any combination thereof. Tetra-alkylammonium halides may be symmetrically substituted or asymmetrically substituted with respect to the substituents of the quaternary nitrogen atom.

As used herein, the term "viologen" refers to any bipyridinium derivative of 4-4'-bipyridine.

As used herein, the term "ammonium bromide complexing agent" refers to any compound, salt, or material comprising a quaternary nitrogen atom, wherein the quaternary nitrogen atom is not part of an imidazolium, pyridinium, pyrrolidinium, morpholinium, or phosphonium moiety. Examples of ammonium bromide complexing agents include: tetraethylammonium bromide, trimethylpropylammonium bromide, dodecyltrimethylammonium bromide, cetyltriethylammonium bromide, and hexyltrimethylammonium bromide.

As used herein, the term "imidazolium bromide complexing agent" refers to any compound, salt, or material comprising a quaternary nitrogen atom, wherein the quaternary nitrogen atom is part of an imidazolium moiety. Examples of imidazolium bromide complexing agents include: 1-ethyl-3-methylimidazolium bromide, 1-butyl-3-methylimidazoliium bromide, 1-ethyl-2,3-dimethylimidazolium bromide, 1-decyl-3-methylimidazolium bromide, 1-butyl-2,3-dimethylimidazolium bromide, 1-methyl-3-octylimidazollium bromide, and 1-methyl-3-hexylimidazolium bromide.

As used herein, the term "pyridinium bromide complexing agent" refers to any compound, salt, or material comprising a quaternary nitrogen atom, wherein the quaternary nitrogen atom is part of a pyridinium moiety. Examples of pyridinium bromide complexing agents include: 1-ethyl-2-methylpyridinium bromide, 1-ethyl-3-methylpyridinium bromide, 1-ethyl-4-methylpyridinium bromide, 1-butyl-3-methylpyridinium bromide, 1-butyl-3-methylpyridinium bromide, 1-butyl-4-methylpyridinium bromide, and 1-hexylpyridinium bromide.

As used herein, the term "pyrrolidinium bromide complexing agent" refers to any compound, salt, or material comprising a quaternary nitrogen atom, wherein the quaternary nitrogen atom is part of a pyrrolidinium moiety. An example of a pyrrolidinium bromide complexing agent is 1-butyl-1-methylpyrrolidinium bromide.

As used herein, the term "morpholinium bromide complexing agent" refers to any compound, salt, or material comprising a quaternary nitrogen atom, wherein the quaternary nitrogen atom is part of a morpholinium moiety. An example of a morpholinium bromide complexing agent is N-ethyl-N-methylmorpholinium bromide.

As used herein, the term "phosphonium bromide complexing agent" refers to any compound, salt, or material comprising a quaternary phosphonium atom. An example of a phosphonium bromide complexing agent is tetraethylphosphonium bromide.

As used herein, the term "crown ether" refers to a cyclic chemical compound consisting of a ring containing at least three ether groups. Examples of crown ethers include 12-crown-4, 15-crown-5, 18-crown-6, dibenzo-18-crown-6, and diaza-18-crown-6.

As used herein, an "alkyl" group refers to a saturated aliphatic hydrocarbon group containing 1-20 (e.g., 1-16, 1-12, 1-8, 1-6, or 1-4) carbon atoms. An alkyl group can be straight or branched. Examples of alkyl groups include, but are not limited to, methyl, ethyl, propyl, isopropyl, butyl, isobutyl, sec-butyl, tert-butyl, pentyl, hexyl, heptyl, 2-ethylhexyl, octyl, nonyl, decyl, dodecyl, and cetyl.

As used herein, an "aryl" group used alone or as part of a larger moiety as in "aralkyl", "aralkoxy", or "aryloxyalkyl" refers to monocyclic (e.g., phenyl); bicyclic (e.g., indenyl, naphthalenyl, tetrahydronaphthyl, tetrahydroindenyl); tricyclic (e.g., fluorenyl, tetrahydrofluorenyl, anthracenyl, or tetrahydroanthracenyl); or a benzofused group having 3 rings. For example, a benzofused group includes phenyl fused with two or more $C_{4-8}$ carbocyclic moieties. An aryl is optionally substituted with one or more substituents including aliphatic (e.g., alkyl, alkenyl, or alkynyl); cycloalkyl; (cycloalkyl)alkyl; heterocycloalkyl; (heterocycloalkyl)alkyl; aryl; heteroaryl; alkoxy; cycloalkyloxy; heterocycloalkyloxy; aryloxy; heteroaryloxy; aralkyloxy; heteroaralkyloxy; aroyl; heteroaroyl; amino; aminoalkyl; nitro; carboxy; carbonyl (e.g., alkoxycarbonyl, alkylcarbonyl, aminocarbonyl, (alkylamino)alkylaminocarbonyl, arylaminocarbonyl, heteroarylaminocarbonyl; or sulfonylcarbonyl); aryalkylcarbonyloxy; sulfonyl (e.g., alkylsulfonyl or aminosulfonyl); sulfinyl (e.g., alkylsulfinyl); sulfanyl (e.g., alkylsulfanyl); cyano; halo; hydroxyl; acyl; mercapto; sulfoxy; urea; thiourea; sulfamoyl; sulfamide; oxo; or carbamoyl. Alternatively, an aryl may be unsubstituted.

Examples of substituted aryls include haloaryl, alkoxycarbonylaryl, alkylaminoalkylaminocarbonylaryl, p, m-dihaloaryl, p-amino-p-alkoxycarbonylaryl, m-amino-m-cyanoaryl, aminoaryl, alkylcarbonylaminoaryl, cyanoalkylaryl, alkoxyaryl, aminosulfonylaryl, alkylsulfonylaryl, aminoaryl, p-halo-m-aminoaryl, cyanoaryl, hydroxyalkylaryl, alkoxyalkylaryl, hydroxyaryl, carboxyalkylaryl, dialkylaminoalkylaryl, m-heterocycloaliphatic-o-alkylaryl, heteroarylaminocarbonylaryl, nitroalkylaryl, alkyl sulfonylaminoalkylaryl, heterocycloaliphaticcarbonylaryl, alkyl sulfonylalkylaryl, cyanoalkylaryl, heterocycloaliphaticcarbonylaryl, alkylcarbonylaminoaryl, hydroxyalkylaryl, alkylcarbonylaryl, aminocarbonylaryl, alkyl sulfonylaminoaryl, dialkylaminoaryl, alkyl aryl, and trihaloalkylaryl.

As used herein, an "aralkyl" group refers to an alkyl group (e.g., a $C_{1-4}$ alkyl group) that is substituted with an aryl group. Both "alkyl" and "aryl" are defined herein. An example of an aralkyl group is benzyl. A "heteroaralkyl" group refers to an alkyl group that is substituted with a heteroaryl.

As used herein, a "cycloalkyl" group refers to a saturated carbocyclic mono-, bi-, or tri-, or multicyclic (fused or bridged) ring of 3-10 (e.g., 5-10) carbon atoms. Without limitation, examples of monocyclic cycloalkyl groups include cyclopropyl, cyclobutyl, cyclopentyl, cyclohexyl, cycloheptyl, or the like. Without limitation, examples of bicyclic cycloalkyl groups include octahydro-indenyl, decahydro-naphthyl, bicyclo[3.2.1]octyl, bicyclo[2.2.2]octyl, bicyclo[3.3.1]nonyl, bicyclo[3.3.2.]decyl, bicyclo[2.2.2]octyl, bicycle[2.2.1]heptanyl, bicycle[3.1.1]heptanyl, or the like. Without limitation, multicyclic groups include adamantyl, cubyl, norbornyl, or the like. Cycloalkyl rings can be optionally substituted at any chemically viable ring position.

As used herein, a "heterocycloalkyl" group refers to a 3-10 membered mono or bicyclic (fused or bridged) (e.g., 5 to 10 membered mono or bicyclic) saturated ring structure, in which one or more of the ring atoms is a heteroatom (e.g., N, O, S, or combinations thereof). Examples of a heterocycloalkyl group include optionally substituted piperidyl, piperazyl, tetrahydropyranyl, tetrahydrofuryl, 1,4-dioxolanyl, 1,4-dithianyl, 1,3-dioxolanyl, oxazolidyl, isoxazolidyl, morpholinyl, thiomorpholyl, octahydro-benzofuryl, octahydro-chromenyl, octahydro-thiochromenyl, octahydro-indolyl, octahydro-pyrindinyl, decahydro-quinolinyl, octahydro-benzo[b]thiopheneyl, 2-oxa-bicyclo[2.2.2]octyl, 1-aza-bicyclo[2.2.2]octyl, 3-aza-bicyclo[3.2.1]octanyl, 2,6-dioxa-tricyclo[3.3.1.0$^{3,7}$]nonyl, tropane. A monocyclic heterocycloalkyl group may be fused with a phenyl moiety such as tetrahydroisoquinoline. Heterocycloalkyl ring structures can be optionally substituted at any chemically viable position on the ring or rings.

A "heteroaryl" group, as used herein, refers to a monocyclic, bicyclic, or tricyclic ring structure having 4 to 15 ring atoms wherein one or more of the ring atoms is a heteroatom (e.g., N, O, S, or combinations thereof) and wherein one or more rings of the bicyclic or tricyclic ring structure is aromatic. A heteroaryl group includes a benzo fused ring system having 2 to 3 rings. For example, a benzo fused group includes benzo fused with one or two $C_{4-8}$ heterocyclic moieties (e.g., indolizyl, indolyl, isoindolyl, 3H-indolyl, indolinyl, benzo[b]furyl, benzo[b]thiophenyl, quinolinyl, or isoquinolinyl). Some examples of heteroaryl are azetidinyl, pyridyl, 1H-indazolyl, furyl, pyrrolyl, thienyl, thiazolyl, oxazolyl, imidazolyl, tetrazolyl, benzofuryl, isoquinolinyl, benzthiazolyl, xanthene, thioxanthene, phenothiazine, dihydroindole, benzo[1,3]dioxole, benzo[b]furyl, benzo[b]thiophenyl, indazolyl, benzimidazolyl, benzthiazolyl, puryl, cinnolyl, quinolyl, quinazolyl,cinnolyl, phthalazyl, quinazolyl, quinoxalyl, isoquinolyl, 4H-quinolizyl, benzo-1,2,5-thiadiazolyl, or 1,8-naphthyridyl. Heteroaryls also include bipyridine compounds.

II. Electrochemical Cells and Battery Stacks

Referring to FIGS. 1-23, in one aspect the present invention provides a static (non-flowing) bipolar zinc-halide rechargeable electrochemical cell 100 and battery stacks of such cells 1000.

A. Bipolar Electrochemical Cell

The bipolar electrochemical cell of the present invention 100 comprises a bipolar electrode 102, a terminal assembly 104, and a zinc-halide electrolyte.

1. Bipolar Electrodes

Bipolar electrodes 102, 102' of present invention comprise a bipolar electrode plate 208 having a front surface 212 and a back surface 214, wherein a cathode assembly 202 is affixed to the front surface of the bipolar electrode plate so that the cathode assembly electrically communicates with at least the front surface of the bipolar electrode plate 208. Bipolar electrodes 102 of the present invention are configured to plate zinc metal on an anodic electrode surface (e.g., the back surface of an adjacent bipolar electrode or an inner surface of an endplate of a terminal anode assembly) and generate halide or mixed halide species during charging of the electrochemical cell that are reversibly sequestered in the cathode assembly. Conversely, these electrodes are configured to oxidize plated zinc metal to generate $Zn^{2+}$ cations and reduce the halide or mixed halide species to their corresponding anions during discharging of the electrochemical cell.

a. Bipolar Electrode Plates

Bipolar electrode plates of the present invention 208, 208', comprise a front surface 212 and a back surface 214. The cathode assembly is situated on the front surface 212 (e.g., the cathodic surface) of the bipolar electrode plate 208. In some embodiments, the bipolar electrode plate comprises a conductive material that is relatively inert to the zinc halide electrolyte used in the electrochemical cell or battery stack. In some embodiments, the bipolar electrode plate 208 comprises a titanium material (e.g., titanium or titanium oxide).

In some instances, the bipolar electrode plate 208 further comprises a coating or film that covers at least a portion of the front surface 212, at least a portion of the back surface 214, or at least a portion of both surfaces. In other embodiments, the bipolar electrode plate comprises a titanium material that is coated with a titanium carbide material. And, in some embodiments, bipolar plate comprises a titanium material that is thermally diffused with carbon. In these embodiments, at least a portion of the front surface 212, at least a portion of the back surface 214, or at least a portion of both surfaces are coated with the titanium carbide material or thermally diffused with carbon. In some embodiments, the bipolar electrode plate comprises an electrically conductive carbon material (e.g., a graphite plate).

In some instances, the bipolar electrode plate comprises a graphite plate that is coated with a titanium carbide material. In these embodiments, at least a portion of the front surface 212, the back surface 214, or at least a portion of either of these surfaces is coated with the titanium carbide material.

The bipolar electrode plate of the present invention optionally comprises a recessed portion 215 on the front surface 212 of the bipolar electrode plate. In some embodiments, the bipolar electrode plate comprises a recessed portion 215 on the front surface 212 of the bipolar electrode plate. In some of these embodiments, peripheral edges of the recessed portion 215 are substantially defined by the outermost edge of the flange 220 of the cathode cage 216 of the cathode assembly 202, such that the cathode assembly at least partially fits within recessed portion 215 when the bipolar electrode is assembled. In other embodiments, the peripheral edges of the recessed portion are at least partially within the outermost edge of the flange 220 of the cathode cage 216 of the cathode assembly 202. In some of these embodiments, the recessed portion may be defined by the outermost edge of the carbon material 224 that is nested within the cathode cage 216 of the cathode assembly 202, such that the carbon material 224 at least partially fits within recessed portion 215 of the bipolar electrode plate when the bipolar electrode 102 is assembled. And, in some alternative embodiments, the front surface 212 of the bipolar electrode plate lacks a recessed portion such that the surface is at least substantially flat.

Bipolar electrode plates of the present invention may optionally comprise one or more thru holes at or near the periphery 204 of the plate. Referring to FIGS. 2A-4, in some embodiments, the bipolar electrode plate comprises one or more thru holes 206, 210 at or near the periphery 204 of the plate that may be useful for filling an electrochemical cell with liquid electrolyte or may be useful for aligning electrode plates in battery stacks.

The bipolar electrode plates may be formed by stamping or other suitable processes. A portion of the front surface 212, a portion of the back surface 214, or portions of both surfaces may optionally undergo surface treatments (e.g., coating or the like) to enhance the electrochemical properties of the cell or battery stack. The back surface of the bipolar electrode plate may include an electrochemically active region associated with or defined by the formation of a layer of zinc metal upon cell or battery stack charging. In some embodiments, the back surface of the electrode plate may be sandblasted (e.g., sandblasted with SiC or garnet), textured, or otherwise treated within the electrochemically active region. In other embodiments, the front surface may also be sandblasted within an electrochemically active region associated with a region enclosed by the cathode assembly.

For example, in some embodiments, at least a portion of the back surface, at least a portion of the front surface, or at least portions of both surfaces are treated (e.g., sandblasted) to give a rough surface. In some instances, at least a portion of the back surface of the bipolar electrode plate is treated (e.g., sandblasted) to give a rough surface. In some instances, the region of the back surface that is treated to give a rough surface is substantially defined by the periphery of the cathode assembly affixed to the front surface of the electrode plate.

b. Cathode Assemblies

Electrochemical cells and battery stacks of the present invention comprise at least one cathode assembly 202, wherein the cathode assembly is formed from a cathode cage 216, carbon material 224, and a separator 222.

i. Cathode Cage

The cathode cage 216 comprises a pocket portion 218 and a flange 220 and is disposed on either the front surface 212, 212' of the bipolar electrode plate or the inner surface 316 of a terminal endplate at the flange 220. Referring to FIGS. 6A and 6B, a front view (FIG. 6A) and a side view (FIG. 6B) of the cathode cage 216 are illustrated. The cathode cage 216 includes an overall area defined by the length $X_1$ and the width $Y_1$ that includes the flange 220. To form the flanges, a flat metal sheet is installed in a forming machine to press the flanges on each of the four edges of the flat sheet. In some implementations, the flat metal sheet comprises a titanium or titanium carbide material. In some embodiments, the cathode cage further comprises slots at the corners of the cage. These slots may be formed by laser cutting. The cathode cage 216 includes a reduced area corresponding to the pocket portion 218 defined by the length $X_2$ and the width $Y_2$. Accordingly, $X_1$ is greater than $X_2$ and $Y_1$ is greater than $Y_2$. In the example shown, the flange 220 is flexed flat relative to the pocket portion 218 to dictate the $X_1/X_2$ and $Y_1/Y_2$ dimensions and the depth of the pocket portion. In some embodiments, the area defined by $X_2$ and $Y_2$ is indicative of the etching area where a plurality of holes 227 are formed. Lengths $X_1/X_2$ and widths $Y_1/Y_2$ may vary based upon the operating requirements of the electrochemical cell 100 or battery stack 1000.

In some embodiments, the flange 220 includes a surface adjacent to and contacting the front surface 212 of the bipolar electrode plate and a depth of the pocket portion 218 extends from the flange in a direction away from the front surface of the electrode plate. The pocket portion 218 of the cathode cage operates cooperatively with the front surface of the electrode plate to form a chamber in which the separator 222 and the carbon material 224 are situated. In some of these embodiments, the cathode cage is disposed on the front surface of the electrode plate at its flange by welding, use of an adhesive, use of a mechanical fastener, or any combination thereof.

The cathode cage is formed of a metal, metal alloy, or plastic that is substantially inert to the electrolyte of the electrochemical cell or battery stack. In some embodiments, the cathode cage is stamped from a titanium material (e.g., titanium or titanium oxide). In other embodiments, the cathode cage comprises a titanium material that is coated with a titanium carbide material.

In some embodiments, the pocket portion of the cathode cage is chemically-etched to form a plurality of spaced holes 227. In some embodiments, the holes are sized and spaced to form a hole pattern (e.g., a modulated hole pattern) that increases the uniformity of current and/or charge distributed across the cathode cage by compensating for the deformation or bending of the pocket portion of the cathode cage that occurs during operation (e.g., charging or discharging) of the electrochemical cell.

Figure 7A:
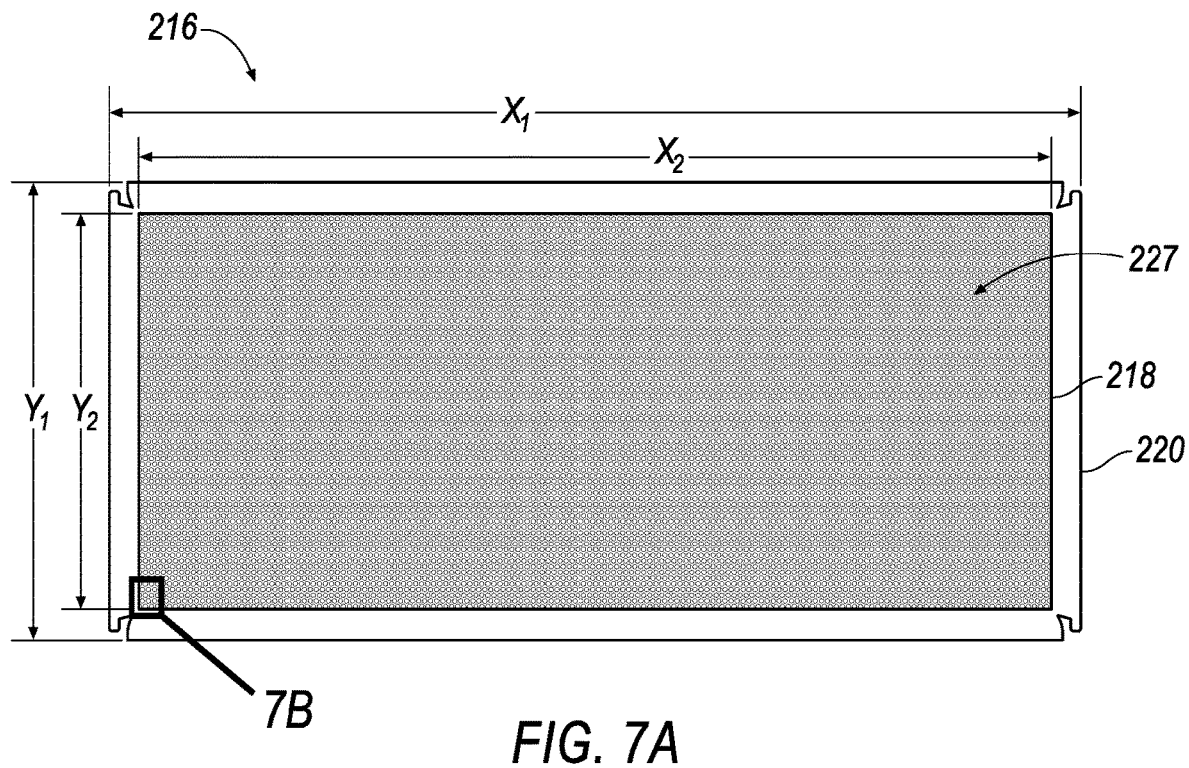
FIGS. 7A and 7B show a front view of a cathode cage and a magnified view of a cathode cage material having holes therethrough, respectively, according to an embodiment of the present invention.
Figure 7B:
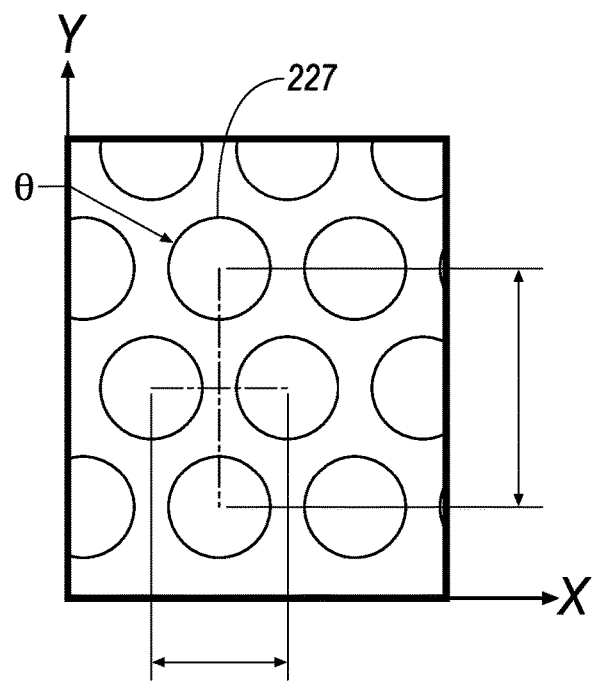
Figure 8:
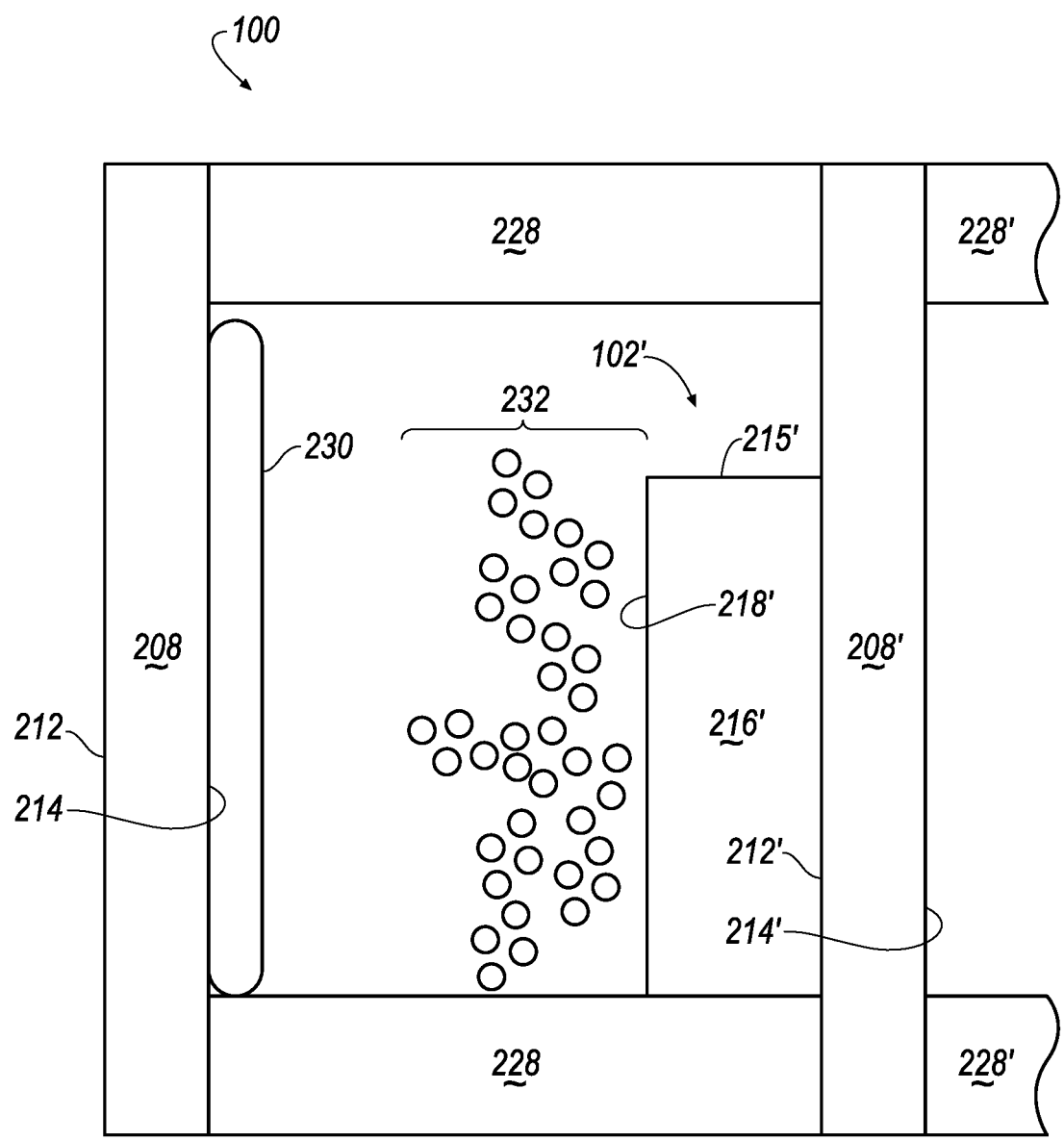
FIG. 8 shows a cross-sectional view of a portion of an electrochemical cell including an interface between a front surface of a bipolar electrode plate (including the cathode assembly mounted thereon) and the back surface of a second electrode plate or an inner surface of a terminal endplate according to an embodiment of the present invention.
Figure 9:
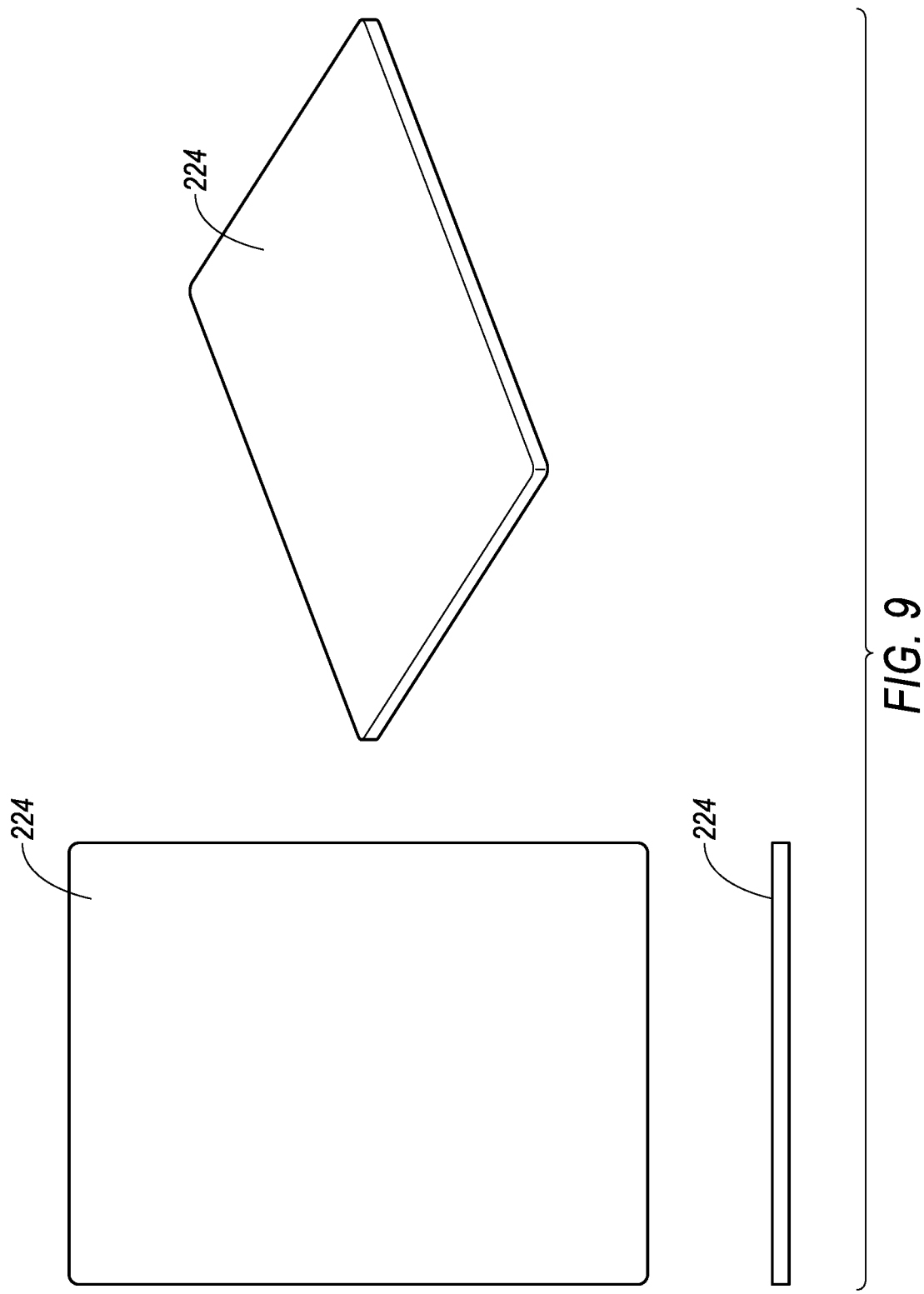
FIG. 9 shows a front, side, and top perspective view of a carbon material for use as a cathode according to an embodiment of the present invention.

FIG. 7A illustrates the front view of the cathode cage 216 depicted by FIG. 6A, including the plurality of holes 227 formed through the chemically-etched surface of the pocket portion 218 by chemical etching. FIG. 7B is a detailed view of a portion illustrated by FIG. 7A showing a distribution of the plurality of holes 227. The chemical etching process is a subtractive manufacturing process that eliminates solid material that is to be removed for forming the plurality of holes 227. During the first step of the chemical etching process, the cathode cage 216 begins as a flat metal sheet that is cut using a shear to achieve dimensions corresponding to $X_1$ and $Y_1$. Next, the metal sheet may be cleaned and coated with a dry film solder mask in a hot roll laminator and then cooled in a dark environment. A protective film may then be applied within a vacuum exposure unit to expose the metal sheet. In some examples, the magnitude of exposure may be measured using a step indicator, and the exposure is determined when a desired magnitude of exposure is achieved. Subsequently, the metal sheet is run through a developer to remove the protective film while a resolve detergent in the developer is applied to the metal sheet to remove unwanted, unexposed resist. The metal sheet may then be placed in a furnace rack and baked at a predetermined temperature for a predetermined period of time. For instance, the baking temperature may be about 250° F. for about 60 minutes. Following the baking cycle, each metal sheet is air-cooled, and a chemical etching device is programmed for specifications of the desired etching area, e.g., the area defined by $X_2$ and $Y_2$, and the baked and cooled metal sheet is run through the chemical etching device to remove the unwanted material and thereby form the holes 227.

Referring now to FIG. 7B, the plurality of holes 227 are spaced and distributed along rows in a pattern. In some embodiments, the pattern is an alternating repeating pattern. In some embodiments, the pattern is selected to permit a uniform distribution of current across the cathode cage 216 in the presence of the cathode cage bending and deforming from flat during charging of the electrochemical cell or battery stack. Also referring to FIGS. 30A-31C, providing the cathode cage with a hole pattern in accordance with the present invention enhances the uniform distribution of charge and/or current which generates a more uniform plating of zinc metal at the anodic surface (e.g., the back surface 214 of a bipolar electrode plate, or the inner surface 318 of an endplate, or both surfaces) of the bipolar electrode plate during charge cycles. Likewise, conversions between bromine and bromide anions at or near the cathode cage 216 may also be enhanced. In some embodiments, the spacing between each hole of the plurality of holes 227 along the rows in the x-direction, the spacing between the alternating rows in the y-direction, and the diameter, φ, of the holes may be selected to achieve a substantially uniform distribution of charge and/or current across the cathode cage 216 based on the amount of bend or deformation that results in the cathode cage and the bipolar electrode the when the electrochemical cell or battery stack undergoes charging and discharging. In some implementations, the distribution of the x and y hole locations (e.g., spacing) in each of the x and y directions is based upon a nominal hole area and a recommended web length of the cathode cage 216. The thickness of the surface of the pocket portion 218 may dictate the dimensions of the nominal hole area and the recommended web length. In some examples, the center of the adjacent plurality of holes 227 along a row are spaced by about 0.067 cm in the x-direction and every other row is spaced by about 0.152 cm in the y-direction. As described in greater detail below, the cathode cage 216, and the bipolar electrode plate 208, 208', or the terminal endplate 302 will bend greater distances from flat at regions further from the perimeter at each of the parts resulting in the spacing between the anode and cathode electrodes to be shorter at the center regions with respect the outer regions near the perimeter. Generally, as the spacing between the anode and cathode electrodes decreases, the calculated hole diameter at corresponding x and y hole locations will increase.

In some embodiments, the spacing between the electrodes (e.g., between the cathode cage 216 and the back surface 214 or the inner surface 318 of the bipolar electrode plate 208, 208', 302) is calculated at each of the plurality of evenly distributed x and y hole locations along the etching area (e.g., area defined by $X_2$ and $Y_2$) of the cathode cage. An x-y origin can include the lower left boundary of the pocket portion 218 shown in FIG. 7B where the x- and y-axis intersect. Thereafter, the hole area for each of the plurality of holes 227 may be calculated based on the calculated spacing between the cathode and anode electrodes at each of the x and y locations, a predetermined minimum spacing between the electrodes, and the nominal hole area. In some embodiments, the number of the plurality of holes 227 can be further based upon the thickness of the surface of the pocket portion 218 of the cathode cage 216. In some examples, the predetermined minimum spacing is about 7.45 mm and the nominal hole area is about 1.08 mm². In some implementations, calculating the spacing between the anode and cathode electrodes at each of the plurality of x and y locations along the etching area is calculated using the following fit equation:

$$f = y0 + a*x + b*y + c*x^2 + d*y^2 \quad [1].$$

The coefficients for the fit equation of Eq. [1] may be determined by measuring a delta from flat for each cathode cage 216 and, the electrode plate 208' or terminal endplate 302 for each of bipolar electrodes. The measurement is taken from the plurality of x and y hole locations across each of the cathode cage 216 and corresponding locations at the electrode plate 208'. An average is calculated for each of the plurality of bipolar electrodes 102, for both the cathode cage 216, and the electrode plate 208' or the terminal endplate 302, at each location. Data corresponding to the calculated averages is utilized to determine the coefficients y0, a, b, c, and d for each of the cathode cage and the electrode plate. In some embodiments, the direction of the delta for each of the two electrodes is adjusted so that the flat distance between the two is a desired spacing, e.g., about 10.0 mm, and the delta for the electrode plate extends up from about 0 mm and the delta for the cathode cage extends down from about 10.0 mm. Accordingly, the coefficients determined for each of the electrode plate and the cathode cage are as follows:

Electrode Plate/Terminal Endplate $y0 = -1.5787$ $a = 0.8948$ $b = 2.4920$ $c = -0.1268$ $d = -0.9132$ $e = 0.0000$ Cathode Cage $y0 = 10.8602$ $a = -0.5295$ $b = -1.5860$ $c = 0.0814$ $d = 0.6857$ $e = 0.0000$ New coefficients put into the fit equation of Eq. [1] may be determined by subtracting the anode coefficients from the cathode coefficients. Accordingly, the new coefficients for input into Eq. [1] are as follows:

$y0 = 12.4389$ $a = -1.4243$ $b = -4.078$ $c = 0.2082$ $d = 1.5989$ $e = 0.0000$

The x and y hole locations must be normalized by the etching area before being input to Eq. [1] for calculating the spacing of the plurality of holes 227. For instance, each x location is divided by the length, $X_2$, of pocket portion 218 and each y location is divided by the width, $Y_2$, of the pocket portion. Thereafter, each normalized x and y hole location, along with the new coefficients determined above, are input to Eq. [1] to determine the spacing between the anode and the cathode electrodes at each x and y hole location. The fit equation of Eq. [1] is a non-linear three-dimensional paraboloid equation. In some implementations, Eq. [1] is executed using SigmaPlot™ software licensed by Systal Software, Inc.

In some implementations, the area of each hole of the plurality of holes 227 at each x and y location may be calculated as follows:

$$\varphi_{x,y} = f \times \frac{A_{nominal}}{S_{nominal\_minimum}} \quad [2]$$

wherein $\varphi_{x,y}$ is the calculated diameter at each hole location,
f is the spacing between the electrodes at each hole location calculated utilizing Eq. 1,
$A_{nominal}$ is the nominal hole area, and
$S_{nommal\_minimum}$ is the nominal minimum hole spacing.

In some examples, the nominal hole area is about 1.08 mm² and the nominal minimum spacing is about 7.45 mm². The examples for calculating the hole diameter utilize mixed units, wherein inches are utilized for each of the x and y hole locations and the etching area defined by $X_2$ and $Y_2$ while millimeters are utilized for calculating the spacing between the electrodes. Equation [2] demonstrates that the hole diameter increases as the spacing between the anode and cathode electrodes increases. The average hole diameter calculated at each hole location utilizing Eq. 2 for each of the bipolar electrodes 102, 102' is averaged. Implementations include utilizing the average hole diameter for the plurality of holes 227 formed in the cathode cage 216 for each of the plurality of bipolar electrodes 102, 102'.

Figure 10:
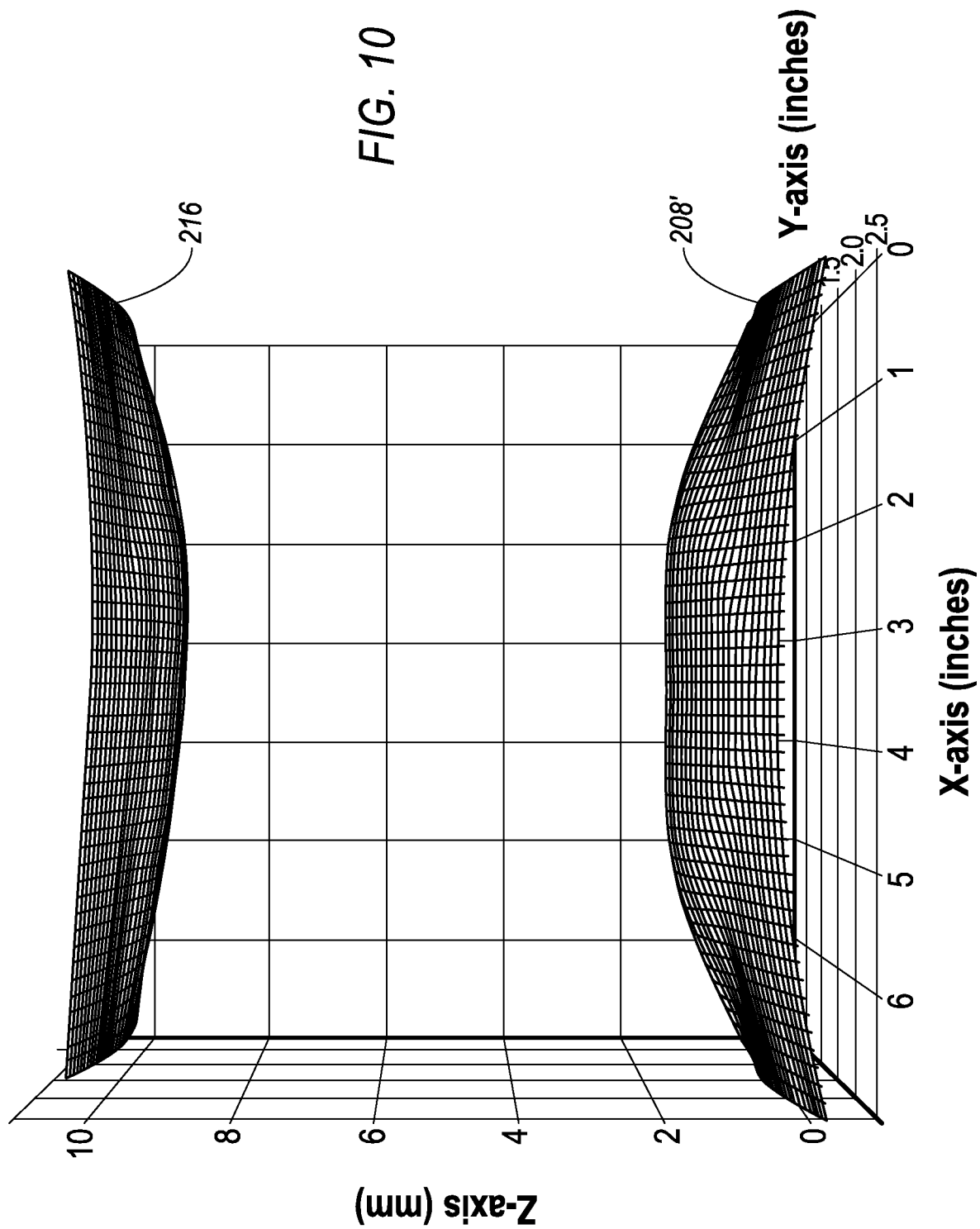
FIG. 10 illustrates experimental data of spacing between the three-dimensional shape profiles of a bipolar electrode plate and cathode cage with respect to the Z-axis and X-axis according to an embodiment of the present invention.
Figure 11:
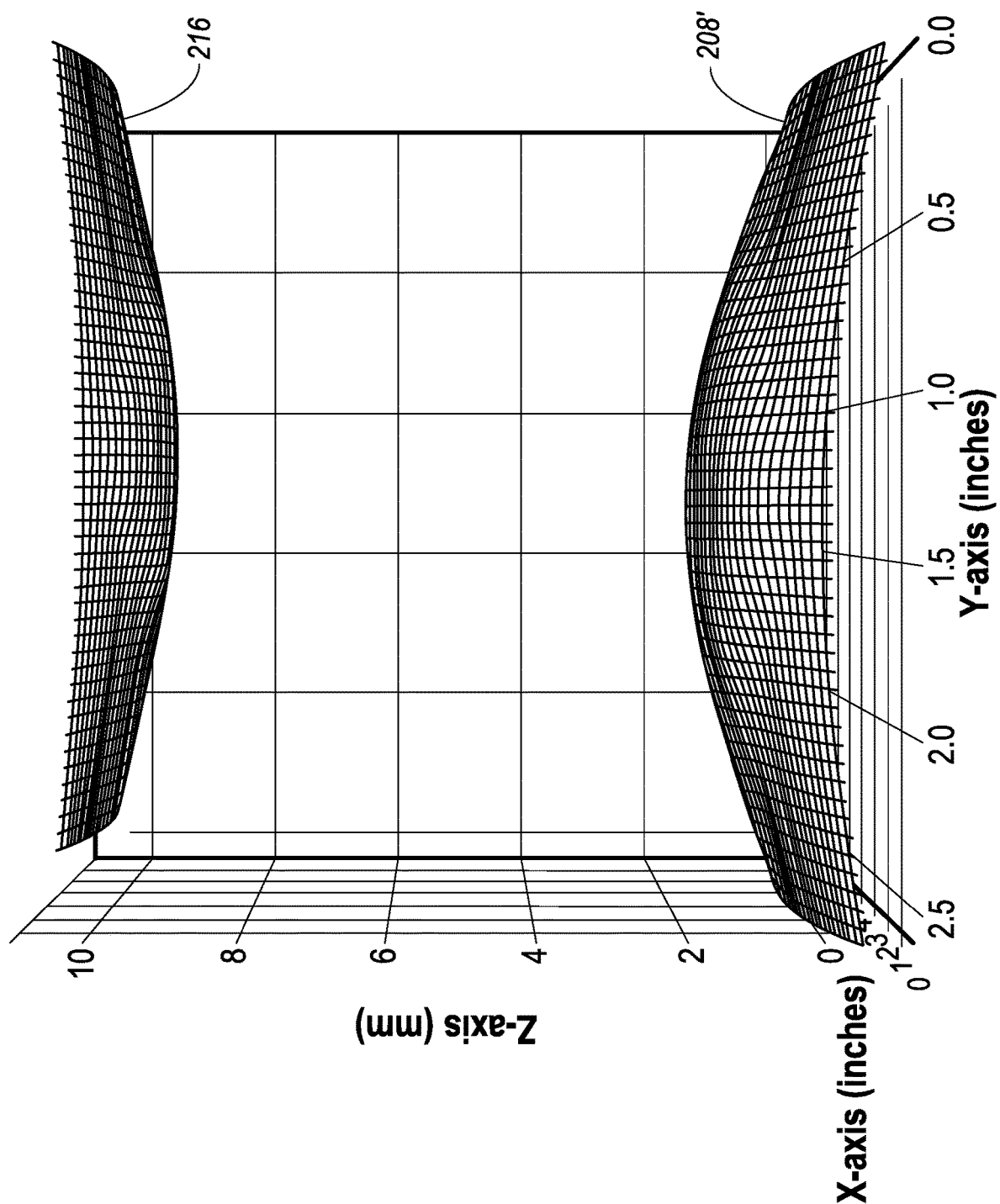
FIG. 11 illustrates experimental data of spacing between the three-dimensional shape profiles of a bipolar electrode plate and cathode with respect to the Z-axis and the Y-axis according to an embodiment of the present invention.
Figure 12:
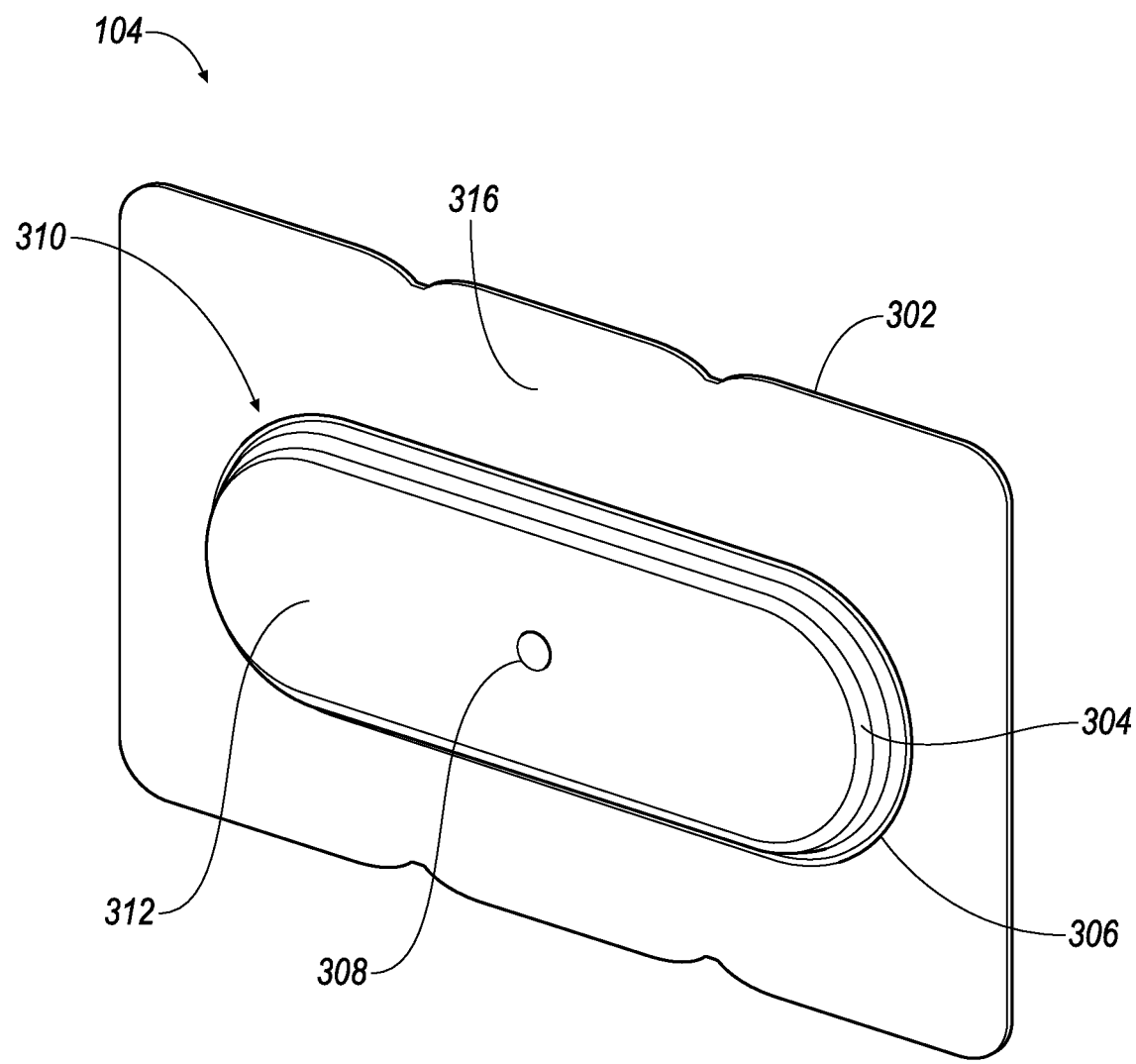
FIG. 12 shows a perspective view of a terminal assembly according to an embodiment of the present invention.

FIGS. 10 and 11 illustrate experimental data of average spacing between three dimensional shape profiles of the bipolar electrode plate 208' and the cathode cage 216 with respect to the x-axis (FIG. 10) and the y-axis (FIG. 11). The experimental data illustrates an average taken from twenty bipolar electrodes 102, 102' of the battery module 1000. The electrode plate 208' and the cathode cage 216 bend from flat when charged. In the example shown, the cathode cage and the electrode plate are arranged such that the spacing between the cathode cage and the electrode plate from flat is about 10 mm with respect to the z-axis. The electrode plate has a largest delta from flat of about 1.566 mm along the z-axis at direct center (e.g., about 3.5 mm with respect to the x-axis) and the cathode cage has a largest delta from flat of about 0.565 mm along the x-axis at right-center (e.g., about 2.0 mm with respect to the x-axis). An average electrode separation from left-center to right-center of plurality of bipolar electrodes is about 7.78 mm.

ii. Carbon Material

The carbon material 224 is in electrical communication with the front surface 212, 212' of the bipolar electrode plate 208, 208' and is confined by the cathode cage 216, 216', the separator 222, and the front surface 212, 212' of the bipolar electrode plate. Carbon materials suitable for electrochemical cells of the present invention may comprise any carbon material that can reversibly absorb aqueous bromine species (e.g., aqueous bromine or aqueous bromide) (collectively 702) and is substantially chemically inert in the presence of the electrolyte. In some embodiments, the carbon material comprises carbon blacks or other furnace process carbons. Suitable carbon black materials include, but are not limited to, Cabot Vulcan® XC72R, Akzo-Nobel Ketjenblack EC600JD, and other matte black mixtures of conductive furnace process carbon blacks. In some embodiments, the carbon material may also include other components, including but not limited to a PTFE binder, carbon fibers, and de-ionized water. For example, the carbon material has a water content of less than 50 wt % (e.g., from about 0.01 wt % to about 30 wt %) by weight of the carbon material. In some embodiments, the carbon material comprises PTFE (e.g., from about 0.5 wt % to about 5 wt % by weight of the carbon material).

In some embodiments, the carbon material is molded into a size and shape such that the carbon material can be at least partially nested by the cathode cage. In some examples, the carbon material may be in the form of one or more thin rectangular blocks. For instance, the carbon material is formed into one or more thin rectangular blocks having rounded corners such that the corners do not perforate the separator when the cathode assembly is assembled. In some embodiments, the carbon material may comprise a single solid block. In other embodiments, the carbon material may comprise from one to five, one to three, or one to two solid blocks of carbon blacks.

iii. Separator

Separators 222 useful in the electrochemical cells or battery stacks of the present invention are capable of forming a porous barrier between at least the reduced surface of the pocket portion of the cathode cage and the carbon material. In some embodiments, the separator is formed of electrically conductive material that enables electron transport. In some embodiments, the separator is formed of a wetable woven or wetable non-woven cloth, either of which is electrically conductive. In other embodiments, the separator is formed of a wetable woven or wetable non-woven cloth. And, in some examples, the woven or non-woven cloth comprises a plurality of pores that are sized to permit the passage of electrolyte therethrough while at least substantially restraining the passage of particles of carbon material therethrough. In other embodiments, the separator is formed from a carbon cloth including Zorflex® FM10 ACC 100% activated woven carbon cloth having with an extremely large surface area (e.g., 1000-2000 $m^2/g$) and/or exhibits rapid reaction and adsorption kinetics. In some embodiments, the separator is formed from a graphite cloth.

In some embodiments, the separator 222 is interposed between at least a portion of the cathode cage and the carbon material. And, in other embodiments, the separator substantially wraps the carbon material such that the separator is interposed between the carbon material and substantially all of the pocket portion of the cathode cage, and the separator is interposed between at least a portion of the carbon material and at least a portion of the bipolar electrode plate. For example, the separator is interposed between at least the reduced surface of the pocket portion of the cathode cage possessing a hole pattern (e.g., a plurality of holes 227) and the carbon material.

2. Terminal Assembly

Another aspect of the present invention provides a terminal assembly for a bipolar electrochemical cell or a battery. Referring to FIGS. 12-17, a terminal assembly 104 of the present invention comprises a conductive cup-shaped member 310 that comprises a terminal wall 312, a sidewall 304, and a rim 306 that is separated from the terminal wall by the sidewall. A terminal 308 of the bipolar electrochemical cell or battery stack is connected for electrical communication with the terminal wall 312 of the conductive cup-shaped member 310. In some embodiments, the terminal 308 comprises brass (e.g., the terminal is a brass plug that electrically communicates or contacts the terminal wall). In some embodiments, a portion of the terminal wall 312 in contact with the terminal 308 comprises copper. In these embodiments, the terminal wall may be formed from titanium and include a copper plate operative to contact and electrically connect the terminal formed from copper to the terminal wall of the conductive cup-shaped member.

The terminal assembly further comprises a terminal endplate 302 having inner and outer surfaces 318, 316 at least substantially coplanar with the terminal wall and joined to the rim at the outer surface 316. The terminal endplate 302 may be formed to comprise any of the features present in the bipolar electrode plate, including without limitation, a titanium material that is coated with a titanium carbide material, thru holes, rough inner surface, or the like. The rim of the cup-shaped member joins to the terminal endplate 302 such that the rim is approximately centered about the electrochemically active region 322 of the terminal endplate. In some embodiments, the electrochemically active region 322 corresponds to a region extending between the inner and outer surfaces of the terminal endplate in chemical or electrical communication with the adjacent bipolar electrode during charge and discharge cycles of the electrochemical cell or battery stack. In these embodiments, the electrochemically active region for the terminal endplate associated with the negative cathode terminal of the battery corresponds to or is defined by an area enclosed by a cathode assembly disposed upon the inner surface of the terminal endplate (e.g., the terminal cathode endplate). The electrochemically active region for the terminal endplate associated with the positive anode terminal of the battery may correspond to an area on its inner surface that opposes a cathode assembly disposed on the front surface of an adjacent bipolar electrode plate and forms a layer of zinc metal upon charging of the battery (terminal anode assembly). In some embodiments, at least a portion of the inner surface (e.g., at least the chemically active region) of the terminal endplate of the terminal anode assembly is a rough surface.

Figure 14:
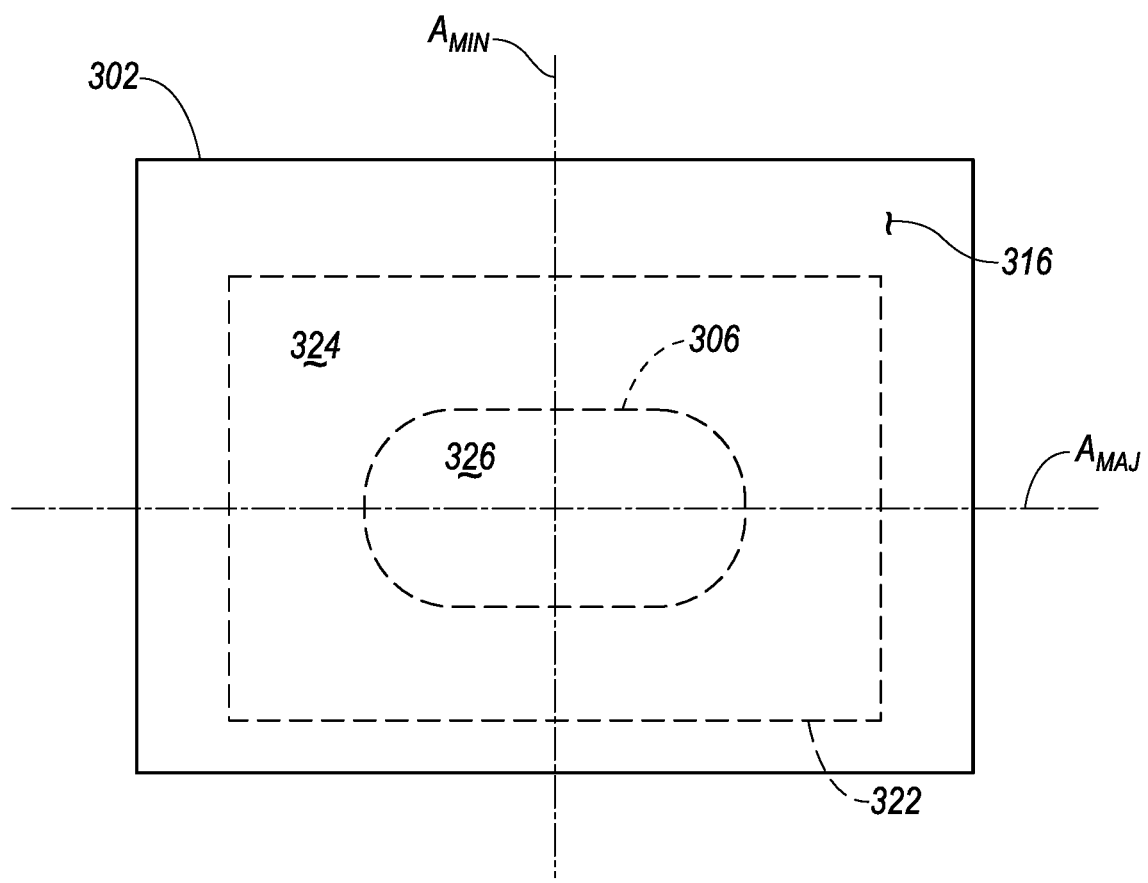
FIG. 14 shows a top view of the endplate of the terminal assembly of FIG. 13 having an electrochemically active region comprising a first surface area enclosed by the rim of the conductive cup-shaped member and a remaining second surface defined by an outer periphery of the rim and peripheral edges of the electrochemically active region according to an embodiment of the present invention.

FIG. 14 provides a top view of the terminal endplate showing the electrochemically active region of the terminal endplate comprising a first surface area 326 enclosed within dashed ellipse 306 corresponding to the outer periphery of the rim and a remaining second surface area 324 defined by the outer periphery of the rim 306 and the peripheral edges of the electrochemically active region 322. The conductive cup-shaped member 310 is removed for clarity in FIG. 14 so that the first surface area can be shown. Thus, the first surface area is enclosed by the rim when the conductive cup-shaped member is joined to the outer surface of the terminal endplate. The first 326 and second 324 surface areas are substantially equal.

Figure 13:
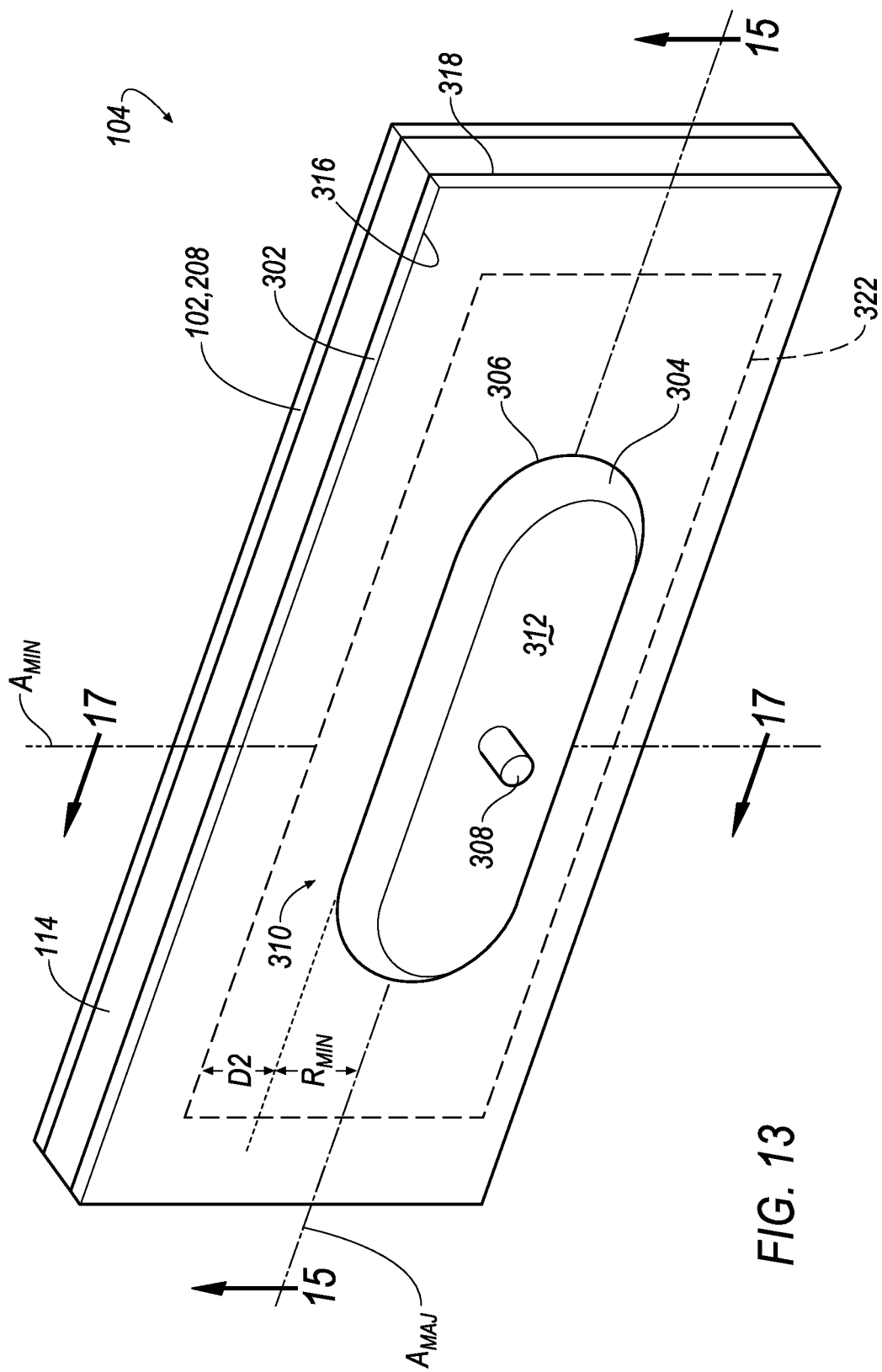
FIG. 13 shows a top perspective view of a terminal assembly for a bipolar battery comprising a terminal endplate and a conductive cup-shaped member having a substantially elliptical rim joined to the endplate according to an embodiment of the present invention.
Figure 15:
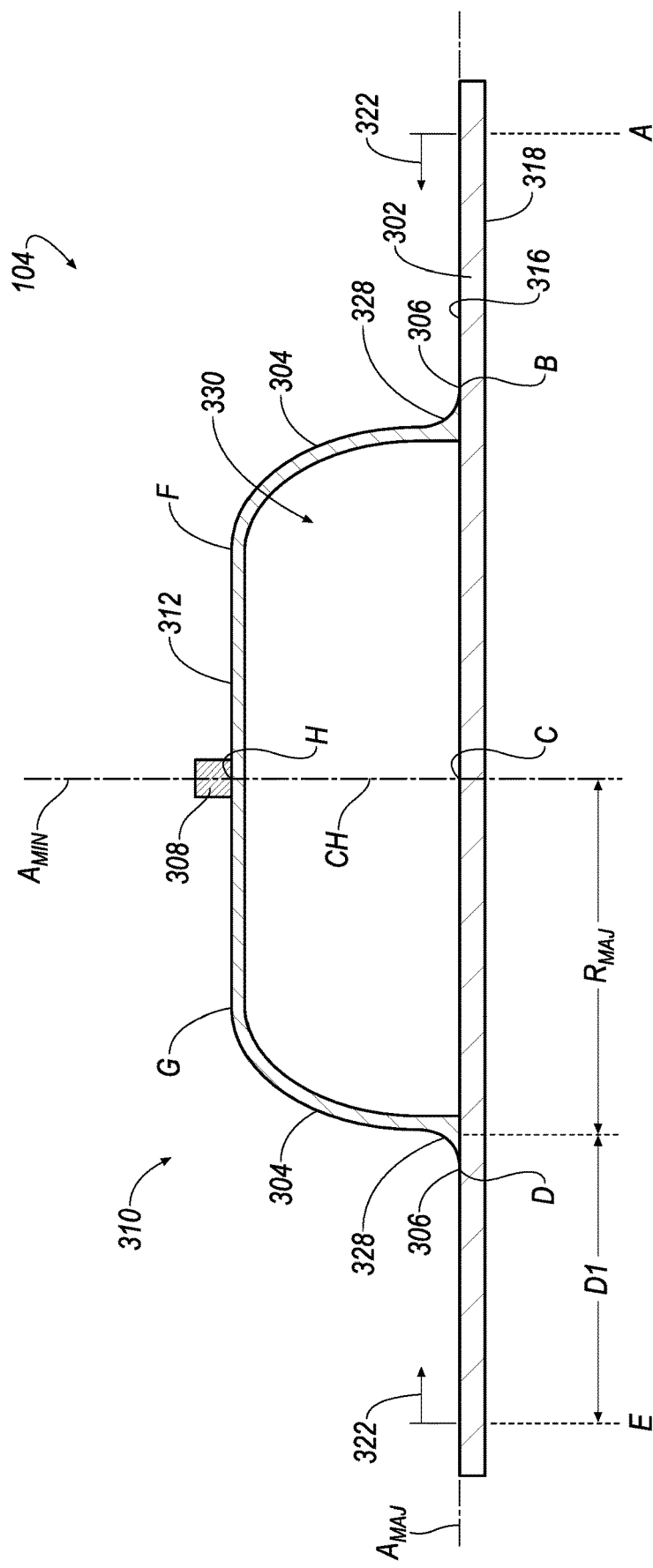
FIG. 15 is a cross-sectional view taken along line 17-17 of FIG. 13 showing the conductive cup-shaped member and a remaining second surface defined by an outer periphery of the rim and peripheral edges of the electrochemically active region according to an embodiment of the present invention.

In some embodiments, the rim is substantially elliptical and defined by a major axis $A_{MAJ}$ and a minor axis $A_{MIN}$ perpendicular to the major axis, the major axis and the minor axis intersecting at a center of the rim and also the center of the electrochemically active region. As used herein, the substantially elliptical rim refers to the rim having a substantially rectangular shape with radiused, or otherwise curved and rounded corners. In some embodiments, the rim is substantially rectangular. FIG. 15 provides a cross-sectional view taken along line 15-15 of FIG. 13 showing a major radius $R_{MAJ}$ of the rim being substantially equal to a first distance D1 extending along the major axis from the outer periphery of the rim to a peripheral edge of the electrochemically active region that is parallel to the minor axis; and FIG. 13 shows a minor radius $R_{MIN}$ of the rim is substantially equal to a second distance D2 extending along the minor axis from the outer periphery of the rim to a peripheral edge of the electrochemically active region that is parallel to the major axis.

In some embodiments, the rim defines an opening of an interior region 330 defined by interior surfaces of the terminal wall and the sidewall, and the outer surface of the terminal endplate enclosing the opening of the interior region when joined to the rim.

In some embodiments, the rim is centered within the electrochemically active region of the endplate. In some embodiments, the rim is substantially circular or substantially elliptical.

In some embodiments, the sidewall is perpendicular or substantially perpendicular to the terminal wall and the rim. In other embodiments, the sidewall extends radially outward from the terminal wall to the rim.

Figure 16:
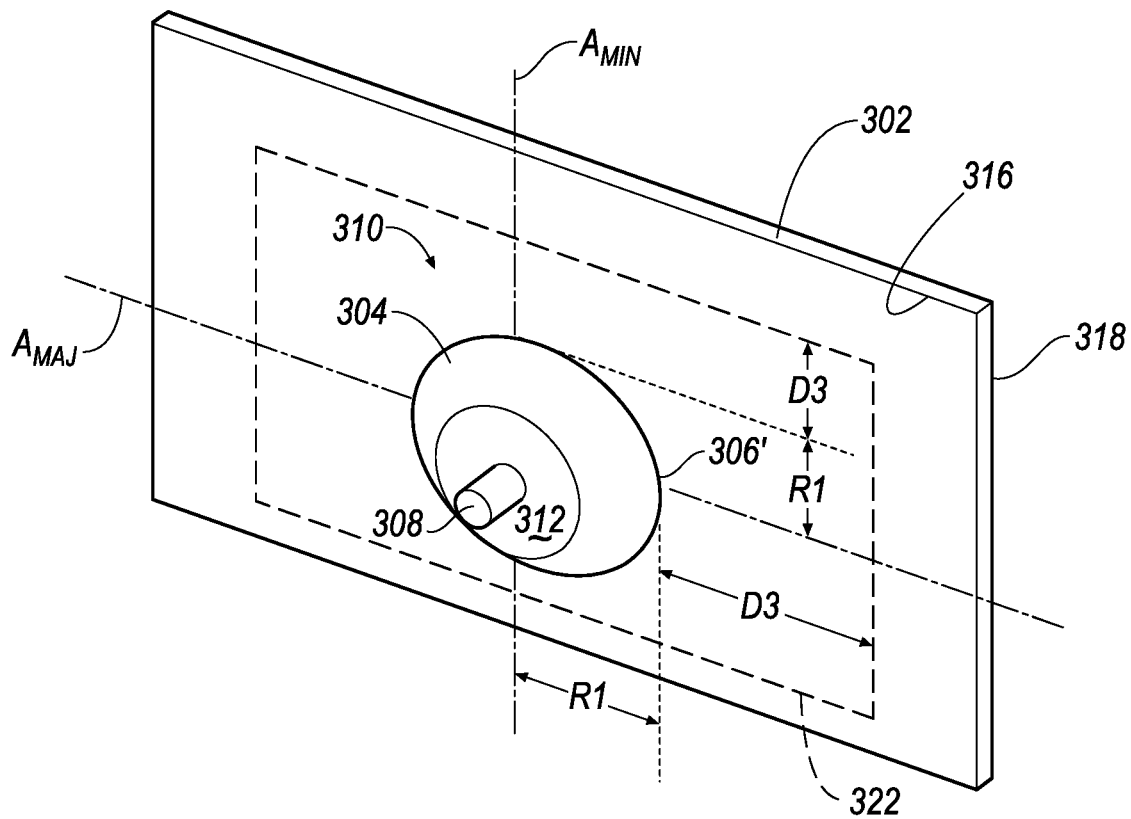
FIG. 16 is a top perspective view of the terminal assembly of FIG. 13 showing the bipolar endplate and the conductive-cup shaped member comprising a substantially circular rim according to an embodiment of the present invention.

In some embodiments, the rim is substantially circular. For example, FIG. 16 provides a top perspective view of the terminal assembly comprising the conductive cup-shaped member that comprises the terminal wall, the sidewall, and a substantially circular rim 306' that is separated from the terminal wall by the sidewall. In these embodiments, a radius R1 of the rim is substantially equal to a distance D3 between peripheral edges of the electrochemically active region 322 and the outer periphery of the rim.

Figure 17:
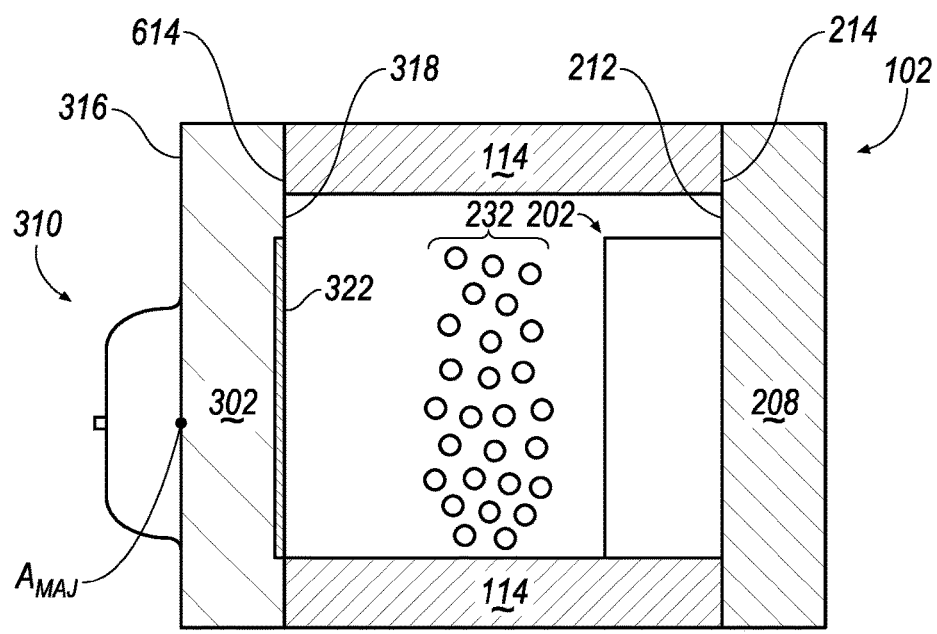
FIG. 17 is a cross-sectional view taken along line 15-15 of FIG. 13 showing the terminal assembly further comprising a frame member opposed to and receiving a second surface of the terminal endplate on a side opposite the conductive cup-shaped member according to an embodiment of the present invention.
Figure 23:
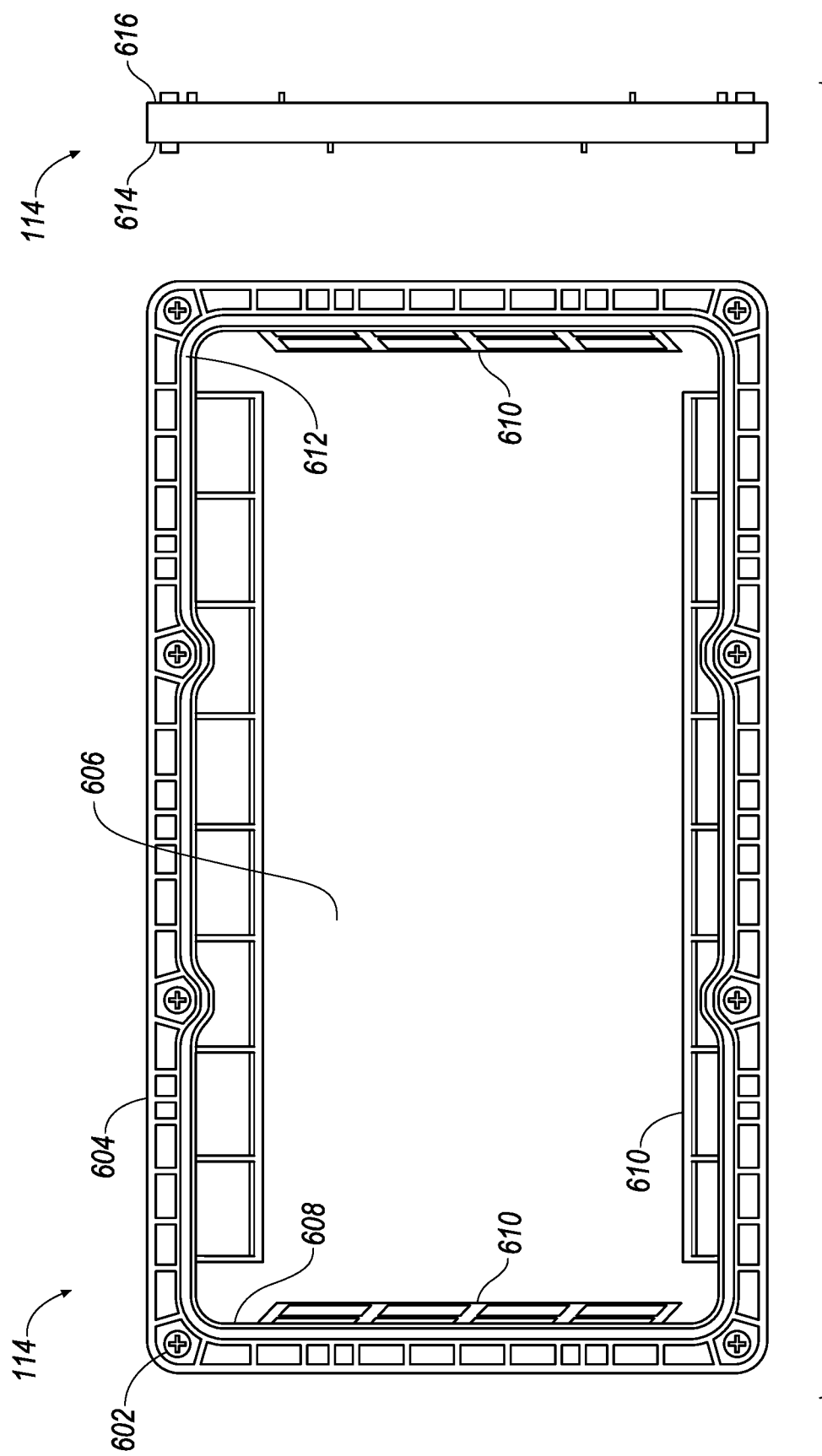
FIG. 23 shows a front view and side view of a frame for use in the battery stack of FIG. 18 according to an embodiment of the present invention.
Figure 24:
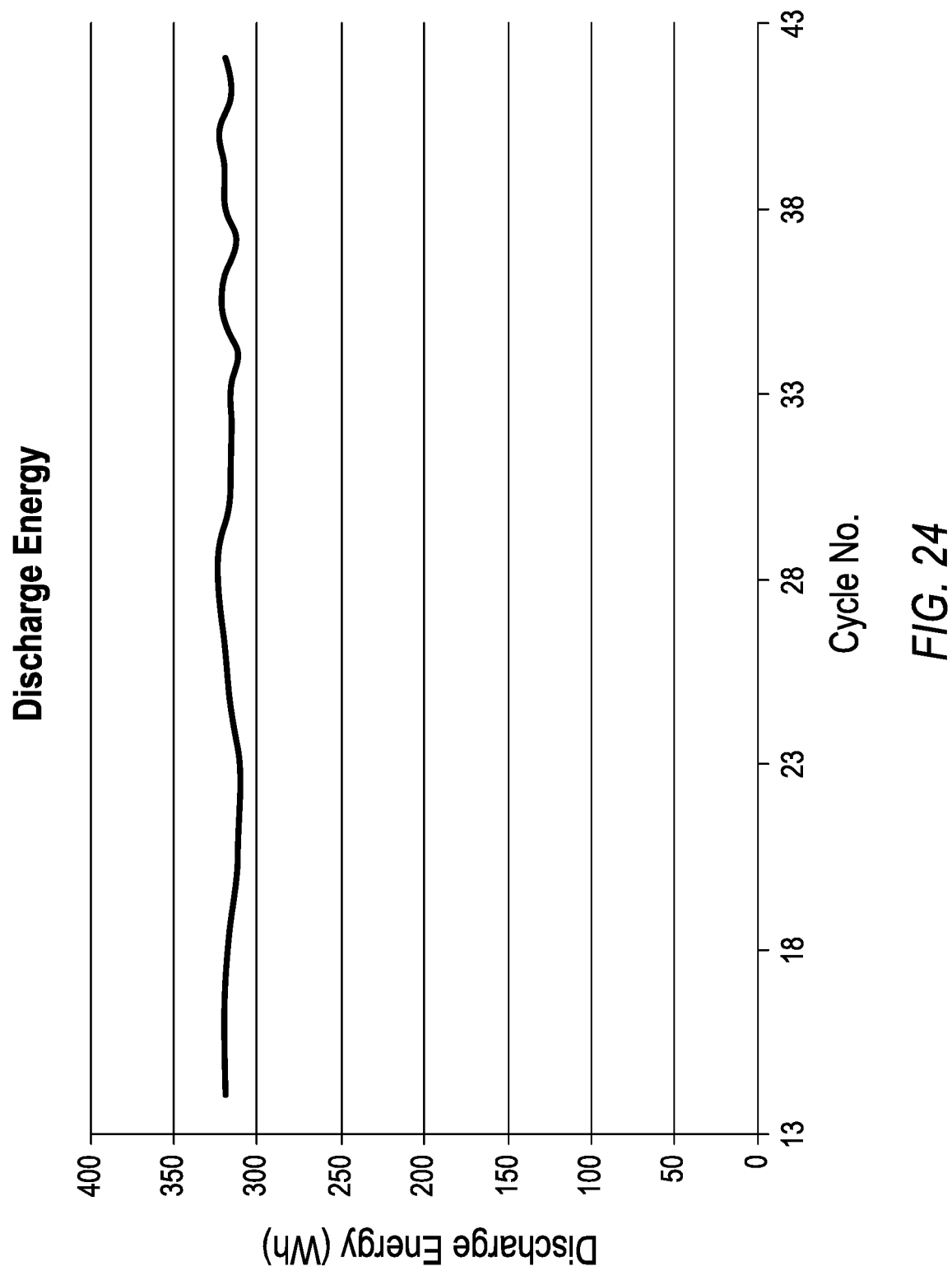
FIG. 24 shows representative behavior of a battery stack according to an embodiment of the present invention in terms of discharge energy over several charge cycles.
Figure 25A:
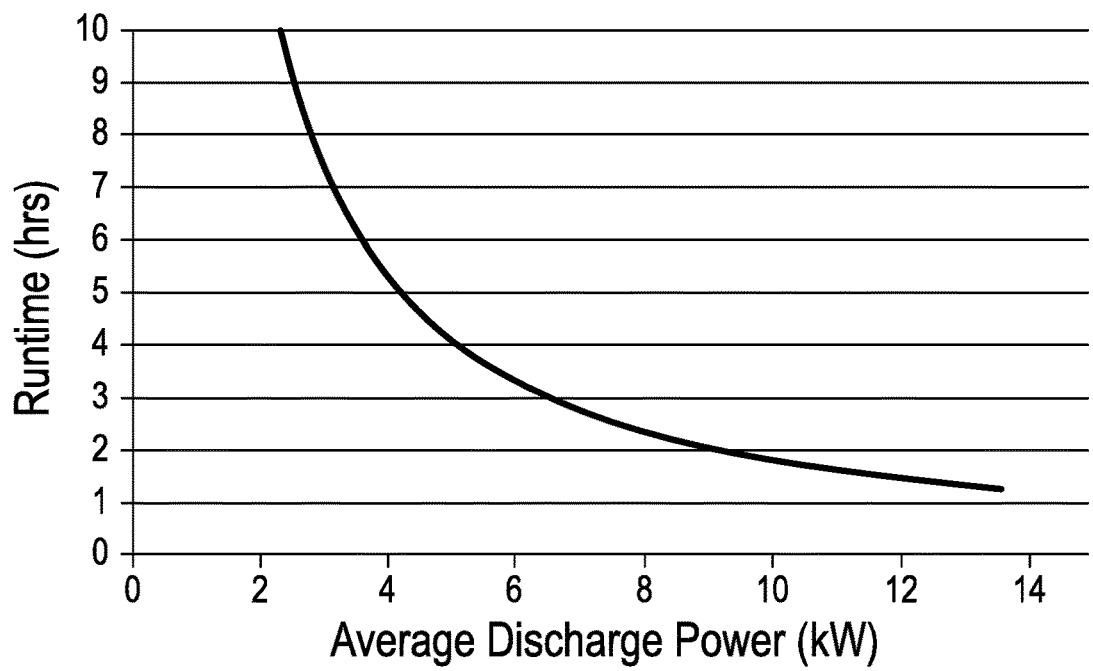
FIGS. 25A and 25B show representative behavior of a battery module according to an embodiment of the present invention.
Figure 25B:
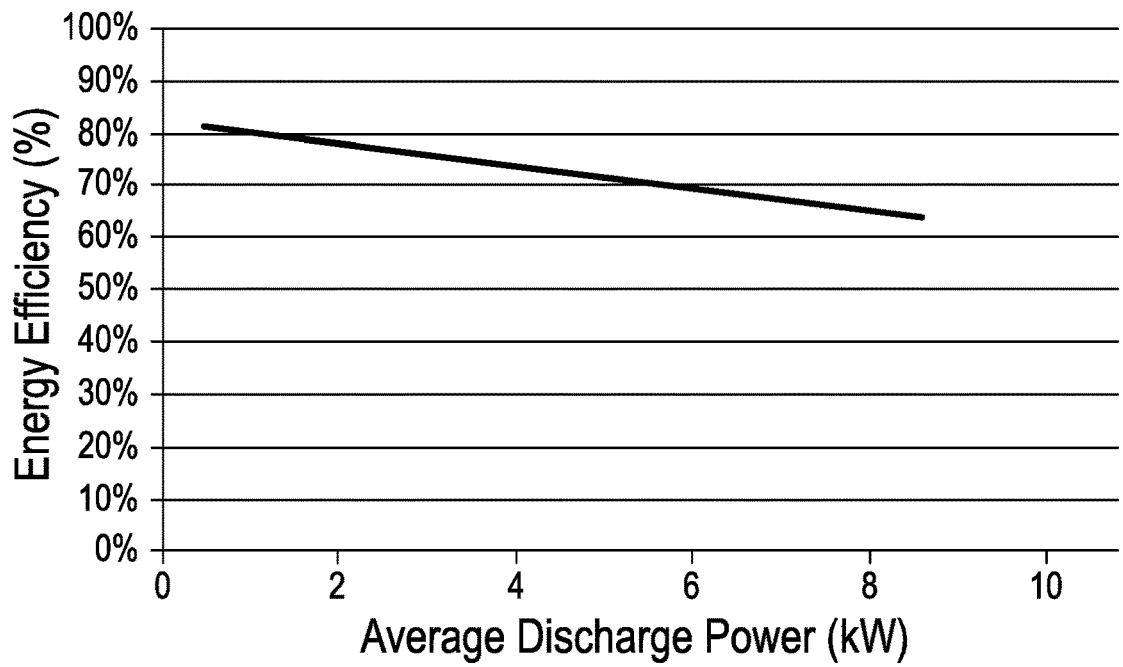
Figure 26:
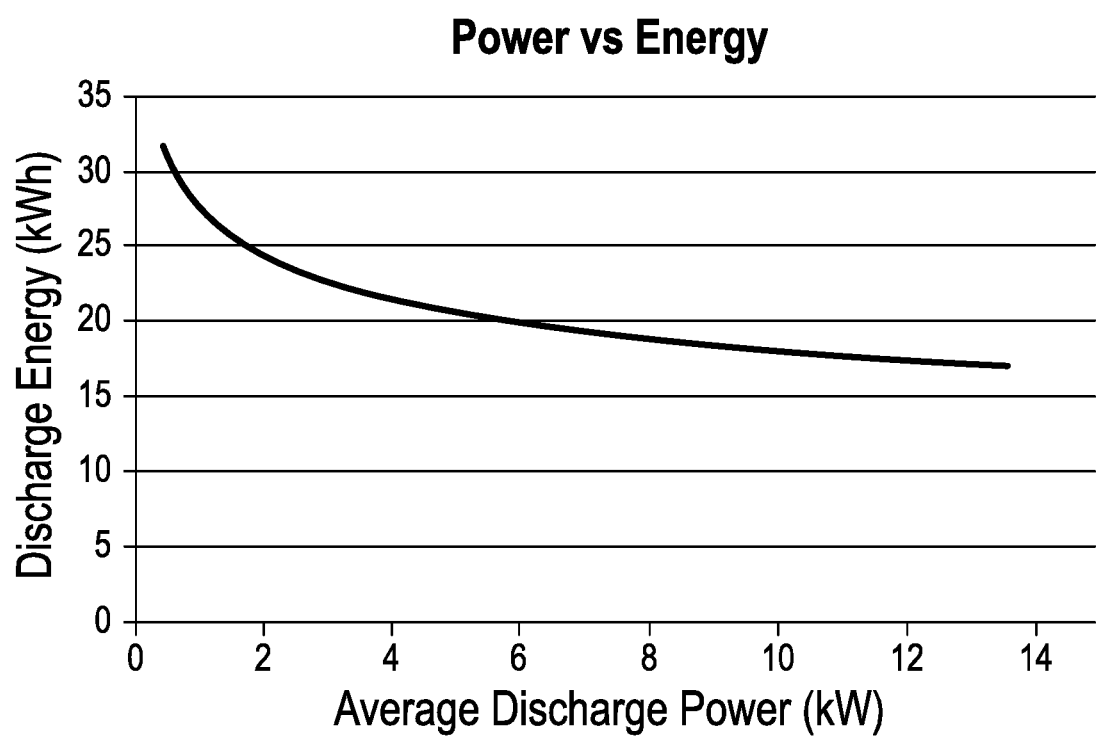
FIG. 26 shows representative behavior of a battery module according to an embodiment of the present invention in terms of discharge energy vs. average discharge power.
Figure 27A:
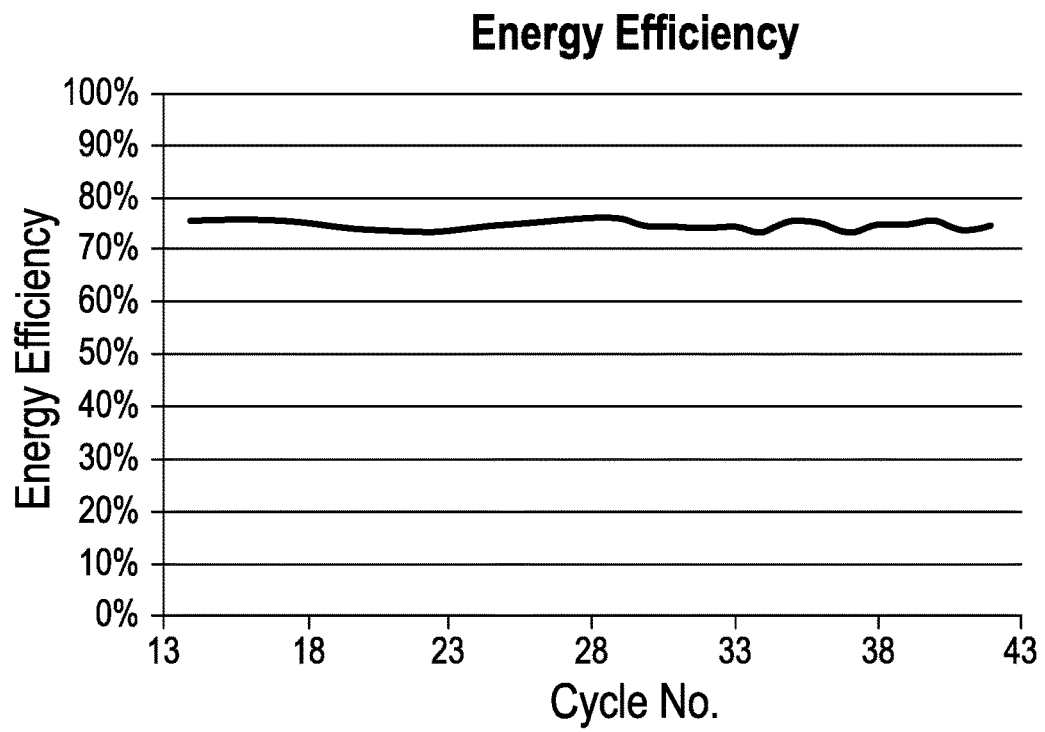
FIGS. 27A and 27B show representative behavior of a battery module according to an embodiment of the present invention.
Figure 27B:
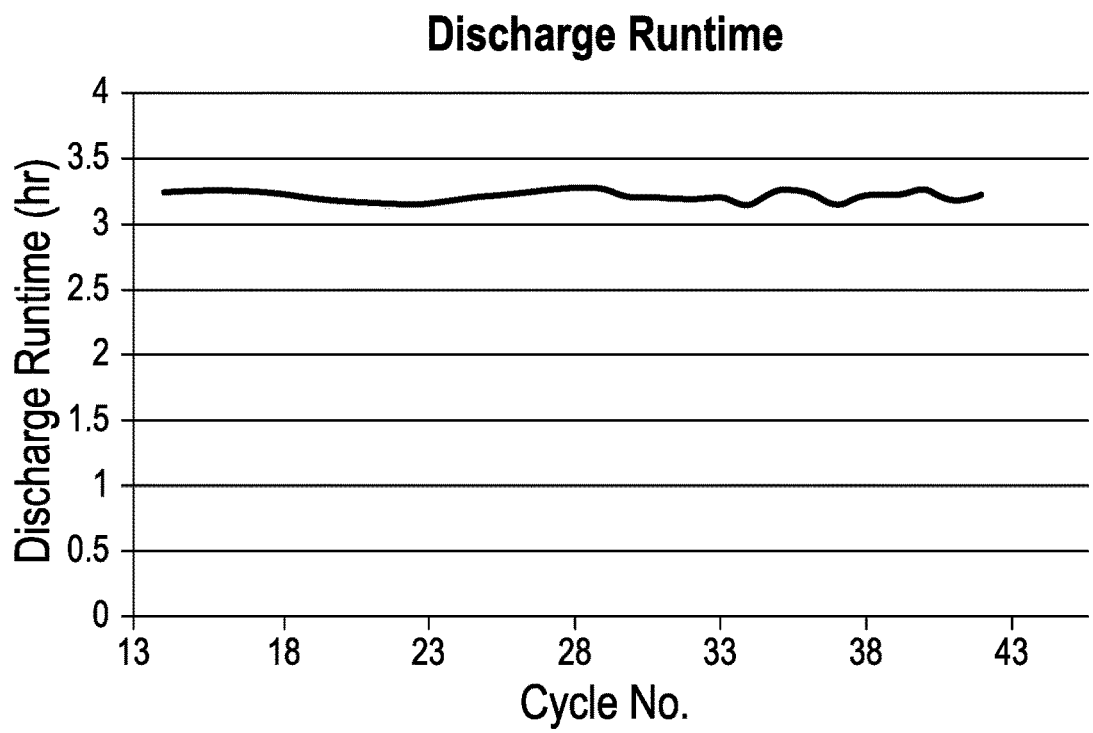

Referring to FIG. 17, a cross-sectional view taken along 17-17 of FIG. 13 shows the terminal assembly comprising the conductive cup-shaped member, the terminal endplate, an optional frame member 114, and a bipolar electrode that is immediately adjacent to the terminal assembly wherein the bipolar electrode comprises a cathode assembly 202 and a bipolar electrode plate 208. Referring to FIGS. 17 and 23, in some embodiments, the frame member 114 comprises a first side 614 and a second side 616, the first side opposed to and receiving the inner surface 318 of the terminal endplate 302 on a side opposite the conductive cup-shaped member 312. In some of these embodiments, the second side of the frame member opposes the cathode assembly 202 of the bipolar electrode, and the bipolar electrode comprises a bipolar electrode plate 208 comprising a front surface 212 fastened to the second side 616 of the frame member; and a cathode assembly 202 situated on the front surface of the bipolar electrode plate, the cathode assembly interposed between the front surface of the bipolar electrode plate and the inner surface of the terminal endplate. In some embodiments, the electrochemically active region 322 situated at the inner surface of the terminal endplate opposes the cathode assembly situated on the front surface of the bipolar electrode plate and includes a size and shape that is substantially the same as a size and shape of the cathode assembly. Discussed in greater detail above with reference to FIGS. 3 and 4B, the cathode assembly 202 comprises a cathode cage 216, a separator 222, and a carbon material 224 situated on the front surface 212, 212' of the bipolar electrode plate.

In some embodiments, the terminal assembly is a terminal cathode assembly, wherein the terminal cathode assembly comprises a terminal endplate 302 having an electrochemically active region, a conductive cup-shaped member such as any of the cup shaped members described herein disposed on the outer surface of the terminal endplate and approximately centered in the electrochemically active region, and a cathode assembly such as any of the cathode assemblies described herein disposed on the inner surface of the terminal endplate.

In some embodiments, the terminal assembly comprises a terminal anode assembly, wherein the terminal anode assembly comprises a terminal endplate having an electrochemically active region, a conductive cup-shaped member such as any of the cup shaped members described herein disposed on the outer surface of the terminal endplate and approximately centered in the electrochemically active region, and wherein the terminal anode assembly lacks a cathode assembly.

In some embodiments, the rim of the conductive cup-shaped member is joined to the outer surface of the terminal endplate by a weld or an adhesive. In some instances, the adhesive is electrically conductive. Examples of suitable electrically conductive adhesives include graphite filled adhesives (e.g., graphite filled epoxy, graphite filled silicone, graphite filled elastomer, or any combination thereof), nickel filled adhesives (e.g., nickel filled epoxy), silver filled adhesives (e.g., silver filled epoxy), copper filled adhesives (e.g., copper filled epoxy), any combination thereof, or the like.

In some embodiments, the conductive cup-shaped member is composed of at least one of a copper alloy, a copper/titanium clad, aluminum, and electrically conductive ceramics. For instance, the interior surfaces of the terminal wall and the sidewall comprise copper. In other instances, the exterior surfaces of the terminal wall and the sidewall comprise at least one of copper, titanium, and electrically conductive ceramics.

In some embodiments, at least one of the conductive cup-shaped member or the terminal endplate comprises titanium. In some embodiments, at least one of the conductive cup-shaped member or the terminal endplate comprises a titanium material coated with a titanium carbide material.

In some embodiments, the conductive cup-shaped member comprises a first metal and the endplate comprises a second metal.

In some embodiments, the rim comprises a flange 328 (FIG. 15) extending radially outward from the sidewall.

Referring again to FIG. 15, electrical properties of an exemplary terminal assembly for a zinc-halide electrochemical cell or battery stack during its operation (e.g., charging or discharging) are generalized according to the following expressions:

| | |
|---|---|
| $V_A \approx V_E \approx V_C$ | exp. 1 |
| $V_D \approx V_B$ | exp. 2 |
| $V_F \approx V_G$ | exp. 3 |
| $\Delta V_{G-D} \approx \Delta V_{F-B} \gg \Delta V_{H-G} \approx \Delta V_{F-H}$ | exp. 4 |
| $\Delta V_{G-D} \approx \Delta V_{F-B} \gg \Delta V_{B-C} \approx \Delta V_{D-C}$ | exp. 5 |

B and D identify two electrical points of contact between the rim of the cup-shaped member and the first surface of the bipolar endplate. H represents the center of inversion of symmetry for the conductive cup-shaped member, and C represents the superposition of H onto the first surface of the bipolar endplate such that the line CH extending along the minor axis $A_{MIN}$ and joining C and H is normal to the first surface of the endplate. F and G identify junctions where the terminal wall 312 and the sidewall 304 meet, and A and E identify opposing peripheral edges of the electrochemically active region 322.

The charge at A, $V_A$, is approximately equal to the charges at E, $V_E$, and C, $V_C$. The charge at D, $V_D$, is approximately equal to the charge at B, $V_B$. The charge at F, $V_F$, is approximately equal to the charge at G, $V_G$. The electrical potential difference, or voltage from G to D, $\Delta V_{G-D}$, is approximately equal to the voltage from F to B, $\Delta V_{F-B}$, the voltage from H to G, $\Delta V_{H-G}$ is approximately equal to the voltage from F to H, $\Delta V_{F-H}$, and $\Delta V_{G-D}$ and $\Delta V_{F-B}$ is substantially greater than $\Delta V_{H-G}$ and $\Delta V_{F-H}$. And, the voltages $\Delta V_{G-D}$ and $\Delta V_{F-B}$ are substantially greater than the voltages from B to C, $\Delta V_{B-C}$, and D to C, $\Delta V_{D-C}$.

Because the voltages from G to D and from F to B, i.e., $\Delta V_{G-D}$ and $\Delta V_{F-B}$, are substantially greater than the voltage from H to G and F to H, i.e., $\Delta V_{H-G}$ and $\Delta V_{F-H}$, current discharged from the terminal of the terminal assembly of the present invention is substantially more uniform than discharge current from a traditional bipolar battery having a terminal directly attached to an endplate.

3. Zinc-Halide Electrolyte

In electrochemical cells and battery stacks of the present invention, an aqueous electrolyte, i.e., a zinc-halide electrolyte is interposed between the inner surface of the terminal endplate, the cathode assembly, the front surface of the bipolar electrode, and if present, the interior surfaces of the frame. In these embodiments, bromide anions at the surface of the cathode cage of the cathode assembly that is exposed to the electrolyte are oxidized to bromine when the electrochemical cell or battery stack is charging. Conversely, during discharge, the bromine is reduced to bromide anions. The conversion between bromine and bromide anions 232 at or near the cathode cage of the cathode assembly can be expressed as follows:

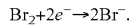

The present invention provides an aqueous electrolyte that is useful in flowing or non-flowing (i.e., static) rechargeable zinc halide electrochemical cells or battery stacks. In these cells or battery stacks, zinc bromide, zinc chloride, or any combination of the two, present in the electrolyte, acts as the electrochemically active material.

One aspect of the present invention provides an electrolyte for use in a secondary zinc bromine electrochemical cell (e.g., a static cell) comprising from about 30 wt % to about 40 wt % of $ZnCl_2$ or $ZnBr_2$; from about 5 wt % to about 15 wt % of KBr; from about 5 wt % to about 15 wt % of KCl; and one or more quaternary ammonium agents, wherein the electrolyte comprises from about 0.5 wt % to about 10 wt % of the one or more quaternary ammonium agents.

In some embodiments, the electrolyte comprises from about 4 wt % to about 12 wt % (e.g., from about 6 wt % to about 10 wt %) of potassium bromide (KBr). In some embodiments, the electrolyte comprises from about 8 wt % to about 12 wt % of potassium bromide (KBr).

In some embodiments, the electrolyte comprises from about 4 wt % to about 12 wt % (e.g., from about 6 wt % to about 10 wt %) of potassium chloride (KCl). In some embodiments, the electrolyte comprises from about 8 wt % to about 14 wt % of potassium chloride (KCl). In some embodiments, the electrolyte comprises from about 11 wt % to about 14 wt % of potassium chloride (KCl).

In some embodiments, the electrolyte further comprises from about 0.5 wt % to about 10 wt % (e.g., from about 1 wt % to about 7.5 wt %) of a glyme. In some examples, the glyme comprises monoglyme, diglyme, triglyme, tetraglyme, pentaglyme, hexaglyme, or any combination thereof. For instance, the glyme comprises tetraglyme. In other examples, the electrolyte comprises from about 1 wt % to about 5 wt % of tetraglyme.

In some embodiments, the electrolyte further comprises from about 0.05 wt % to about 4 wt % (e.g., from about 0.1 wt % to about 1 wt %) of an ether. In some embodiments, the ether is a crown ether, DME-PEG, dimethyl ether, or any combination thereof. In a further embodiment, the ether is a crown ether.

In some embodiments, the electrolyte further comprises from about 0.5 wt % to about 2.5 wt % (e.g., from about 1 wt % to about 2.25 wt %) of DME-PEG or dimethyl ether. In some examples, the DME-PEG has an average molecular weight (e.g., a number average molecular weight $M_n$) of from about 350 amu to about 3000 amu. In other examples, the DME-PEG has an average molecular weight of from about 1200 amu to about 3000 amu. And, in some examples, the electrolyte further comprises from about 5 wt % to about 10 wt % of DME-PEG, wherein the DME-PEG has an average molecular weight (e.g., a number average molecular weight $M_n$) of from about 1500 amu to about 2500 amu (e.g., about 2000 amu).

In some embodiments, the ether is a crown ether. For example, the crown ether is 18-crown-6. For example, the crown ether is 15-crown-5. For example, the crown ether is 12-crown-4.

In some embodiments, the electrolyte further comprises from about 0.1 wt % to about 1.0 wt % of an alcohol, wherein the alcohol is substantially miscible in water. For example, the alcohol comprises a $C_{1-4}$ alcohol. In other examples, the alcohol comprises methanol, ethanol, 1-propanol (i.e., n-propanol), 2-propanol (i.e., iso-propanol), 1-butanol (i.e., n-butanol), sec-butanol, iso-butanol, tert-butanol, 1-pentanol, or any combination thereof. And in some examples, the electrolyte further comprises from about 0.25 wt % to about 0.75 wt % of tert-butanol.

In some embodiments, the electrolyte further comprises from about 0.25 wt % to about 5 wt % (e.g., from about 0.5 wt % to about 4 wt %) of a $C_{1-10}$ glycol. In some examples, the electrolyte further comprises from about 0.25 wt % to about 5 wt % (e.g., from about 0.5 wt % to about 4 wt %) of a substituted ethylene glycol or a substituted propylene glycol. In some examples, the glycol comprises ethylene glycol, propylene glycol, 1,3-butylene glycol, 1,4-butylene glycol, neopentyl glycol, hexalene glycol, or any combination thereof. And, in some examples, the electrolyte further comprises from about 0.25 wt % to about 2.5 wt % of neopentyl glycol.

One aspect of the present invention provides an electrolyte for use in a secondary zinc bromine electrochemical cell (e.g., a static cell) comprising from about 30 wt % to about 50 wt % (e.g., from about 35 wt % to about 47.5 wt % or from about 37 wt % to about 46 wt %) of $ZnBr_2$; from about 22.5 wt % to about 40 wt % (e.g., from about 23.75 to about 38 wt % or from about 24 wt % to about 36 wt %) of $H_2O$; from about 3.00 wt % to about 9.5 wt % (e.g., from about 4.00 wt % to about 8.5 wt %, from about 3.00 wt % to about 8.5 wt %, or from about 4.1 wt % to about 8 wt %) of KBr; from about 7.75 wt % to about 14.0 wt % (e.g., from about 7.9 wt % to about 13.25 wt % or from about 8 wt % to about 13 wt %) of KCl; from about 0.25 wt % to about 2.25 wt % (e.g., from about 0.35 wt % to about 2.0 wt % or from about 0.5 wt % to about 2 wt %) of MPEG 2K; from about 0.075 wt % to about 1.25 wt % (e.g., from about 0.1 wt % to about 1 wt %) of MPEG 1K; and from about 0.35 wt % to about 2.75 wt % (e.g., from about 0.4 wt % to about 2.65 wt % or from 0.5 wt % to about 2.5 wt %) of neopentyl glycol.

In some embodiments, the one or more quaternary ammonium agents comprises one or more quaternary ammonium agents of the formula $N^+(R^A)(R^B)_3$ wherein $R^A$ is a $C_{1-6}$ alkyl (e.g., methyl, ethyl, propyl, butyl or the like), $R^B$ is a $C_{1-6}$ alkyl (e.g., methyl, ethyl, propyl, butyl or the like), and $X^-$ is $Br^-$ or $Cl^-$. In some embodiments, the one or more quaternary ammonium agents is at least one selected from triethylmethylammonium chloride, tetraethylammonium bromide, and/or trimethylpropylammonium bromide. In some embodiments, the electrolyte comprises up to 5 (e.g., 1, 2, 3, 4, or 5) different quaternary ammonium agents. For instance, the electrolyte comprises triethylmethylammonium chloride. In other instances, the electrolyte comprises triethylmethylammonium chloride and tetraethylammonium bromide. And, in some instances, the electrolyte comprises triethylmethylammonium chloride, tetraethylammonium bromide, and trimethylproplyammonium bromide.

In one example, the electrolyte comprises from about 30 wt % to about 50 wt % (e.g., from about 35 wt % to about 47.5 wt % or from about 37 wt % to about 46 wt %) of $ZnBr_2$; from about 22.5 wt % to about 40 wt % (e.g., from about 23.75 to about 38 wt % or from about 24 wt % to about 36 wt %) of $H_2O$; from about 3.00 wt % to about 9.5 wt % (e.g., from about 4.00 wt % to about 8.5 wt %, from about 3.00 wt % to about 8.5 wt %, or from about 4.1 wt % to about 8 wt %) of KBr; from about 7.75 wt % to about 14.0 wt % (e.g., from about 7.9 wt % to about 13.25 wt % or from about 8 wt % to about 13 wt %) of KCl; from about 0.25 wt % to about 2.25 wt % (e.g., from about 0.35 wt % to about 2.0 wt % or from about 0.5 wt % to about 2 wt %) of MPEG 2K; from about 0.075 wt % to about 1.25 wt % (e.g., from about 0.1 wt % to about 1 wt %) of MPEG 1K; from about 0.35 wt % to about 2.75 wt % (e.g., from about 0.4 wt % to about 2.65 wt % or from 0.5 wt % to about 2.5 wt %) of neopentyl glycol; from about 3.5 wt % to about 15 wt % (e.g., from about 4 wt % to about 13 wt %) of a first quaternary ammonium agent (e.g., triethylmethylammonium chloride); and from about 0.35 wt % to about 3.75 wt % of a second quaternary ammonium agent (e.g., tetraethylammonium bromide).

In another example, the electrolyte comprises from about 30 wt % to about 50 wt % (e.g., from about 35 wt % to about 47.5 wt % or from about 37 wt % to about 46 wt %) of $ZnBr_2$; from about 22.5 wt % to about 40 wt % (e.g., from about 23.75 to about 38 wt % or from about 24 wt % to about 36 wt %) of $H_2O$; from about 3.00 wt % to about 9.5 wt % (e.g., from about 4.00 wt % to about 8.5 wt %, from about 3.00 wt % to about 8.5 wt %, or from about 4.1 wt % to about 8 wt %) of KBr; from about 7.75 wt % to about 14.0 wt % (e.g., from about 7.9 wt % to about 13.25 wt % or from about 8 wt % to about 13 wt %) of KCl; from about 0.25 wt % to about 2.25 wt % (e.g., from about 0.35 wt % to about 2.0 wt % or from about 0.5 wt % to about 2 wt %) of MPEG 2K; from about 0.075 wt % to about 1.25 wt % (e.g., from about 0.1 wt % to about 1 wt %) of MPEG 1K; from about 0.35 wt % to about 2.75 wt % (e.g., from about 0.4 wt % to about 2.65 wt % or from 0.5 wt % to about 2.5 wt %) of neopentyl glycol; from about 3.5 wt % to about 15 wt % (e.g., from about 4 wt % to about 13 wt %) of a first quaternary ammonium agent (e.g., triethylmethylammonium chloride); from about 0.35 wt % to about 3.75 wt % of a second quaternary ammonium agent (e.g., tetraethylammonium bromide); and from about 0.35 wt % to about 2.75 wt % (e.g., from about 0.5 wt % to about 2.5 wt %) of neopentyl glycol.

And, in another example, the electrolyte comprises from about 30 wt % to about 50 wt % (e.g., from about 35 wt % to about 47.5 wt % or from about 37 wt % to about 46 wt %) of $ZnBr_2$; from about 22.5 wt % to about 40 wt % (e.g., from about 23.75 to about 38 wt % or from about 24 wt % to about 36 wt %) of $H_2O$; from about 3.75 wt % to about 9.5 wt % (e.g., from about 4 wt % to about 8.5 wt % or from about 4.1 wt % to about 8 wt %) of KBr; from about 7.75 wt % to about 13.5 wt % (e.g., from about 7.9 wt % to about 13.25 wt % or from about 8 wt % to about 13 wt %) of KCl; from about 0.25 wt % to about 2.25 wt % (e.g., from about 0.35 wt % to about 2.0 wt % or from about 0.5 wt % to about 2 wt %) of MPEG 2K; from about 0.075 wt % to about 1.25 wt % (e.g., from about 0.1 wt % to about 1 wt %) of MPEG 1K; from about 0.35 wt % to about 2.75 wt % (e.g., from about 0.4 wt % to about 2.65 wt % or from 0.5 wt % to about 2.5 wt %) of neopentyl glycol; from about 3.5 wt % to about 15 wt % (e.g., from about 4 wt % to about 13 wt %) of a first quaternary ammonium agent (e.g., triethylmethylammonium chloride); from about 0.35 wt % to about 3.75 wt % of a second quaternary ammonium agent (e.g., tetraethylammonium bromide); from about 0.35 wt % to about 2.75 wt % (e.g., from about 0.5 wt % to about 2.5 wt %) of neopentyl glycol; from about 5 ppm to about 20 ppm of tin (e.g., $SnCl_2$ or any hydrate thereof); and from about 5 ppm to about 20 ppm of indium (e.g., $InCl_3$ or any hydrate thereof).

In some embodiments, the one or more quaternary ammonium agents is a salt of

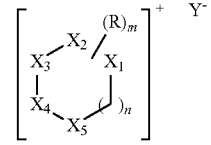

Formula I wherein

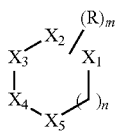

is saturated, partially unsaturated, or fully unsaturated;

$X_1$, $X_2$, $X_3$, $X_4$, and $X_5$ are each independently selected from carbon, oxygen, and nitrogen, provided that at least one of $X_1$, $X_2$, $X_3$, $X_4$, and $X_5$ is nitrogen;

each R is independently hydrogen, alkyl, cycloalkyl, aryl, arylalkyl, heterocycloalkyl, or heteroaryl, wherein each R is independently and optionally substituted with halo, —CN, —NO$_2$, -Q$_2$, -OQ$_2$, —S(O)$_z$Q$_2$, —S(O)$_z$N(Q$_2$)$_2$, —N(Q$_2$)$_2$, —C(O)OQ$_2$, —C(O)Q$_2$, —C(O)N(Q$_2$)$_2$, —C(O)N(Q$_2$)(OQ$_2$), —N(Q$_2$)C(O)Q$_2$, —N(Q$_2$)C(O)N(Q$_2$)$_2$, —N(Q$_2$)C(O)OQ$_2$, or —N(Q$_2$)S(O)$_z$Q$_2$;

each $Q_2$ is independently hydrogen, alkyl, cycloalkyl, aryl, arylalkyl, heterocycloalkyl, or heteroaryl, each optionally substituted with 1-3 $Q_3$ substituents;

each $Q_3$ is independently halo, oxo, CN, NO$_2$, CF$_3$, OCF$_3$, OH, —S(O)$_z$(C$_{1-6}$ alkyl), —N(C$_{1-6}$ alkyl)$_2$, —COO (C$_{1-6}$ alkyl), —C(O)(C$_{1-6}$ alkyl), —O(C$_{1-6}$ alkyl), or a C$_{1-6}$ alkyl optionally substituted with 1-3 substituents selected from halo, oxo, —CN, —NO$_2$, —CF$_3$, —OCF$_3$, —OH, —SH, —S(O)$_z$H, —NH$_2$, or —COOH;

m is 0, 1, 2, 3, 4, or 5;

n is 0, 1, or 2;

z is 0, 1, or 2; and

Y is an anion.

In one embodiment, one or two of $X_1$, $X_2$, $X_3$, $X_4$, and $X_5$ are nitrogen, and the others are carbon. In a further embodiment, one of $X_1$, $X_2$, $X_3$, $X_4$, and $X_5$ is nitrogen, and the others are carbon. In another further embodiment, two of $X_1$, $X_2$, $X_3$, $X_4$, and $X_5$ are nitrogen, and the others are carbon. In still a further embodiment,

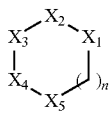

is selected from pyridine, pyrimidine, pyrazine, piperazine, piperidine, morpholine, 1,3-oxazinane, 1,2-oxazinane, pyrrolidine, pyrrole, pyrazole, imidazole, oxazole, isoxazole, 1,2,3-oxadiazole, 1,3,4-oxadiazole, 1,2,3-triazole, 1,2,4-triazole, 1,2,3,4-oxatriazole, 1,2,3,5-oxatriazole, 1,2,4,5-oxatriazole, and tetrazole.

In one embodiment,

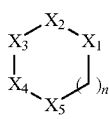

is selected from pyridine, pyrimidine, pyrazine, piperazine, piperidine, morpholine, 1,3-oxazinane, and 1,2-oxazinane. In one embodiment,

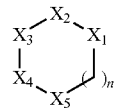

is selected from pyridine, pyrimidine, and pyrazine. In a further embodiment,

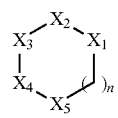

is pyridine.

In one embodiment,

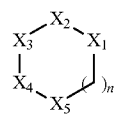

is selected from piperidine, morpholine, 1,3-oxazinane, and 1,2-oxazinane. In a further embodiment,

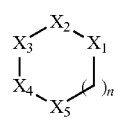

is selected from piperidine and morpholine. In one embodiment,

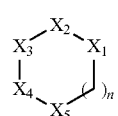

is piperidine. In one embodiment,

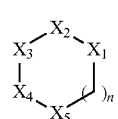

is morpholine.

In one embodiment,

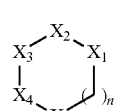

is selected from pyrrolidine, pyrrole, pyrazole, imidazole, oxazole, isoxazole, 1,2,3-oxadiazole, 1,3,4-oxadiazole, 1,2,3-triazole, 1,2,4-triazole, 1,2,3,4-oxatriazole, 1,2,3,5-oxatriazole, 1,2,4,5-oxatriazole, and tetrazole. In another embodiment,

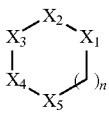

is selected from pyrrole, pyrazole, and imidazole. In one embodiment,

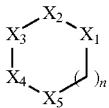

is pyrrole. In one embodiment,

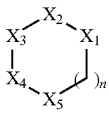

is pyrazole. In one embodiment,

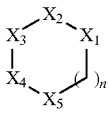

is imidazole. In one embodiment,

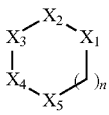

is pyrrolidine.

In one embodiment, n is 1. In another embodiment, n is 0.

In one embodiment, each R is independently alkyl or cycloalkyl, wherein each R is independently and optionally substituted with halo, —CN, —NO$_2$, —OQ$_2$, —S(O)$_z$Q$_2$, —S(O)$_z$N(Q$_2$)$_2$, —N(Q$_2$)$_2$, —C(O)OQ$_2$, —C(O)Q$_2$, —C(O)N(Q$_2$)$_2$, —C(O)N(Q$_2$)(OQ$_2$), —N(Q$_2$)C(O)Q$_2$, —N(Q$_2$)C(O)N(Q$_2$)$_2$, —N(Q$_2$)C(O)OQ$_2$, —N(Q$_2$)S(O)$_z$Q$_2$, or heterocycloalkyl or alkyl optionally substituted with 1-3 Q$_3$ substituents. In another embodiment, each R is independently alkyl or cycloalkyl, wherein each R is independently and optionally substituted with halo, heterocycloalkyl, —CN, —NO$_2$, -OQ$_2$, —N(Q$_2$)$_2$, —C(O)OQ$_2$, —C(O)Q$_2$, or —C(O)N(Q$_2$)$_2$. In a further embodiment, each R is alkyl, which is independently and optionally substituted with halo, heterocycloalkyl, —CN, —NO$_2$, -OQ$_2$, —N(Q$_2$)$_2$, —C(O)OQ$_2$, —C(O)Q$_2$, or —C(O)N(Q$_2$)$_2$. In still a further embodiment, each R is alkyl, which is independently and optionally substituted with halo, heterocycloalkyl, —CN, —NO$_2$, —N(Q$_2$)$_2$, or —C(O)N(Q$_2$)$_2$. In yet a further embodiment, each R is alkyl, which is independently and optionally substituted with halo or heterocycloalkyl.

In another embodiment, each R is alkyl, which is substituted with heterocycloalkyl. In a further embodiment, R is alkyl, which is substituted with pyrrolidine. In a further embodiment, R is propyl, which is substituted with heterocycloalkyl. In a further embodiment, R is propyl, which is substituted with pyrrolidine.

In one embodiment, each R is an unsubstituted alkyl. For example, R is an unsubstituted linear or branched $C_{1-20}$ alkyl. In another embodiment, R is selected from methyl, ethyl, propyl, isopropyl, butyl, isobutyl, sec-butyl, tert-butyl, pentyl, hexyl, heptyl, 2-ethylhexyl, octyl, nonyl, decyl, dodecyl, and cetyl. In one embodiment, R is selected from methyl, ethyl, propyl, butyl, pentyl, hexyl, heptyl, octyl, nonyl, decyl, dodecyl, and cetyl. In one embodiment, R is methyl. In one embodiment, R is ethyl. In one embodiment, R is propyl. In one embodiment, R is butyl. In one embodiment, R is pentyl. In one embodiment, R is hexyl. In one embodiment, R is heptyl. In one embodiment, R is octyl. In one embodiment, R is dodecyl. In one embodiment, R is nonyl. In one embodiment, R is decyl. In one embodiment, R is dodecyl. In one embodiment, R is cetyl.

In one embodiment, Y is an anion selected from fluoride, chloride, bromide, iodide, arsenate, phosphate, arsenite, hydrogen phosphate, dihydrogen phosphate, sulfate, nitrate, hydrogen sulfate, nitrite, thiosulfate, sulfite, perchlorate, iodate, chlorate, bromate, chlorite, hypochlorite, chlorate, perchlorate, hypobromite, bromite, bromate, perbromate, carbonate, chromate, hydrogen carbonate (bicarbonate), dichromate, acetate, formate, cyanide, amide, cyanate, peroxide, thiocyanate, oxalate, hydroxide, and permanganate. In a further embodiment, Y is a monovalent anion selected from fluoride, chloride, bromide, iodide, dihydrogen phosphate, nitrate, perchlorate, hypochlorite, hydrogen carbonate (bicarbonate), acetate, formate, cyanide, and hydroxide. In another further embodiment, Y is a bivalent anion selected from hydrogen phosphate, sulfate, and carbonate. In still a further embodiment, Y is selected from fluoride, chloride, bromide and iodide. In one embodiment, Y is chloride. In one embodiment, Y is bromide. In one embodiment, Y is iodide.

In some embodiments, the one or more quaternary ammonium agents is a salt of Formula Ia, Formula Ib, Formula Ic, Formula Id, or Formula Ie

Formula Ia

Formula Ib

Formula Ic

-continued

Formula Id

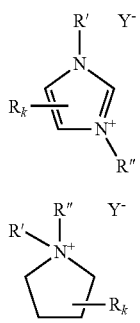

Formula Ie wherein
each R, R', and R" is independently hydrogen, alkyl, cycloalkyl, aryl, arylalkyl, heterocycloalkyl, or heteroaryl, wherein each R, R', and R" is independently and optionally substituted with halo, —CN, —NO$_2$, —OQ$_2$, —S(O)$_z$Q$_2$, —S(O)$_z$N(Q$_2$)$_2$, —N(Q$_2$)$_2$, —C(O)OQ$_2$, —C(O)Q$_2$, —C(O)N(Q$_2$)$_2$, —C(O)N(Q$_2$)(OQ$_2$), —N(Q$_2$)C(O)Q$_2$, —N(Q$_2$)C(O)N(Q$_2$)$_2$, —N(Q$_2$)C(O)OQ$_2$, —N(Q$_2$)S(O)$_z$Q$_2$, or heterocycloalkyl or alkyl optionally substituted with 1-3 Q$_3$ substituents;
  each Q$_2$ is independently hydrogen, alkyl, cycloalkyl, aryl, arylalkyl, heterocycloalkyl, or heteroaryl, each optionally substituted with 1-3 Q$_3$ substituents;
  each Q$_3$ is independently halo, oxo, CN, NO$_2$, CF$_3$, OCF$_3$, OH, —S(O)$_z$(C$_{1-6}$ alkyl), —N(C$_{1-6}$ alkyl)$_2$, —COO (C$_{1-6}$ alkyl), —C(O) (C$_{1-6}$ alkyl), —O(C$_{1-6}$ alkyl), or a C$_{1-6}$ alkyl optionally substituted with 1-3 substituents selected from halo, oxo, —CN, —NO$_2$, —CF$_3$, —OCF$_3$, —OH, —SH, —S(O)$_z$H, —NH$_2$, or —COOH;
  z is 0, 1, or 2; and
  Y is an anion.

In some embodiments of Formulas Ia-Ie, each R, R', and R" is independently alkyl or cycloalkyl, wherein each R, R', and R" is independently and optionally substituted with halo, —CN, —NO$_2$, —OQ$_2$, —S(O)$_z$Q$_2$, —S(O)$_z$N(Q$_2$)$_2$, —N(Q$_2$)$_2$, —C(O)OQ$_2$, —C(O)Q$_2$, —C(O)N(Q$_2$)$_2$, —C(O)N(Q$_2$)(OQ$_2$), —N(Q$_2$)C(O)Q$_2$, —N(Q$_2$)C(O)N(Q$_2$)$_2$, —N(Q$_2$)C(O)OQ$_2$, —N(Q$_2$)S(O)$_z$Q$_2$, or heterocycloalkyl or alkyl optionally substituted with 1-3 Q$_3$ substituents. In another embodiment, each R, R', and R" is independently alkyl or cycloalkyl, wherein each R, R', and R" is independently and optionally substituted with halo, heterocycloalkyl, —CN, —NO$_2$, —OQ$_2$, —N(Q$_2$)$_2$, —C(O)OQ$_2$, —C(O)Q$_2$, or —C(O)N(Q$_2$)$_2$. In a further embodiment, each R, R', and R" is independently alkyl, which is independently and optionally substituted with halo, heterocycloalkyl, —CN, —NO$_2$, -OQ$_2$, —N(Q$_2$)$_2$, —C(O)OQ$_2$, —C(O)Q$_2$, or —C(O)N(Q$_2$)$_2$. In still a further embodiment, each R, R', and R" is independently alkyl, which is independently and optionally substituted with halo, heterocycloalkyl, —CN, —NO$_2$, —N(Q$_2$)$_2$, or —C(O)N(Q$_2$)$_2$.

In one embodiment, each R, R', and R" is independently an unsubstituted alkyl. In another embodiment, each R, R', and R" is independently selected from methyl, ethyl, propyl, isopropyl, butyl, isobutyl, sec-butyl, tert-butyl, pentyl, hexyl, heptyl, 2-ethylhexyl, octyl, nonyl, decyl, dodecyl, and cetyl. In one embodiment, each R, R', and R" is independently selected from methyl, ethyl, propyl, butyl, pentyl, hexyl, heptyl, octyl, nonyl, decyl, dodecyl, and cetyl.

In some embodiments of Formulas Ia-Ie, Y is selected from fluoride, chloride, bromide, iodide, arsenate, phosphate, arsenite, hydrogen phosphate, dihydrogen phosphate, sulfate, nitrate, hydrogen sulfate, nitrite, thiosulfate, sulfite, perchlorate, iodate, chlorate, bromate, chlorite, hypochlorite, hypobromite, carbonate, chromate, hydrogen carbonate (bicarbonate), dichromate, acetate, formate, cyanide, amide, cyanate, peroxide, thiocyanate, oxalate, hydroxide, and permanganate. In a further embodiment, Y is a monovalent anion selected from fluoride, chloride, bromide, iodide, dihydrogen phosphate, nitrate, perchlorate, hypochlorite, hydrogen carbonate (bicarbonate), acetate, formate, cyanide, and hydroxide. In another further embodiment, Y is selected from a bivalent anion selected from hydrogen phosphate, sulfate, and carbonate. In still a further embodiment, Y is selected from fluoride, chloride, bromide and iodide. In one embodiment, Y is chloride. In one embodiment, Y is bromide. In one embodiment, Y is iodide.

In some embodiments of Formulas Ia-Ie, k is 0 or 1. In a further embodiment, k is 0. In another further embodiment, k is 1.

In some embodiments of Formula Ia, each R and R' is independently selected from methyl, ethyl, butyl, and hexyl. In a further embodiment, k is 1; R' is selected from ethyl, butyl, and hexyl; and R is methyl. In another further embodiment, k is 0 and R' is selected from ethyl, butyl, and hexyl.

In one embodiment, the salt of Formula Ia is selected from 1-ethyl-3-methylpyridinium bromide, 1-ethyl-2-methylpyridinium bromide, 1-butyl-3-methylpyridinium bromide, 1-butyl-4-methylpyridinium bromide, and 1-hexylpyridinium bromide.

In some embodiments of Formula Ib, each R, R', and R" is independently selected from methyl and propyl.

In one embodiment, the salt of Formula Ib is 1-methyl-1-propylpiperidinium bromide.

In some embodiments of Formula Ic, each R, R', and R" is independently selected from methyl, ethyl, and butyl. In a further embodiment, k is 0.

In one embodiment, the salt of Formula Ic is selected from N-methyl-N-ethylmorpholinium bromide and N-methyl-N-butylmorpholinium bromide.

In some embodiments of Formula Id, each R, R', and R" is independently selected from methyl, ethyl, butyl, hexyl, octyl, and decyl. In a further embodiment, k is 1 and R is methyl.

In one embodiment, the salt of Formula Id is selected from 1-ethyl-3-methylimidazolium bromide, 1-butyl-3-methylimidazolium bromide, 1-ethyl-2,3-dimethylimidazolium bromide, 1-decyl-3-methylimidazolium bromide, 1-butyl-2,3-dimethylimidazolium bromide, 1-methyl-3-octylimidazolium bromide, and 1-methyl-3-hexylimidazolium bromide.

In some embodiments of Formula Ie, each R, R', and R" is independently selected from methyl, ethyl, propyl, butyl, pentyl, and hexyl. In another embodiment, k is 0 and each R' and R" is independently an alkyl, which is optionally substituted by heterocycloalkyl or halo. In a further embodiment, k is 0 and each R' and R" is independently selected from methyl, ethyl, propyl, butyl, pentyl, hexyl, 2-chloroethyl, or 3-(N-methylpyrrolidinium)propyl.

In one embodiment, the salt of Formula Ie is selected from N-methyl-N-ethylpyrrolidinium bromide, N-ethyl-N-propylpyrrolidinium bromide, N-propyl-N-butylpyrrolidinium bromide, N-methyl-N-butylpyrrolidinium bromide, N-ethyl-N-(2-chloroethyl)pyrrolidinium bromide, N-methyl-N-hexylpyrrolidinium bromide, N-methyl-N-pentylpyrrolidinium bromide, N-ethyl-N-pentylpyrrolidinium bromide, N-ethyl- N-butylpyrrolidinium bromide, N-butyl-N-pentylpyrrolidinium bromide, N-methyl-N-propylpyrrolidinium bromide, trimethylene-bis(N-methylpyrrolidinium) dibromide, and N-propyl-N-pentylpyrrolidinium bromide.

In some embodiments, the one or more quaternary ammonium agent comprises an agent having the chemical formula

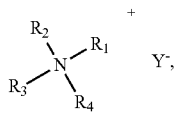

wherein $R_1$, $R_2$, $R_3$, and $R_4$ are each independently hydrogen or an alkyl group (e.g., a $C_{1-6}$ alkyl group or a $C_{1-4}$ alkyl group), and Y is an anion as defined herein. In some embodiments, the one or more quaternary ammonium agents comprises ammonium halides (e.g., $NH_4Br$, $NH_4Cl$, or any combination thereof); tetra-alkyl ammonium halides (e.g., tetramethylammonium bromide, tetramethylammonium chloride, triethylmethylammonium chloride, tetraethylammonium bromide, tetraethylammonium chloride, trimethylpropylammonium bromide, combinations thereof, or the like); heterocyclic ammonium halides (e.g., N-methyl-N-ethylpyrrolidinium halide, N-ethyl-N-methylpyrrolidinium halide, combinations thereof, or the like); or any combination thereof. In some embodiments, the one or more quaternary ammonium agents comprises a quaternary ammonium agent selected from the group consisting of ammonium chloride, ammonium bromide, tetraethylammonium bromide, trimethylpropylammonium bromide, N-methyl-N-ethylmorpholinium bromide, N-ethyl-N-methylmorpholinium bromide, N-methyl-N-butylmorpholinium bromide, N-methyl-N-ethylpyrrolidinium bromide, N,N,N-triethyl-N-propylammonium bromide, N-ethyl-N-propylpyrrolidinium bromide, N-propyl-N-butylpyrrolidinium bromide, N-methyl-N-butylpyrrolidinium bromide, N-ethyl-N-(2-chloroethyl)pyrrolidinium bromide, N-methyl-N-hexylpyrrolidinium bromide, N-methyl-N-pentylpyrrolidinium bromide, N-ethyl-N-pentylpyrrolidinium bromide, N-ethyl-N-butylpyrrolidinium bromide, trimethylene-bis(N-methylpyrrolidinium) dibromide, N-butyl-N-pentylpyrrolidinium bromide, N-methyl-N-propylpyrrolidinium bromide, N-propyl-N-pentylpyrrolidinium bromide, and any combination thereof. In some examples, the electrolyte comprises from about 1 wt % to about 5 wt % of one or more quaternary ammonium agents. In some examples, the electrolyte comprises from about 3 wt % to about 7 wt % of one or more quaternary ammonium agents. And, in some embodiments, the one or more quaternary ammonium agents comprises N-methyl-N-ethylmorpholinium bromide. In other examples, the electrolyte comprises from about 0.25 wt % to about 1.25 wt % of N-methyl-N-ethylmorpholinium bromide. And, in some examples, the one or more quaternary ammonium agents comprises tetraethylammonium bromide, trimethylpropylammonium bromide, or any combination thereof. For instance, the electrolyte comprises from about 1 wt % to about 5 wt % of tetraethylammonium bromide.

In some embodiments, the one or more quaternary ammonium agents comprises a quaternary ammonium agent selected from the group consisting of an ammonium bromine complexing agent, an imidazolium bromine complexing agent, a pyrrolidinium bromine complexing agent, a pyridinium bromine complexing agent, a phosphonium bromine complexing agent, and a morpholinium bromine complexing agent.

In some embodiments, the one or more quaternary ammonium agents comprises a quaternary ammonium agent selected from the group consisting of tetraethylammonium (TEA) bromide, N-ethyl-N-methylmorpholinium (MEM) bromide, trimethylpropylammonium bromide, 1-ethyl-3-methylimidazolium bromide, 1-butyl-3-methylimidazolium bromide, 1-butyl-1-methylpyrrolidinium bromide, 1-ethyl-3-methylpyridinium bromide, 1-ethyl-3-methylpyridinium bromide, 1-ethyl-2-methylpyridinium bromide, 1-methyl-1-propylpiperidinium bromide, dodecyltrimethylammonium bromide, 1-ethyl-2,3-dimethylimidazolium bromide, 1-decyl-3-methylimidazolium bromide, 1-butyl-2,3-dimethylimidazolium bromide, 1-methyl-3-octylimidazolium bromide, 1-methyl-3-hexylimidazolium bromide, 1-butyl-3-methylpyridinium bromide, 1-butyl-4-methylpyridinium bromide, 1-hexylpyridinium bromide, triethylmethylammonium chloride, tetraethylphosphonium bromide, 1-methyl-1-propylpyrrolidinium bromide, hexyltrimethylammonium bromide, and cetyltriethylammonium bromide.

In some embodiments, the one or more quaternary ammonium agents comprises 1-ethyl-3-methylpyridinium bromide, 1-ethyl-2-methylpyridinium bromide, 1-butyl-3-methyl pyridinium bromide, or 1-butyl-1-methyl pyrrolidinium bromide. For example, the electrolyte comprises from about 1 wt % to about 5 wt % (e.g., from about 1.5 wt % to about 4 wt %) of 1-ethyl-3-methylpyridinium bromide, 1-ethyl-2-methylpyridinium bromide, 1-butyl-3-methyl pyridinium bromide, N-ethyl-N-methylmorpholinium bromide, or 1-butyl-1-methyl pyrrolidinium bromide.

In some embodiments, the one or more quaternary ammonium agents comprises one or more quaternary ammonium agents of the formula $N^+(R^A)(R^B)_3X^-$, wherein $R^A$ is a $C_{1-6}$ alkyl (e.g., methyl, ethyl, propyl, butyl or the like), $R^B$ is a $C_{1-6}$ alkyl (e.g., methyl, ethyl, propyl, butyl or the like), and X is Br or Cl. In some embodiments, $R^B$ is a $C_{1-6}$ alkyl that is different from $R^A$ and vice versa. In some embodiments, the one or more quaternary ammonium agents is selected from triethylmethylammonium chloride and/or tetraethylammonium chloride.

In some embodiments, the one or more quaternary ammonium agents comprises quaternary ammonium agents includes at least one of 1-ethyl-4-methylpyridinium bromide, 1-ethyl-2-methylpyridinium bromide, triethylmethylammonium bromide, triethylmethylammonium chloride, 1,1'-dioctadecyl-4-4'-bipyridinium dibromide, or 1-ethyl-4-methyl pyridinium bromide.

In some embodiments, the one or more quaternary ammonium agents comprises cetyltriethylammonium bromide (CTAB), decyltriethylammonium bromide, or dodecyltriethylammonium bromide. For example, the electrolyte comprises from about 0.01 wt % to about 1 wt % (e.g., from about 0.05 wt % to about 0.5 wt %) of cetyltriethylammonium bromide (CTAB).

In some embodiments, the one or more quaternary ammonium agents comprises tetraethylammonium bromide, trimethylpropylammonium bromide, or any combination thereof. For example, the electrolyte comprises from about 1 wt % to about 6 wt % (e.g., from about 1.5 wt % to about 5 wt %) of tetraethylammonium bromide. For example, the electrolyte comprises from about 1 wt % to about 5 wt % (e.g., from about 1.5 wt % to about 3.5 wt %) of trimethylpropylammonium bromide.

Without being bound by theory, it is thought that the quaternary ammonium agents enhance electrochemistry by creating a buoyancy effect with the bromine complexes formed with the quaternary ammonium agents. As bromide ions in the electrolyte pseudo-polymerize, they become heavier and sink to the bottom of the electrolyte volume, reducing kinetics in the cell. Quaternary ammonium agents that create a buoyancy effect help mitigate this issue, bringing the pseudo-polymerized bromide ions off the bottom of the electrolyte volume, and increasing kinetics in the cell.

In some embodiments, the electrolyte further comprises less than 1 wt % of one or more additives selected from Sn, In, Ga, Al, Tl, Bi, Pb, Sb, Ag, Mn, Fe, or any combination thereof. For example, the electrolyte comprises less than 1 wt % of Sn and In.

In some embodiments, the electrolyte further comprises from about 30 wt % to about 50 wt % of water. In some embodiments, the electrolyte further comprises from about 35 wt % to about 45 wt % of water. In some examples, the water is de-mineralized until its resistance is greater than about 8 MΩ·cm (e.g., about 10 MΩ·cm or greater or greater than about 10 MΩ·cm). In other examples, the water is simply tap water.

In some embodiments, the electrolyte further comprises sufficient HBr to impart the electrolyte with a pH of from about 2 to about 4 (from about 2.5 to about 3.5). In some embodiments, the electrolyte further comprises from about 0.1 wt % to about 2 wt % (e.g., from about 0.3 wt % to about 1 wt %) of HBr.

In some embodiments, the electrolyte further comprises from about 0.1 wt % to about 2 wt % (e.g., from about 0.3 wt % to about 1 wt %) of acetic acid. In alternative embodiments, the electrolyte comprises from about 0.1 wt % to about 2 wt % of acetic acid, sodium acetate, potassium acetate, or any combination thereof.

In some embodiments, the electrolyte further comprises from about 2 wt % to about 8 wt % (e.g., from about 3 wt % to about 5 wt %) citric acid monohydrate. In some embodiments, the electrolyte further comprises from about 2 wt % to about 8 wt % (e.g., from about 3 wt % to about 5 wt %) of potassium dihydrogen citrate monohydrate.

In some embodiments, the electrolyte further comprises from about 2 wt % to about 8 wt % (e.g., from about 3 wt % to about 5 wt %) oxalic acid. In some embodiments, the electrolyte further comprises from about 2 wt % to about 8 wt % (e.g., from about 3 wt % to about 5 wt %) of oxalic acid.

In some embodiments the electrolyte further comprises a stable additive. For example, the stable additive is acetic acid, sodium acetate, oxalic acid, sodium oxalate, citric acid, potassium citrate, 18-crown-6, dicyandiamide, succinic acid, sodium methane sulfonate, sodium proprionate, sodium malonate, sodium hexanoate, sodium hexafluoroaluminate, sebacic acid, potassium trifluoromethanesulfonate, acetonitrile, propionitrile, acquivion ionomer, sodium butyrate, melamine, sebaic acid, 2,2 bipyridine, dodecanedioic acid, sodium trichloroacetate, dodecanoic acid, sodium dodecanoate, 15-crown-5, or trichloroacetic acid. In some embodiments the additives enhance electrochemistry. In other embodiments the additives do not change the electrochemistry.

In some embodiments, the electrolyte further comprises a defoamer. For example, the electrolyte comprises a polydimethylsiloxane trimethylsiloxy defoamer having a molecular weight (Mn) of from about 1000 amu to about 2000 amu (e.g., from about 1000 amu to about 1500 amu, or about 1250 amu). In some instances, the electrolyte comprises from about 0.1 wt % to about 0.35 wt % of defoamer (e.g., a polydimethylsiloxane trimethylsiloxy defoamer having a molecular weight (Mn) of from about 1000 amu to about 2000 amu (e.g., from about 1000 amu to about 1500 amu, or about 1250 amu)).

Another aspect of the present invention provides an electrolyte for use in a secondary zinc halide electrochemical cell comprising from about 30 wt % to about 40 wt % of $ZnBr_2$, $ZnCl_2$, or any combination thereof; from about 4 wt % to about 12 wt % of KBr; from about 4 wt % to about 12 wt % of KCl; from about 0.5 wt % to about 10 wt % of a glyme; and from about 1 wt % to about 5 wt % of one or more quaternary ammonium agents.

Another aspect of the present invention provides an electrolyte for use in a secondary zinc halide electrochemical cell comprising from about 30 wt % to about 40 wt % of $ZnBr_2$; from about 4 wt % to about 12 wt % of KBr; from about 4 wt % to about 12 wt % of KCl; from about 0.5 wt % to about 10 wt % of a glyme; and from about 1 wt % to about 5 wt % of one or more quaternary ammonium agents.

Another aspect of the present invention provides an electrolyte for use in a secondary zinc halide electrochemical cell comprising from about 30 wt % to about 40 wt % of $ZnBr_2$ and from about 0.01 wt % to about 0.9 wt % of one or more additives selected from Sn, In, Ga, Al, Tl, Bi, Pb, Sb, Ag, Mn, Fe, or any combination thereof.

In some embodiments, the electrolyte comprises from about 30 wt % to about 40 wt % of $ZnBr_2$; from about 5 wt % to about 15 wt % of KBr; from about 5 wt % to about 15 wt % of KCl; from about 0.5 wt % to about 10 wt % of one or more quaternary ammonium agents; from about 0.1 wt % to about 2 wt % of acetic acid; and from about 0.05 wt % to about 4 wt % of a crown ether.

In some embodiments, the electrolyte comprises from about 30 wt % to about 40 wt % of $ZnBr_2$; from about 5 wt % to about 15 wt % of KBr; from about 5 wt % to about 15 wt % of KCl; from about 0.5 wt % to about 10 wt % of one or more quaternary ammonium agents; from about 0.1 wt % to about 2 wt % of acetic acid; from about 0.05 wt % to about 4 wt % of a crown ether; and wherein the one or more quaternary ammonium agents comprises tetraethylammonium bromide.

In some embodiments, the electrolyte comprises from about 30 wt % to about 40 wt % of $ZnBr_2$; from about 5 wt % to about 15 wt % of KBr; from about 5 wt % to about 15 wt % of KCl; from about 0.5 wt % to about 10 wt % of one or more quaternary ammonium agents; from about 0.1 wt % to about 2 wt % of acetic acid; from about 0.05 wt % to about 4 wt % of a crown ether; and wherein the one or more quaternary ammonium agents comprises trimethylpropylammonium bromide.

In some embodiments, the electrolyte comprises from about 30 wt % to about 40 wt % of $ZnBr_2$; from about 5 wt % to about 15 wt % of KBr; from about 5 wt % to about 15 wt % of KCl; from about 0.5 wt % to about 10 wt % of one or more quaternary ammonium agents; from about 0.1 wt % to about 2 wt % of acetic acid; from about 0.05 wt % to about 4 wt % of a crown ether; and wherein the one or more quaternary ammonium agents comprises tetraethylammonium bromide, methylethylpyridinium bromide, and cetyltriethylammonium bromide. In a further embodiment, the methylethylpyridinium bromide is selected from 1-ethyl-2-methylpyridinium bromide, 1-ethyl-3-methylpyridinium bromide, or 1-ethyl-4-methylpyridinium bromide. In a further embodiment, the methylethylpyridinium bromide is 1-ethyl-3-methylpyridinium bromide.

In some embodiments, the electrolyte comprises from about 30 wt % to about 40 wt % of $ZnBr_2$; from about 5 wt % to about 15 wt % of KBr; from about 5 wt % to about 15 wt % of KCl; from about 0.5 wt % to about 10 wt % of one or more quaternary ammonium agents; from about 0.1 wt % to about 2 wt % of acetic acid; from about 0.05 wt % to about 4 wt % of a crown ether; and wherein the one or more quaternary ammonium agents comprises triethylpropylammonium bromide, methylethylpyridinium bromide, and cetyltriethylammonium bromide. In a further embodiment, the methylethylpyridinium bromide is 1-ethyl-2-methylpyridinium bromide.

In some embodiments, the electrolyte comprises from about 30 wt % to about 40 wt % of $ZnBr_2$; from about 5 wt % to about 15 wt % of KBr; from about 5 wt % to about 15 wt % of KCl; from about 0.5 wt % to about 10 wt % of one or more quaternary ammonium agents; from about 0.1 wt % to about 2 wt % of acetic acid; from about 0.05 wt % to about 4 wt % of a crown ether; and wherein the one or more quaternary ammonium agents comprises triethylpropylammonium bromide, 1-butyl-3-methylpyridinium bromide, and cetyltriethylammonium bromide.

In some embodiments, the electrolyte comprises from about 30 wt % to about 40 wt % of $ZnBr_2$; from about 5 wt % to about 15 wt % of KBr; from about 5 wt % to about 15 wt % of KCl; from about 0.5 wt % to about 10 wt % of one or more quaternary ammonium agents; from about 0.1 wt % to about 2 wt % of acetic acid; from about 0.05 wt % to about 4 wt % of a crown ether; and wherein the one or more quaternary ammonium agents comprises triethylpropylammonium bromide, 1-ethyl-3-methylpyridinium bromide, and cetyltriethylammonium bromide.

In some embodiments, the electrolyte comprises from about 30 wt % to about 40 wt % of $ZnBr_2$; from about 5 wt % to about 15 wt % of KBr; from about 5 wt % to about 15 wt % of KCl; from about 0.5 wt % to about 10 wt % of one or more quaternary ammonium agents; from about 0.1 wt % to about 2 wt % of acetic acid; from about 0.05 wt % to about 4 wt % of a crown ether; and wherein the one or more quaternary ammonium agents comprises triethylpropylammonium bromide, 1-ethyl-2-methylpyridinium bromide, and cetyltriethylammonium bromide.

In some embodiments, the electrolyte comprises from about 30 wt % to about 40 wt % of $ZnBr_2$; from about 5 wt % to about 15 wt % of KBr; from about 5 wt % to about 15 wt % of KCl; from about 0.5 wt % to about 10 wt % of one or more quaternary ammonium agents; from about 0.1 wt % to about 2 wt % of acetic acid; from about 0.05 wt % to about 4 wt % of a crown ether; and wherein the one or more quaternary ammonium agents comprises triethylpropylammonium bromide, 1-ethyl-4-methylpyridinium bromide, and cetyltriethylammonium bromide.

In some embodiments, the electrolyte comprises from about 30 wt % to about 40 wt % of $ZnBr_2$; from about 5 wt % to about 15 wt % of KBr; from about 5 wt % to about 15 wt % of KCl; from about 0.5 wt % to about 10 wt % of one or more quaternary ammonium agents; from about 0.1 wt % to about 2 wt % of acetic acid; from about 0.05 wt % to about 4 wt % of a crown ether; and wherein the one or more quaternary ammonium agents comprises tetraethylammonium bromide, 1-butyl-3-methylpyridinium bromide, and cetyltriethylammonium bromide.

In some embodiments, the electrolyte comprises from about 30 wt % to about 40 wt % of $ZnBr_2$; from about 5 wt % to about 15 wt % of KBr; from about 5 wt % to about 15 wt % of KCl; from about 0.5 wt % to about 10 wt % of one or more quaternary ammonium agents; from about 0.1 wt % to about 2 wt % of acetic acid; from about 0.05 wt % to about 4 wt % of a crown ether; and wherein the one or more quaternary ammonium agents comprises at least tetraethylammonium bromide, N-ethyl-N-methylmorpholinium bromide, and cetyltriethylammonium bromide.

In some embodiments, the electrolyte comprises from about 30 wt % to about 40 wt % of $ZnBr_2$; from about 5 wt % to about 15 wt % of KBr; from about 5 wt % to about 15 wt % of KCl; from about 0.5 wt % to about 10 wt % of one or more quaternary ammonium agents; from about 0.1 wt % to about 2 wt % of acetic acid; from about 0.05 wt % to about 4 wt % of a crown ether; and wherein the one or more quaternary ammonium agents comprises trimethylpropylammonium bromide, 1-butyl-1-methylpyrrolidinium bromide, and cetyltriethylammonium bromide.

In some embodiments, the electrolyte comprises from about 30 wt % to about 40 wt % of $ZnBr_2$; from about 5 wt % to about 15 wt % of KBr; from about 5 wt % to about 15 wt % of KCl; from about 0.5 wt % to about 10 wt % of one or more quaternary ammonium agents; wherein the one or more quaternary ammonium agents comprises tetraethylammonium bromide, methylethylpyridinium bromide, and cetyltriethylammonium bromide.

In some embodiments, the electrolyte comprises from about 30 wt % to about 40 wt % of $ZnBr_2$; from about 5 wt % to about 15 wt % of KBr; from about 5 wt % to about 15 wt % of KCl; from about 0.5 wt % to about 10 wt % of one or more quaternary ammonium agents; wherein the one or more quaternary ammonium agents comprises trimethylpropylammonium bromide, 1-butyl-1-methylpyrrolidinium bromide, and cetyltriethylammonium bromide.

Methods of Preparing an Electrolyte

Another aspect of the present invention provides a method of preparing an electrolyte for use in a secondary zinc halide electrochemical cell comprising mixing $ZnBr_2$, KBr, KCl; water, and one or more quaternary ammonium agents to generate a mixture, wherein the mixture comprises from about 30 wt % to about 40 wt % of $ZnBr_2$; from about 4 wt % to about 12 wt % of KBr; from about 4 wt % to about 12 wt % of KCl; from about 0.5 wt % to about 10 wt % of the one or more quaternary ammonium agents; and from about 25 wt % to about 45 wt % of water.

Alternatively, the mixture comprises from about 30 wt % to about 40 wt % of $ZnBr_2$; from about 8 wt % to about 12 wt % of KBr; from about 8 wt % to about 14 wt % of KCl; from about 0.5 wt % to about 10 wt % of the one or more quaternary ammonium agents; and from about 25 wt % to about 45 wt % of water.

In some implementations, the mixture comprises from about 32 wt % to about 36 wt % of $ZnBr_2$.

In some implementations, the mixture comprises from about 4 wt % to about 12 wt % (e.g., from about 6 wt % to about 10 wt %) of potassium bromide (KBr). In some implementations, the mixture comprises from about 8 wt % to about 12 wt % of potassium bromide (KBr).

In some implementations, the mixture comprises from about 4 wt % to about 12 wt % (e.g., from about 6 wt % to about 10 wt %) of potassium chloride (KCl). In some implementations, the mixture comprises from about 8 wt % to about 14 wt % of potassium chloride (KCl). In some implementations, the mixture comprises from about 11 wt % to about 14 wt % of potassium chloride (KCl).

In some implementations, the mixture comprises from about 27 wt % to about 43 wt % (e.g., from about 30 wt % to about 40 wt % or from about 35 wt % to about 41 wt %) of water.

In some implementations, the one or more quaternary ammonium agents is a salt of Formula I

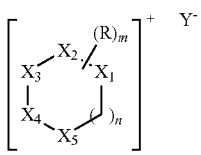

Formula I as described herein.

In some implementations, the one or more quaternary ammonium comprises a quaternary ammonium agent selected from the group consisting of an ammonium halide (e.g., NH$_4$Br, NH$_4$Cl, or any combination thereof); a tetraalkylammonium halide (e.g., tetramethylammonium bromide, tetramethylammonium chloride, tetraethylammonium bromide, tetraethylammonium chloride, combinations thereof or the like); a heterocyclic ammonium halides (e.g., N-methyl-N-ethylpyrrolidinium halide, N-ethyl-N-methylpyrrolidinium halide, combinations thereof, or the like); or any combination thereof. In other implementations, the one or more quaternary ammonium agents comprises a quaternary ammonium agent selected from the group consisting of ammonium chloride, tetraethylammonium chloride, trimethylpropylammonium bromide, N-methyl-N-ethylmorpholinium bromide, N-ethyl-N-methylmorpholinium bromide, N-methyl-N-butylmorpholinium bromide, N-methyl-N-ethylpyrrolidinium bromide, N,N,N-triethyl-N-propylammonium bromide, N-ethyl-N-propylpyrrolidinium bromide, N-propyl-N-butylpyrrolidinium bromide, N-methyl-N-butylpyrrolidinium bromide, N-ethyl-N-(2-chloroethyl)pyrrolidinium bromide, N-methyl-N-hexylpyrrolidinium bromide, N-methyl-N-pentylpyrrolidinium bromide, N-ethyl-N-pentylpyrrolidinium bromide, N-ethyl-N-butylpyrrolidinium bromide, trimethylene-bis(N-methylpyrrolidinium) dibromide, N-butyl-N-pentylpyrrolidinium bromide, N-methyl-N-propylpyrrolidinium bromide, N-propyl-N-pentylpyrrolidinium bromide, and any combination thereof. In some examples, the mixture comprises from about 1 wt % to about 5 wt % of one or more quaternary ammonium agents. And, in some implementations, the one or more quaternary ammonium agents comprises N-methyl-N-ethylmorpholinium bromide. In other examples, the mixture comprises from about 0.25 wt % to about 1.25 wt % of N-methyl-N-ethylmorpholinium bromide. And, in some examples, the one or more quaternary ammonium agents comprises tetraethylammonium bromide, trimethylpropylammonium bromide, or any combination thereof. For instance, the electrolyte comprises from about 1 wt % to about 5 wt % of tetraethylammonium bromide.

In some implementations, the one or more quaternary ammonium agents comprises a quaternary ammonium agent selected from the group consisting of an ammonium bromine complexing agent, an imidazolium bromine complexing agent, a pyrrolidinium bromine complexing agent, a pyridinium bromine complexing agent, a phosphonium bromine complexing agent, and a morpholinium bromine complexing agent.

In some implementations, the one or more quaternary ammonium agents comprises a quaternary ammonium agent selected from the group consisting of tetraethylammonium (TEA) bromide, N-ethyl-N-methylmorpholinium (MEM) bromide, trimethylpropylammonium bromide, 1-ethyl-3-methylimidazolium bromide, 1-butyl-3-methylimidazolium bromide, 1-butyl-1-methylpyrrolidinium bromide, 1-ethyl-2-methylpyridinium bromide, 1-ethyl-3-methylpyridinium bromide, 1-ethyl-2-methylpyridinium bromide, 1-ethyl-4-methylpyridinium bromide, 1-methyl-1-propylpiperidinium bromide, dodecyltrimethylammonium bromide, 1-ethyl-2,3-dimethylimidazolium bromide, 1-decyl-3-methylimidazolium bromide, 1-butyl-2,3-dimethylimidazolium bromide, 1-methyl-3-octylimidazolium bromide, 1-methyl-3-hexylimidazolium bromide, 1-butyl-3-methylpyridinium bromide, 1-butyl-4-methylpyridinium bromide, 1-hexylpyridinium bromide, tetraethylphosphonium bromide, 1-methyl-1-propylpyrrolidinium bromide, triethylmethylammonium chloride, hexyltrimethylammonium bromide, hexyltrimethylammonium chloride, and cetyltriethylammonium bromide. For example, the one or more quaternary ammonium agents comprises 1-ethyl-3-methylpyridinium bromide, 1-ethyl-2-methylpyridinium bromide, 1-ethyl-4-methylpyridinium bromide, 1-butyl-3-methyl pyridinium bromide, or 1-butyl-1-methyl pyrrolidinium bromide. For example, the electrolyte comprises from about 1 wt % to about 4 wt % (e.g., from about 1.5 wt % to about 3 wt %) of 1-ethyl-3-methylpyridinium bromide, 1-ethyl-2-methylpyridinium bromide, 1-ethyl-4-methylpyridinium bromide, 1-butyl-3-methyl pyridinium bromide, or 1-butyl-1-methyl pyrrolidinium bromide.

In some embodiments, the one or more quaternary ammonium agents comprises cetyltriethylammonium bromide (CTAB). For example, the electrolyte comprises from about 0.05 wt % to about 1 wt % (e.g., from about 0.1 wt % to about 0.5 wt %) of cetyltriethylammonium bromide (CTAB).

In some embodiments, the one or more quaternary ammonium agents comprises tetraethylammonium bromide, trimethylpropylammonium bromide, or any combination thereof. For example, the electrolyte comprises from about 1 wt % to about 5 wt % (e.g., from about 1.5 wt % to about 3.5 wt %) of tetraethylammonium bromide. For example, the electrolyte comprises from about 1 wt % to about 5 wt % (e.g., from about 1.5 wt % to about 3.5 wt %) of trimethylpropylammonium bromide.

Some implementations additionally comprise mixing a glyme with ZnBr$_2$ and other ingredients (e.g., KBr, KCl, quaternary ammonium agent, and water), wherein the mixture comprises from about 0.5 wt % to about 10 wt % (e.g., from about 1 wt % to about 7.5 wt %) of a glyme. In some examples, the glyme comprises monoglyme, diglyme, triglyme, tetraglyme, or any combination thereof. For instance, the glyme comprises tetraglyme. In other examples, the mixture comprises from about 1 wt % to about 5 wt % of tetraglyme.

Some implementations additionally comprise mixing DME-PEG with ZnBr$_2$ and other ingredients (e.g., KBr, KCl, quaternary ammonium agent, water, and/or glyme) to generate the mixture, wherein the mixture comprises from about 0.5 wt % to about 2.5 wt % (e.g., from about 1 wt % to about 2.25 wt %) of MPEG. In some examples, the DME-PEG has an average molecular weight (e.g., a number average molecular weight M$_n$) of from about 350 amu to about 3000 amu. In other examples, the DME-PEG has an average molecular weight (e.g., a number average molecular weight M$_n$) of from about 1200 amu to about 3000 amu. And, in some examples, the mixture further comprises from about 5 wt % to about 10 wt % of DME-PEG, wherein the DME-PEG has an average molecular weight (e.g., a number average molecular weight M$_n$) of from about 1500 amu to about 2500 amu (e.g., about 2000 amu).

Some implementations additionally comprise mixing a crown ether with ZnBr$_2$ and other ingredients (e.g., KBr, KCl, quaternary ammonium agent, water, etc.) to generate the mixture, wherein the mixture comprises from about 0.05 wt % to about 4 wt % of the crown ether. In some examples the crown ether is 18-crown-6 or 15-crown-5. In some examples the mixture comprises from about 0.1 wt % to about 1 wt % of the crown ether.

Some implementations additionally comprise mixing an alcohol that is substantially miscible in water with $ZnBr_2$ and other ingredients (e.g., KBr, KCl, quaternary ammonium agent, water, glyme, and/or DME-PEG) to generate the mixture, wherein the mixture comprises from about 0.1 wt % to about 1.0 wt % of the alcohol. For example, the alcohol comprises a $C_{1-4}$ alcohol. In other examples, the alcohol comprises methanol, ethanol, 1-propanol, iso-propanol, 1-butanol, sec-butanol, iso-butanol, tert-butanol, or any combination thereof. And in some examples, the mixture further comprises from about 0.25 wt % to about 0.75 wt % of tert-butanol.

Some implementations additionally comprise mixing a $C_{1-10}$ glycol with $ZnBr_2$ and other ingredients (e.g., KBr, KCl, quaternary ammonium agent, water, glyme, DME-PEG, and/or alcohol) to generate the mixture, wherein the mixture comprises from about 0.25 wt % to about 5 wt % (e.g., from about 0.5 wt % to about 4 wt %) of the $C_{1-10}$ glycol. In some examples, the glycol comprises ethylene glycol, propylene glycol, 1,3-butylene glycol, 1,4-butylene glycol, neopentyl glycol, hexalene glycol, or any combination thereof. And, in some examples, the mixture further comprises from about 0.25 wt % to about 2.5 wt % of neopentyl glycol.

Some implementations additionally comprise mixing one or more additives selected from Sn, In, Ga, Al, Tl, Bi, Pb, Sb, Ag, Mn, or Fe with $ZnBr_2$ and other ingredients (e.g., KBr, KCl, quaternary ammonium agent, water, glyme, DME-PEG, alcohol, and/or $C_{1-10}$ glycol), wherein the mixture comprises less than 1 wt % of the one or more additives selected from Sn, In, Ga, Al, Tl, Bi, Pb, Sb, Ag, Mn, or Fe. For example, the mixture comprises less than 1 wt % of Sn and In.

Some implementations additionally comprise adding a sufficient amount of HBr to the mixture to impart the mixture with a pH of from about 2 to about 4 (from about 2.5 to about 3.5).

Some implementations additionally comprise mixing acetic acid with $ZnBr_2$ and other ingredients (e.g., KBr, KCl, quaternary ammonium agent, water, etc.) to generate the mixture, wherein the mixture comprises from about 0.1 wt % to about 2 wt % (e.g., from about 0.3 wt % to about 1 wt %) of acetic acid.

Some implementations additionally comprise mixing citric acid monohydrate with $ZnBr_2$ and other ingredients (e.g., KBr, KCl, quaternary ammonium agent, water, etc.) to generate the mixture, wherein the mixture comprises from about 2 wt % to about 8 wt % (e.g., from about 3 wt % to about 5 wt %) citric acid monohydrate.

Some implementations additionally comprise mixing potassium dihydrogen citrate monohydrate with $ZnBr_2$ and other ingredients (e.g., KBr, KCl, quaternary ammonium agent, water, etc.) to generate the mixture, wherein the mixture comprises from about 2 wt % to about 8 wt % (e.g., from about 3 wt % to about 5 wt %) of potassium dihydrogen citrate monohydrate.

In some implementations, the $ZnBr_2$, KBr, KCl, water, and one or more quaternary ammonium agents are mixed at a temperature of from about 15° C. to about 30° C. (e.g., room temperature).

In some implementations, the $ZnBr_2$, KBr, KCl; water, and one or more quaternary ammonium agents are mixed under agitation (e.g., the mixture is stirred).

In some implementations, the mixtures described herein are optionally filtered. In some implementations, the mixtures described herein are filtered. In some implementations, the mixtures described herein are not filtered.

Another aspect of the present invention provides an electrolyte for use in a secondary zinc bromine electrochemical cell comprising from about 25 wt % to about 45 wt % of $ZnBr_2$; from about 25 wt % to about 45 wt % of water; and an aggregate amount of from about 1 wt % to about 25 wt % of one or more quaternary ammonium agents, wherein the one or more quaternary ammonium agent comprises at least triethylmethylammonium bromide.

In some embodiments, the electrolyte comprises from about 30 wt % to about 40 wt % of $ZnBr_2$. In other embodiments, the electrolyte comprises from about 32 wt % to about 38 wt % of $ZnBr_2$.

In some embodiments, the electrolyte comprises from about 1.5 wt % to about 7.5 wt % of $ZnCl_2$.

In some embodiments, the electrolyte comprises from about 35 wt % to about 45 wt % of water.

In some embodiments, the electrolyte comprises from about 1 wt % to about 5 wt % of KBr. For instance, the electrolyte comprises from about 1.5 wt % to about 4.5 wt % of KBr.

In some embodiments, the electrolyte comprises from about 5 wt % to about 15 wt % of KCl.

In some embodiments, the electrolyte comprises from about 0.5 wt % to about 2.5 wt % of an ether selected from DME-PEG, dimethyl ether, or any combination thereof. In some examples, the ether is DME-PEG, and the DME-PEG has an average molecular weight of from about 350 amu to about 3000 amu. In other examples, the DME-PEG has an average molecular weight of from about 750 amu to about 2500 amu. In some embodiments, the ether is DME-PEG, and the electrolyte comprises from about 0.1 wt % to about 0.5 wt % of DME-PEG having an average molecular weight of from about 750 amu to about 1250 amu. In other embodiments, the ether is DME-PEG, and the electrolyte comprises from about 1.0 wt % to about 2.0 wt % of DME-PEG having an average molecular weight of from about 1750 amu to about 2250 amu. And, in some examples, the ether is DME-PEG, the electrolyte comprises from about 0.1 wt % to about 0.5 wt % of DME-PEG having an average molecular weight of from about 750 amu to about 1250 amu, and the electrolyte further comprises from about 1 wt % to about 2 wt % of DME-PEG having an average molecular weight of from about 1750 amu to about 2250 amu.

In some embodiments, the electrolyte according to claim 1, further comprising from about 1 wt % to about 10 wt % of triethylmethylammonium bromide. For example, the electrolyte comprises from about 1.5 wt % to about 7.5 wt % of triethylammonium bromide.

In some embodiments, the one or more quaternary ammonium agents additionally comprises at least one quaternary ammonium agent selected from the group consisting of ammonium chloride, tetraethylammonium bromide, trimethylpropylammonium bromide, N-methyl-N-ethylmorpholinium bromide, N-methyl-N-ethylmorpholinium bromide (MEMBr), N-methyl-N-butylmorpholinium bromide, N-methyl-N-ethylpyrrolidinium bromide, N,N,N-triethyl-N-propylammonium bromide, N-ethyl-N-propylpyrrolidinium bromide, N-propyl-N-butylpyrrolidinium bromide, N-methyl-N-butylpyrrolidinium bromide, 1-methyl-1-butylpyrrolidinium bromide, N-ethyl-N-(2-chloroethyl)pyrrolidinium bromide, N-methyl-N-hexylpyrrolidinium bromide, N-methyl-N-pentylpyrrolidinium bromide, N-ethyl-N-pentylpyrrolidinium bromide, N-ethyl-N-butylpyrrolidinium bromide, trimethylene-bis(N-methylpyrrolidinium) dibromide, N-butyl-N-pentylpyrrolidinium bromide, N-methyl-N-propylpyrrolidinium bromide, N-propyl-N-pentylpyrrolidinium bromide, 1-ethyl-4-methylpyridinium bromide, 1-ethyl-2-methylpyridinium bromide, 1-butyl-3-methylpyridinium bromide, and cetyltrimethylammonium bromide.

In alternative embodiments, the one or more quaternary ammonium agents additionally comprises at least one quaternary ammonium agent selected from the group consisting of 1-ethyl-4-methylpyridinium bromide, 1-ethyl-2-methylpyridinium bromide, and 1-butyl-3-methylpyridinium bromide. For instance, the one or more quaternary ammonium agents additionally comprises 1-ethyl-2-methylpyridinium bromide, and the electrolyte further comprises from about 1.0 wt % to about 10 wt % of 1-ethyl-2-methylpyridinium bromide.

In some embodiments, the one or more quaternary ammonium agents additionally comprises cetyltrimethylammonium bromide, and the electrolyte further comprises from about 0.05 wt % to about 0.10 wt % of cetyltrimethylammonium bromide.

In some embodiments, the electrolyte comprises an acid, or the conjugate base of an acid, selected from acetic acid, nitric acid, and citric acid. For instance, the electrolyte comprises from about 0.1 wt % to about 1.0 wt % of glacial acetic acid. In other instances, the electrolyte comprises from about 0.1 wt % to about 1.0 wt % of HBr. In other instances, the electrolyte comprises from about 0.12 wt % to about 0.08 wt % nitric acid. In some instances, the electrolyte comprises from about 3.5 wt % to about 4.5 wt % citric acid. And in some instances, the electrolyte comprises from about 3.5 wt % to about 4.5 wt % potassium dihydrogen citrate.

Another aspect of the present invention provides a electrolyte for use in a secondary zinc bromine electrochemical cell comprising from about 25 wt % to about 45 wt % of $ZnBr_2$; from about 25 wt % to about 45 wt % of water; from about 1 wt % to about 5 wt % of KBr; from about 5 wt % to about 15 wt % of KCl; and from about 1 wt % to about 10 wt % of triethylmethylammonium bromide.

In some embodiments, the electrolyte comprises from about 0.1 wt % to about 1.0 wt % of glacial acetic acid.

In some embodiments, the electrolyte comprises from about 0.1 wt % to about 0.5 wt % of DME-PEG having an average molecular weight of from about 750 amu to about 1250 amu.

In some embodiments, the electrolyte comprises from about 1.0 wt % to about 2.0 wt % of DME-PEG having an average molecular weight of from about 1750 amu to about 2250 amu.

In some embodiments, the electrolyte comprises from about 1.0 wt % to about 10 wt % of at least quaternary ammonium agent selected from the group consisting of 1-ethyl-4-methylpyridinium bromide, 1-ethyl-2-methylpyridinium bromide, and 1-butyl-3-methylpyridinium bromide.

In some embodiments, the electrolyte comprises from about 0.05 wt % to about 0.10 wt % of cetyltrimethylammonium bromide.

Another aspect of the present invention provides a method of preparing an electrolyte for use in a secondary zinc halide electrochemical cell comprising mixing $ZnBr_2$, KBr, KCl, and triethylmethylammonium bromide under aqueous conditions to generate a mixture and stirring the mixture until the solids have dissolved, wherein the mixture comprises from about 25 wt % to about 45 wt % of $ZnBr_2$; from about 25 wt % to about 45 wt % of water; from about 1 wt % to about 5 wt % of KBr; from about 5 wt % to about 15 wt % of KCl; and from about 1 wt % to about 10 wt % of triethylmethylammonium bromide.

B. Battery Stacks

Figure 18:
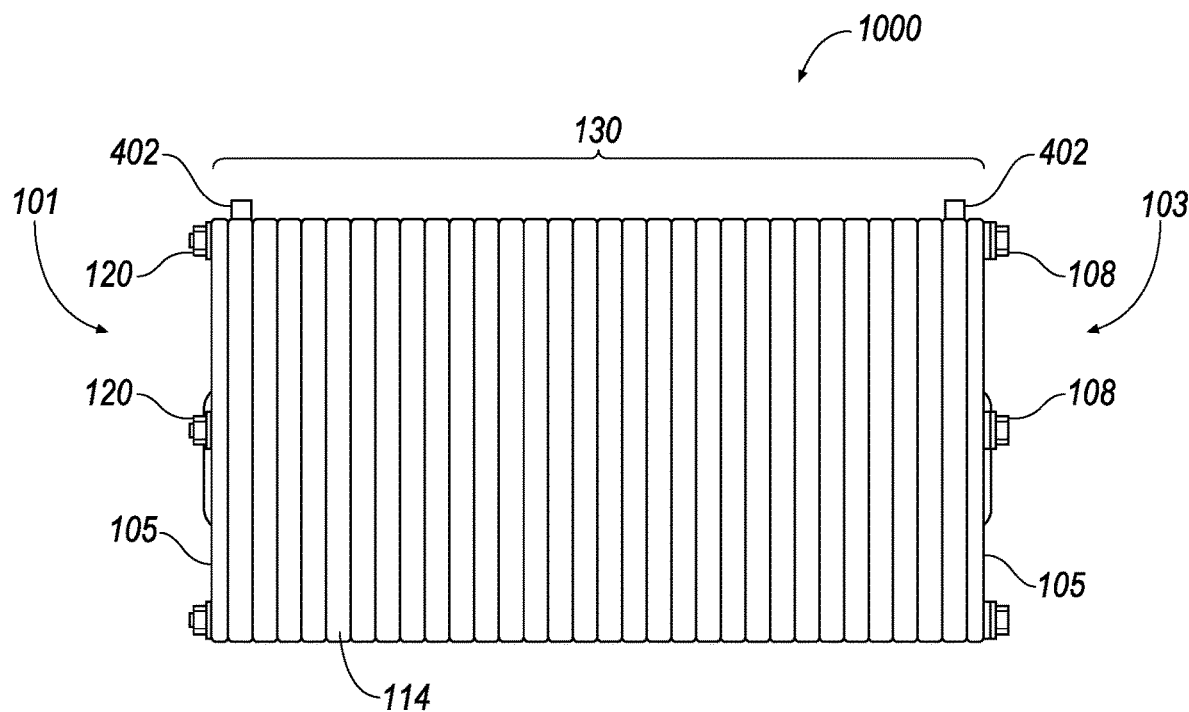
FIG. 18 is a side view of a battery stack comprising a cathode terminal and an anode terminal with bipolar electrodes and frame members between compression plates according to an embodiment of the present invention.
Figure 19:
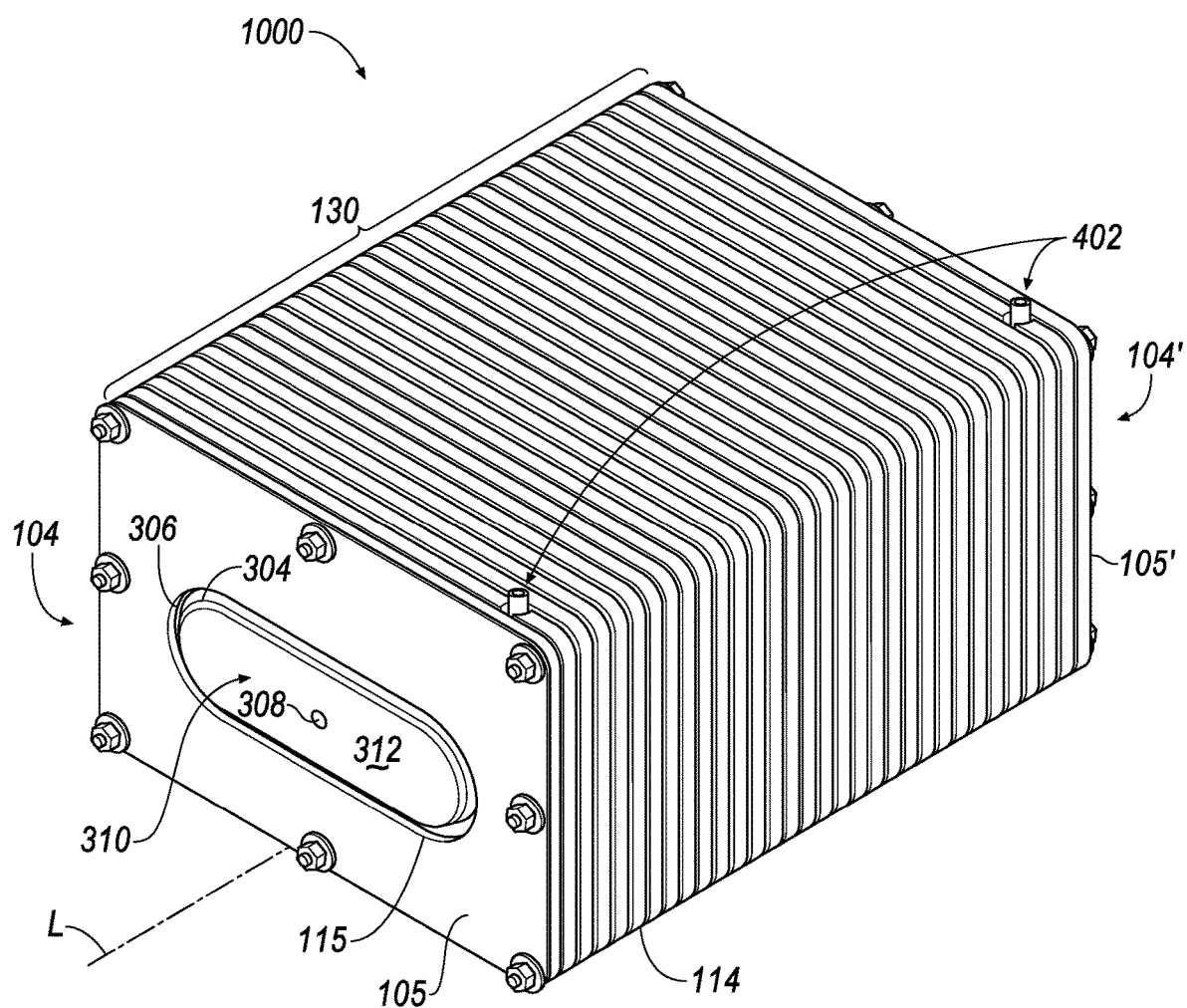
FIG. 19 is a top perspective view of a battery stack comprising a pair of terminal assemblies at corresponding proximal and distal ends of the battery module according to an embodiment of the present invention.
Figure 20:
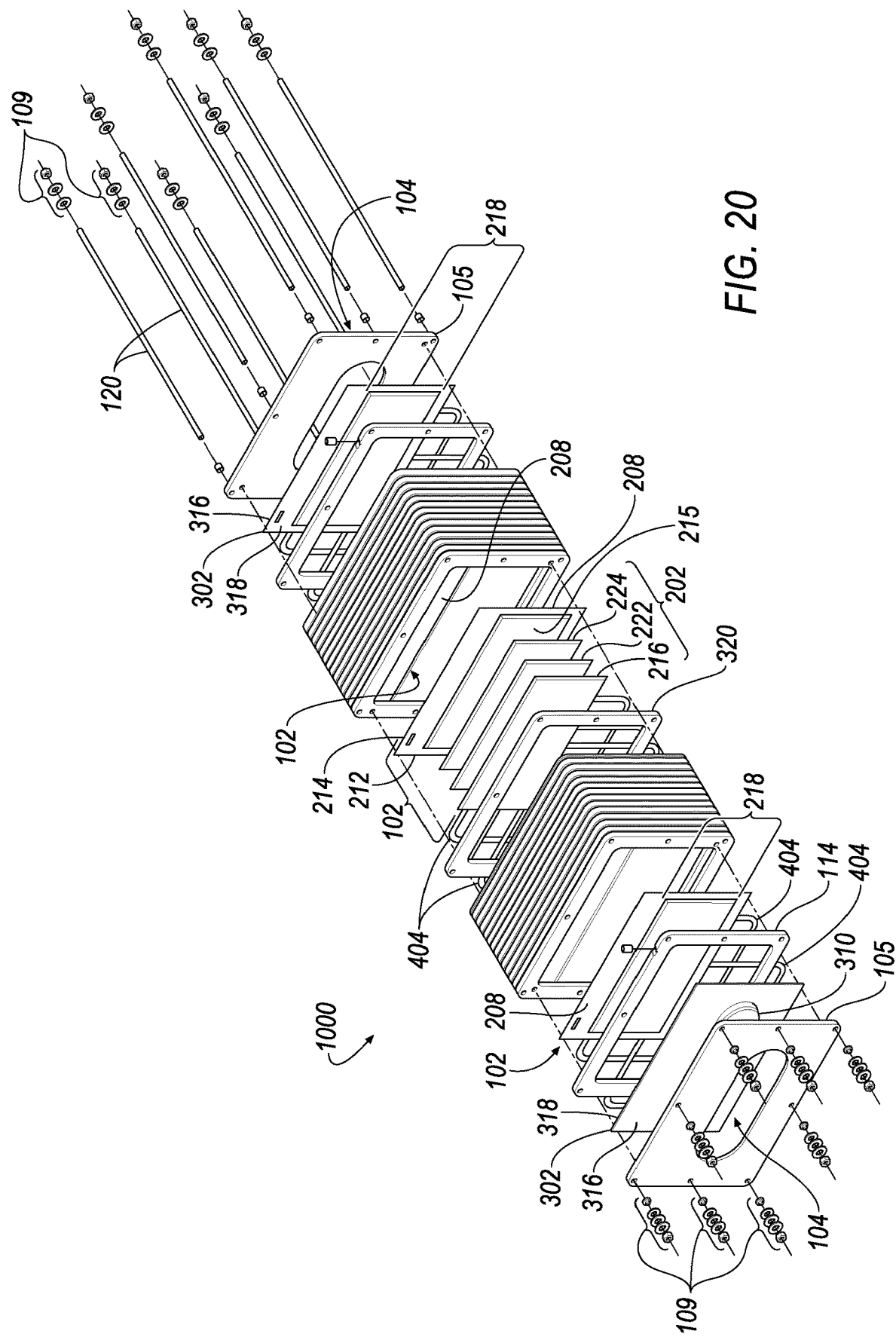
FIG. 20 is an exploded view of the battery stack of FIG. 18 according to an embodiment of the present invention.
Figure 21:
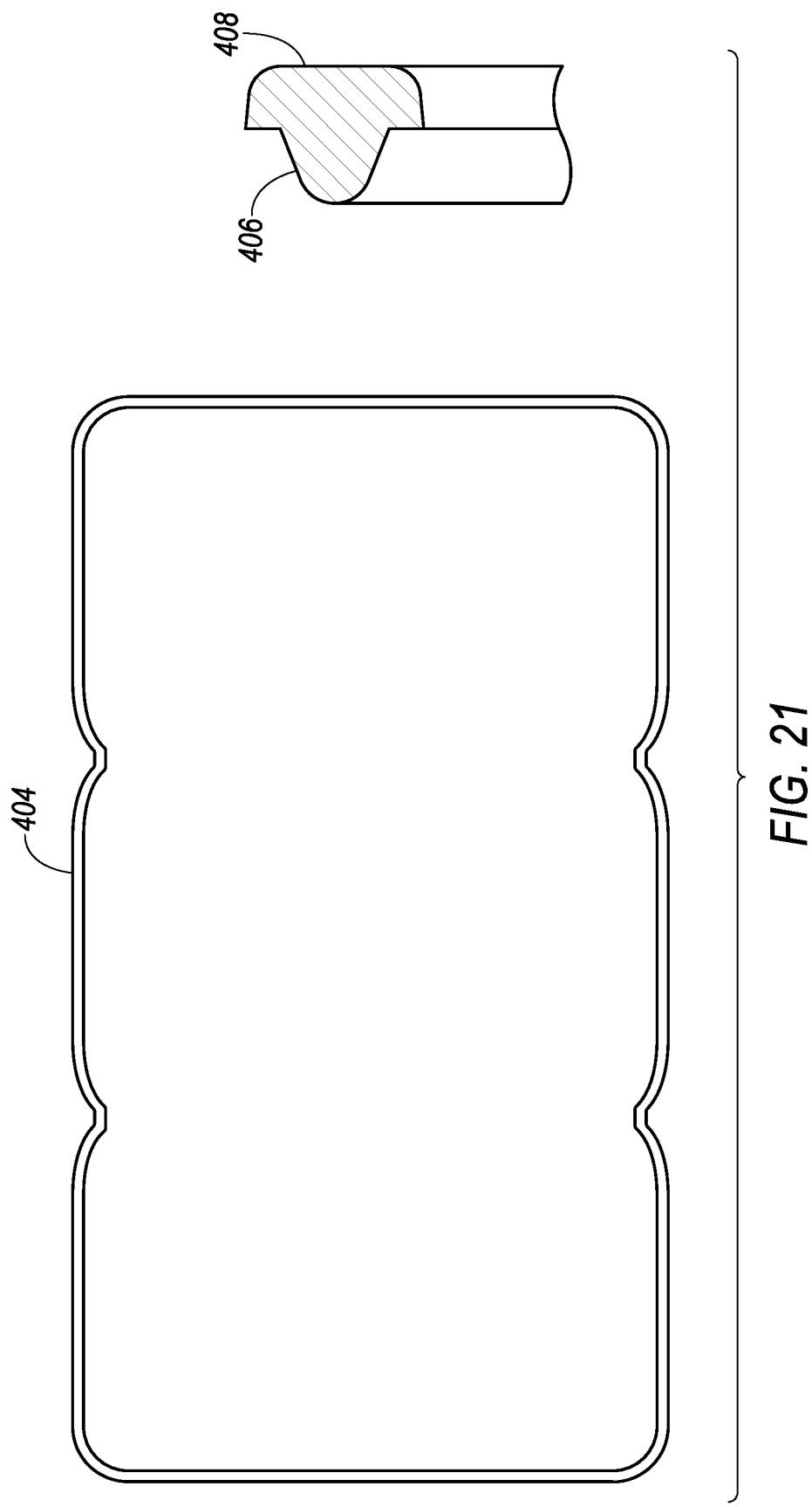
FIG. 21 shows a front view of a seal for use in the battery module of FIG. 20 and a cross sectional view of the seal.

Referring to FIGS. 18-20, another aspect of the present invention provides a battery stack comprising a plurality of bipolar electrodes at least partially disposed in zinc-halide electrolyte and interposed between a cathode terminal assembly and an anode terminal assembly. The cathode terminal assembly, the anode terminal assembly, the zinc-halide electrolyte, and the bipolar electrodes include any embodiments described herein.

1. Frame Members

In some embodiments, the battery stack or electrochemical cell of the present invention comprises a frame member 114 that is interposed between two adjacent bipolar electrodes or interposed between a bipolar electrode and a terminal assembly (e.g., a terminal anode assembly or a terminal cathode assembly).

In one embodiment, illustrated in FIG. 23, the frame member has an outer periphery edge 604, and an inner periphery edge 608 defining an open interior region 606. The inner periphery edge 608 defines the open interior region such that a cathode assembly of a bipolar electrode is immediately adjacent to an inner surface of a terminal endplate or a back surface of an adjacent bipolar electrode plate without interference or obstruction from the frame member. Thus, the open interior region is at least as large as the electrochemically active area of a terminal endplate and at least as large as a reduced surface of a pocket portion of a cathode cage of a cathode assembly. In some embodiments, the frame member is configured such that open interior region is approximately centered about the center of an electrochemically active region of a terminal endplate received by the frame member and/or the center of a cathode assembly disposed on a bipolar electrode plate of a bipolar electrode. In some embodiments, the outer periphery of the frame member defines the outer surface of a battery stack or electrochemical cell.

In some embodiments, the frame member includes a first side 614 that opposes and retains the first bipolar electrode plate or terminal endplate and a second side 616 disposed on an opposite side of the frame member than the first side that opposes and retains a second bipolar electrode plate. The first and second electrode plates and the terminal endplate(s) may be configured to have substantially the same size and shape.

In some embodiments, each side of the frame member includes a sealing groove 612 that extends around the inner periphery edge. In some examples, each sealing groove is sized and shaped to conform to the contour of the peripheral edge of the corresponding bipolar electrode plate or terminal endplate retained by the frame member. And, in some embodiments, each sealing groove is configured to receive a seal 116 (FIG. 21) (e.g., an o-ring or gasket) seated therein that forms a substantially leak-free seal when the seal is compressed between the corresponding electrode plate or endplate and the frame member when the electrochemical cell or battery stack is assembled to provide a sealing interface between the electrode plate or endplate and the frame member. The seals cooperate to retain the electrolyte between the opposing electrode plates and a frame member, or between an electrode plate, an endplate and a frame member.

In some embodiments, the frame member has one or more retaining fences 610 that protrude into the open interior region and restrain a compression plate 105 or electrode plate from movement when the battery is assembled. In other embodiments, one or more retaining fences may extend into the interior region from the inner periphery edge. In some examples, the retaining fences are operative to contact a substantially flat surface of the cathode cage (e.g., the pocket portion of the cathode cage) that protrudes away from the front surface of an electrode plate in a direction toward the frame member. The retaining fence may reduce or prevent the bending and deforming of the cathode cage from flat during charging of the battery module. The retaining fences may include openings or cut outs to reduce overall weight of the frame member.

Each frame member may be formed from flame retardant polypropylene fibers, polypropylene filled with glass fibers, flame retardant high density polyethylene (e.g., filled with glass fibers or unfilled), or polyvinyl chloride. Each frame member may receive two adjacent electrode plates or an electrode plate and a terminal endplate. And, one of the electrode plates may include a surface joined to a cathode assembly having a carbon material and a separator arranged in a layered configuration and a cathode cage enclosing the carbon material and the separator. Each frame may also house an aqueous electrolyte solution (e.g., zinc-halide electrolyte or zinc-bromide electrolyte). As illustrated in FIG. 19, a frame member disposed adjacent to a compression plate may optionally include one or more pressure release valves or rupture disks to release excess pressure from within the electrochemical cell or battery stack. In some embodiments, the pressure relief valve includes a molded carrier configured to extend through the frame and a pressure relief umbrella or rupture disks (e.g., rupture disks that rupture at about 300 psi or greater.

2. Compression Plates

Figure 22:
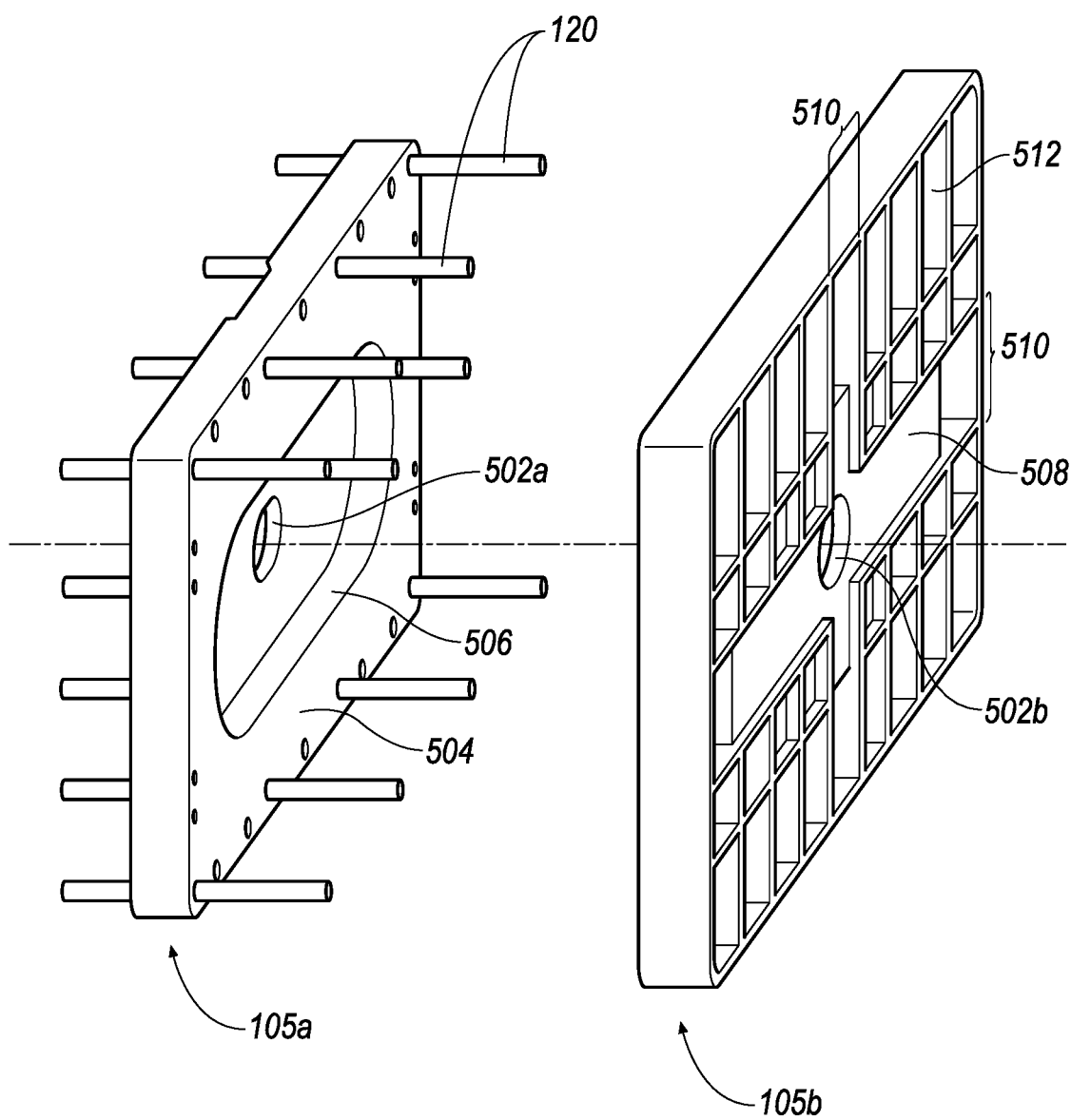
FIG. 22 shows a top perspective view of compression plates for the cathode terminal and anode terminal of the battery stack of FIG. 18 according to an embodiment of the present invention.

In some embodiments, the electrochemical cell or battery stack comprises a pair of compression plates 105, 105a, 105b located at the ends of the electrochemical cell or battery stack. In some embodiments, each compression plate includes an exterior surface 512 and an interior surface 504 disposed on an opposite side of the compression plate than the exterior surface and opposing an adjacent frame member. FIG. 22 shows the exterior surface of the compression plate associated with the positive (+) anode terminal of the electrochemical cell or battery stack and the interior surface of the compression plate associated with the negative (−) cathode of the electrochemical cell or battery stack. In some embodiments, the compression plates are formed from 6061-T6 aluminum and may be manufactured by stamping. In other embodiments, the compression plates are formed of stainless steel and may be manufactured by machining. And, in some embodiments, the compression plates are formed of milled steel.

In some embodiments, a terminal hole 502a, 502b extends through each compression plate to expose a corresponding terminal for electrical connection with a connection/power cable. In some embodiments, the compression plates have thru holes formed through the compression plates that are operative to receive one or more frame bolts or tie rods 120. For example, a first row of four (4) thru holes may be spaced apart (e.g., evenly spaced apart) along the top edge of each compression plate and a second row of four (4) thru holes may be spaced apart (e.g., evenly spaced apart) along the bottom edge of each compression plate.

The outer surface of each compression plate may include cut-outs 508 to reduce weight of the compression plates and to define reinforcement members that reduce stress concentration when the compression plate contacts adjacent terminal frame members. Moreover, the cut-outs may dissipate heat that the electrochemical cell or battery stack generates. The exterior surface and the cut-outs may define one or more channels 510 operative to receive and route the connection/power cables that electrically connect with the exposed terminals and/or a wiring harness for the assembled battery module. And, in some embodiments, each interior surface of the compression plate has one or more cut-outs.

In some embodiments, the interior surface of each compression plate may include a substantially flat surface operative to engage an outer surface of an adjacent frame member. In some embodiments, the interior surface of each compression plate also defines a recessed area having a size and shape configured to receive at least a portion of a conductive cup-shaped member joined to and protruding from the terminal endplate associated with the corresponding adjacent compression plate. In some embodiments, an aperture may extend through the interior and exterior surfaces of the compression plate endplate in place of the recessed area to expose at least a portion of a conductive-cup shaped member and terminal.

In some embodiments of electrochemical cells or battery stacks of the present invention, each frame member and each pair of compression plates have corresponding thru holes that are configured to receive bolts or tie rods therethrough and operate to compress these components using fasteners (e.g., nuts 108 and/or washers 106, 110) to assemble a substantially sealed electrochemical cell or battery stack.

In some embodiments, each frame member, each compression plate, each terminal endplate, and each bipolar electrode plate has one or more corresponding thru holes that operate to align the components such that the terminal, the conductive cup-shaped member, the cathode assembly, and the electrochemically active region share the same approximate center when dowels 112 are placed therethough.

In some embodiments, the battery stack comprises a first bipolar electrode, a second bipolar electrode, and a frame member 114, wherein the frame member is interposed between the first bipolar electrode, the frame member has a first side and a second side, the first bipolar electrode has a first electrode plate, and the second bipolar electrode has a second bipolar plate; and wherein the first side of the frame member is configured to receive at least a portion of a front side of the first electrode plate, and the second side of the frame member is configured to receive at least a portion of a back side of the second electrode plate.

Referring to FIGS. 19 and 20, another aspect of the present invention provides a bipolar battery stack defining a longitudinal axis L, the bipolar battery 1000 comprising a pair of terminal assemblies 104 at corresponding proximal and distal ends of the battery, each terminal assembly comprising a conductive cup-shaped member 310 comprising a terminal wall 312, a sidewall 304, and a rim 306 separated from the terminal wall by the sidewall; and a terminal endplate 302 having outer and inner surfaces 316, 318 coplanar with the terminal wall and joining to the corresponding rim at the outward surface, the joining enabling bi-directional uniform current flow through the cup-shaped member between a corresponding terminal 308 and the endplate when the corresponding terminal wall is in electrical contact with the corresponding terminal. In some embodiments, the terminal assembly corresponds to the terminal assembly 104 described above with reference to FIGS. 12-17. In some embodiments, the battery stack 1000 further comprises at least one pair of intermediate bipolar electrodes 102, 102' arranged in a parallel orientation between the pair of terminal assemblies. In these embodiments, the intermediate cells comprise bipolar electrodes for distributing current between the terminal assemblies. Each intermediate cell comprises a frame member 114 that houses components of the cell.

FIG. 20 provides an exploded view of the battery stack of FIG. 19. In some embodiments, each battery stack or electrochemical cell further comprises corresponding compression plates 105a, 105b opposed to and releasably fastened in contact with the outer surfaces of the endplates 302, each compression plate comprising an aperture 502a, 502b configured to receive the corresponding terminal 308. In some of these embodiments, at least a portion of the terminal wall of the conductive cup-shaped member is exposed through the aperture of the compression plate. In other embodiments, the terminal wall and at least a portion of the sidewall is exposed through the aperture of the compression plates. FIG. 7 illustrates the compression plates having their corresponding apertures formed therethrough. In other embodiments, a recessed area may be disposed at the inward surface of each compression plate that is configured to receive the corresponding cup-shaped member. In these embodiments, a terminal hole may be formed through the recessed area of each compression plate to expose the terminal. In some embodiments, outward/exterior surfaces of the compression plates include cut-outs to reduce the overall weight of the compression plates and to help dissipate heat generated by the battery.

In some embodiments, the compression plates include openings operative to receive tie rods and/or bolts secured by fasteners to compress the two compression plates and intervening frame members together along longitudinal axis L (FIG. 19) when the battery stack is assembled.

In some embodiments, an electrochemically active region of each corresponding terminal endplate comprises a first surface area enclosed by the corresponding rim and a remaining second surface area outside an outer periphery of the corresponding rim, the first and second surface areas being substantially equal.

In some embodiments, each terminal wall projects away from the outward surface of the corresponding endplate.

In some embodiments, one of the terminal walls projects away from the outward surface of the corresponding endplate in a proximal direction along the longitudinal axis and the other terminal wall projects away from the outward surface of the corresponding endplate in an opposite distal direction along the longitudinal axis.

In some embodiments, the terminal walls of the conductive cup-shaped members are exposed at corresponding ones of the proximal and distal ends of the electrochemical cell assembly.

In some embodiments, one of the terminal assemblies in the battery stack or electrochemical cells further comprises a cathode assembly 202 disposed on an inner surface of the corresponding endplate on a side opposite the corresponding conductive cup-shaped member, the cathode assembly interposed between the inner surface of the endplate and a back surface of an adjacent bipolar electrode plate.

In some embodiments, each rim is centered within the electrochemically active region of the corresponding endplate.

In some embodiments, each rim of the conductive cup-shaped members is joined to the outward surface of the corresponding endplate by a weld or an adhesive. In some instances, the adhesive is electrically conductive.

In some embodiments, at least one of the conductive cup-shaped members comprises a copper/titanium clad.

In some embodiments, interior surfaces of at least one of the conductive cup-shaped members comprises copper. In other embodiments, exterior surfaces of at least one of the conductive cup-shaped members comprises titanium.

In some embodiments, each corresponding terminal contacts a central location of the corresponding terminal wall.

In some embodiments, the rim comprises a flange extending radially outward from the sidewall.

IV. Examples

Example 1A—Electrolyte Formulations

Ingredients used in the electrolyte formulations described below were reagent grade.

TABLE 1

| Ingredients for electrolyte ingredients | |
|---|---|
| Ingredient | Source |
| ZnBr$_2$ (73-79% ZnBr$_2$ soln. in water) | ICL IP America, Inc., Carteret, NJ |
| KBr | Alfa Aesar, Ward Hill, MA |
| KCl | Alfa Aesar, Ward Hill, MA |
| tetraglyme | Sigma Aldrich Corp., St. Louis, MO |
| DME-PEG 2000 | Sigma Aldrich Corp., St. Louis, MO |
| DME-PEG 1000 | Alfa Aesar, Ward Hill, MA |
| N-methyl-N-ethylmorpholinium bromide | ICL-IP Bromine Compounds, Ltd., Beer-Sheva, Israel |
| neopentyl glycol | Sigma Aldrich Corp., St. Louis, MO |
| tert-butyl alcohol | Alfa Aesar, Ward Hill, MA |
| Sn (SnCl$_2$•2H$_2$O) | Alfa Aesar, Ward Hill, MA |
| In (5% v/v in dilute nitric acid - 10,050 µg/ml) | Inorganic Ventures, Christiansburg, VA |
| acetic acid (glacial) | Alfa Aesar, Ward Hill, MA |
| 18-crown-6 ether | Sigma Aldrich Corp., St. Louis, MO |
| 15-crown-5 ether | Sigma Aldrich Corp., St. Louis, MO |
| tetraethylammonium bromide | Alfa Aesar, Ward Hill, MA |
| 1-ethyl-2-methylpyridinium bromide | ICL-IP Bromine Compounds, Ltd., Beer-Sheva, Israel |
| 1-ethyl-3-methylpyridinium bromide | ICL-IP Bromine Compounds, Ltd., |

TABLE 1-continued

Ingredients for electrolyte ingredients

| Ingredient | Source |
|---|---|
| | Beer-Sheva, Israel |
| 1-ethyl-4-methylpyridinium bromide | Eos Energy Storage, LLC, Edison, NJ |
| triethylmethylammonium chloride | TCI America, Portland, OR |
| tetraglyme | Sigma Aldrich Corp., St. Louis, MO |
| cetyltrimethylammonium bromide | Amresco, Solon, OH |
| 1-butyl-1-methylpyrrolidinium bromide | ICL-IP Bromine Compounds, Ltd., Beer-Sheva, Israel |
| 1-butyl-3-methylpyridinium bromide | ICL-IP Bromine Compounds, Ltd., Beer-Sheva, Israel |
| trimethylpropylammonium bromide | ICL-IP Bromine Compounds, Ltd., Beer-Sheva, Israel |
| potassium dihydrogen citrate monohydrate | Sigma Aldrich Corp., St. Louis, MO |
| citric acid monohydrate | Sigma Aldrich Corp., St. Louis, MO |
| HBr (48 wt % in $H_2O$) | Sigma Aldrich Corp., St. Louis, MO |
| proprionic acid (99.5%≤) | Sigma Aldrich Corp., St. Louis, MO |
| tetraethylphosphonium bromide (99%≤) | Sigma Aldrich Corp., St. Louis, MO |
| triethyl-N-methoxymethylammonium bromide | Hangzhou Yanshan Chemical Co., Ltd. |
| trimethylproplyammonium bromide | Sigma Aldrich Corp., St. Louis, MO |
| triethylmethylammonium bromide | Sigma Aldrich Corp., St. Louis, MO |
| hexyltrimethylammonium bromide | Sigma Aldrich Corp., St. Louis, MO |
| chloroethylammonium chloride | Sigma Aldrich Corp., St. Louis, MO |
| Triethylmethylammonium chloride | TCI America, Portland, OR |

Electrolytes of the present invention was formulated as follows:

TABLE 2

Electrolyte no. 1-1 formulation (base formulation).

| Ingredient | Amount (g) | Wt % |
|---|---|---|
| $ZnBr_2$ | 85 | 36.31 |
| Water | 95 | 40.58 |
| KBr | 21 | 8.97 |
| KCl | 20 | 8.54 |
| Acetic acid | 1.11 | 0.47 |
| 1-ethyl-2-methylpyridinium bromide | 4.96 | 2.12 |
| Tetraethylammonium bromide | 6.1 | 2.61 |
| 18-crown-6 | 0.55 | 0.23 |
| Cetyltrimethylammonium bromide | 0.4 | 0.17 |
| Total: | 234.12 | 100.00 |

Electrolyte no. 1-1 generated a cloudy mixture that was not filtered.

Electrolyte no. 1-2 was formulated with the same ingredients in the same amounts, but this electrolyte was filtered before testing.

TABLE 3

Electrolyte no. 1-3 formulation.

| Ingredient | Amount (g) | Wt % |
|---|---|---|
| $ZnBr_2$ | 85 | 34.82 |
| Water | 95 | 38.92 |
| KBr | 21 | 8.60 |
| KCl | 20 | 8.19 |
| Acetic acid | 1.11 | 0.45 |
| 1-ethyl-2-methylpyridinium bromide | 4.96 | 2.03 |
| Tetraethylammonium bromide | 6.1 | 2.50 |
| 18-crown-6 | 0.55 | 0.23 |
| Cetyltrimethylammonium bromide | 0.4 | 0.16 |
| Citric acid | 10 | 4.10 |
| Total: | 244.12 | 100.00 |

TABLE 4

Electrolyte no. 1-4 formulation.

| Ingredient | Amount (g) | Wt % |
|---|---|---|
| $ZnBr_2$ | 85 | 35.63 |
| Water | 95 | 39.82 |
| KBr | 21 | 8.80 |
| KCl | 20 | 8.38 |
| Acetic acid | 1.11 | 0.47 |
| 1-ethyl-2-methylpyridinium bromide | 4.96 | 2.08 |
| Tetraethylammonium bromide | 6.1 | 2.56 |
| DME-PEG 2000 | 4 | 1.68 |
| DME-PEG 2000 | 1 | 0.42 |
| Cetyltrimethylammonium bromide | 0.4 | 0.17 |
| Total: | 238.57 | 100.00 |

Test electrolyte formulation no. 3 was prepared as a filtered and unfiltered mixture.

TABLE 5

Electrolyte no. 1-5 formulation.

| Ingredient | Amount (g) | Wt % |
|---|---|---|
| $ZnBr_2$ | 101.3 | 36.78 |
| Water | 100 | 36.31 |
| KBr | 23.8 | 8.64 |
| KCl | 37.2 | 13.51 |
| Acetic acid | 1.11 | 0.40 |
| 1-ethyl-2-methylpyridinium bromide | 4.96 | 1.80 |
| Tetraethylammonium bromide | 6.1 | 2.21 |
| 18-crown-6 | 0.55 | 0.20 |
| Cetyltrimethylammonium bromide | 0.4 | 0.15 |
| Total: | 275.42 | 100 |

TABLE 6

Electrolyte no. 1-6 formulation.

| Ingredient | Amount (g) | Wt % |
|---|---|---|
| $ZnBr_2$ | 85 | 36.31 |
| Water | 95 | 40.58 |
| KBr | 21 | 8.97 |
| KCl | 20 | 8.54 |
| Acetic acid | 1.11 | 0.47 |
| 1-butyl-1-methylpyridinium bromide | 4.96 | 2.12 |
| Trimethlypropylammonium bromide | 6.1 | 2.61 |
| 18-crown-6 | 0.55 | 0.23 |
| Cetyltrimethylammonium bromide | 0.4 | 0.17 |
| Total: | 234.12 | 100.00 |

TABLE 7

Electrolyte no. 1-7 formulation.

| Ingredient | Amount (g) | Wt % |
|---|---|---|
| $ZnBr_2$ | 85 | 34.88 |
| Water | 95 | 38.98 |
| KBr | 21 | 8.62 |
| KCl | 20 | 8.21 |
| Acetic acid | 1.11 | 0.46 |
| 1-butyl-1-methylpyridinium bromide | 4.96 | 2.04 |
| Trimethylpropylammonium bromide | 6.1 | 2.50 |
| 18-crown-6 | 0.55 | 0.23 |
| Potassium dihydrogen citrate | 10 | 4.10 |
| Total: | 243.72 | 100.00 |

TABLE 8

Electrolyte no. 1-8 formulation.

| Ingredient | Amount (g) | Wt % |
|---|---|---|
| $ZnBr_2$ | 85 | 36.37 |
| Water | 95 | 40.65 |
| KBr | 21 | 8.99 |
| KCl | 20 | 8.56 |
| Acetic acid | 1.11 | 0.47 |
| 1-ethyl-2-methylpyridinium bromide | 4.96 | 2.12 |
| Tetraethylammonium bromide | 6.1 | 2.61 |
| 18-crown-6 | 0.55 | 0.24 |
| Total: | 234.12 | 100.00 |

TABLE 9

Electrolyte no. 1-9 formulation.

| Ingredient | Amount (g) | Wt % |
|---|---|---|
| $ZnBr_2$ | 85 | 36.25 |
| Water | 95 | 40.52 |
| KBr | 21 | 8.96 |
| KCl | 20 | 8.53 |
| Acetic acid | 1.11 | 0.47 |
| 1-ethyl-2-methylpyridinium bromide | 4.96 | 2.12 |
| Tetraethylammonium bromide | 6.1 | 2.60 |
| 18-crown-6 | 1.1 | 0.47 |
| Cetyltrimethylammonium bromide | 0.2 | 0.09 |
| Total: | 234.47 | 100.00 |

TABLE 10

Electrolyte no. 1-10 formulation.

| Ingredient | Amount (g) | Wt % |
|---|---|---|
| $ZnBr_2$ | 85 | 34.70 |
| Water | 95 | 38.78 |
| KBr | 21 | 8.57 |
| KCl | 20 | 8.16 |
| Acetic acid | 1.11 | 0.45 |
| 1-ethyl-2-methylpyridinium bromide | 9.92 | 4.05 |
| Tetraethylammonium bromide | 12.2 | 4.98 |
| 18-crown-6 | 0.55 | 0.22 |
| Cetyltrimethylammonium bromide | 0.2 | 0.08 |
| Total: | 244.98 | 100.00 |

TABLE 11

Electrolyte no. 1-11 formulation.

| Ingredient | Amount (g) | Wt % |
|---|---|---|
| $ZnBr_2$ | 85 | 34.85 |
| Water | 95 | 38.95 |
| KBr | 21 | 8.61 |
| KCl | 20 | 8.20 |
| Acetic acid | 1.11 | 0.46 |
| 1-ethyl-2-methylpyridinium bromide | 4.96 | 2.03 |
| Tetraethylammonium bromide | 6.1 | 2.50 |
| 18-crown-6 | 0.55 | 0.23 |
| Cetyltrimethylammonium bromide | 0.2 | 0.08 |
| Potassium dihydrogen citrate | 10 | 4.10 |
| Total: | 243.92 | 100.00 |

TABLE 12

Electrolyte no. 1-12 formulation.

| Ingredient | Amount (g) | Wt % |
|---|---|---|
| $ZnBr_2$ | 85 | 36.34 |
| Water | 95 | 40.61 |
| KBr | 21 | 8.98 |
| KCl | 20 | 8.55 |
| Acetic acid | 1.11 | 0.47 |
| 1-butyl-3-methylpyridinium bromide | 4.96 | 2.12 |
| Tetraethylammonium bromide | 6.1 | 2.61 |
| 18-crown-6 | 0.55 | 0.24 |
| Cetyltrimethylammonium bromide | 0.2 | 0.09 |
| Total: | 233.92 | 100.00 |

TABLE 13

Electrolyte no. 1-13 formulation.

| Ingredient | Amount (g) | Wt % |
|---|---|---|
| $ZnBr_2$ | 85 | 36.34 |
| Water | 95 | 40.61 |
| KBr | 21 | 8.98 |
| KCl | 20 | 8.55 |
| Acetic acid | 1.11 | 0.47 |
| N-ethyl-N-methylmorpholinium bromide | 4.96 | 2.12 |
| tetraethylammonium bromide | 6.1 | 2.61 |
| 18-crown-6 | 0.55 | 0.24 |
| Cetyltrimethyl ammonium bromide | 0.2 | 0.09 |

TABLE 13-continued

Electrolyte no. 1-13 formulation.

| Ingredient | Amount (g) | Wt % |
|---|---|---|
| Total: | 233.92 | 100.00 |

TABLE 14

Electrolyte no. 1-14 formulation.

| Ingredient | Amount (g) | Wt % |
|---|---|---|
| ZnBr$_2$ | 85 | 36.34 |
| Water | 95 | 40.61 |
| KBr | 21 | 8.98 |
| KCl | 20 | 8.55 |
| Acetic acid | 1.11 | 0.47 |
| 1-ethyl-2-methylpyridinium bromide | 4.96 | 2.12 |
| Trimethylpropylammonium bromide | 6.1 | 2.61 |
| 18-crown-6 | 0.55 | 0.24 |
| Cetyltrimethylammonium bromide | 0.2 | 0.09 |
| Total: | 233.92 | 100.00 |

TABLE 15

Electrolyte no. 1-15 formulation.

| Ingredient | Amount (g) | Wt % |
|---|---|---|
| ZnBr$_2$ | 85 | 35.29 |
| Water | 95 | 39.44 |
| KBr | 21 | 8.72 |
| KCl | 20 | 8.30 |
| Acetic acid | 1.11 | 0.46 |
| 1-butyl-3-methylpyridinium bromide | 4.96 | 2.06 |
| Trimethylpropylammonium bromide | 6.1 | 2.53 |
| 18-crown-6 | 1.1 | 0.46 |
| Cetyltrimethylammonium bromide | 0.2 | 0.08 |
| Tetraethylammonium bromide | 6.1 | 2.53 |
| 15-crown-5 | 0.29 | 0.12 |
| Total: | 240.86 | 100.00 |

TABLE 16

Electrolyte no. 1-16 formulation.

| Ingredient | Amount (g) | Wt % |
|---|---|---|
| ZnBr2 | 85 | 34.69 |
| Water | 95 | 38.77 |
| KBr | 21 | 8.57 |
| KCl | 20 | 8.16 |
| Acetic acid | 1.11 | 0.45 |
| 1-ethyl-2-methylpyridinium bromide | 9.92 | 4.05 |
| Tetraethylammonium bromide | 12.2 | 4.98 |
| 18-crown-6 | 0.55 | 0.22 |
| Cetyltrimethylammonium bromide | 0.2 | 0.08 |
| SnCl$_2$•2H$_2$O | ~0.0047 | ~0.0019 |
| In (In in nitric acid soln.) | ~0.0025 | ~0.0010 |
| Nitric acid (from soln.) | ~0.026 | ~0.0106 |
| Total: | ~240.86 | ~100.00 |

TABLE 17

Electrolyte no. 1-17 formulation.

| Ingredient | Amount (g) | Wt % |
|---|---|---|
| ZnBr2 | 85 | 34.07 |
| Water | 95 | 38.08 |
| KBr | 21 | 8.42 |
| KCl | 20 | 8.02 |
| Acetic acid | 1.11 | 0.45 |
| 1-ethyl-2-methylpyridinium bromide | 9.92 | 3.98 |
| Tetraethylammonium bromide | 12.2 | 4.89 |
| DME-PEG 2000 | 4 | 1.60 |
| DME-PEG 1000 | 1 | 0.40 |
| Cetyltrimethylammonium bromide | 0.2 | 0.08 |
| SnCl$_2$•2H$_2$O | ~0.0047 | ~0.0019 |
| In (In in nitric acid soln.) | ~0.0025 | ~0.0010 |
| Nitric acid (from soln.) | ~0.026 | ~0.0104 |
| Total: | ~249.46 | ~100.00 |

TABLE 18

Electrolyte no. 1-18 formulation.

| Ingredient | Amount (g) | Wt % |
|---|---|---|
| ZnBr$_2$ | 85 | 34.00 |
| Water | 95 | 38.00 |
| KBr | 21 | 8.40 |
| KCl | 20 | 8.00 |
| Acetic acid | 1.11 | 0.44 |
| 1-ethyl-2-methylpyridinium bromide | 9.92 | 3.97 |
| Tetraethylammonium bromide | 12.2 | 4.88 |
| 18-crown-6 | 0.55 | 0.22 |
| DME-PEG 2000 | 4 | 1.60 |
| DME-PEG 1000 | 1 | 0.40 |
| Cetyltrimethylammonium bromide | 0.2 | 0.08 |
| SnCl$_2$•2H$_2$O | ~0.0047 | ~0.0019 |
| In (In in nitric acid soln.) | ~0.0025 | ~0.0010 |
| Nitric acid (from soln.) | ~0.026 | ~0.0104 |
| Total: | ~250.01 | ~100.00 |

TABLE 19

Electrolyte no. 1-19 formulation.

| Ingredient | Amount (g) | Wt % |
|---|---|---|
| ZnBr$_2$ | 85 | 34.83 |
| Water | 95 | 38.93 |
| KBr | 5.3 | 2.17 |
| KCl | 29.8 | 12.21 |
| Acetic acid | 1.11 | 0.45 |
| 1-ethyl-2-methylpyridinium bromide | 9.92 | 4.07 |
| Tetraethylammonium bromide | 12.2 | 5.00 |
| 18-crown-6 | 0.55 | 0.23 |
| DME-PEG 2000 | 4 | 1.64 |
| DME-PEG 1000 | 1 | 0.41 |
| Cetyltrimethylammonium bromide | 0.1 | 0.04 |
| SnCl$_2$•2H$_2$O | ~0.0047 | ~0.0019 |
| In (In in nitric acid soln.) | ~0.0025 | ~0.0010 |
| Nitric acid (from soln.) | ~0.026 | ~0.0107 |
| Total: | ~244.01 | ~100.00 |

TABLE 20

Electrolyte no. 1-20 formulation.

| Ingredient | Amount (g) | Wt % |
|---|---|---|
| $ZnBr_2$ | 77.3 | 32.33 |
| Water | 95 | 39.73 |
| $ZnCl_2$ | 4.68 | 1.96 |
| KCl | 33.2 | 13.89 |
| Acetic acid | 1.11 | 0.46 |
| 1-ethyl-2-methylpyridinium bromide | 9.92 | 4.15 |
| Tetraethylammonium bromide | 12.2 | 5.10 |
| 18-crown-6 | 0.55 | 0.23 |
| DME-PEG 2000 | 4 | 1.67 |
| DME-PEG 1000 | 1 | 0.42 |
| Cetyltrimethylammonium bromide | 0.1 | 0.04 |
| $SnCl_2 \cdot 2H_2O$ | ~0.0047 | ~0.0020 |
| In (In in nitric acid soln.) | ~0.0025 | ~0.0010 |
| Nitric acid (from soln.) | ~0.026 | ~0.0109 |
| Total: | ~239.09 | ~100.00 |

TABLE 21

Electrolyte no. 1-21 formulation.

| Ingredient | Amount (g) | Wt % |
|---|---|---|
| $ZnBr_2$ | 67.5 | 28.70 |
| Water | 95 | 40.39 |
| $ZnCl_2$ | 10.6 | 4.51 |
| KCl | 33.2 | 14.12 |
| Acetic acid | 1.11 | 0.47 |
| 1-ethyl-2-methylpyridinium bromide | 9.92 | 4.22 |
| Tetraethylammonium bromide | 12.2 | 5.19 |
| 18-crown-6 | 0.55 | 0.23 |
| DME-PEG 2000 | 4 | 1.70 |
| DME-PEG 1000 | 1 | 0.43 |
| cetyltrimethylammonium bromide | 0.1 | 0.04 |
| $SnCl_2 \cdot 2H_2O$ | ~0.0047 | ~0.0020 |
| In (In in nitric acid soln.) | ~0.0025 | ~0.0011 |
| nitric acid (from soln.) | ~0.026 | ~0.0111 |
| Total: | ~235.21 | ~100.00 |

TABLE 22

Electrolyte no. 1-22 formulation.

| Ingredient | Amount (g) | Wt % |
|---|---|---|
| $ZnBr_2$ | 85 | 30.83 |
| Water | 95 | 34.46 |
| KBr | 21 | 7.62 |
| KCl | 45.8 | 16.61 |
| Acetic acid | 1.11 | 0.40 |
| 1-ethyl-2-methylpyridinium bromide | 9.92 | 3.60 |
| Tetraethylammonium bromide | 12.2 | 4.42 |
| 18-crown-6 | 0.55 | 0.20 |
| DME-PEG 2000 | 4 | 1.45 |
| DME-PEG 1000 | 1 | 0.36 |
| Cetyltrimethylammonium bromide | 0.1 | 0.04 |
| $SnCl_2 \cdot 2H_2O$ | ~0.0047 | ~0.0017 |
| In (In in nitric acid soln.) | ~0.0025 | ~0.0009 |
| Nitric acid (from soln.) | ~0.026 | ~0.0094 |
| Total: | ~275.71 | ~100.00 |

TABLE 23

Electrolyte no. 1-23 formulation.

| Ingredient | Amount (g) | Wt % |
|---|---|---|
| $ZnBr_2$ | 85 | 32.92 |
| Water | 95 | 36.80 |
| KBr | 21 | 8.13 |
| KCl | 20 | 7.75 |
| Acetic acid | 1.11 | 0.43 |
| 1-ethyl-2-methylpyridinium bromide | 14.88 | 5.77 |
| Tetraethylammonium bromide | 18.3 | 7.09 |
| 18-crown-6 | 2.75 | 1.07 |
| Cetyltrimethylammonium bromide | 0.1 | 0.04 |
| $SnCl_2 \cdot 2H_2O$ | ~0.0047 | ~0.0018 |
| In (In in nitric acid soln.) | ~0.0025 | ~0.0010 |
| Nitric acid (from soln.) | ~0.026 | ~0.0101 |
| Total: | ~258.17 | ~100.00 |

TABLE 24

Electrolyte no. 1-24 formulation.

| Ingredient | Amount (g) | Wt % |
|---|---|---|
| $ZnBr_2$ | 85 | 34.40 |
| Water | 95 | 38.44 |
| KBr | 21 | 8.50 |
| KCl | 20 | 8.09 |
| Acetic acid | 1.11 | 0.45 |
| 1-ethyl-2-methylpyridinium bromide | 11.92 | 4.82 |
| Tetraethylammonium bromide | 10.2 | 4.13 |
| 18-crown-6 | 2.75 | 1.11 |
| Cetyltrimethylammonium bromide | 0.1 | 0.04 |
| $SnCl_2 \cdot 2H_2O$ | ~0.0047 | ~0.0019 |
| In (In in nitric acid soln.) | ~0.0025 | ~0.0010 |
| Nitric acid (from soln.) | ~0.026 | ~0.0105 |
| Total: | ~247.11 | ~100.00 |

TABLE 25

Electrolyte no. 1-25 formulation.

| Ingredient | Amount (g) | Wt % |
|---|---|---|
| $ZnBr_2$ | 85 | 34.40 |
| Water | 95 | 38.44 |
| KBr | 21 | 8.50 |
| KCl | 20 | 8.09 |
| Acetic acid | 1.11 | 0.45 |
| 1-ethyl-2-methylpyridinium bromide | 7.92 | 3.21 |
| Tetraethylammonium bromide | 14.2 | 5.75 |
| 18-crown-6 | 2.75 | 1.11 |
| Cetyltrimethylammonium bromide | 0.1 | 0.04 |
| $SnCl_2 \cdot 2H_2O$ | ~0.0047 | ~0.0019 |
| In (In in nitric acid soln.) | ~0.0025 | ~0.0010 |
| Nitric acid (from soln.) | ~0.026 | ~0.0105 |
| Total: | ~247.11 | ~100.00 |

TABLE 26

Electrolyte no. 1-26 formulation.

| Ingredient | Amount (g) | Wt % |
|---|---|---|
| $ZnBr_2$ | 85 | 34.40 |
| Water | 95 | 38.44 |
| KBr | 21 | 8.50 |
| KCl | 20 | 8.09 |
| Acetic acid | 1.11 | 0.45 |
| 1-ethyl-2-methylpyridinium bromide | 9.92 | 4.01 |

TABLE 26-continued

Electrolyte no. 1-26 formulation.

| Ingredient | Amount (g) | Wt % |
|---|---|---|
| Tetraethylammonium bromide | 12.2 | 4.94 |
| 18-crown-6 | 2.75 | 1.11 |
| Cetyltrimethylammonium bromide | 0.1 | 0.04 |
| $SnCl_2 \cdot 2H_2O$ | ~0.0047 | ~0.0019 |
| In (In in nitric acid soln.) | ~0.0025 | ~0.0010 |
| Nitric acid (from soln.) | ~0.026 | ~0.0105 |
| Total: | ~247.11 | ~100.00 |

TABLE 27

Electrolyte no. 1-27 formulation.

| Ingredient | Amount (g) | Wt % |
|---|---|---|
| $ZnBr_2$ | 85 | 34.71 |
| Water | 95 | 38.79 |
| KBr | 21 | 8.57 |
| KCl | 20 | 8.17 |
| Acetic acid | 1.11 | 0.45 |
| 1-ethyl-2-methylpyridinium bromide | 9.92 | 4.05 |
| Triethylmethylammonium bromide | 12.2 | 4.98 |
| 18-crown-6 | 0.55 | 0.22 |
| Cetyltrimethylammonium bromide | 0.1 | 0.04 |
| $SnCl_2 \cdot 2H_2O$ | ~0.0047 | ~0.0019 |
| In (In in nitric acid soln.) | ~0.0025 | ~0.0010 |
| Nitric acid (from soln.) | ~0.026 | ~0.0106 |
| Total: | ~244.91 | ~100.00 |

TABLE 28

Electrolyte no. 1-28 formulation.

| Ingredient | Amount (g) | Wt % |
|---|---|---|
| $ZnBr_2$ | 85 | 36.37 |
| Water | 95 | 40.65 |
| KBr | 21 | 8.99 |
| KCl | 20 | 8.56 |
| Acetic acid | 1.11 | 0.47 |
| 1-ethyl-2-methylpyridinium bromide | 9.92 | 4.24 |
| Tetraethylphosphonium bromide | 1 | 0.43 |
| 18-crown-6 | 0.55 | 0.24 |
| Cetyltrimethylammonium bromide | 0.1 | 0.04 |
| $SnCl_2 \cdot 2H_2O$ | ~0.0047 | ~0.0020 |
| In (In in nitric acid soln.) | ~0.0025 | ~0.0011 |
| Nitric acid (from soln.) | ~0.026 | ~0.0111 |
| Total: | ~233.71 | ~100.00 |

TABLE 29

Electrolyte no. 1-29 formulation.

| Ingredient | Amount (g) | Wt % |
|---|---|---|
| $ZnBr_2$ | 85 | 34.79 |
| Water | 95 | 38.89 |
| KBr | 21 | 8.60 |
| KCl | 20 | 8.19 |
| Proprionic acid | 0.5 | 0.20 |
| 1-ethyl-2-methylpyridinium bromide | 9.92 | 4.06 |
| Tetraethylphosphonium bromide | 12.2 | 4.99 |
| 18-crown-6 | 0.55 | 0.23 |
| Cetyltrimethylammonium bromide | 0.1 | 0.04 |
| $SnCl_2 \cdot 2H_2O$ | ~0.0047 | ~0.0019 |
| In (In in nitric acid soln.) | ~0.0025 | ~0.0010 |
| Nitric acid (from soln.) | ~0.026 | ~0.0106 |

TABLE 29-continued

Electrolyte no. 1-29 formulation.

| Ingredient | Amount (g) | Wt % |
|---|---|---|
| Total: | ~244.30 | ~100.00 |

TABLE 30

Electrolyte no. 1-30 formulation.

| Ingredient | Amount (g) | Wt % |
|---|---|---|
| $ZnBr_2$ | 85 | 34.68 |
| Water | 95 | 38.76 |
| KBr | 21 | 8.57 |
| KCl | 20 | 8.16 |
| Zn acetate | 1.32 | 0.54 |
| 1-ethyl-2-methylpyridinium bromide | 9.92 | 4.05 |
| Tetraethylphosphonium bromide | 12.2 | 4.98 |
| 18-crown-6 | 0.55 | 0.22 |
| Cetyltrimethylammonium bromide | 0.1 | 0.04 |
| $SnCl_2 \cdot 2H_2O$ | ~0.0047 | ~0.0019 |
| In (In in nitric acid soln.) | ~0.0025 | ~0.0010 |
| Nitric acid (from soln.) | ~0.026 | ~0.0106 |
| Total: | ~245.12 | ~100.00 |

TABLE 31

Electrolyte no. 1-31 formulation.

| Ingredient | Amount (g) | Wt % |
|---|---|---|
| $ZnBr_2$ | 85 | 34.71 |
| Water | 95 | 38.79 |
| KBr | 21 | 8.57 |
| KCl | 20 | 8.17 |
| Acetic acid | 1.11 | 0.45 |
| 1-ethyl-4-methylpyridinium bromide | 9.92 | 4.05 |
| Tetraethylphosphonium bromide | 12.2 | 4.98 |
| 18-crown-6 | 0.55 | 0.22 |
| Cetyltrimethylammonium bromide | 0.1 | 0.04 |
| $SnCl_2 \cdot 2H_2O$ | ~0.0047 | ~0.0019 |
| In (In in nitric acid soln.) | ~0.0025 | ~0.0010 |
| Nitric acid (from soln.) | ~0.026 | ~0.0106 |
| Total: | ~244.91 | ~100.00 |

TABLE 32

Electrolyte no. 1-32 formulation.

| Ingredient | Amount (g) | Wt % |
|---|---|---|
| $ZnBr_2$ | 85 | 34.90 |
| Water | 95 | 39.01 |
| KBr | 5.3 | 2.18 |
| KCl | 29.8 | 12.24 |
| Acetic acid | 1.11 | 0.46 |
| 1-ethyl-2-methylpyridinium bromide | 9.92 | 4.07 |
| triethylmethylammonium bromide | 12.2 | 5.01 |
| cetyltrimethylammonium bromide | 0.2 | 0.08 |
| mPEG-2K | 4 | 1.64 |
| mPEG-1K | 1 | 0.41 |
| Total: | ~243.53 | ~100.00 |

TABLE 33

Electrolyte no. 1-33 formulation.

| Ingredient | Amount (g) | Wt % |
| --- | --- | --- |
| $ZnBr_2$ | 85 | 34.89 |
| Water | 95 | 39.00 |
| KBr | 5.3 | 2.18 |
| KCl | 29.8 | 12.23 |
| HBr | 1.17 | 0.48 |
| 1-ethyl-2-methylpyridinium bromide | 9.92 | 4.07 |
| triethylmethylammonium bromide | 12.2 | 5.01 |
| cetyltrimethylammonium bromide | 0.2 | 0.08 |
| mPEG-2K | 4 | 1.64 |
| mPEG-1K | 1 | 0.41 |
| Total: | ~243.59 | ~100.00 |

TABLE 34

Electrolyte no. 1-34 formulation.

| Ingredient | Wt % |
| --- | --- |
| $ZnBr_2$ | 34.90 |
| Water | 39.00 |
| KBr | 12.23 |
| KCl | 2.18 |
| 1-ethyl-4-methylpyridinium bromide | 4.07 |
| acetic acid | 0.48 |
| triethylmethylammonium chloride | 5.01 |
| mPEG-2K | 1.64 |
| mPEG-1K | 0.41 |
| 1,1-dioctadecy1-4,4'-bipyridinium dibromide | 0.11 |
| Cetyltrimethylammonium bromide | 0.08 |
| Total: | ~100.00 |

TABLE 35

Electrolyte no. 1-35 formulation.

| Ingredient | Wt % |
| --- | --- |
| $ZnBr_2$ | 27.42 |
| Water | 44.34 |
| KBr | 6.78 |
| KCl | 9.83 |
| tetraglyme | 2.58 |
| N-ethyl-N-methylmorpholinium bromide | 1.03 |
| tetraethylammonium bromide | 2.03 |
| triethylmethylammonium chloride | 1.94 |
| mPEG-2K | 1.29 |
| mPEG-1K | 0.32 |
| neopentyl glycol | 1.29 |
| tert-butyl alcohol | 0.32 |
| Cetyltrimethylammonium bromide | 0.06 |
| HBr (to adjust pH to 3.6) | 0.52 |
| Tin chloride | 7 ppm |
| Indium chloride | 7 ppm |
| Total: | ~100.00 |

Figure 32:
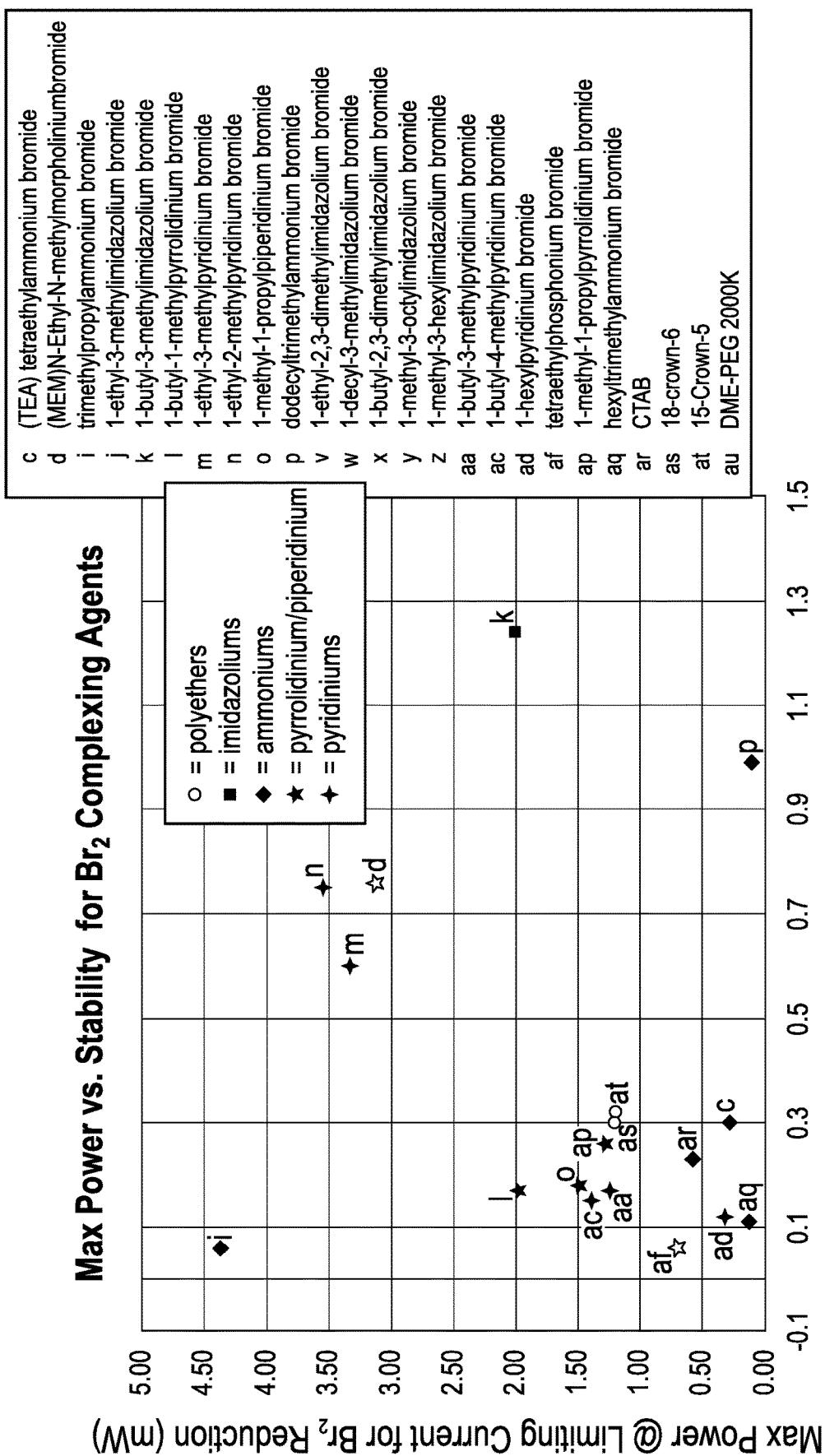
FIG. 32 shows representative behavior of various bromine complexing agents in terms of power (max. power at limiting current for Br$_2$ reduction) as a function of stability (change in pH at 60° C. after 7 days).

In this Example 1, electrolytes containing various quaternary ammonium agents of the invention were tested to evaluate the effect of the quaternary ammonium agents on the power and stability of a zinc bromide electrochemical cell. FIG. 32 illustrates typical ranges for power and stability observed for most of the quaternary ammonium agents that were tested and classified as ammonium complexing agents, pyridinium or pyrrolidinium complexing agents, or imidazolium complexing agents. Stable electrolytes, i.e., electrolytes exhibiting a small change in pH after exposure to $Br_2$ at 60° C. for seven days are desirable. Electrolytes with faster $Br_2$ kinetics, i.e., having a greater max power at Tafel limiting current for Br reduction will result in cells with higher power and are also desirable.

pH Stability Experiment

In this Example 1, stability experiments were performed on each of the electrolytes above to determine whether the ingredients in electrolyte formulations were stable or experienced a significant change in pH when exposed to $Br_2$ at 60° C. for seven days.

In the formulations above, the $ZnBr_2$, deionized water (di water), KBr, and KCl were added to a 500 mL flask and stirred until all salts dissolved (about 30 min). Acetic acid was then added followed by ~5 min of stirring, followed by the addition of a crown ether (when present), DME-PEG (when present) and any other organic ingredients. The quaternary ammonium agents were then added, followed by tin chloride dihydrate (when present) and the Indium-nitric acid solution (when present) were mixed into the formulation. Lastly, conc. HBr acid was added to each of the formulations above to adjust the pH to be about 3.

200 grams of electrolyte was placed in an amber bottle. Amber bottles were used in order to keep the light away from light-sensitive bromine. The pH of the electrolyte was measured. 3.75 grams of bromine was added to the electrolyte, the amber bottle was tightly capped, and the resulting mixture was carefully shaken for at least twenty seconds.

The pH of the bromine-spiked electrolyte was then taken after the bottle was shaken. Next, a piece of Parafilm was wrapped around the top/lid of the amber bottle after the lid was tightly closed to make it air tight, and the spiked electrolyte was placed in an oven at 60° C. for 7 days. After the 7 day period, the pH of the spiked electrolyte was measured (after cooling to room temperature) to evaluate the effect of bromine on the ingredients of the electrolyte. After the pH of the one week old solution is measured and noted, it has to be recapped and rewrapped with Parafilm and must be placed in the oven again. An electrolyte formulation is characterized as stable if its initial pH does not change by more than a value of ~1.0 after being spiked with bromine and subjected to the elevated temperature for the 7 day period.

Power Experiment

Each of the bromine spiked electrolytes was added to a 3-neck round bottom flask. A glassy carbon working electrode was added to the first neck of the flask, a Zn metal counter electrode was added to the second neck of the flask, and a saturated calomel reference electrode was added to the third neck of the flask. All electrodes were submersed in the spiked electrolyte in the flask. A linear sweep voltammetry (LSV) experiment was performed where the potential was swept from 1.3V to 0.4V vs. saturated calomel electrode. The voltage was swept at a rate of 1 mV/s. The resulting current for $Br^-$ oxidation and $Br_2$ reduction was measured as a function of voltage.

The max power achieved during $Br_2$ reduction was calculated by multiplying the limiting current for $Br_2$ reduction by the highest voltage achieved at the limiting current. The max power for $Br_2$ reduction was usually achieved around 0.4V vs. saturated calomel electrode.

Figure 33:
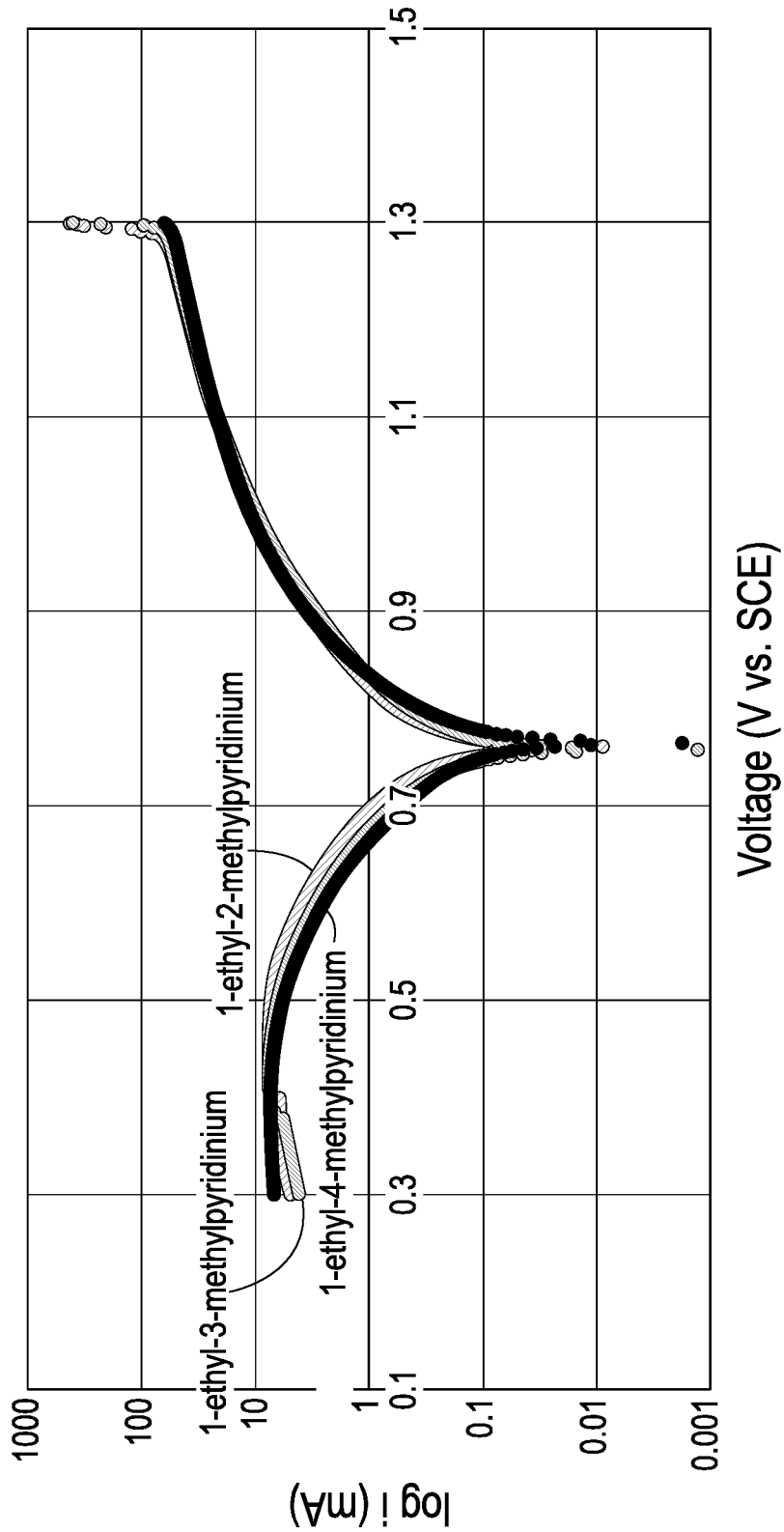
FIG. 33 shows a comparison of bromine activity of various ethyl methyl pyridiniums in terms of logarithmic current as a function of voltage.
Figure 34:
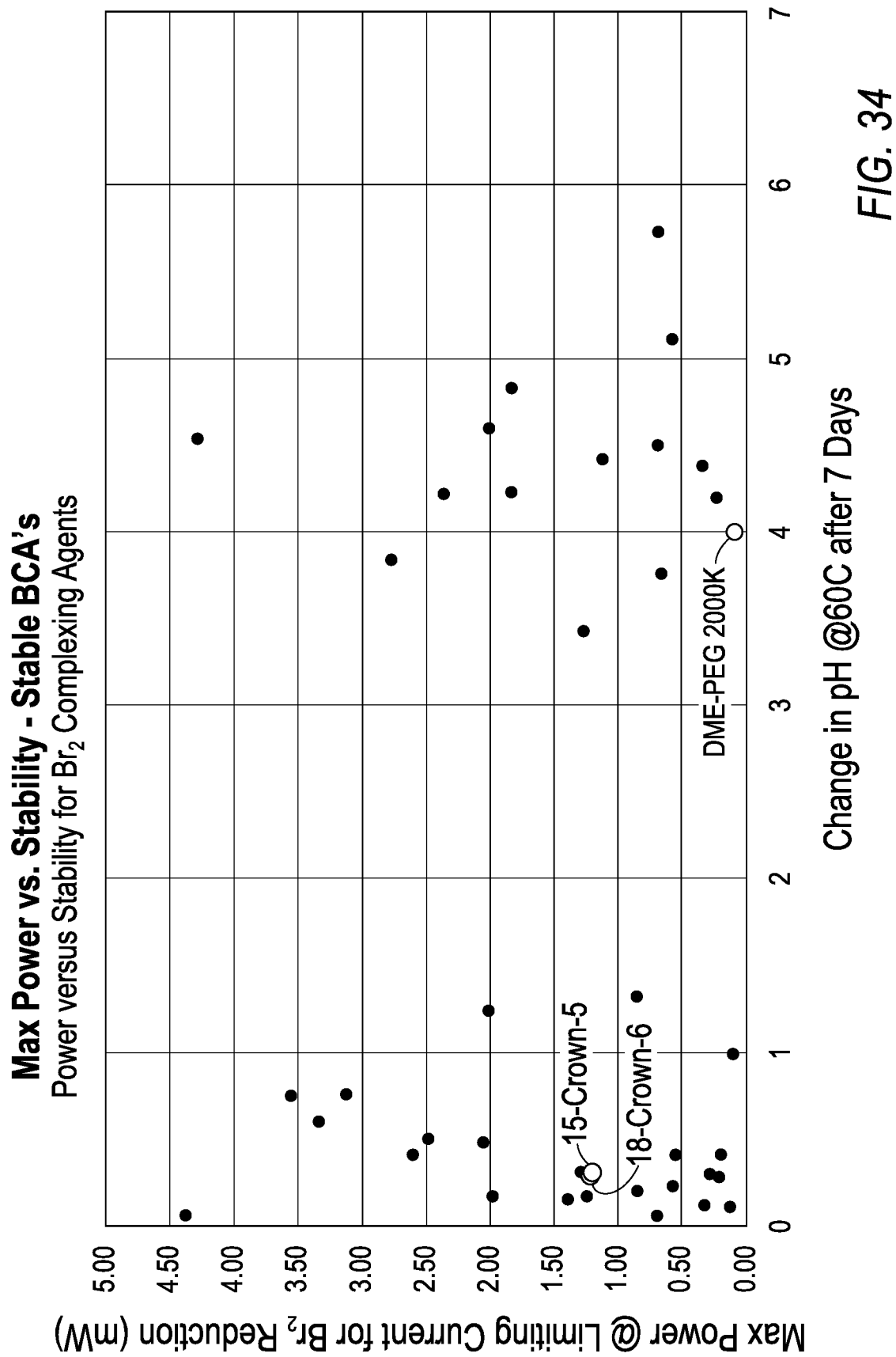
FIG. 34 shows a comparison of different polyethers as bromine complexing agents in terms of power (max. power at limiting current for Br$_2$ reduction) as a function of stability (change in pH at 60° C. after 7 days).
Figure 35:
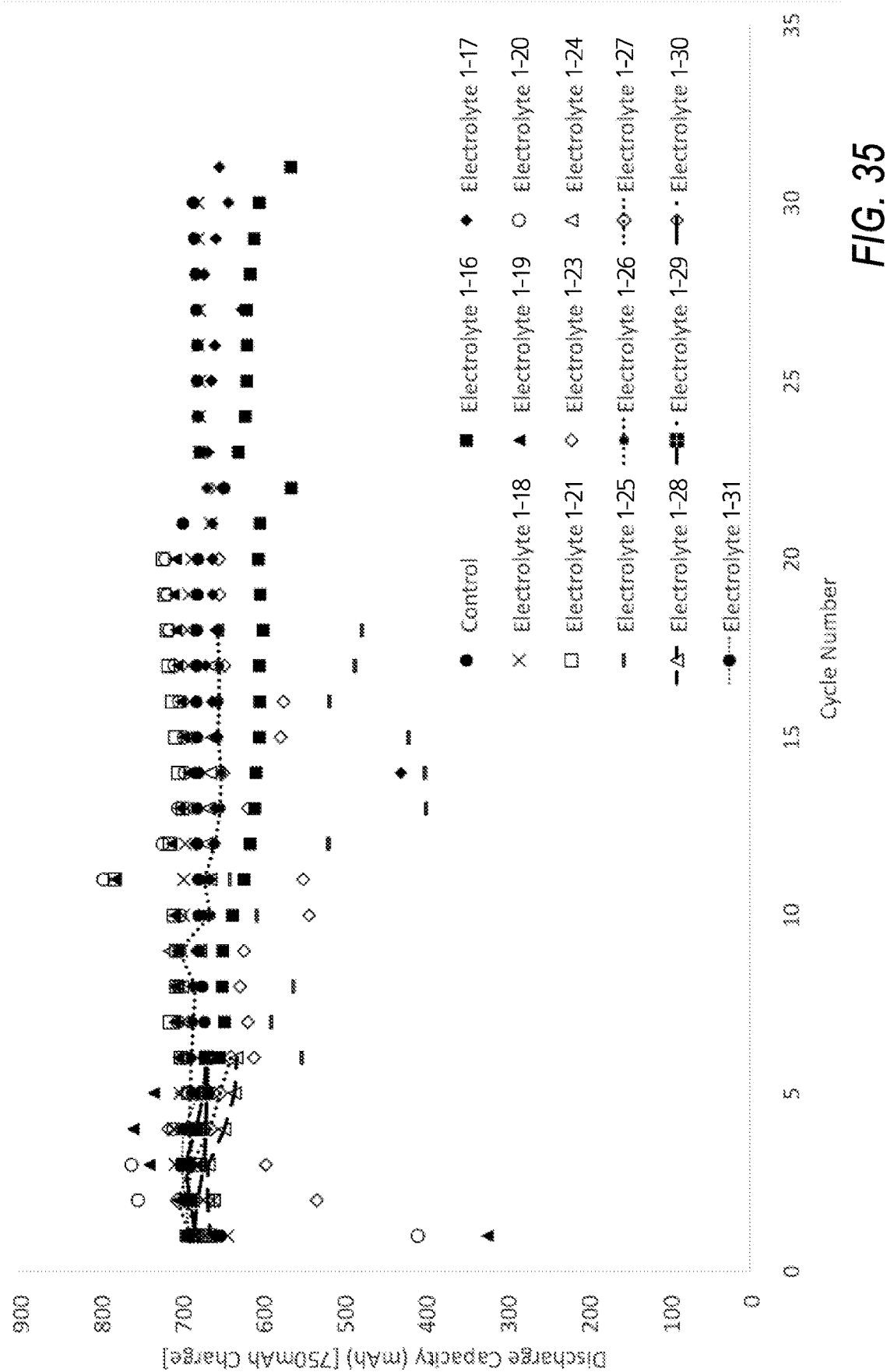
FIG. 35 is a plot of discharge capacity (mAh) vs. charge cycle no. for electrochemical cells of the present invention assembled to include electrolyte formulations from Example No. 1.
Figure 36:
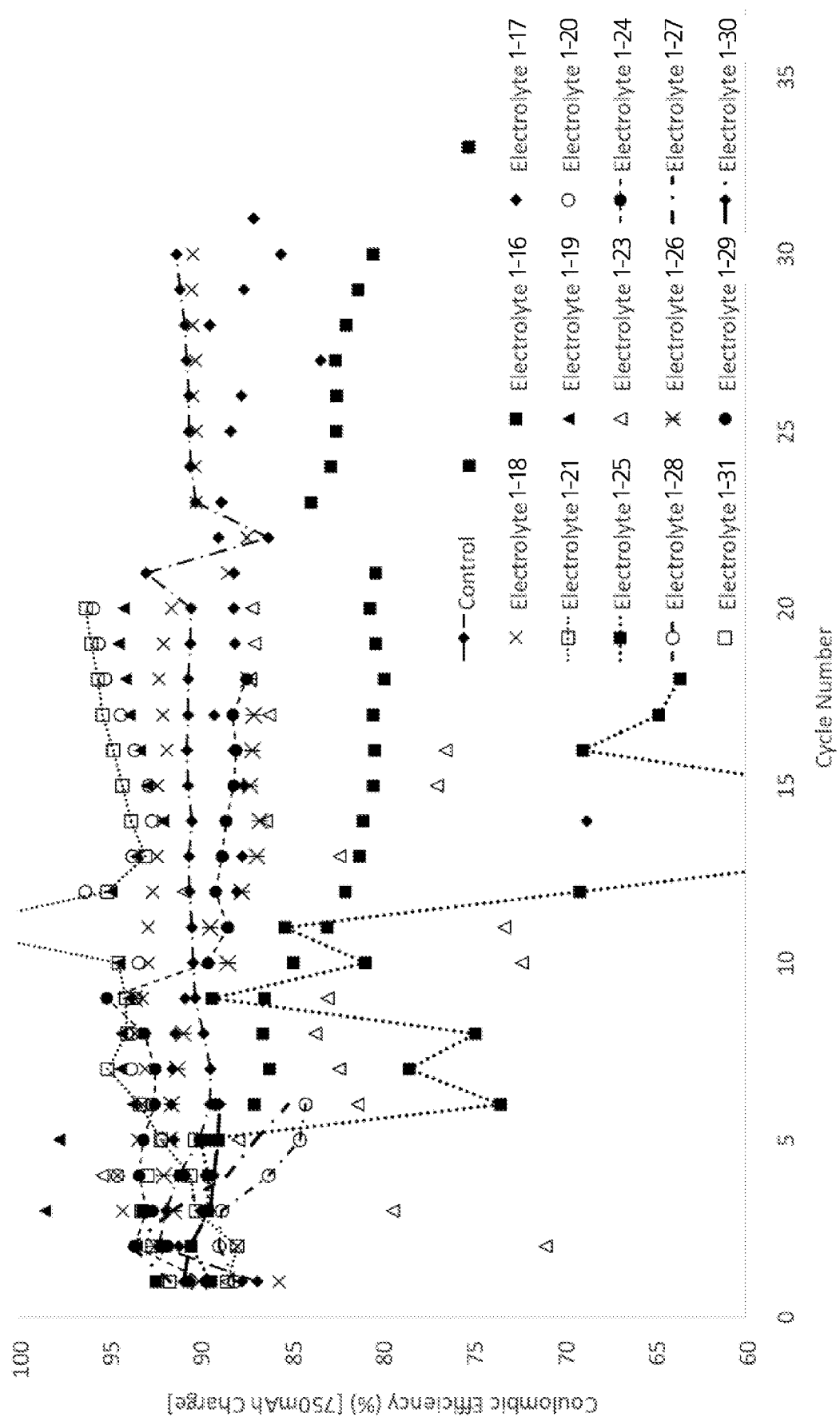
FIG. 36 is a plot of Coulombic Efficiency (%) vs. charge cycle no. for electrochemical cells of the present invention assembled to include electrolyte formulations from Example No. 1.
Figure 37:
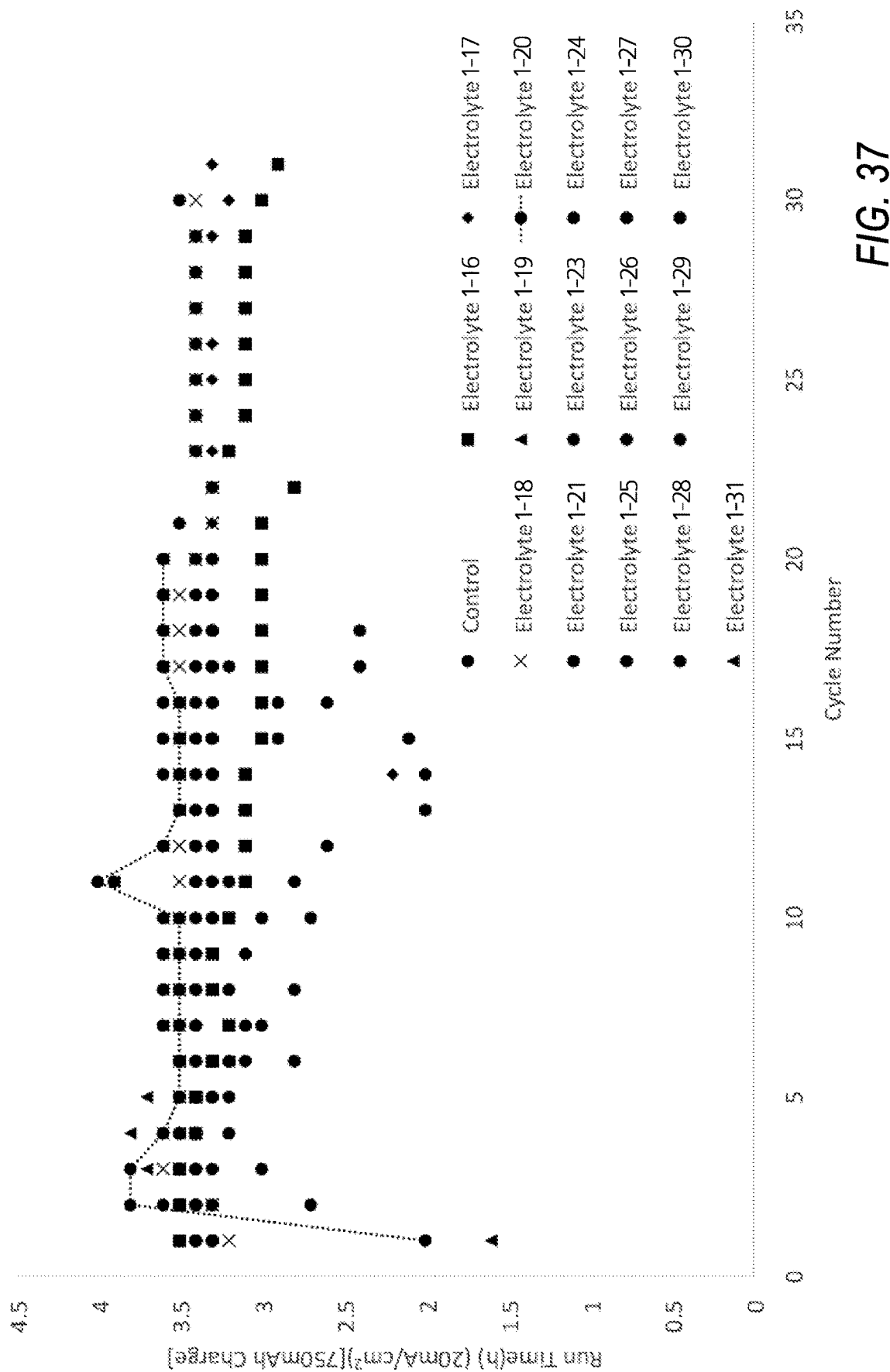
FIG. 37 is a plot of Run Time (hrs) vs. charge cycle no. for electrochemical cells of the present invention assembled to include electrolyte formulations from Example No. 1.
Figure 38:
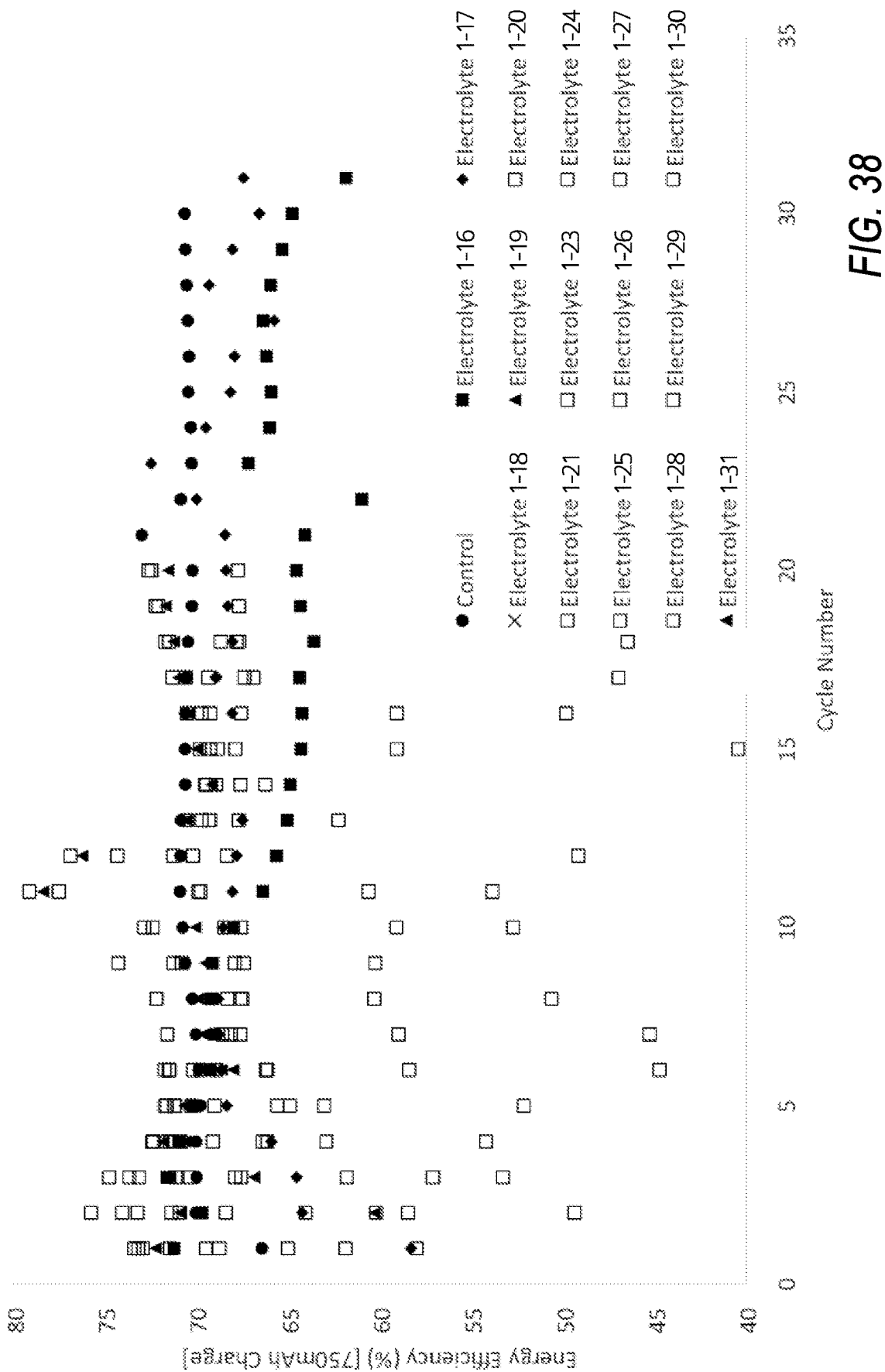
FIG. 38 is a plot of Energy Efficiency (%) vs. charge cycle no. for electrochemical cells of the present invention assembled to include electrolyte formulations from Example No. 1.

The results of the stability experiments and power experiments are provided in FIGS. 32-34.

Example 1B—Electrochemical Cells Including Electrolyte Formulations of Example 1A Referring to FIGS. 35-38, selected electrolytes, formulated as described in Example 1A, above, were added to dry electrochemical test cells that were evaluated for discharge capacity, Coulombic efficiency, Run Time, and energy efficiency as a function of charge cycle no. The dry cells used in this example were formed as illustrated in FIG. 1. Each of the test cells included a Calgon Carbon Zorflex ACC FM-10 carbon cloth separator that was cut into rectangles (width ~5.31 cm, length ~12.076 cm) using a steel ruled die coated in ZrN of the same shape. The carbon material was formulated with 20 kg of PTFE dispersion (60 wt %) (DuPont DISP30 PTFE dispersion), 10 kg Cabot PBX52 carbon blacks, 1 kg carbon fibers (3 mm), 10 kg Akzo-Nobel Ketjenblack EC600JD carbon blacks and 10 kg of de-ionized water. The dry ingredients were premixed in a 55 gallon drum with an anti-static drum liner to form a relatively homogeneous mixture to which the PTFE dispersion and de-ionized water were added, and the resulting mixture was stirred to generate a dough material. The dough material was formed from into blocks (length ~5.24 cm, width ~3.94 cm, thickness ~3.7 mm) and furnace dried to remove moisture to form the carbon material blocks. Three of these blocks were added to the cathode cage in the test cell. The electrode plate and terminal plate were formed of titanium metal that was coated with TiC (commercially available from Titanium Metals Corporation, Exton, Pa.) and formed into plates having 45° chamfered corners (length ~13.5 cm, width ~8.375 cm, thickness ~0.005 cm). The cathode cage was stamped to have a reduced surface region of the pocket portion (length ~5.187 cm, width ~11.952 cm), and the width of the cathode cage from the peripheral edge of one flange to the peripheral edge of an opposing flange gave a total length of ~5.73 cm and a total width of ~12.495 cm, and a pocket depth of ~0.157 cm. A modulated hole pattern was chemically etched with acid into the reduced surface region of the pocket portion of the cathode cage wherein the center of the adjacent holes along a row were spaced by about 0.065 cm in the x-direction and every other row is spaced by about 0.152 cm in the y-direction. The cathode cage was loaded with the separator and 3 blocks of carbon material to form a cathode assembly that was laser welded on the electrode plate with an offset of ~0.694 cm from the bottom edge of the electrode plate and an offset of ~0.502 cm from each of the side edges of the electrode plate. The cathode assembly was laser welded to the electrode plate along the flange of the cathode cage. On a surface of the bipolar electrode plate opposite the cathode assembly, a conductive cup-shaped member was laser welded such that the center of the cup-shaped member was approximately aligned or centered with the center of the reduced surface of the cathode cage. Thus, this component served as a terminal cathode assembly and bipolar electrode for the test cell. The terminal anode assembly was likewise formed of a terminal endplate having dimensions substantially the same as those of the bipolar electrode plate with an elliptical cup-shaped member that was laser welded to the outer surface of the terminal anode endplates such that the center of the cup-shaped member was approximately collinear with the center of the cup-shaped member of the terminal cathode assembly. Conductive cup-shaped members were formed from stamped titanium carbide material. The test cell was finally assembled with the interposition of a single high density polyethylene frame member having a sealing ring seated therein between the terminal anode assembly and the terminal cathode assembly and compressing the components between two opposing 6061-T6 aluminum compression plates. Dry test cells were constructed and loaded to capacity with the selected electrolytes described above. For these experiments, control electrolyte no. 1, as described in Example 2, was used in the control electrochemical cell.

During cell cycling, the cells were charged to a capacity of 750 mAh and discharged at 20 mA/cm$^2$. The results of this testing is provided in FIGS. 35-38.

Example 2: Electrolyte No. 2-1

Bipolar Static (Non-Flowing) Cell Testing:

The following electrolyte formulations were tested in battery stacks, illustrated in FIGS. 18-20.

Each of the 28 bipolar electrodes of the battery stacks included a Calgon Carbon Zorflex ACC FM-10 carbon cloth separator that was cut into rectangles (width ~5.31 cm, length ~12.076 cm) using a steel ruled die coated in ZrN of the same shape. The carbon material was formulated with 20 kg of PTFE dispersion (60 wt %) (DuPont DISP30 PTFE dispersion), 10 kg Cabot PBX52 carbon blacks, 1 kg carbon fibers (3 mm), 10 kg Akzo-Nobel Ketjenblack EC600JD carbon blacks and 10 kg of de-ionized water. The dry ingredients were premixed in a 55 gallon drum with an anti-static drum liner to form a relatively homogeneous mixture to which the PTFE dispersion and de-ionized water were added, and the resulting mixture was stirred to generate a dough material. The dough material was formed from into blocks (length ~5.24 cm, width ~3.94 cm, thickness ~3.7 mm) and furnace dried to remove moisture to form the carbon material blocks. Three of these blocks were added to the cathode cage in the test cell. The bipolar electrode plate was formed of titanium metal that was coated with TiC (commercially available from Titanium Metals Corporation, Exton, Pa.) and formed into plates having 45° chamfered corners (length ~13.5 cm, width ~8.375 cm, thickness ~0.005 cm). The cathode cage was stamped to have a reduced surface region of the pocket portion (length ~5.187 cm, width 11.952 cm), and the width of the cathode cage from the peripheral edge of one flange to the peripheral edge of an opposing flange gave a total length of ~5.73 cm and a total width of ~12.495 cm, and a pocket depth of ~0.157 cm. A modulated hole pattern was chemically etched with acid into the reduced surface region of the pocket portion of the cathode cage wherein the center of the adjacent holes along a row were spaced by about 0.065 cm in the x-direction and every other row is spaced by about 0.152 cm in the y-direction. The cathode cage was loaded with the separator and 3 blocks of carbon material to form a cathode assembly that was laser welded on the electrode plate with an offset of 0.694 cm from the bottom edge of the electrode plate and an offset of ~0.502 cm from each of the side edges of the electrode plate. The cathode assembly was laser welded to the electrode plate along the flange of the cathode cage.

The terminal cathode assembly was formed by laser welding a conductive cup-shaped member on a bipolar electrode, as described above, on the side opposite the cathode assembly, such that the center of the cup-shaped member was approximately aligned or centered with the center of the reduced surface of the cathode assembly. The terminal anode assembly was likewise formed of a terminal endplate having dimensions substantially the same as those of the bipolar electrode plate with an elliptical cup-shaped member that was laser welded to the outer surface of the terminal anode endplate such that the center of the cup-shaped member was approximately collinear with the center of the cup-shaped member of the terminal cathode assembly. Conductive cup-shaped members were formed from stamped titanium carbide material. A portion of the inner surface of the terminal anode endplate corresponding with the reduced surface of the opposing cathode assembly of the terminal cathode assembly was sandblasted to provide a rough surface. The test battery stacks were assembled with the interposition of a high density polyethylene frame member between 1) the cathode terminal endplate and a bipolar electrode, 2.) each of the bipolar electrodes, and 3) the terminal anode endplate and a bipolar electrode, requiring a total of 30 frame members. Each of the 30 frame members had a sealing ring seated on its first surface and a sealing ring seated on its second surface. Two opposing 6061-T6 aluminum compression plates compressed the 30 frame members against adjacent components using tie rods and fasteners as illustrated in FIGS. 18-20. The dry battery stacks were constructed and loaded to capacity with the electrolytes described below.

Control Electrolyte No. 1:

The formulation for control electrolyte no. 1 was based on a formula described in U.S. Pat. No. 4,482,614. Control electrolyte no. 1 was formulated as follows:

TABLE 36

| Formulation for control electrolyte no. 1. | | |
|---|---|---|
| Ingredient | Amount | Wt % |
| $ZnBr_2$ | 675 g | 67.5 |
| $NH_4Cl$ | 100 g | 10 |
| PEG | 15 g | 1.5 |
| Water | 210 g | 21 |
| Total: | 1000 g | 100 |

Control Electrolyte No. 2:

The formulation for control electrolyte no. 2 was based on a formula described in Yan, Jung Hoon, Yan, Hyeon Sun, Ra, Ho Won, et al. Effect of a surface active agent on performance of zing/bromine redox flow batteries: Improvement in current efficiency and system stability, Journal of Power Sources 275 (2015) 294-297. Control electrolyte no. 2 was formulated as follows:

TABLE 37

| Formulation for control electrolyte no. 2. | | |
|---|---|---|
| Ingredient | Amount | Wt % |
| $ZnBr_2$ | 507 g | 50.7 |
| $ZnCl_2$ | 68 g | 6.8 |
| N-methyl-N-ethyl pyrrolidinium bromide | 155 g | 15.5 |
| Water | 270 g | 27 |
| Total: | 1000 g | 100 |

Electrolyte Formulation 2-1:

An electrolyte of the present invention was formulated as follows:

TABLE 38

| Test electrolyte no. 2-1 formulation. | |
|---|---|
| Ingredient | Amount |
| $ZnBr_2$ | 345 g |
| KBr | 85.2 g |
| KCl | 81.2 g |
| tetraglyme | 32.5 g |
| DME-PEG 2000 | 16.2 g |
| tetraethylammonium bromide | 25.5 g |
| MEMBr | 8.5 g |

TABLE 38-continued

| Test electrolyte no. 2-1 formulation. | |
|---|---|
| Ingredient | Amount |
| neopentyl glycol | 16.2 g |
| tert-butyl alcohol | 4.1 g |
| Water | 385 g |
| $SnCl_2 \cdot 2H_2O$ | 10 ppm |
| In | 10 ppm |

The pH for this electrolyte was adjusted to 3 with conc. HBr.

For these tests, each electrolyte was loaded into two test stacks to provide duplicate test data (i.e., n=2). Each of the test stacks was initially charged with a constant voltage of 38.0 V, terminating at 15 min or less than 100 mA. Charging continued at +7.16 Amps constant current, terminating at 58.5 V or 30 Ah total accumulated charge. The cells were discharged at −8.0 A constant current, terminating at 33 V.

Figure 28:
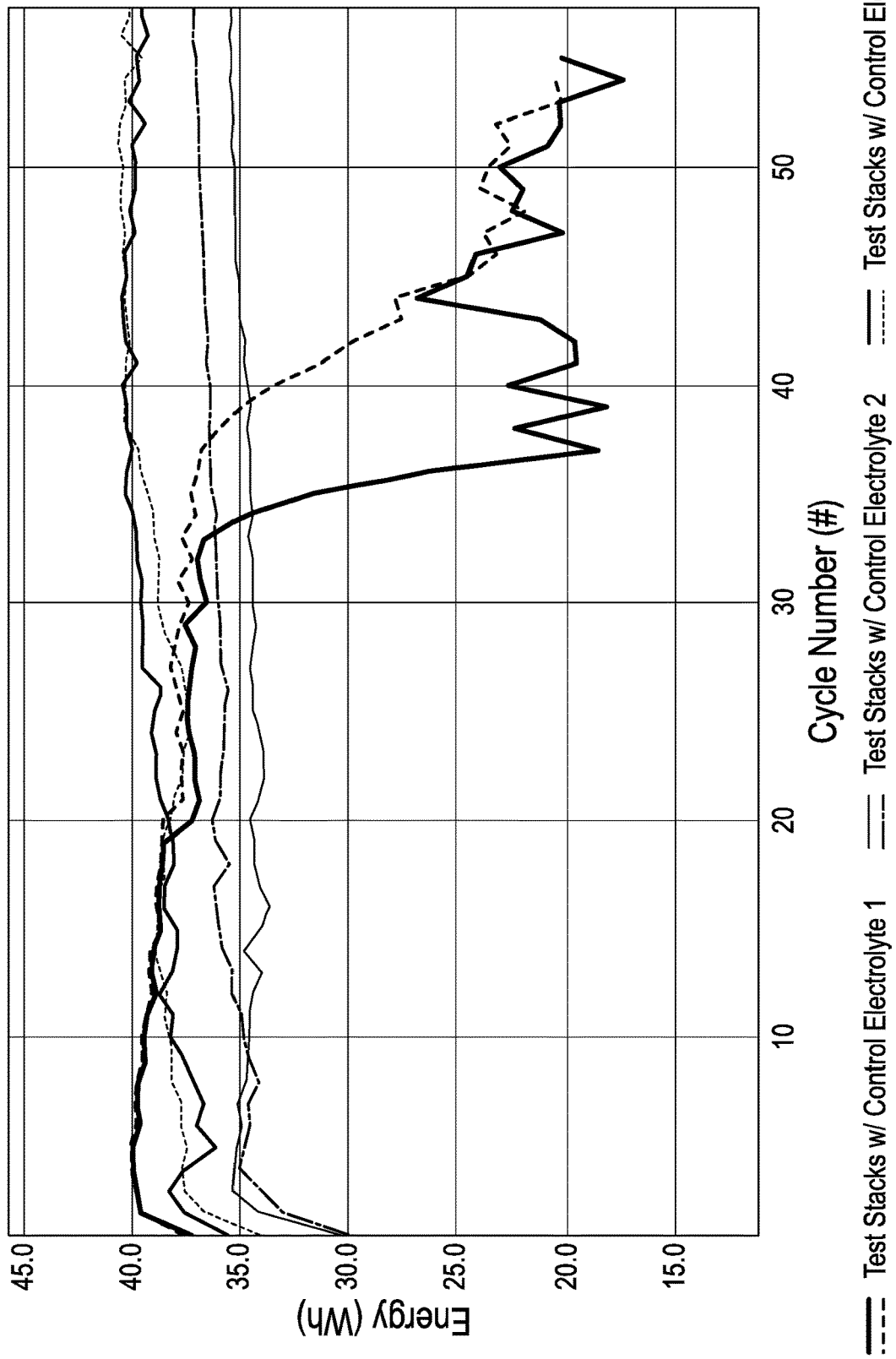
FIG. 28 shows representative behavior of an electrolyte according to an embodiment of the present invention in terms of plots of energy as a function of charge cycle in test cells employing an electrolyte of the present invention and electrolytes reported in the published literature.
Figure 29A:
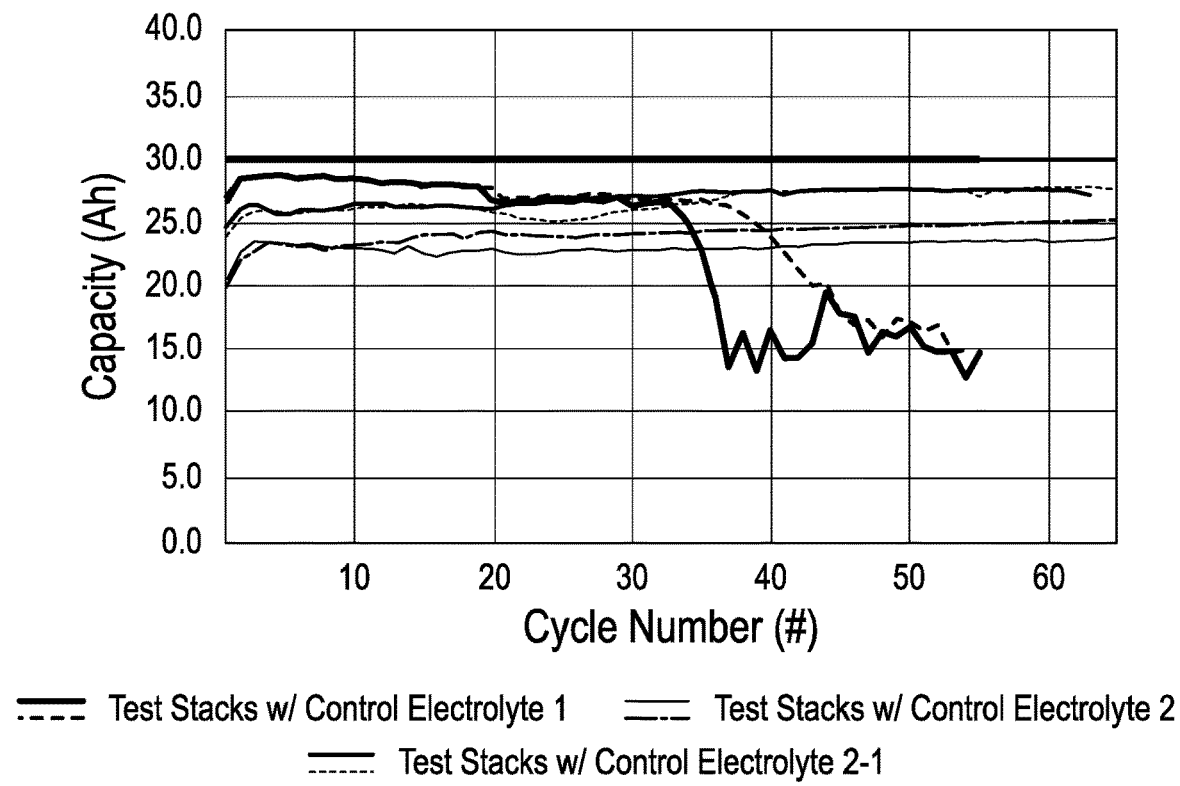
FIG. 29A shows representative behavior of an electrolyte according to an embodiment of the present invention in terms of capacity as a function of charge cycle in test cells employing an electrolyte of the present invention and electrolytes reported in the published literature.
Figure 29B:
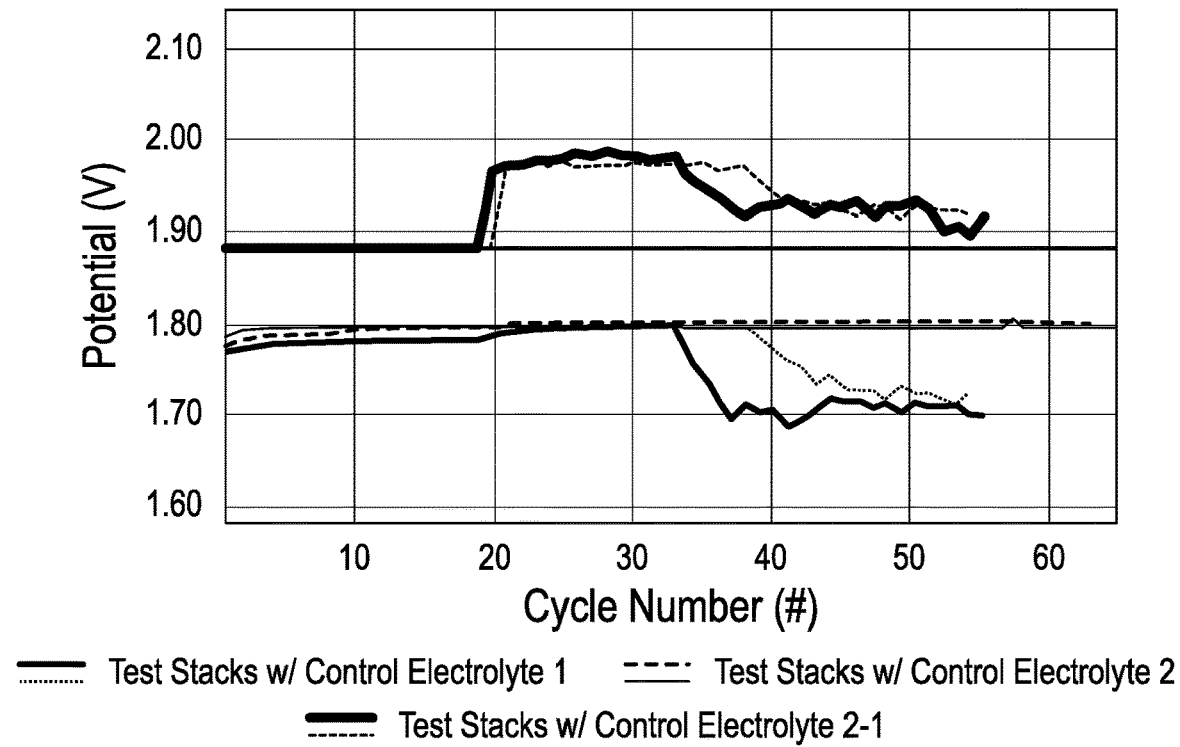
FIG. 29B shows representative behavior of an electrolyte according to an embodiment of the present invention in terms of electric potential as a function of charge cycle in test cells employing an electrolyte of the present invention and electrolytes reported in the published literature.

Results:

Referring to FIGS. 28, 29A, and 29B, the plot of battery stack energy (Wh) as a function of charge cycle number demonstrates that the test stacks using the test electrolyte maintained greater charge and discharge energies over more charge cycles than either of the control electrolytes. And, the plot of battery capacity (Ah) as a function of charge cycle number demonstrates that the test stacks using the electrolyte 2-1 formulation maintained greater charge capacities over more charge cycles than either of the control electrolytes.

Example 3: Cathode Cage Hole Pattern

Negative Control—Two dry test cells were formed as described in Example 1B, except the cathode cage in these two cells possessed an un-modulated series of holes on the pocket portion of the cathode cage. The dry test cells were loaded to capacity with control electrolyte no. 1 and charged.

Test Cells—Three dry test cells were formed as described in Example 1B, including the modulated hole pattern on the reduced surface of the pocket portion of the cathode cage. The dry test cells were loaded to capacity with control electrolyte no. 1 and charged.

Figure 30A:
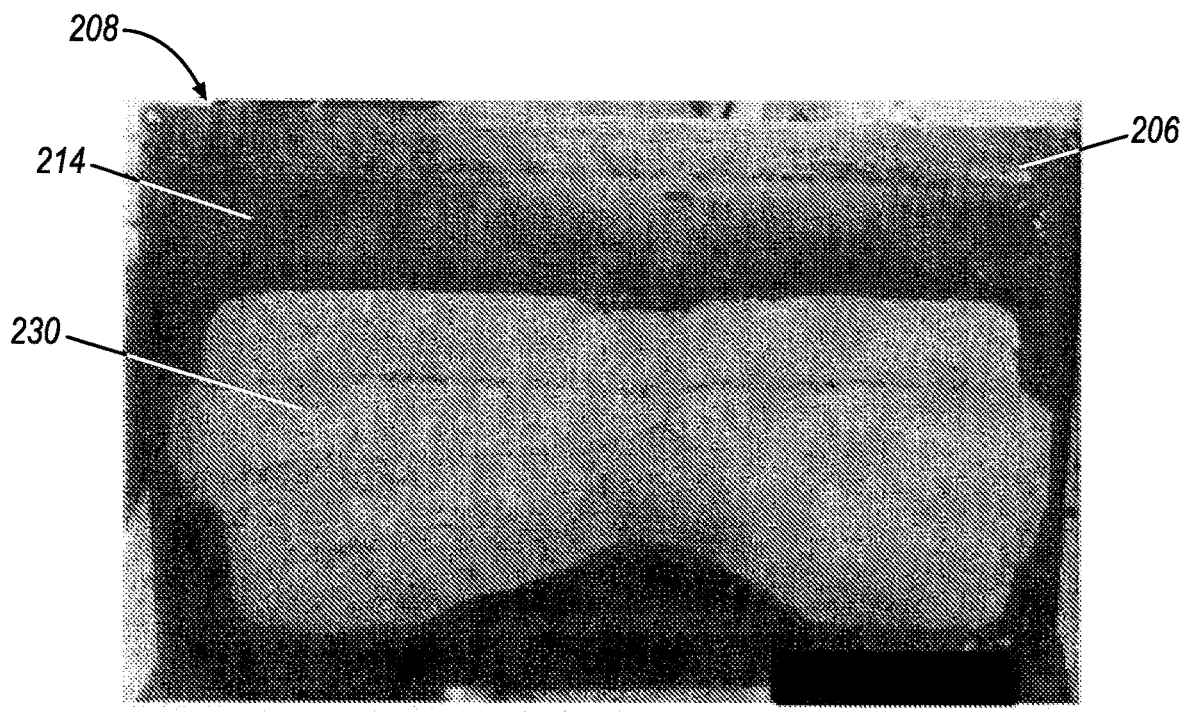
FIGS. 30A and 30B are photographs of zinc metal plated on the back surfaces of electrode plates, wherein the corresponding cathode cages have an un-modulated pattern of holes.
Figure 30B:
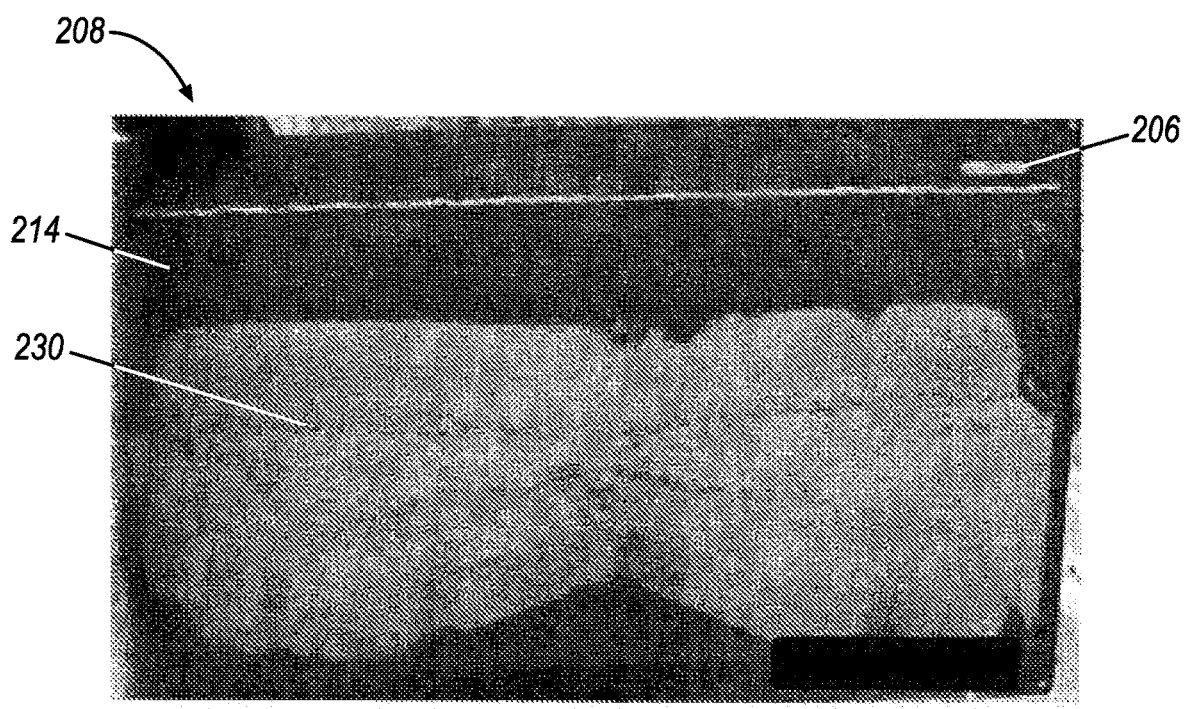
Figure 31A:
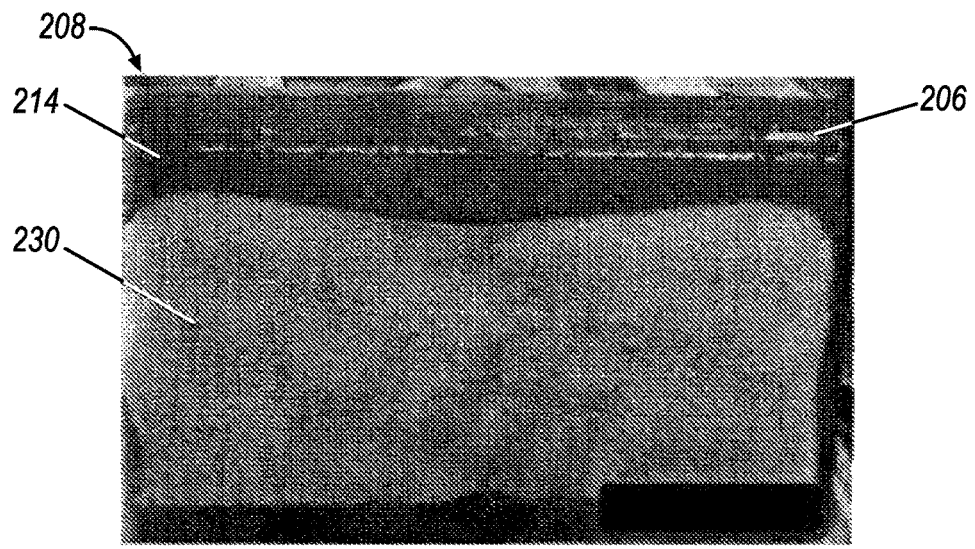
FIGS. 31A, 31B and 31C are photographs of zinc metal plated on the back surfaces of the electrode plates, wherein the corresponding cathode cages have a modulated pattern of holes.
Figure 31B:
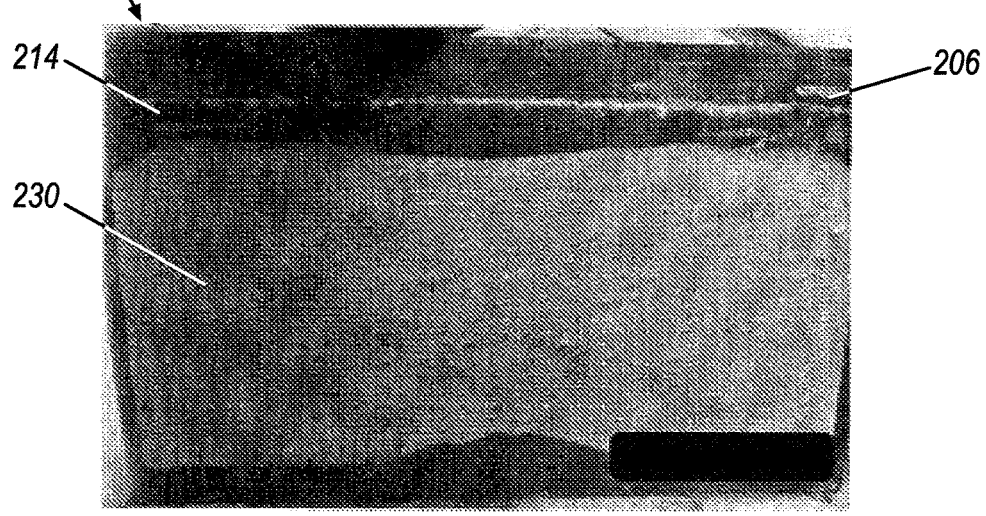
Figure 31C:
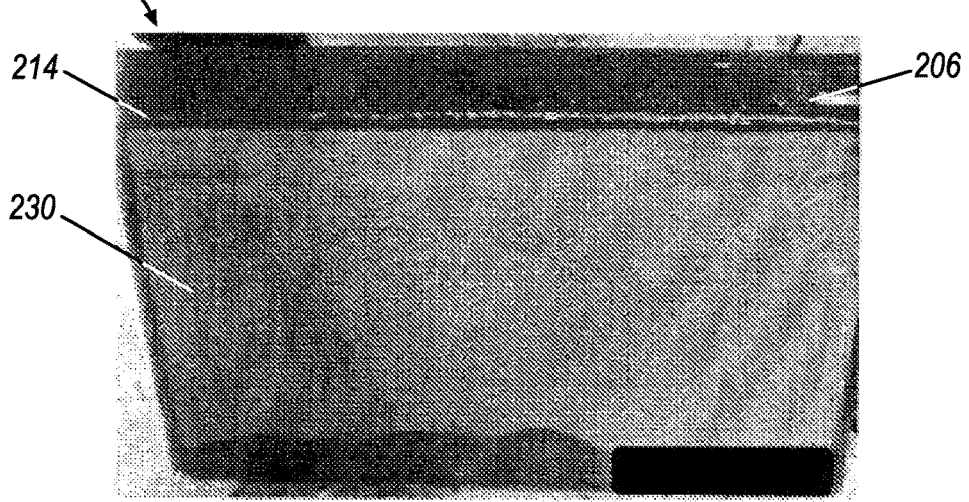

Referring to FIGS. 30A-31C, after charging, the test cells were deconstructed and zinc plating on the anodic surfaces of the cells were evaluated. FIGS. 30A and 30B show zinc plating in the negative control test cells while FIGS. 31A-31C show zinc plating on the test cells. FIGS. 30A-31C illustrate the enhanced zinc plating that was observed for the test cells formed from cathode cages having modulated hole patterns on their respective pocket regions. As shown in FIGS. 30A and 30B, the zinc metal deposits in an irregular pattern when the corresponding cathode cage has an un-modulated series of holes. In contrast, and as shown in FIGS. 31A, 31B, and 31C, the zinc metal deposits in a more regular and complete pattern when the corresponding cathode cage has a modulated series of holes.

Example 4: Battery Stack Performance

Referring to FIGS. 24, 25A, 25B, 26, 27A, and 27B, test stacks, as described in Example 1, underwent charge/discharge cycling to evaluate the performance properties of the test stacks. The data from this testing is plotted in the figures referenced in this Example 3.

Example 5: Alkyl Ammonium Bromides in Electrolytes

The following electrolytes were formulated as follows:

TABLE 39

Electrolyte no. 5-1 formulation.

| Ingredient | Amount (g) | Wt % |
| --- | --- | --- |
| $ZnBr_2$ | 85 | 34.71 |
| Water | 95 | 38.79 |
| KBr | 21 | 8.57 |
| KCl | 20 | 8.17 |
| Acetic acid | 1.11 | 0.45 |
| 1-ethyl-2-methylpyridinium bromide | 9.92 | 4.05 |
| Chloroethylammonium chloride | 12.2 | 4.98 |
| 18-crown-6 | 0.55 | 0.22 |
| Cetyltrimethylammonium bromide | 0.1 | 0.04 |
| $SnCl_2 \cdot 2H_2O$ | ~0.0047 | ~0.0019 |
| In (In in nitric acid soln.) | ~0.0025 | ~0.0010 |
| Nitric acid (from soln.) | ~0.026 | ~0.0106 |
| Total: | ~244.91 | ~100.00 |

TABLE 40

Electrolyte no. 5-2 formulation.

| Ingredient | Amount (g) | Wt % |
| --- | --- | --- |
| $ZnBr_2$ | 85 | 34.73 |
| Water | 95 | 38.82 |
| KBr | 21 | 8.58 |
| KCl | 20 | 8.17 |
| Acetic acid | 1.11 | 0.45 |
| 1-ethyl-4-methylpyridinium bromide | 9.92 | 4.05 |
| Tetraethylammonium bromide | 6.0 | 2.45 |
| Trimethylpropylammonium bromide | 6.0 | 2.45 |
| 18-crown-6 | 0.55 | 0.22 |
| Cetyltrimethylammonium bromide | 0.1 | 0.04 |
| $SnCl_2 \cdot 2H_2O$ | ~0.0047 | ~0.0019 |
| In (In in nitric acid soln.) | ~0.0025 | ~0.0010 |
| Nitric acid (from soln.) | ~0.026 | ~0.0106 |
| Total: | ~244.71 | ~100.00 |

TABLE 41

Electrolyte no. 5-3 formulation.

| Ingredient | Amount (g) | Wt % |
| --- | --- | --- |
| $ZnBr_2$ | 85 | 34.73 |
| Water | 95 | 38.82 |
| KBr | 21 | 8.58 |
| KCl | 20 | 8.17 |
| Acetic acid | 1.11 | 0.45 |
| 1-ethyl-4-methylpyridinium bromide | 9.92 | 4.05 |
| Tetraethylammonium bromide | 6.0 | 2.45 |
| Triethylmethylammonium bromide | 6.0 | 2.45 |
| 18-crown-6 | 0.55 | 0.22 |
| Cetyltrimethylammonium bromide | 0.1 | 0.04 |
| $SnCl_2 \cdot 2H_2O$ | ~0.0047 | ~0.0019 |
| In (In in nitric acid soln.) | ~0.0025 | ~0.0010 |
| Nitric acid (from soln.) | ~0.026 | ~0.0106 |
| Total: | ~244.71 | ~100.00 |

TABLE 42

Electrolyte no. 5-4 formulation.

| Ingredient | Amount (g) | Wt % |
| --- | --- | --- |
| $ZnBr_2$ | 85 | 34.73 |
| Water | 95 | 38.82 |
| KBr | 21 | 8.58 |
| KCl | 20 | 8.17 |
| Acetic acid | 1.11 | 0.45 |
| 1-ethyl-4-methylpyridinium bromide | 9.92 | 4.05 |
| Tetraethylammonium bromide | 6.0 | 2.45 |
| Hexyltrimethylammonium bromide | 6.0 | 2.45 |
| 18-crown-6 | 0.55 | 0.22 |
| Cetyltrimethylammonium bromide | 0.1 | 0.04 |
| $SnCl_2 \cdot 2H_2O$ | ~0.0047 | ~0.0019 |
| In (In in nitric acid soln.) | ~0.0025 | ~0.0010 |
| Nitric acid (from soln.) | ~0.026 | ~0.0106 |
| Total: | ~244.71 | ~100.00 |

TABLE 43

Electrolyte no. 5-5 formulation.

| Ingredient | Amount (g) | Wt % |
| --- | --- | --- |
| $ZnBr_2$ | 85 | 34.73 |
| Water | 95 | 38.82 |
| KBr | 21 | 8.58 |
| KCl | 20 | 8.17 |
| Acetic acid | 1.11 | 0.45 |
| 1-ethyl-4-methylpyridinium bromide | 9.92 | 4.05 |
| tetraethylammonium bromide | 6.0 | 2.45 |
| triethyl-N-methoxymethylammonium bromide | 6.0 | 2.45 |
| 18-crown-6 | 0.55 | 0.22 |
| cetyltrimethylammonium bromide | 0.1 | 0.04 |
| $SnCl_2 \cdot 2H_2O$ | ~0.0047 | ~0.0019 |
| In (In in nitric acid soln.) | ~0.0025 | ~0.0010 |
| nitric acid (from soln.) | ~0.026 | ~0.0106 |
| Total: | ~244.71 | ~100.00 |

Each of the electrolytes in this example was loaded into a dry battery stack, as described in Example 2.

Each of the test stacks was initially charged with a constant voltage of 38.0 V, terminating at 15 min or less than 100 mA. Charging continued at +17.9 mA/cm² constant current, terminating at 58.5 V or 30 Ah total accumulated charge. The cells were discharged at −20.0 mA/cm² constant current, terminating at 33 V.

Figure 39:
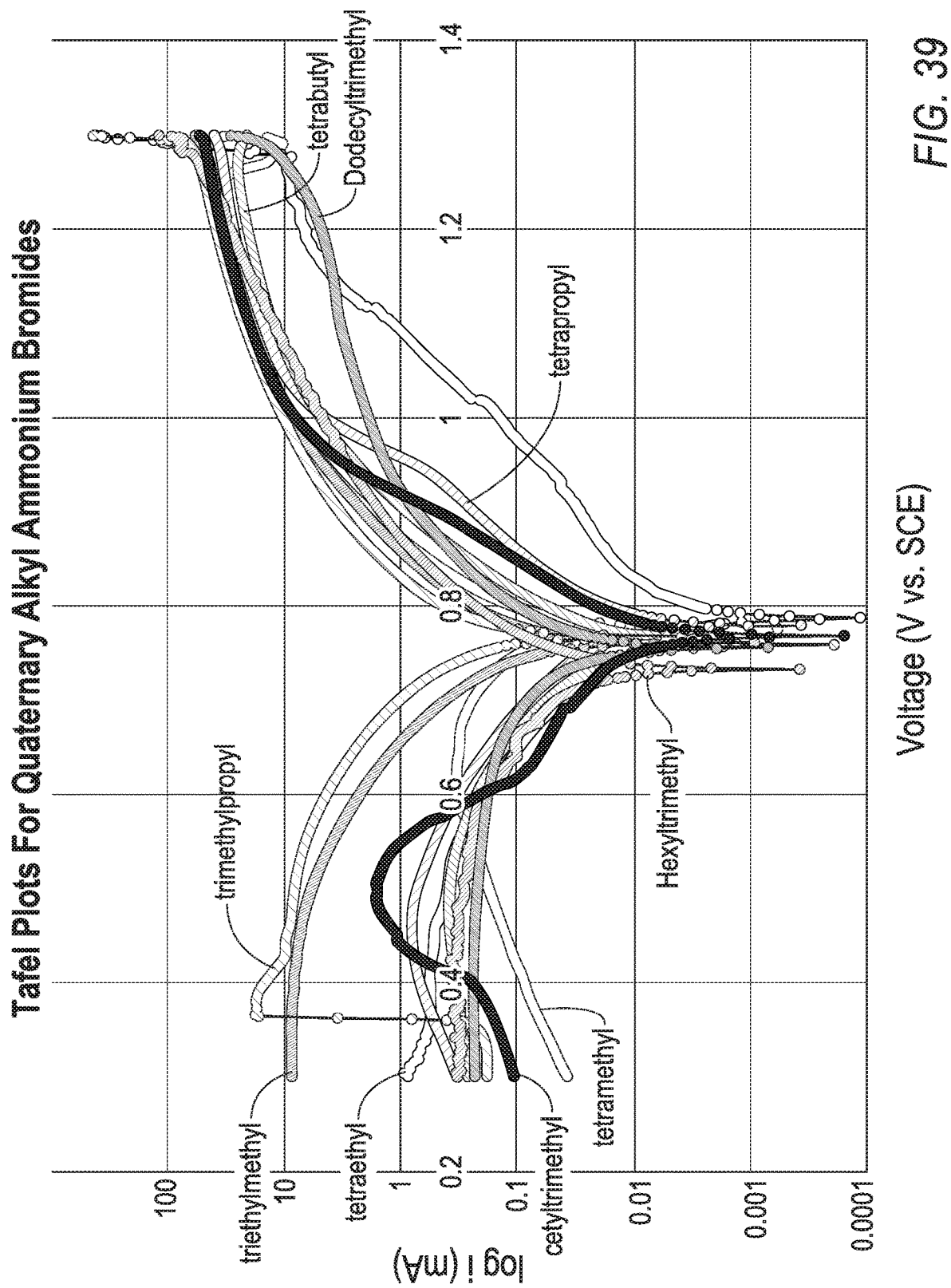
FIG. 39 shows plots of cyclic voltammetry measurements for battery stacks of the present invention assembled to include electrolyte formulations from Example No. 5.
Figure 40:
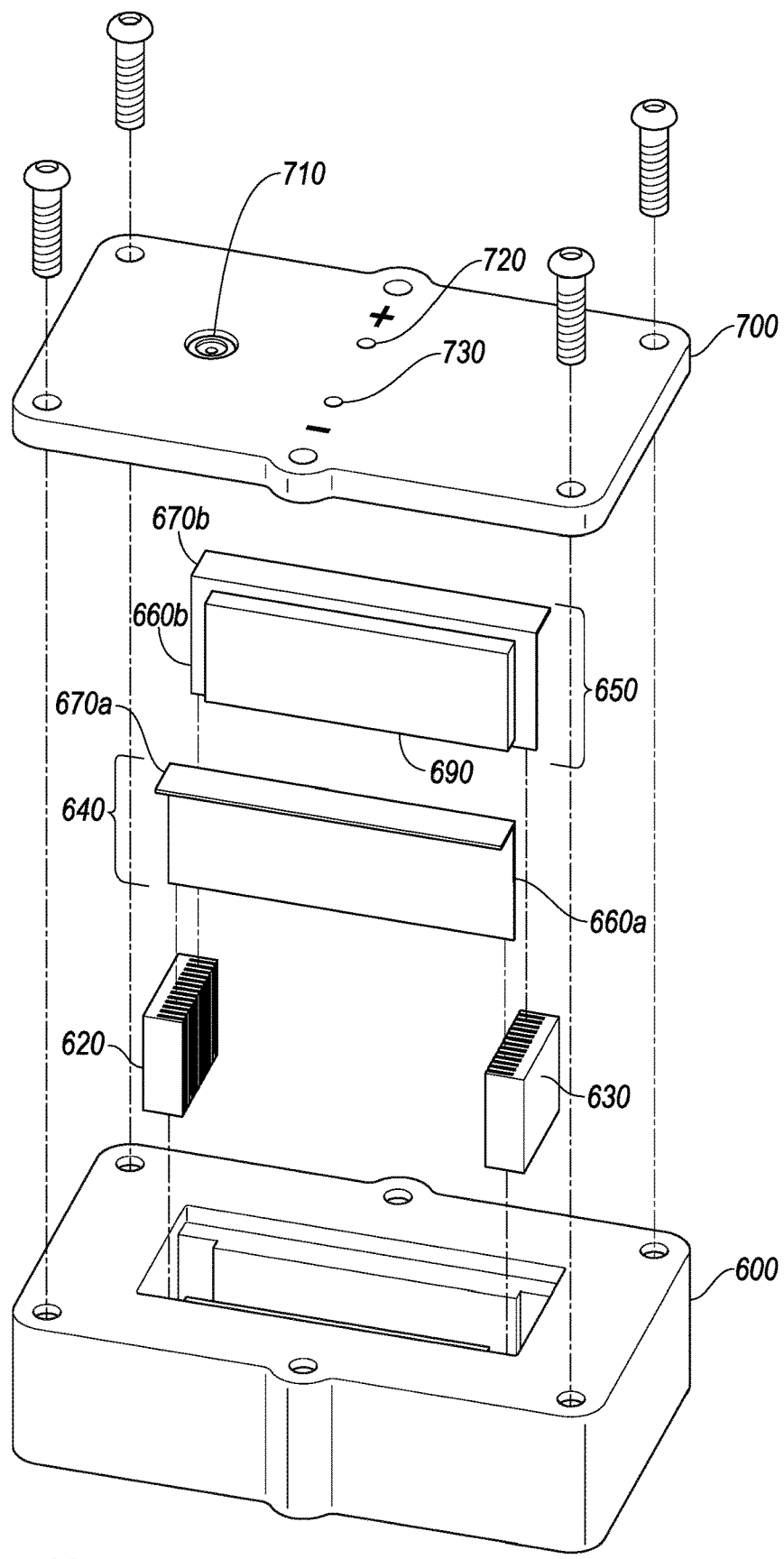
FIG. 40 is an exploded view of a test cell according to an embodiment of the present invention and described in Example 6A.
Figure 41:
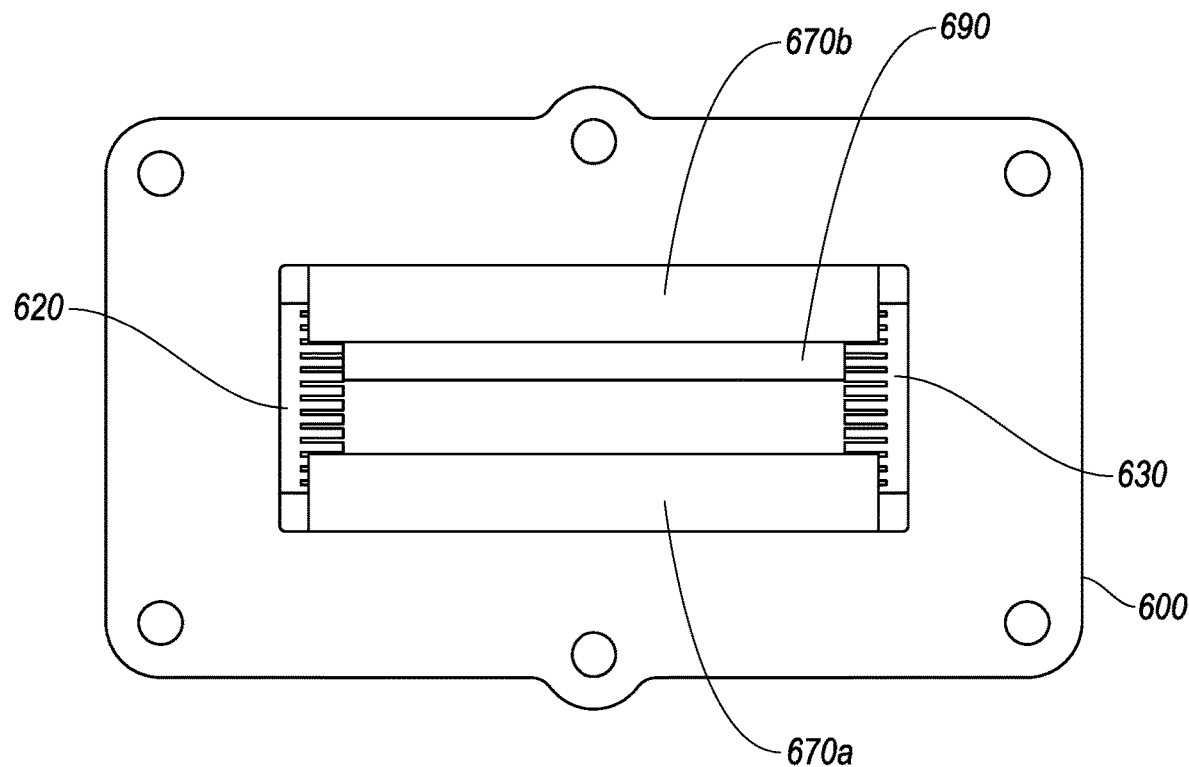
FIG. 41 is a topside view of a test cell according to an embodiment of the present invention and described in Example 6A.
Figure 42:
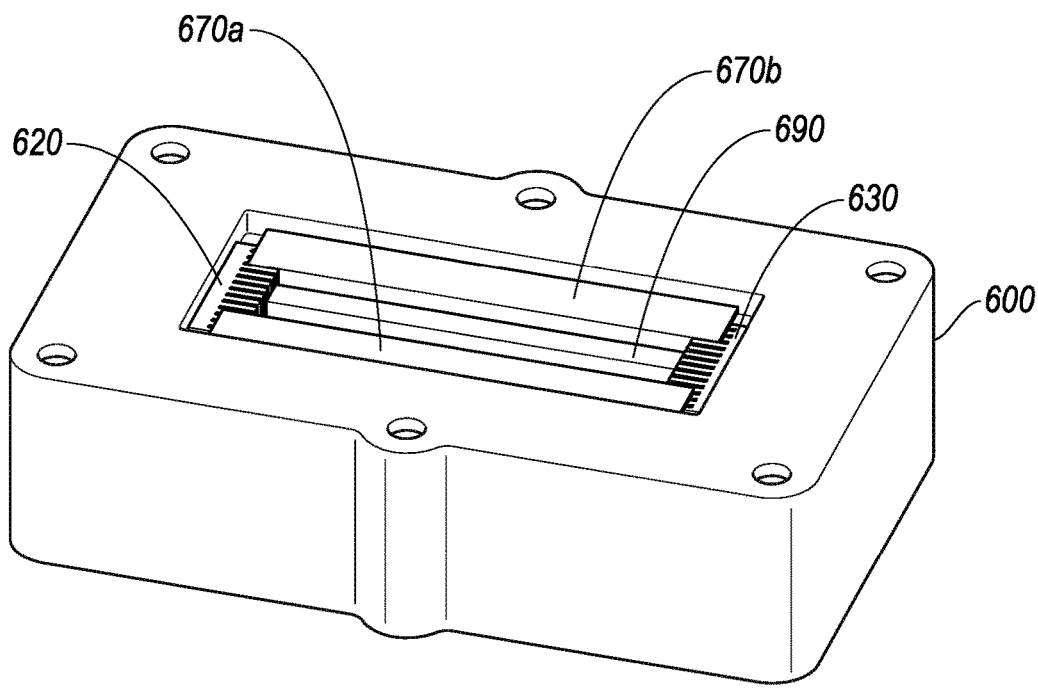
FIG. 42 is a perspective view of a test cell according to an embodiment of the present invention and described in Example 6A.
Figure 43:
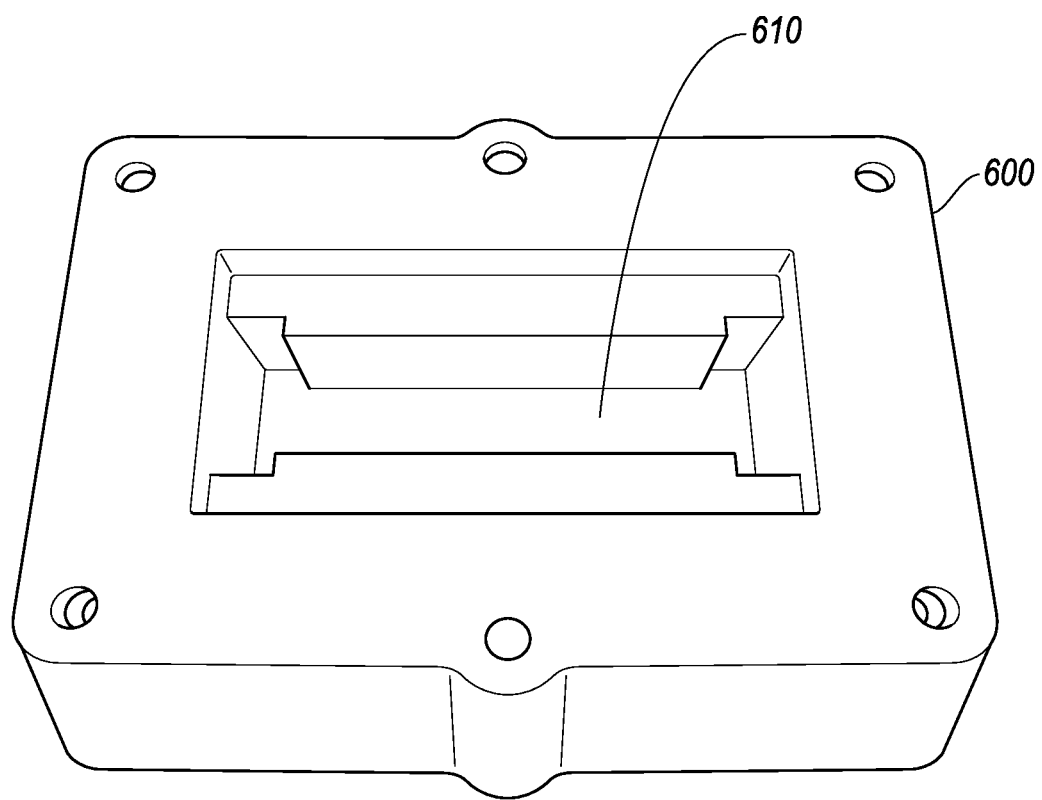
FIG. 43 is a top view of a housing and reaction chamber of a test cell according to an embodiment of the present invention and described in Example 6A.

A plot of the cyclic voltammetry for each of the test stacks is provided in FIG. 39.

Example 6A

Using electrolyte no. 1-32, triethylmethylammonium bromide was evaluated as a replacement for tetraethylammonium bromide in electrolyte formulations. Accordingly, electrolyte 1-32 was and evaluated as described below.

During the preparation of electrolyte no. 1-32, it was noted that the triethylmethylammonium bromide demonstrated a surprisingly significant increase in solubility over tetraethylammonium bromide.

Electrolyte no. 1-32 was evaluated in 140 mA/cm² test cells as depicted in FIGS. 40-43. These test cells were formed from a housing 600 that included a reaction chamber 610 formed therein. Two slotted Telfon inserts 620, 630 were disposed inside the reaction chamber at opposing sides such that the slots of the inserts were inward facing and co-aligned with one another. Two L-shaped current collector plates 640, 650 of titanium that were coated with titanium carbide or thermally infused with carbon were fitted into the slotted inserts such that one leg of each of the L-shaped current collector plates was vertically oriented 660a, 660b and the other leg 670a, 670b was horizontally oriented at the top of the reaction chamber and facing outward, thus forming electrolyte reservoir 680 with the slotted inserts. Accordingly, the electrolyte reservoir is defined by two opposing sidewalls formed from the vertical oriented faces of the current collectors, two opposing sidewalls formed from the slotted inserts, and a bottom that is formed from the bottom of the reaction chamber. A carbon felt (Avcarb G150) 690 was bonded to the vertically oriented leg 660b of L-shaped current collector plate 650 that faced the electrolyte reservoir. Test cells also included a Teflon lid 700 that had a pressure relief valve 710 and two through holes 720, 730 through which electrodes were placed to make electrical contact with the horizontally oriented legs of the current collector plates.

Figure 44:
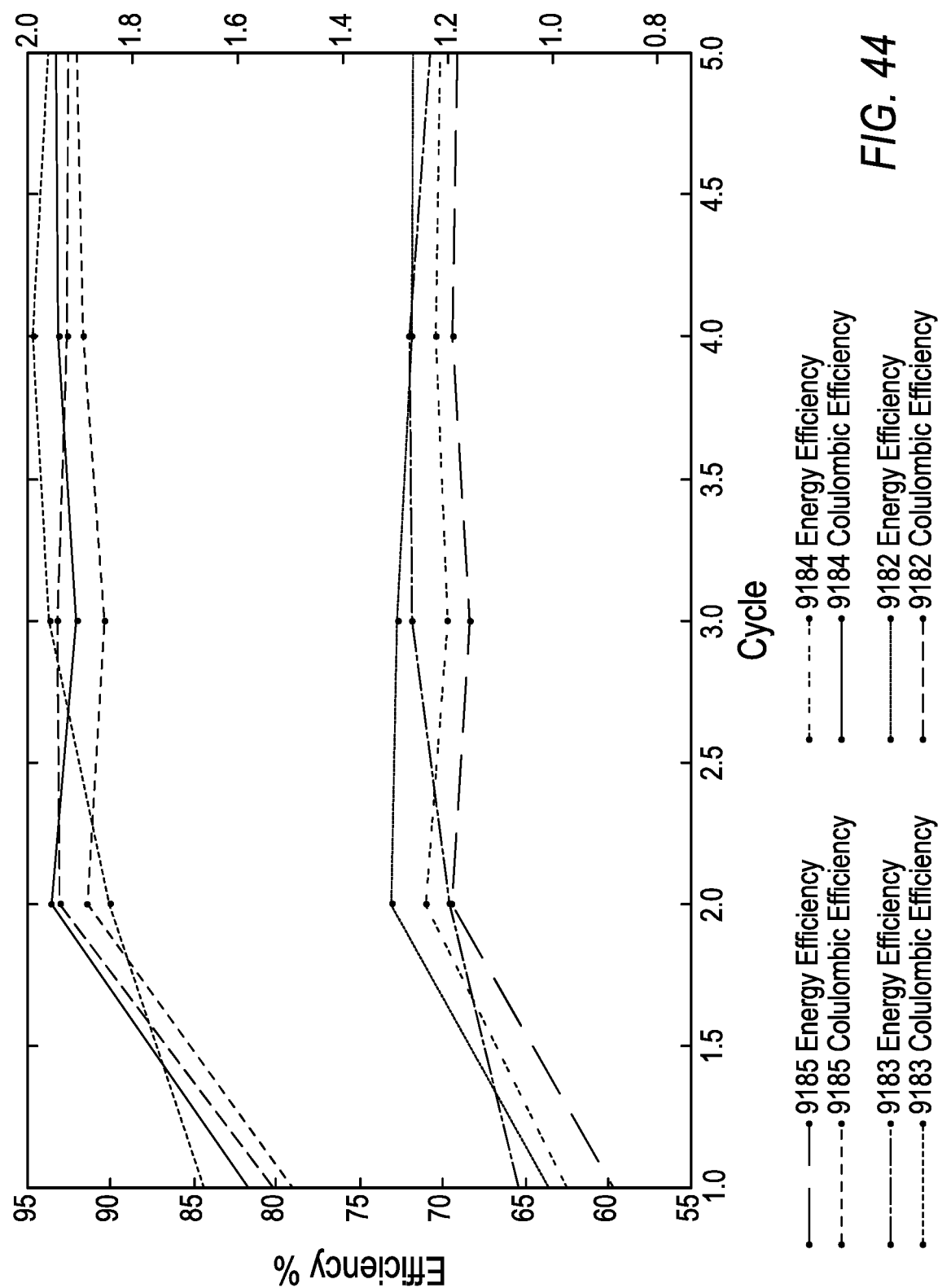
FIG. 44 shows plots of energy and Coulombic efficiencies for test cells according to Example 6A.

Referring to FIG. 44, during testing, the volumes of electrolyte no. 1-32 were kept constant (20 mL total) while battery performances were evaluated at 6 mm (cells 9182 and 9183) and 8 mm (cells 9184 and 9185) of electrolyte depth. The changes in electrolyte depth were tuned by moving the L-shaped current collector plates into different slots thereby narrowing the gap between the opposing vertical faces of the current collector plates.

Each test was performed in duplicate (n=2).

Referring to FIG. 44, the energy and Coulombic efficiencies of the test cells were evaluated over five cycles. The average energy efficiency for test cells 9182 and 9183 was calculated to be 71.2%; the average energy efficiency for test cells 9184 and 9185 was calculated to be 69.7%; the average Coulombic efficiency for test cells 9182 and 9183 was calculated to be 92.5%; and the average Coulombic efficiency for test cells 9184 and 9185 was calculated to be 93.1%. Accordingly, electrolyte no. 1-32 demonstrated high Coulombic and energy efficiencies when used in test cells having 140 mA/cm$^2$ charge capacities.

Example 6B

TABLE 44

Electrolyte no. 6-1 formulation.

| Ingredient | Amount (g) | Wt % |
|---|---|---|
| ZnBr$_2$ | 85 | 34.92 |
| Water | 95 | 39.03 |
| KBr | 5.3 | 2.18 |
| KCl | 29.8 | 12.24 |
| Acetic acid | 1.11 | 0.46 |
| 1-ethyl-4-methylpyridinium bromide | 9.92 | 4.08 |
| Tetraethylammonium bromide | 12.2 | 5.01 |
| DME-PEG 2000 | 4 | 1.64 |
| DME-PEG 1000 | 1 | 0.41 |
| Cetyltrimethylammonium bromide | 0.1 | 0.04 |
| Total: | ~243.43 | ~100.00 |

The energy efficiency and Coulombic efficiency for electrolyte no. 6-1 was evaluated in a 140 mA/cm$^2$ test cells described in Example 6A (cell 9084) and compared with test results from a corresponding cell that employed electrolyte 1-32 (cell 8084).

Figure 45:
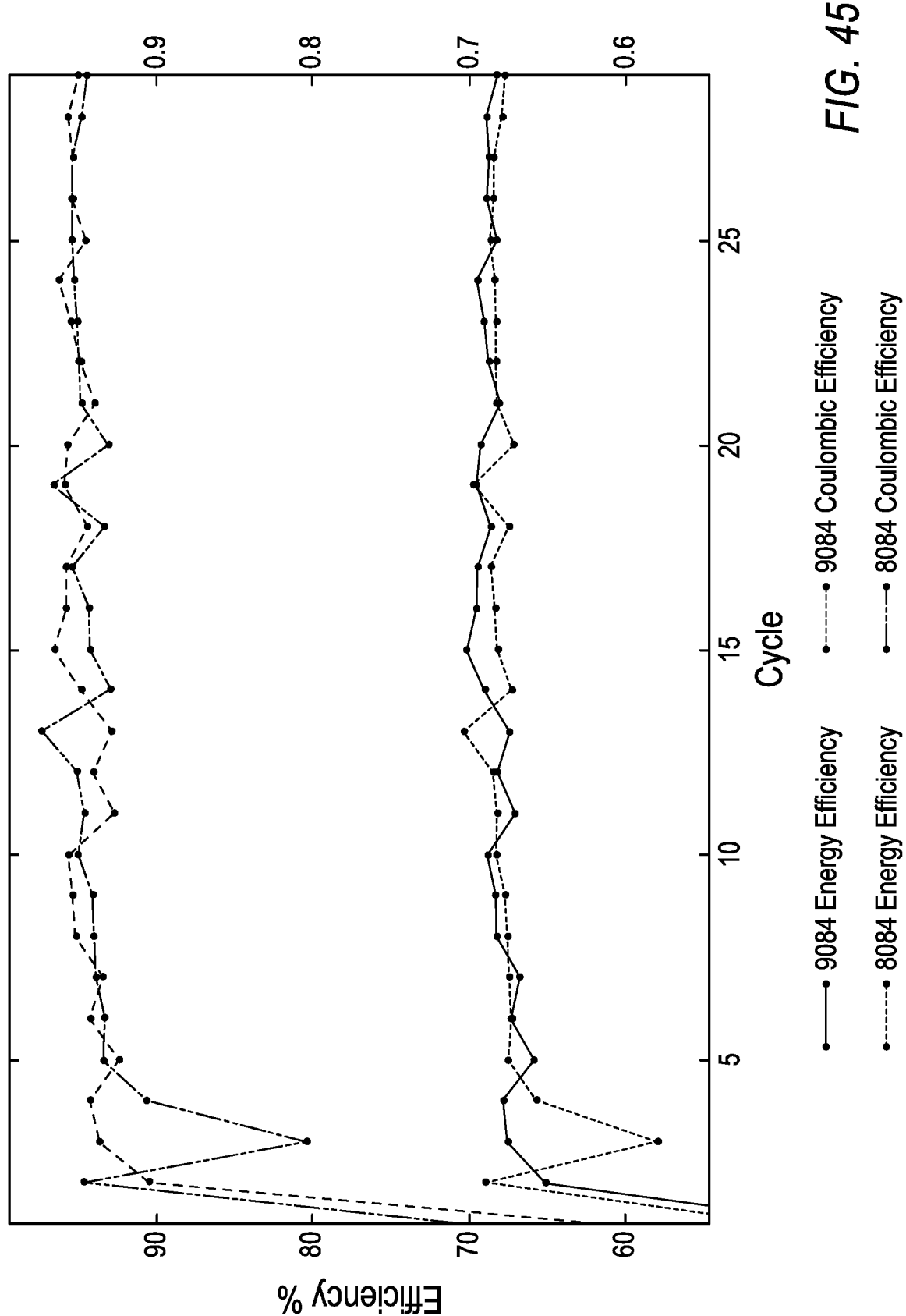
FIG. 45 shows plots of energy and Coulombic efficiencies for test cells according to Example 6B.

Referring to FIG. 45, the energy and Coulombic efficiencies of the test cells were evaluated over more than 25 cycles. The Coulombic efficiency and energy efficiency for the 9084 cell was noticeably greater than the Coulombic efficiency and energy efficiency for cell 8084. Accordingly, electrolyte no. 6-1 demonstrated superior Coulombic and energy efficiencies when used in test cells having 140 mA/cm$^2$ charge capacities.

Example 6B

Electrolyte no. 6-2 was formulated as follows:

TABLE 45

Electrolyte no. 6-2 formulation.

| Ingredient | Amount (g) | Wt % |
|---|---|---|
| ZnBr$_2$ | 85 | 34.92 |
| Water | 95 | 39.03 |
| KBr | 5.3 | 2.18 |
| KCl | 29.8 | 12.24 |
| Acetic acid | 1.11 | 0.46 |
| 1-ethyl-3-methylpyridinium bromide | 9.92 | 4.08 |
| Tetraethylammonium bromide | 12.2 | 5.01 |
| DME-PEG 2000 | 4 | 1.64 |
| DME-PEG 1000 | 1 | 0.41 |
| cetyltrimethylammonium bromide | 0.1 | 0.04 |
| Total: | ~243.43 | ~100.00 |

Figure 46:
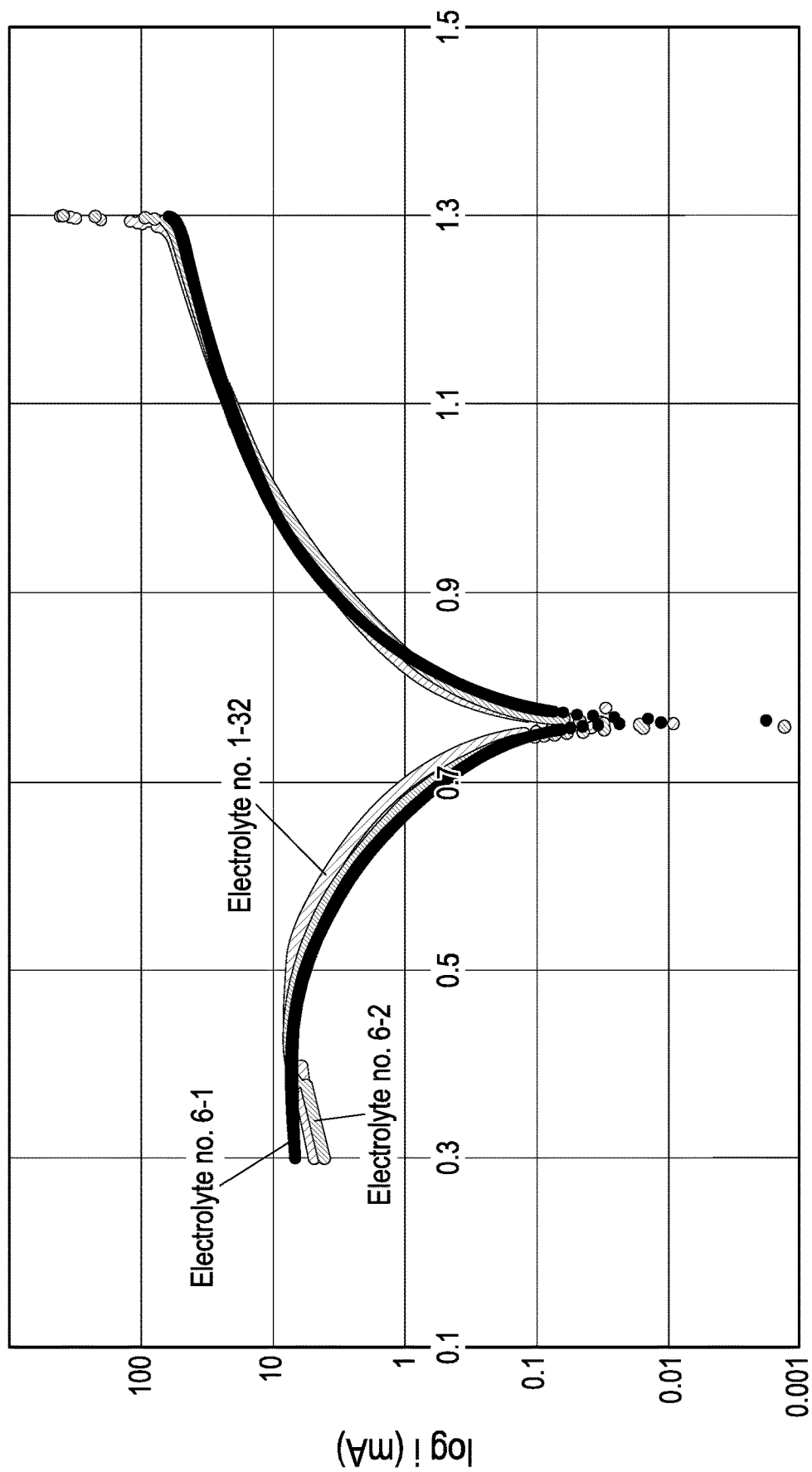
FIG. 46 shows plots of Tafel plots of ethylmethylpryridiniums according to Example 6B.
Figure 47:
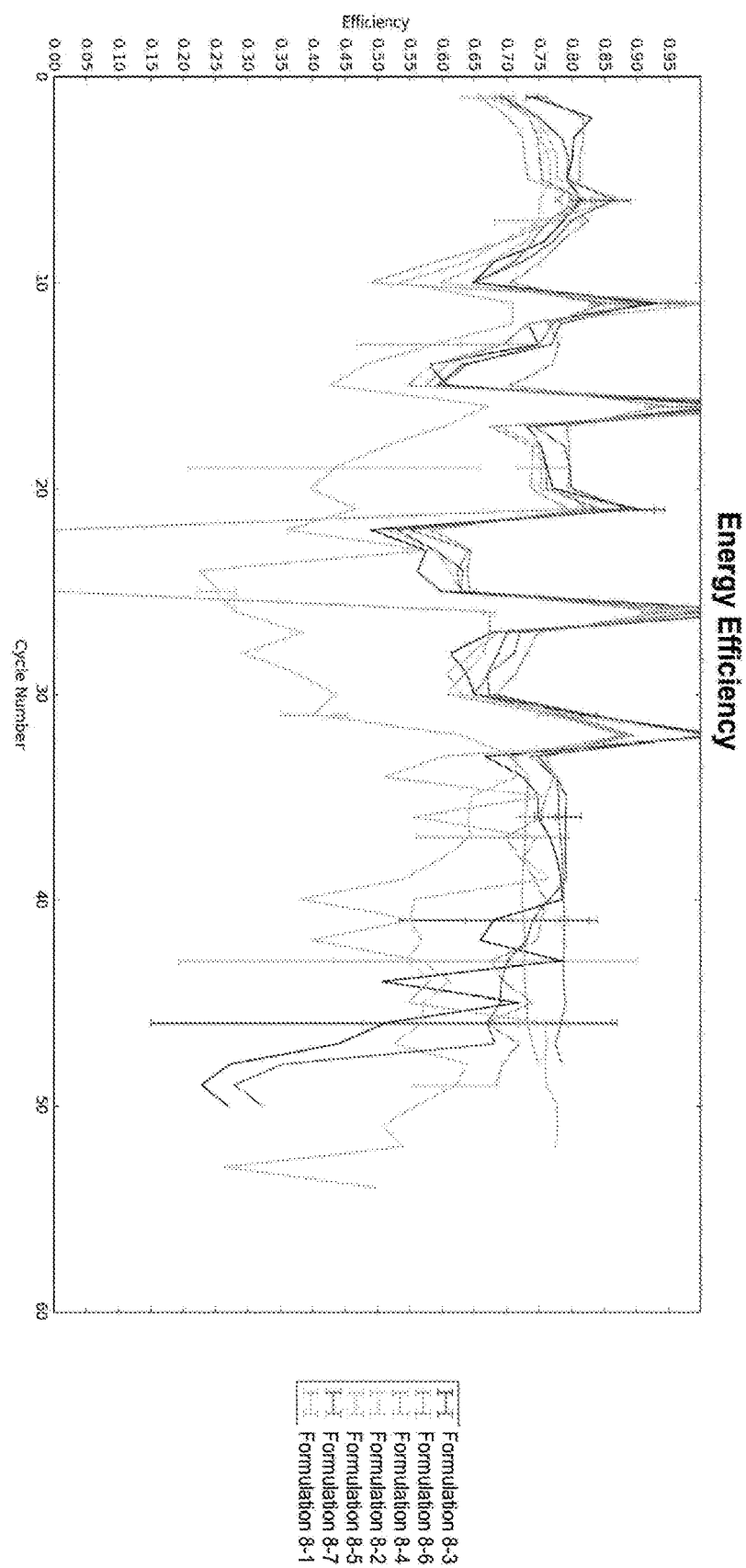
FIG. 47 shows plots of energy efficiencies vs. cycle number for test cells according to Example 8.
Figure 48:
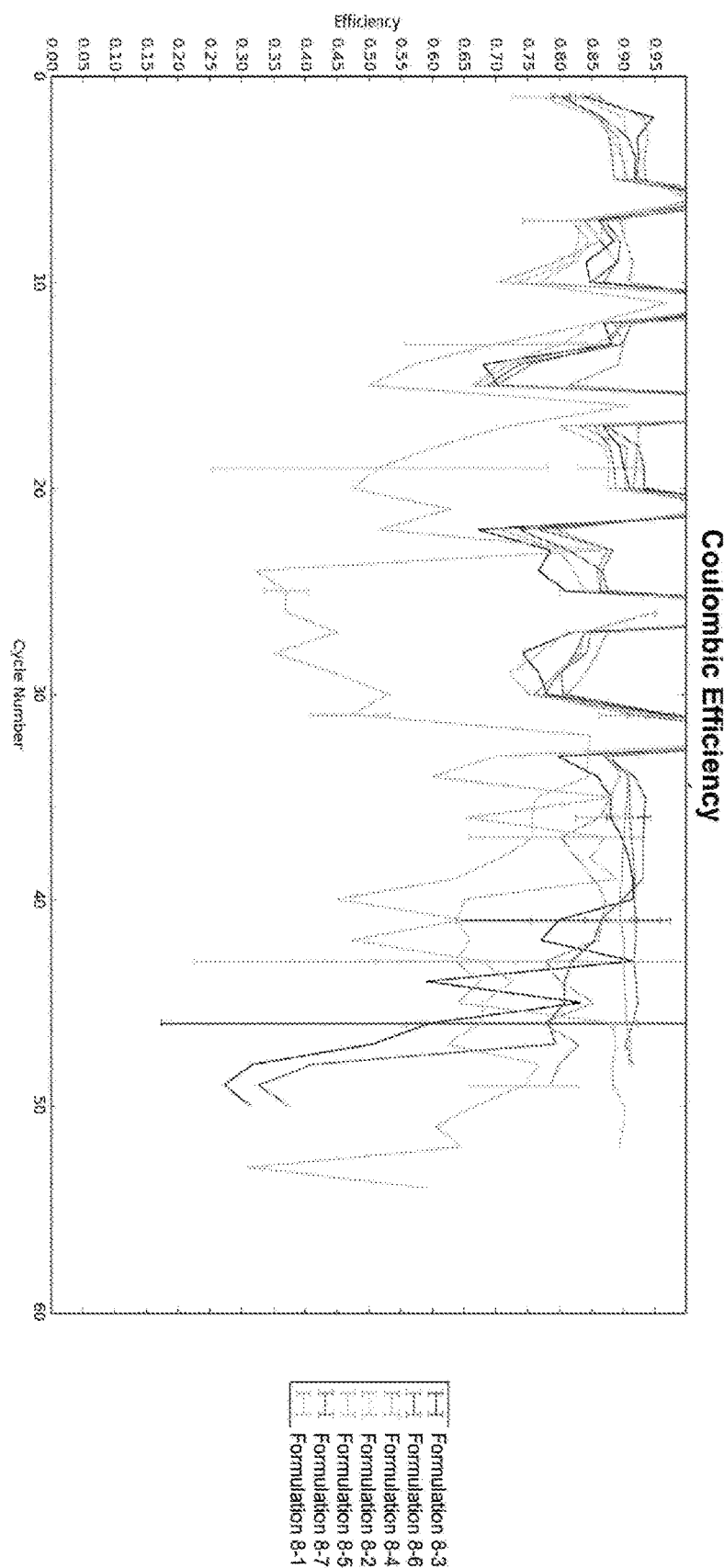
FIG. 48 shows plots of Coulombic efficiencies vs. cycle number for test cells according to Example 8.
Figure 49:
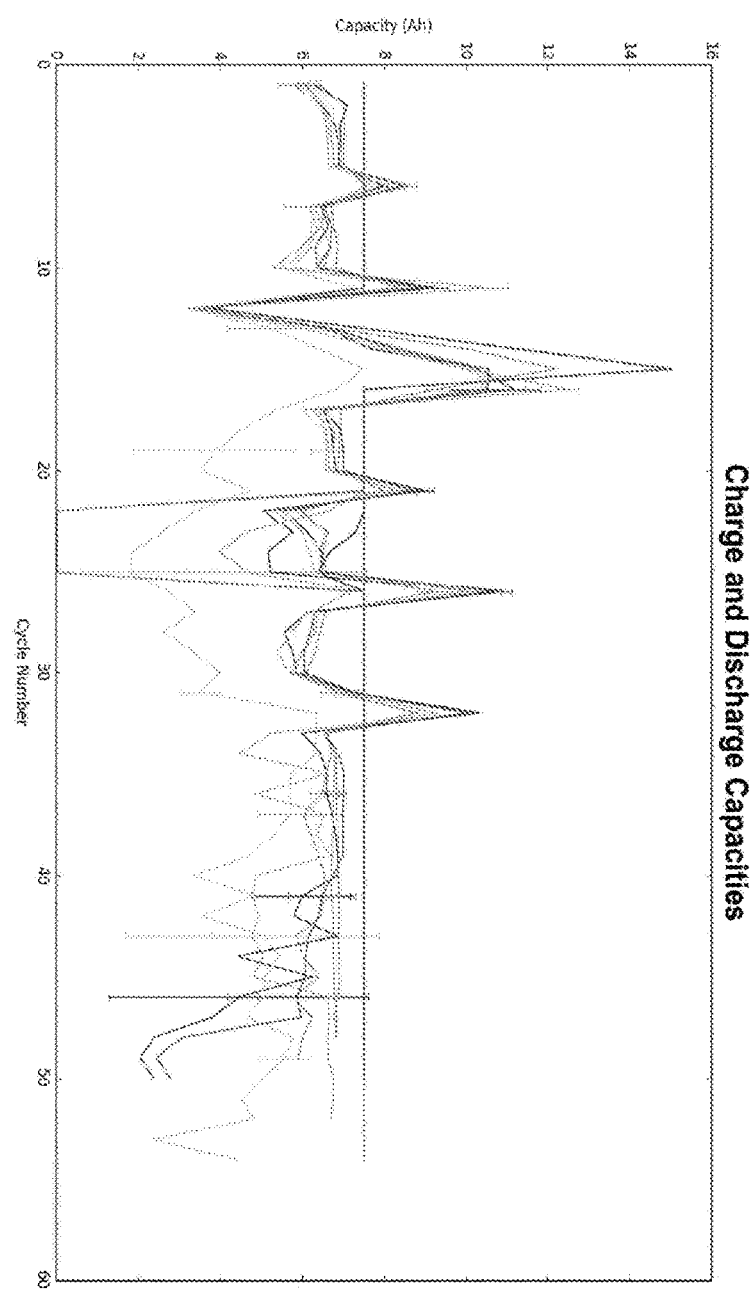
FIG. 49 shows plots of charge and discharge capacities for test cells according to Example 8.
Figure 50:
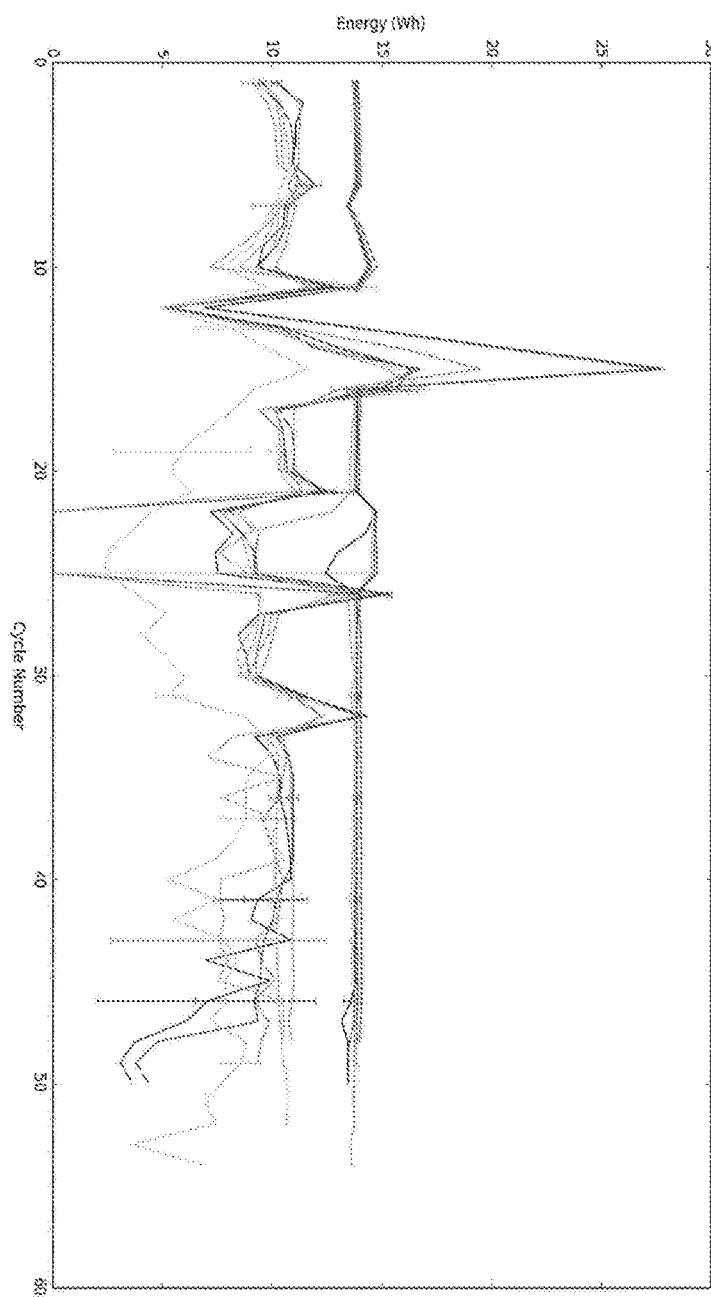
FIG. 50 shows plots of charge and discharge energies for test cells according to Example 8.
Figure 51:
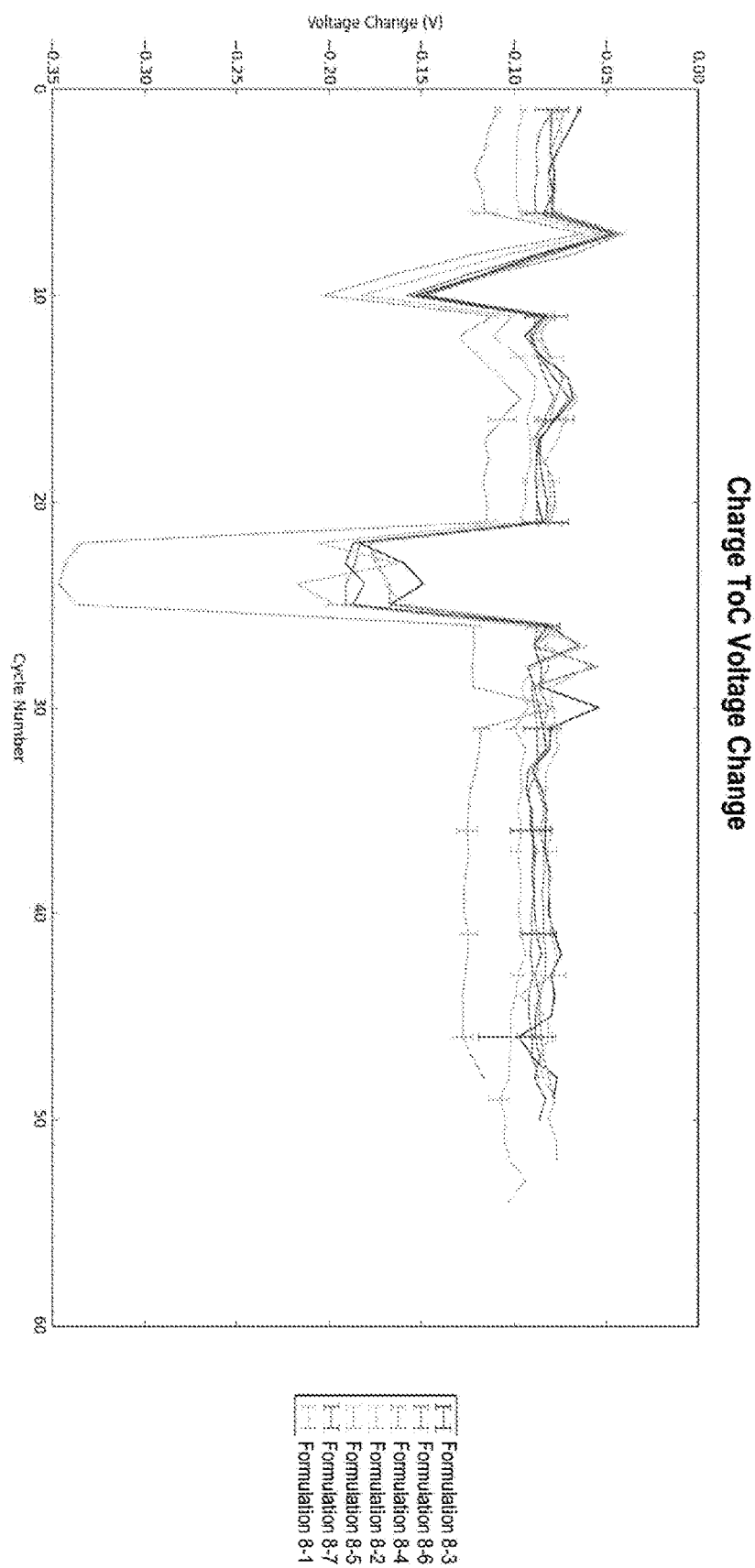
FIG. 51 shows plots of voltage change vs. cycle number for charge ToC (top-of-charge) in test cells according to Example 8.
Figure 52:
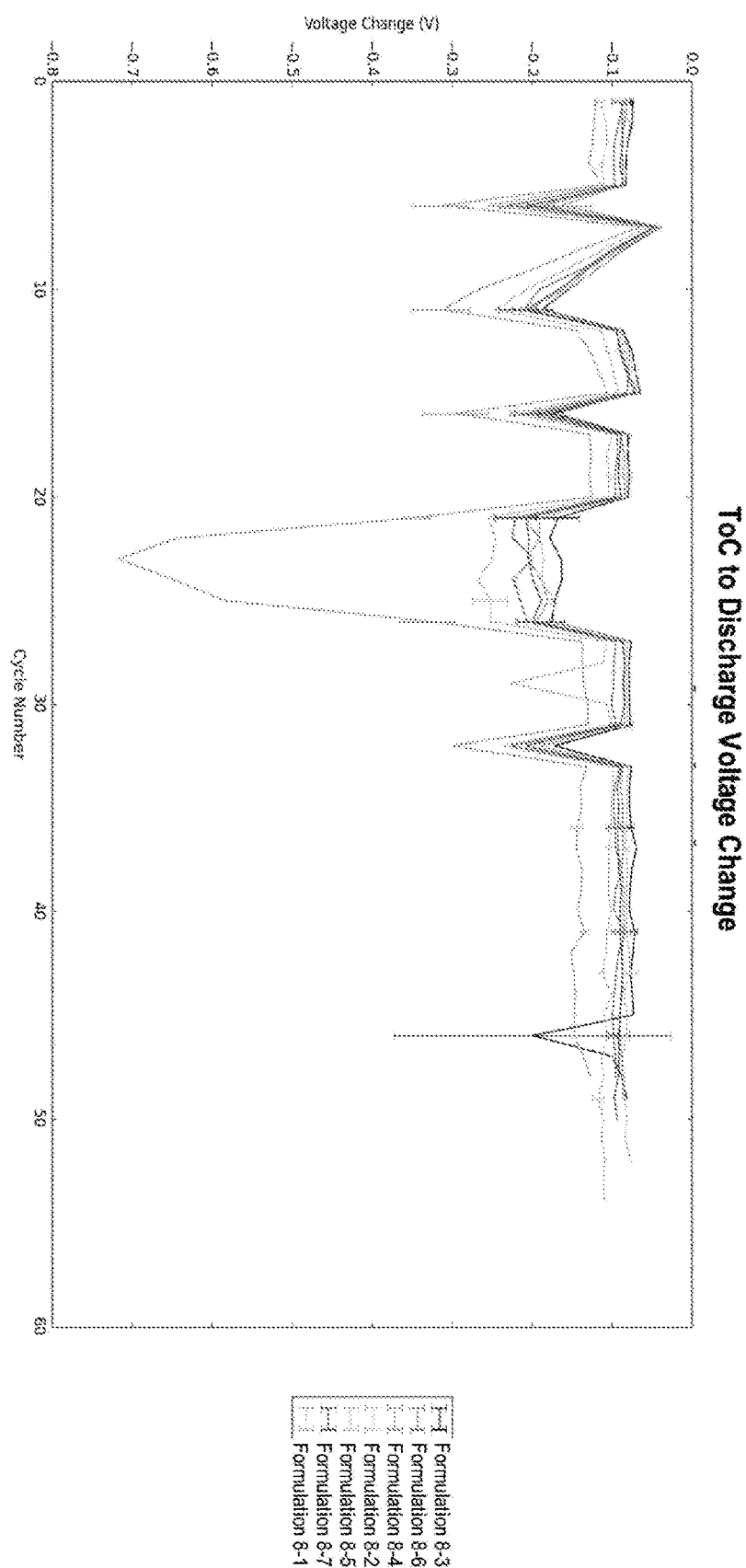
FIG. 52 shows plots of voltage change vs. cycle number for ToC (top-of-charge) to discharge in test cells according to Example 8.
Figure 53:
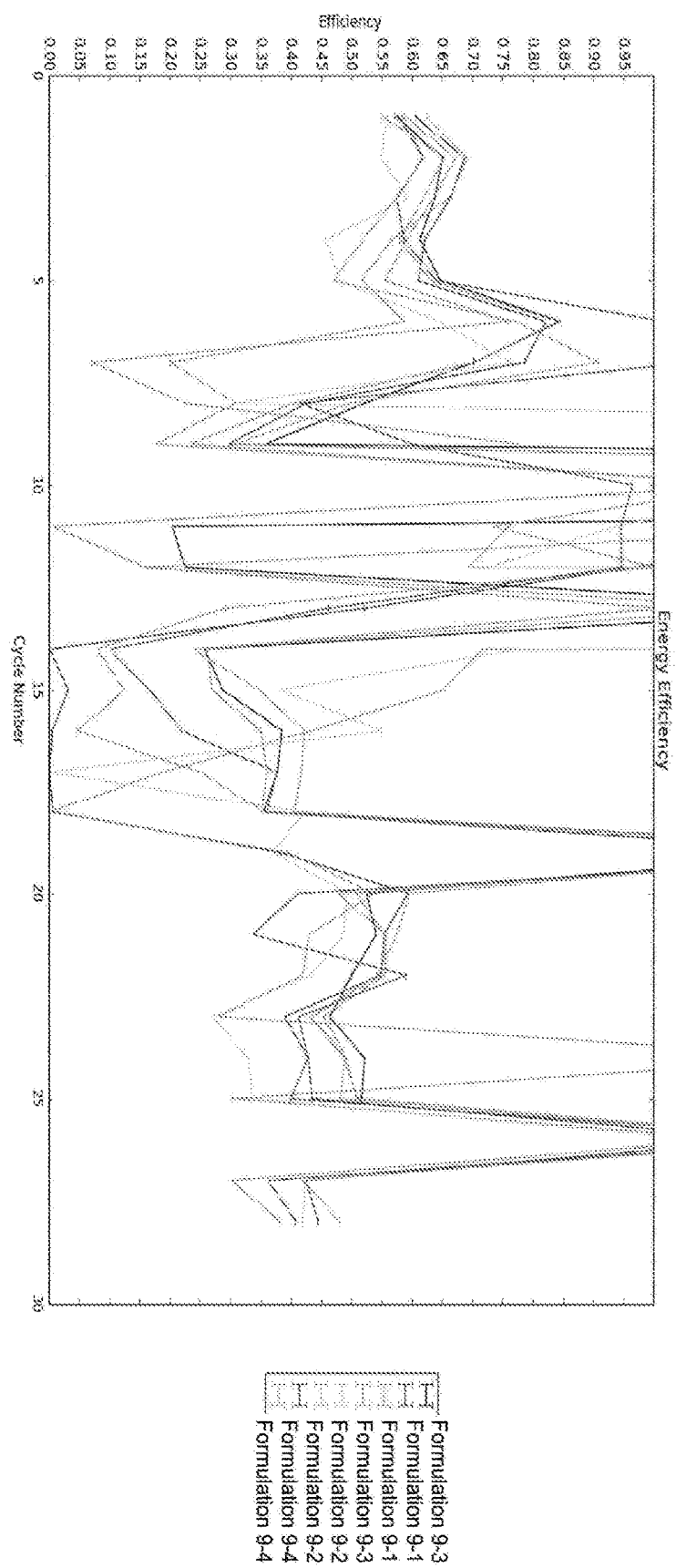
FIG. 53 shows plots of energy efficiencies vs. cycle number for test cells according to Example 9.
Figure 54:
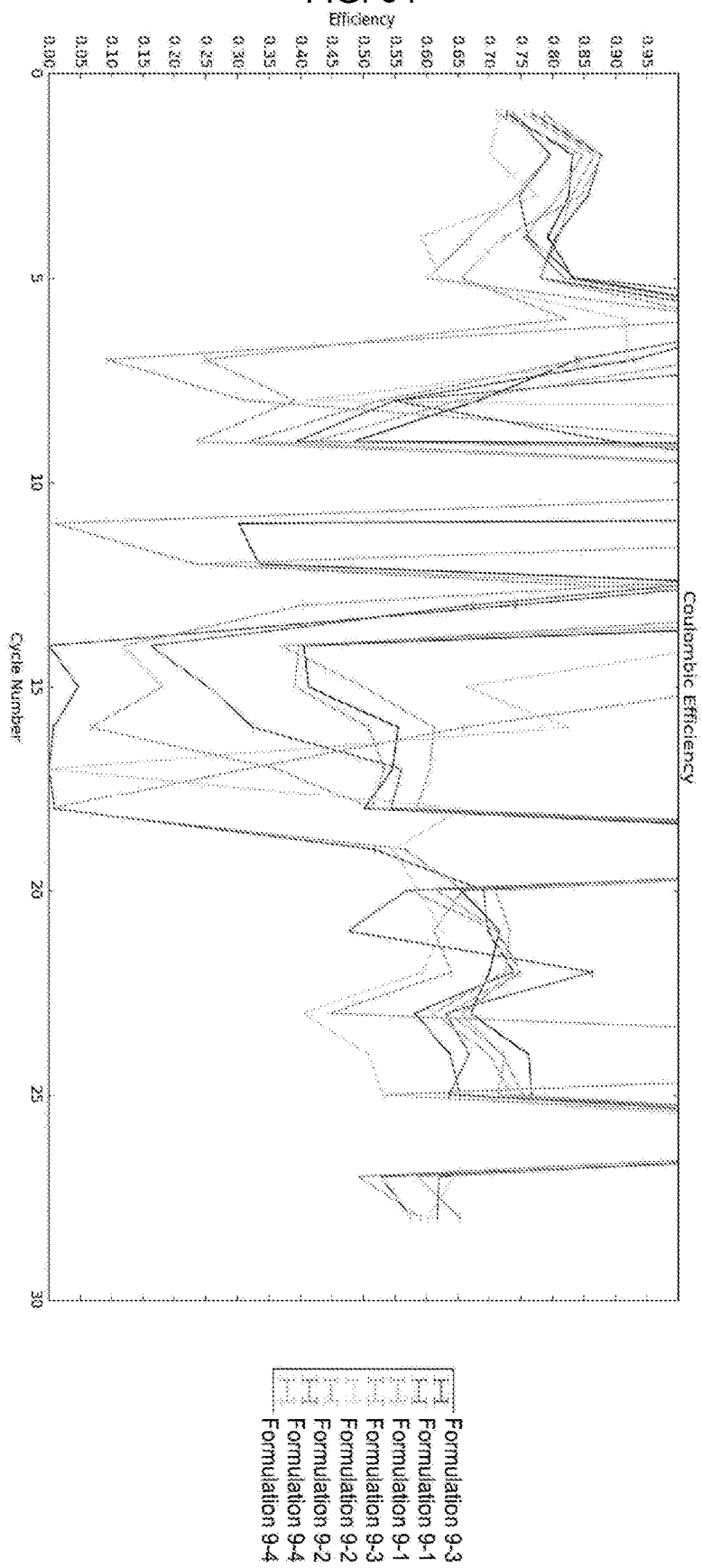
FIG. 54 shows plots of Coulombic efficiencies vs. cycle number for test cells according to Example 9.
Figure 55:
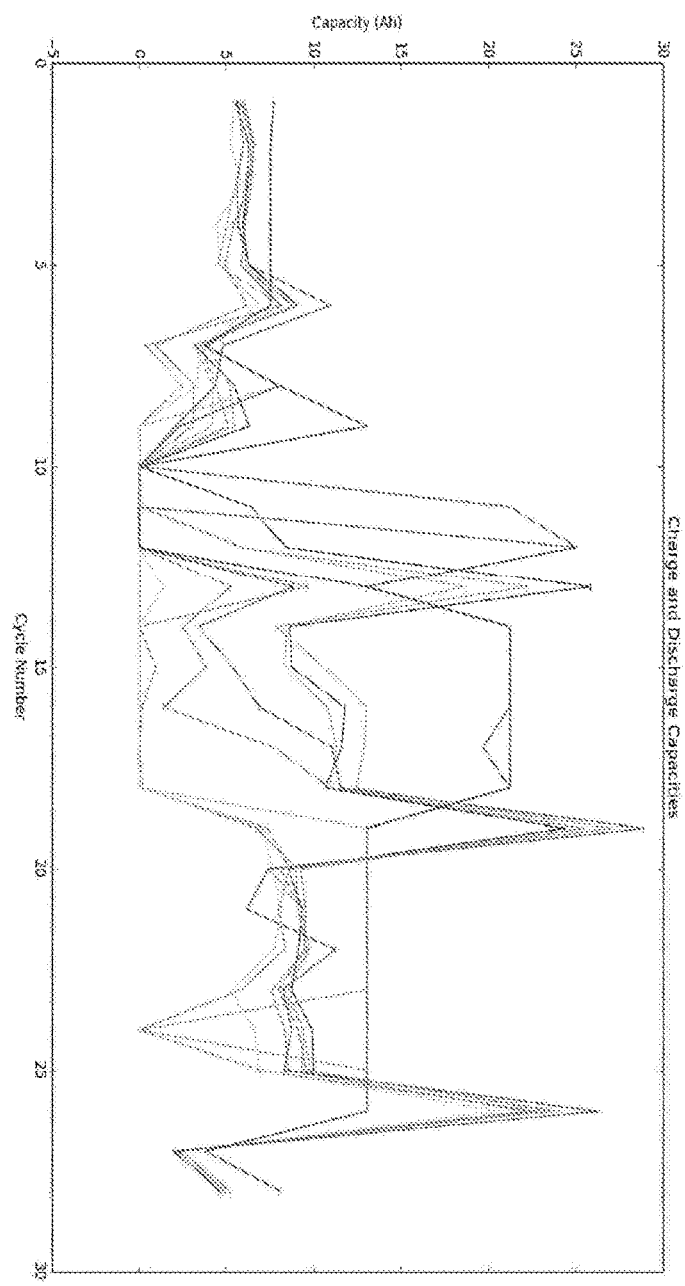
FIG. 55 shows plots of charge and discharge capacities for test cells according to Example 9.
Figure 56:
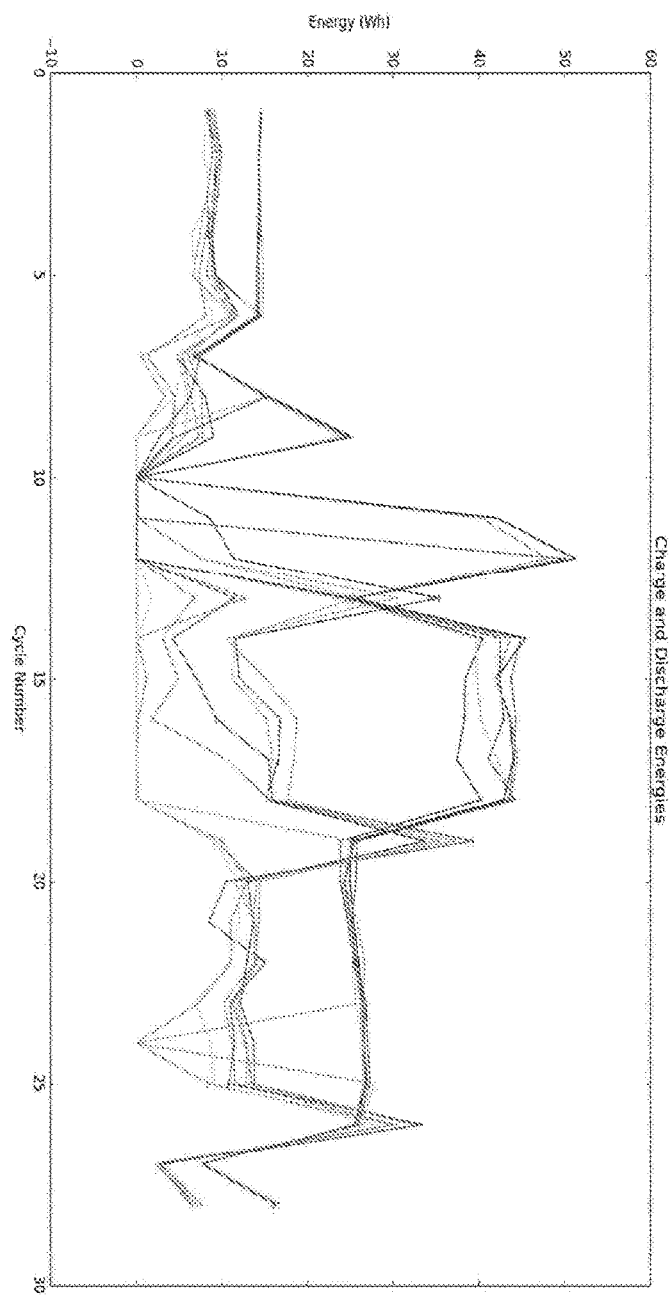
FIG. 56 shows plots of charge and discharge energies for test cells according to Example 9.
Figure 57:
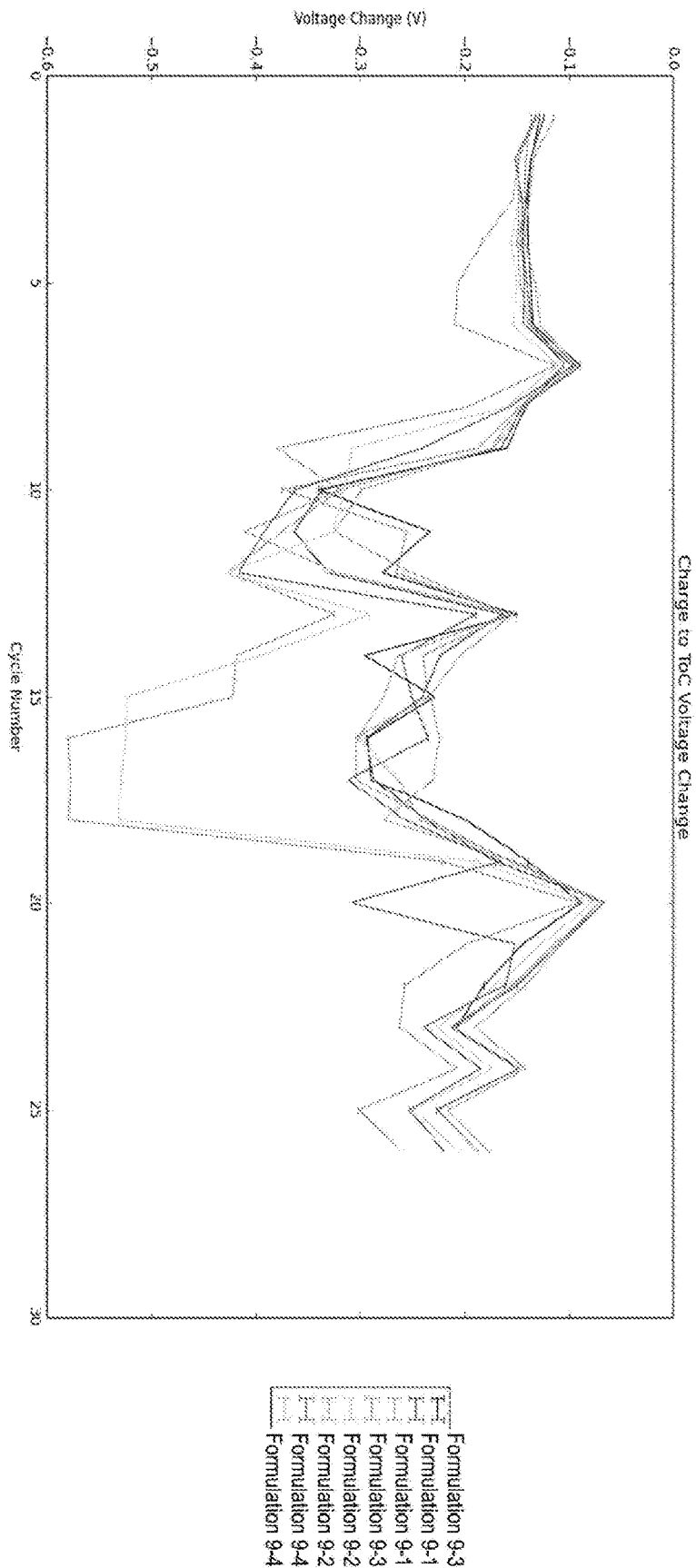
FIG. 57 shows plots of voltage change vs. cycle number for charge ToC (top-of-charge) in test cells according to Example 9.
Figure 58:
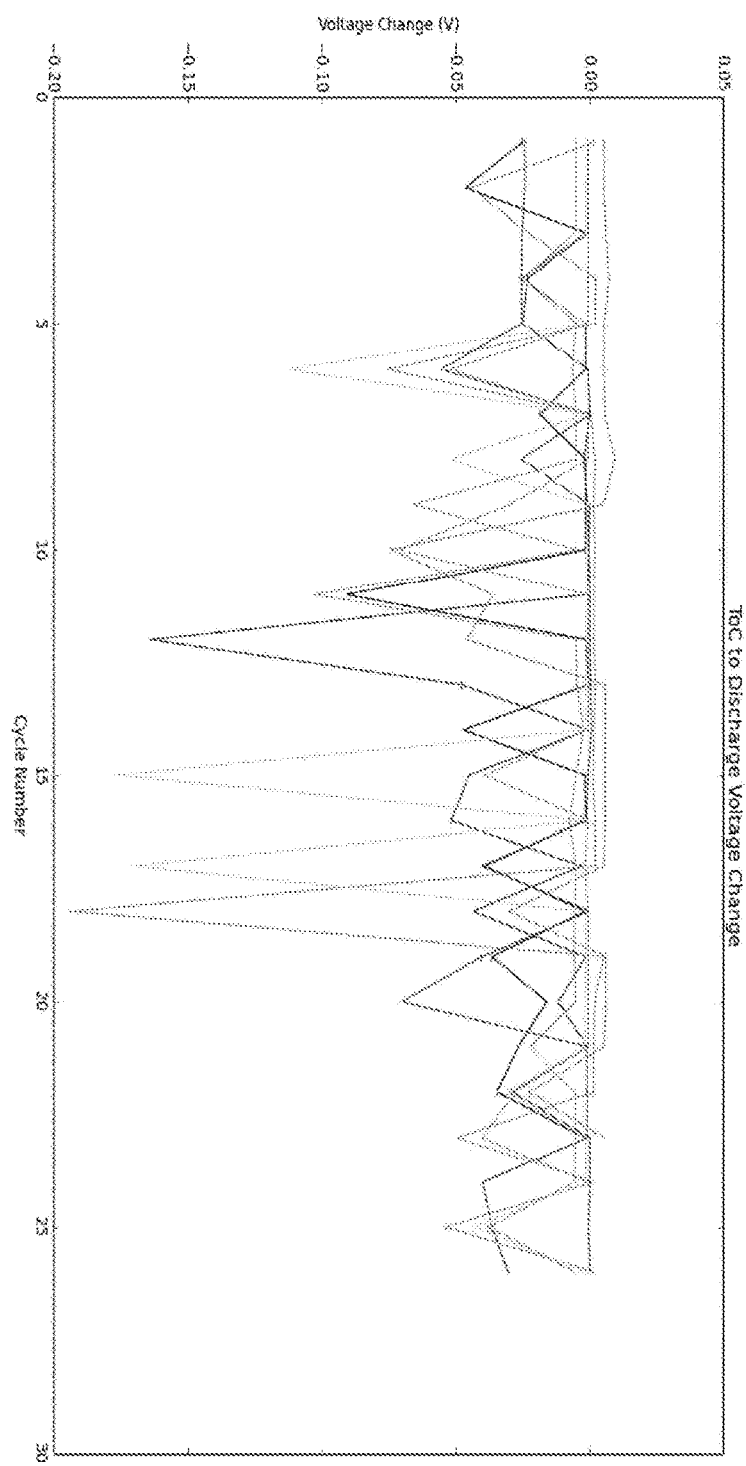
FIG. 58 shows plots of voltage change vs. cycle number for ToC (top-of-charge) to discharge in test cells according to Example 9.
Figure 59:
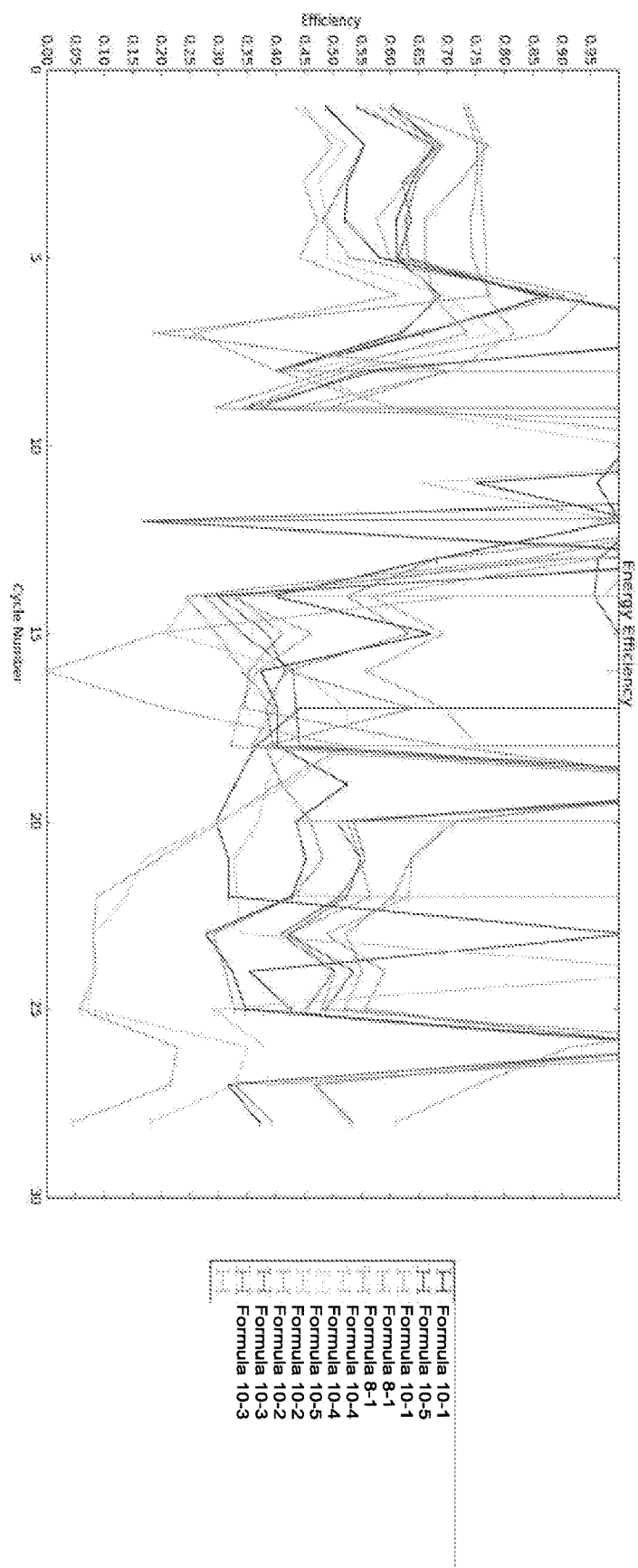
FIG. 59 shows plots of energy efficiencies vs. cycle number for test cells according to Example 10.
Figure 60:
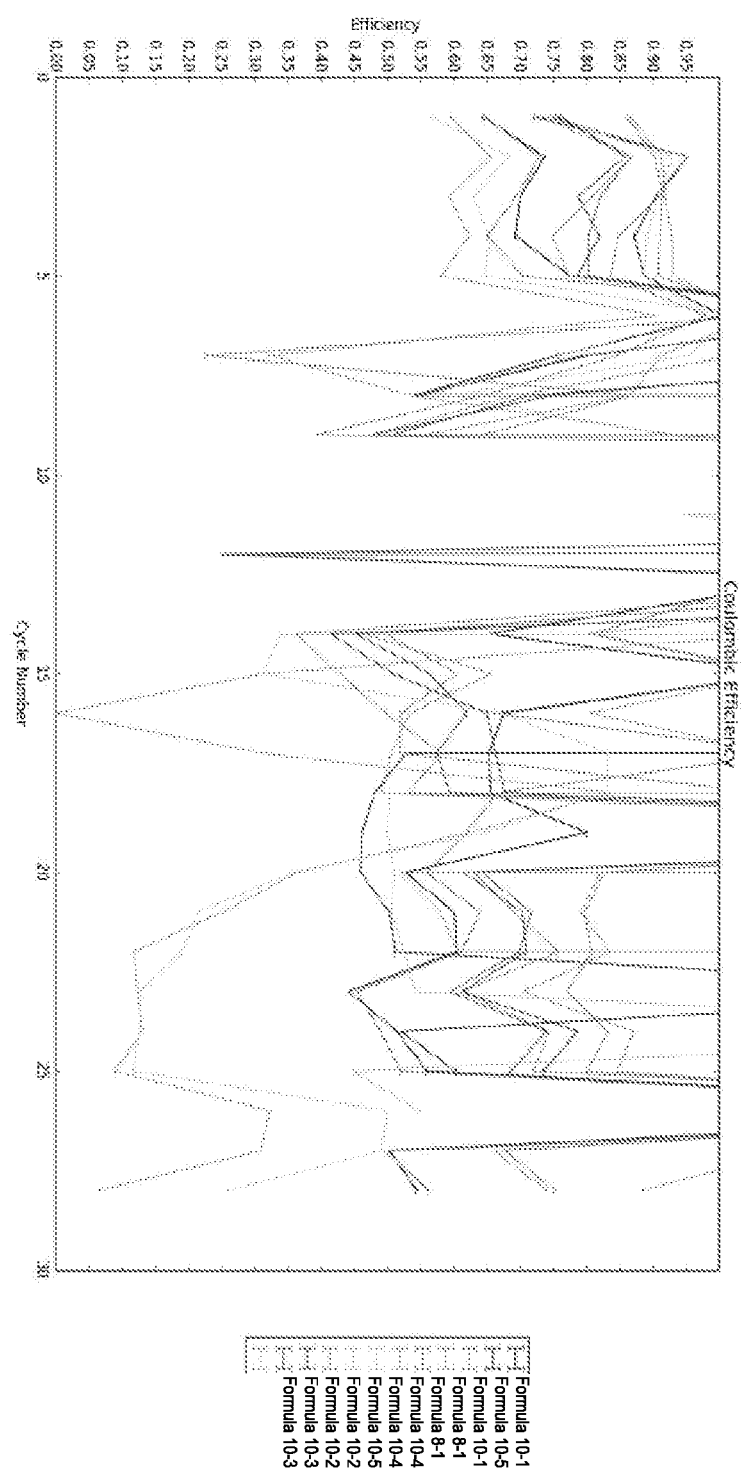
FIG. 60 shows plots of Coulombic efficiencies vs. cycle number for test cells according to Example 10.
Figure 61:
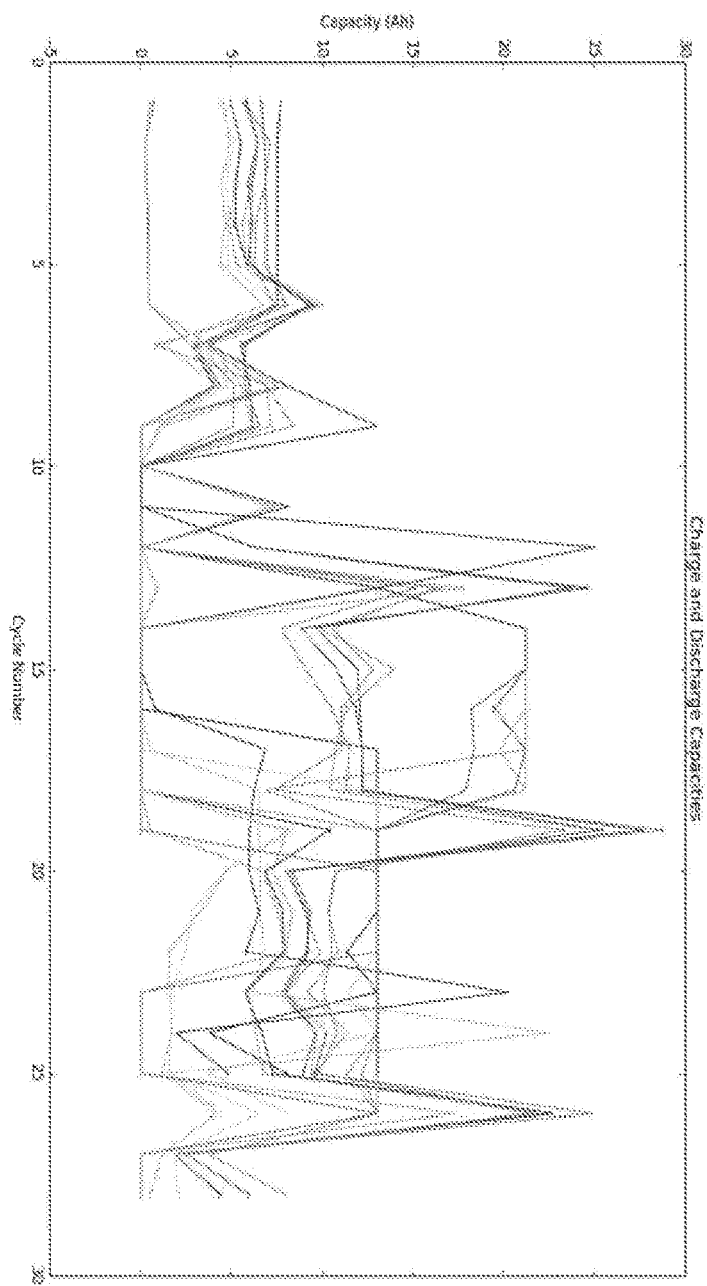
FIG. 61 shows plots of charge and discharge capacities for test cells according to Example 10.
Figure 62:
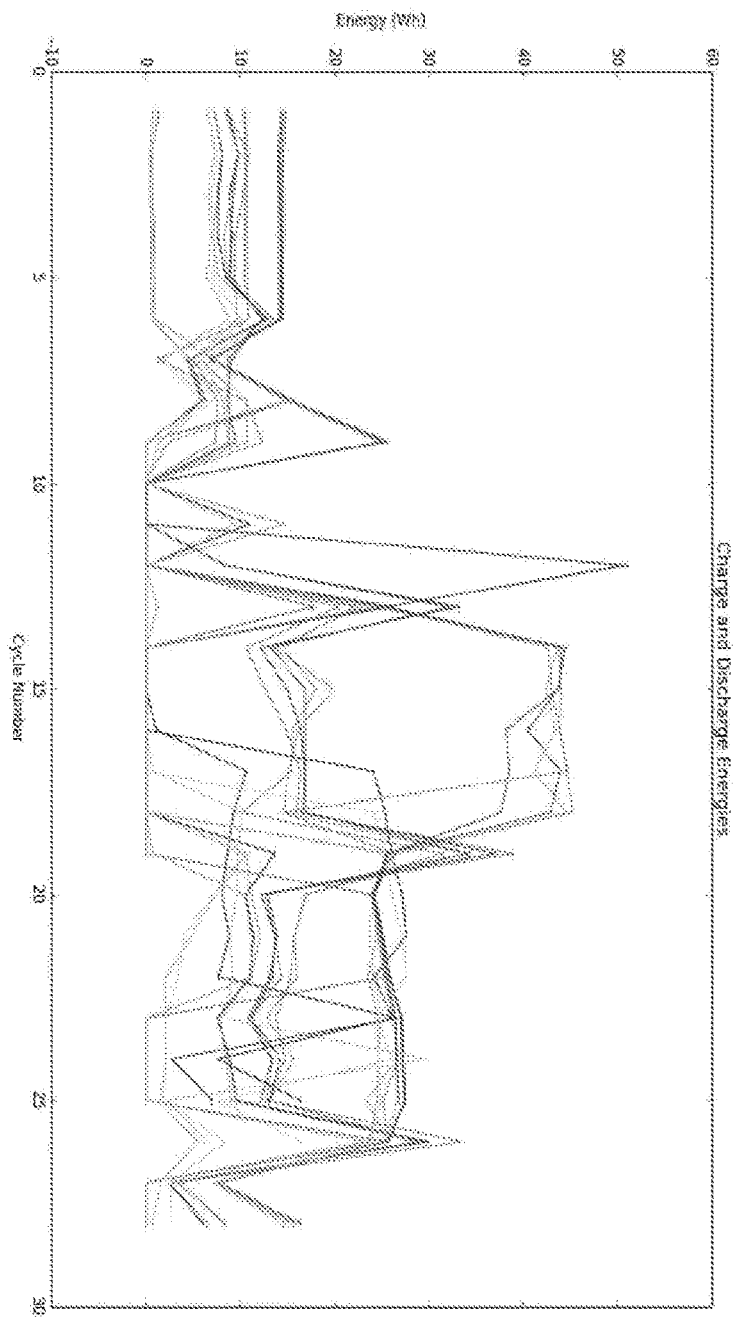
FIG. 62 shows plots of charge and discharge energies for test cells according to Example 10.
Figure 63:
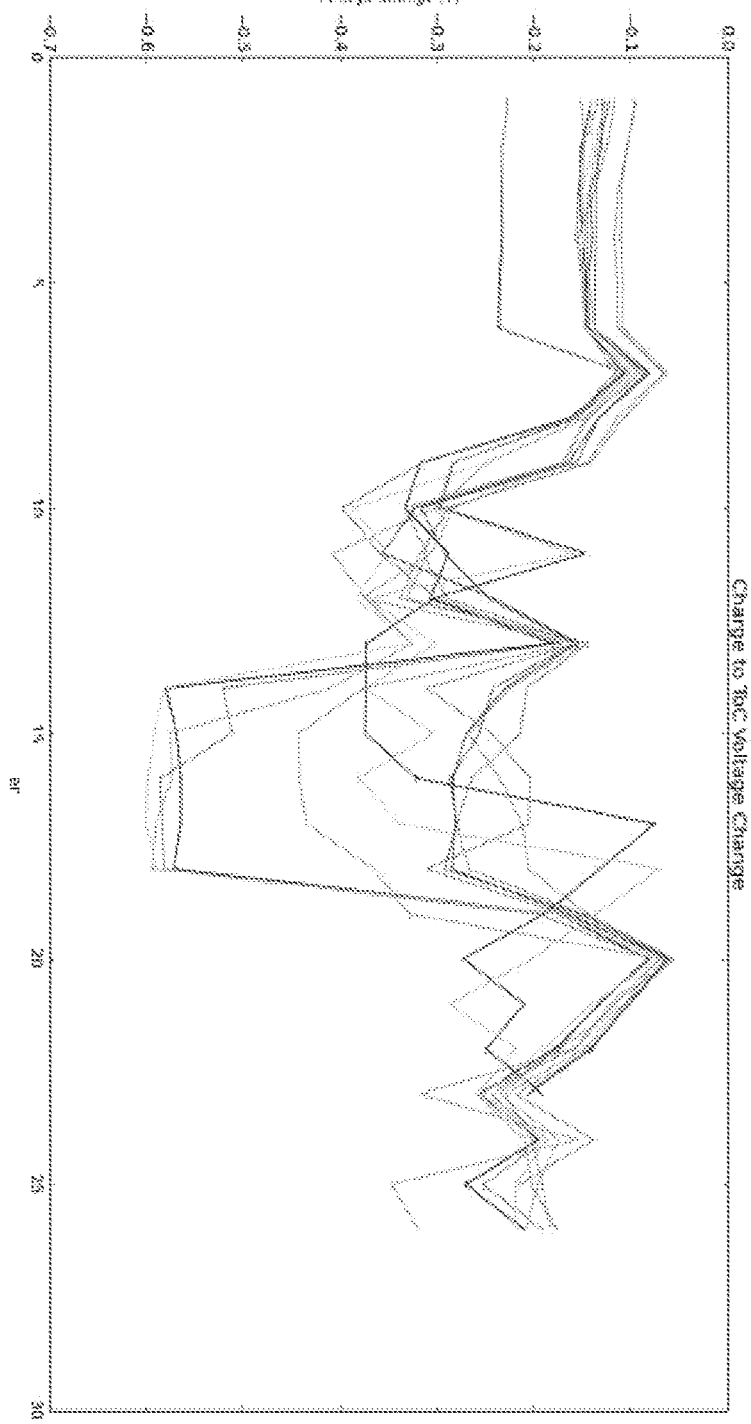
FIG. 63 shows plots of voltage change vs. cycle number for charge ToC (top-of-charge) in test cells according to Example 10.
Figure 64:
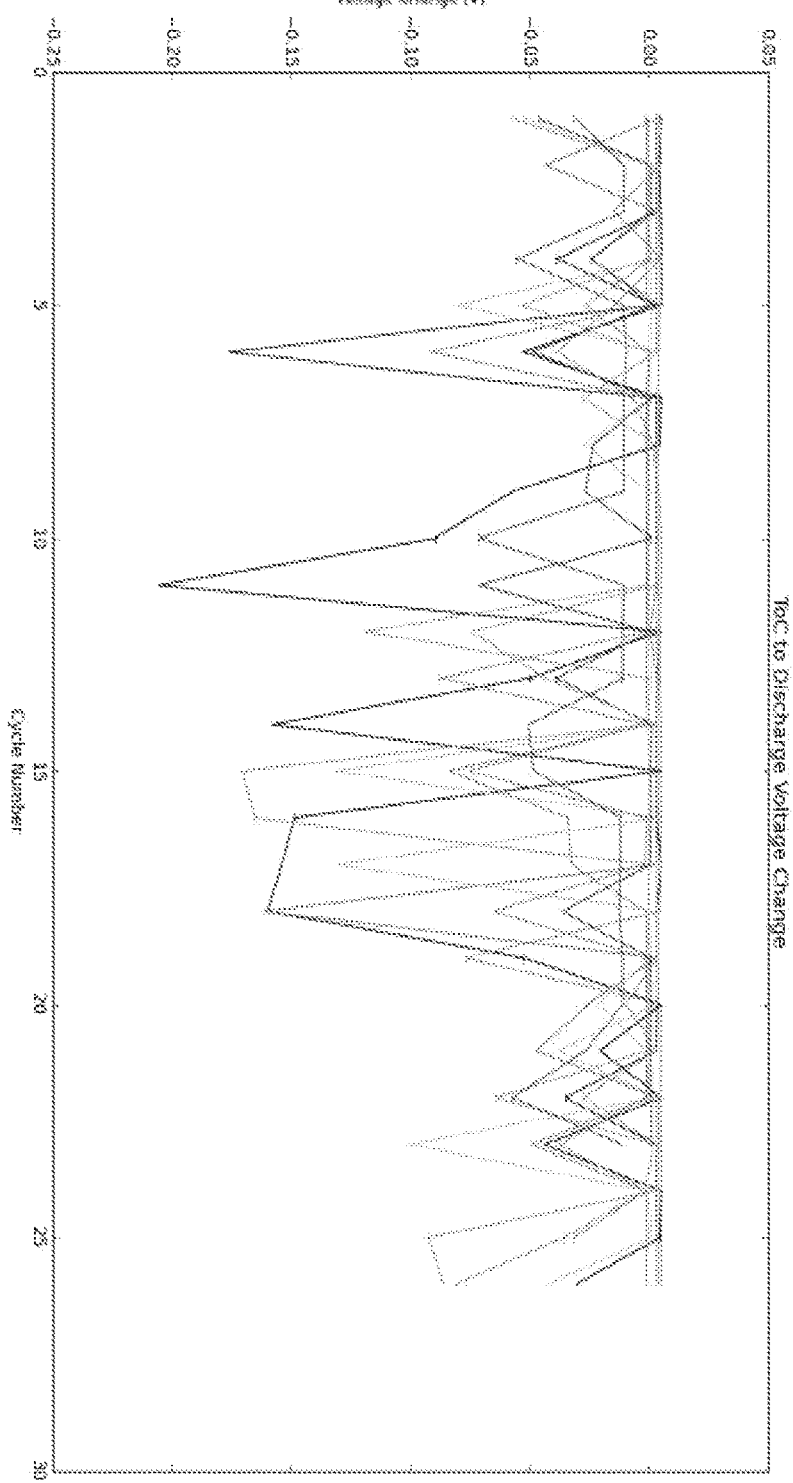
FIG. 64 shows plots of voltage change vs. cycle number for ToC (top-of-charge) to discharge in test cells according to Example 10.

Referring to FIG. 46, test cells, as described above in this Example 6A, underwent cyclic voltammetry testing, as described in Example 5, wherein one test cell was configured with electrolyte no. 1-32, one test cell was configured with electrolyte no. 6-1, and one test cell was configured with electrolyte no. 6-2.

Example 7

The following electrolyte formulations were prepared and evaluated in test cells, as described above in Example 6A.

TABLE 46

Electrolyte no. 7-1 formulation.

| Ingredient | Wt % |
|---|---|
| ZnBr$_2$ | 26.56 |
| H$_2$O | 49.18 |
| KBr | 6.56 |
| KCl | 10.18 |
| methylethylmorpholinium bromide | 0.99 |
| tetraethylammonium bromide | 1.97 |
| triethylmethylammonium chloride | 2.30 |
| MPEG 2K | 1.25 |
| MPEG 1K | 0.31 |
| HBr | 0.52 |
| 1,1-dioctadecyl-4,4'-bipyridinium dibromide | 0.11 |
| cetyltrimethylammonium bromide | 0.06 |
| Sn | 7 ppm |
| In | 7 ppm |
| Total: | ~100.00 |

TABLE 47

Electrolyte no. 7-2 formulation.

| Ingredient | Wt % |
|---|---|
| ZnBr$_2$ | 26.56 |
| H$_2$O | 48.82 |
| KBr | 6.56 |
| KCl | 10.97 |
| methylethylmorpholinium bromide | 0.99 |

TABLE 47-continued

Electrolyte no. 7-2 formulation.

| Ingredient | Wt % |
| --- | --- |
| tetraethylammonium bromide | 1.97 |
| triethylmethylammonium chloride | 1.88 |
| MPEG 2K | 1.25 |
| MPEG 1K | 0.31 |
| HBr | 0.52 |
| 1,1-dioctadecyl-4,4'-bipyridinium dibromide | 0.11 |
| cetyltrimethylammonium bromide | 0.06 |
| Sn | 7 ppm |
| In | 7 ppm |
| Total: | ~100.00 |

TABLE 48

Electrolyte no. 7-3 formulation.

| Ingredient | Wt % |
| --- | --- |
| $ZnBr_2$ | 28.67 |
| $H_2O$ | 46.35 |
| KBr | 7.09 |
| KCl | 10.28 |
| methylethylmorpholinium bromide | 1.08 |
| tetraethylammonium bromide | 2.12 |
| triethylmethylammonium chloride | 2.03 |
| MPEG 2K | 1.35 |
| MPEG 1K | 0.33 |
| HBr | 0.52 |
| 1,1-dioctadecyl-4,4'-bipyridinium dibromide | 0.11 |
| cetyltrimethylammonium bromide | 0.06 |
| Sn | 7 ppm |
| In | 7 ppm |
| Total: | ~100.00 |

Each test cell produced with electrolyte no. 7-1, 7-2, or 7-3 demonstrated an energy efficiency of greater than 80%.

Example 8

Referring to FIGS. 47-52, the following electrolyte formulations were prepared and evaluated in test cells, configured as described in FIG. 1 wherein the terminal cathode plate is formed from 0.020 inch thick TiC plate, carbon felt (G250 Avcarb®) (activated) having 6.4 mm thickness is adhesively attached to the active region of the TiC plate using an adhesive that is formulated from 60 wt % acetone, 13.92 wt % polyvinylidene fluoride resin (Kynar® 2750-00), 7.52 wt % isobutyl methacrylate resin (Elvacite® 4111), 16.16 wt % synthetic graphite (Timrex® KS6), 2 wt % sodium hexametaphosphate, and 0.4 wt % polymethylmethacrylate (PMMA). The frame member was formed of machined HDPE. The test cells were repeatedly cycled at 2.25 W constant power with ramps to 5.5 W, a charge potential of 1.95 V, a charge capacity of 7.5 Ah cutoff with ramps to 15 Ah, top of charge rest time was 30 min with ramps to 24 hrs, discharge current was 2.25 W constant power with ramps to 5.5 W, discharge voltage was 1.1 V, bottom of discharge rest time was 6 hrs, and testing temperature was ambient.

TABLE 49

Electrolyte no. 8-1 formulation

| Ingredient | Wt % |
| --- | --- |
| $ZnBr_2$ | 40.89 |
| $H_2O$ | 35.64 |
| KBr | 4.95 |
| KCl | 10.01 |
| triethylmethylammonium chloride | 5.25 |
| tetraethylammonium bromide | 0.99 |
| MPEG 2K | 1.14 |
| MPEG 1K | 0.32 |
| neopentyl glycol | 0.90 |
| $InCl_3$ | 7 ppm |
| $SnCl_2 \cdot 2H_2O$ | 7 ppm |
| HBr | Adjust to pH 3 |
| Total: | ~100.00 |

TABLE 50

Electrolyte no. 8-2 formulation.

| Ingredient | Wt % |
| --- | --- |
| $ZnBr_2$ | 45.00 |
| $H_2O$ | 31.2 |
| KBr | 5.00 |
| KCl | 10.01 |
| triethylmethylammonium chloride | 5.30 |
| tetraethylammonium bromide | 1.00 |
| MPEG 2K | 1.15 |
| MPEG 1K | 0.32 |
| neopentyl glycol | 0.91 |
| $InCl_3$ | 7 ppm |
| $SnCl_2 \cdot 2H_2O$ | 7 ppm |
| HBr | Adjust to pH 3 |
| Total: | ~100.00 |

TABLE 51

Electrolyte no. 8-3 formulation.

| Ingredient | Wt % |
| --- | --- |
| $ZnBr_2$ | 38.65 |
| $H_2O$ | 34.22 |
| KBr | 7.09 |
| KCl | 11.81 |
| triethylmethylammonium chloride | 5.01 |
| tetraethylammonium bromide | 0.95 |
| MPEG 2K | 1.08 |
| MPEG 1K | 0.30 |
| neopentyl glycol | 0.86 |
| $InCl_3$ | 7 ppm |
| $SnCl_2 \cdot 2H_2O$ | 7 ppm |
| HBr | Adjust to pH 3 |
| Total: | ~100.00 |

TABLE 52

Electrolyte no. 8-4 formulation.

| Ingredient | Wt % |
| --- | --- |
| $ZnBr_2$ | 39.29 |
| $H_2O$ | 34.78 |
| KBr | 4.80 |
| KCl | 9.70 |
| triethylmethylammonium chloride | 6.72 |
| tetraethylammonium bromide | 2.40 |

TABLE 52-continued

Electrolyte no. 8-4 formulation.

| Ingredient | Wt % |
|---|---|
| MPEG 2K | 1.10 |
| MPEG 1K | 0.31 |
| neopentyl glycol | 0.87 |
| $InCl_3$ | 7 ppm |
| $SnCl_2 \cdot 2H_2O$ | 7 ppm |
| HBr | Adjust to pH 3 |
| Total: | ~100.00 |

TABLE 53

Electrolyte no. 8-5 formulation.

| Ingredient | Wt % |
|---|---|
| $ZnBr_2$ | 40.12 |
| $H_2O$ | 35.52 |
| KBr | 4.90 |
| KCl | 9.91 |
| triethylmethylammonium chloride | 5.22 |
| tetraethylammonium bromide | 0.98 |
| MPEG 2K | 1.47 |
| MPEG 1K | 0.98 |
| neopentyl glycol | 0.89 |
| $InCl_3$ | 7 ppm |
| $SnCl_2 \cdot 2H_2O$ | 7 ppm |
| HBr | Adjust to pH 3 |
| Total: | ~100.00 |

TABLE 54

Electrolyte no. 8-6 formulation.

| Ingredient | Wt % |
|---|---|
| $ZnBr_2$ | 39.98 |
| $H_2O$ | 35.39 |
| KBr | 4.88 |
| KCl | 9.87 |
| triethylmethylammonium chloride | 5.18 |
| tetraethylammonium bromide | 0.97 |
| MPEG 2K | 1.12 |
| MPEG 1K | 0.31 |
| neopentyl glycol | 2.25 |
| $InCl_3$ | 7 ppm |
| $SnCl_2 \cdot 2H_2O$ | 7 ppm |
| HBr | Adjust to pH 3 |
| Total: | ~100.00 |

TABLE 55

Electrolyte no. 8-7 formulation.

| Ingredient | Wt % |
|---|---|
| $ZnBr_2$ | 40.41 |
| $H_2O$ | 35.78 |
| KBr | 4.94 |
| KCl | 9.98 |
| triethylmethylammonium chloride | 5.23 |
| tetraethylammonium bromide | 0.98 |
| MPEG 2K | 1.13 |
| MPEG 1K | 0.31 |
| neopentyl glycol | 0.98 |
| tetraglyme | 0.29 |
| $InCl_3$ | 7 ppm |
| $SnCl_2 \cdot 2H_2O$ | 7 ppm |

TABLE 55-continued

Electrolyte no. 8-7 formulation.

| Ingredient | Wt % |
|---|---|
| HBr | Adjust to pH 3 |
| Total: | ~100.00 |

Example 9

Referring to FIGS. 53-58, the following electrolyte formulations were prepared and evaluated in test cells, configured as described in FIG. 1 wherein the terminal cathode plate is formed from 0.020 inch thick TiC plate, carbon felt (G250 Avcarb®) (activated) having 6.4 mm thickness is adhesively attached to the active region of the TiC plate using an adhesive that is formulated from 60 wt % acetone, 13.92 wt % polyvinylidene fluoride resin (Kynar® 2750-00), 7.52 wt % isobutyl methacrylate resin (Elvacite® 4111), 16.16 wt % synthetic graphite (Timrex® KS6), 2 wt % sodium hexametaphosphate, and 0.4 wt % polymethylmethacrylate (PMMA). The frame member was formed of machined HDPE. The test cells were repeatedly cycled at 2.25 W constant power with ramps to 5.5 W, a charge potential of 1.95 V, a charge capacity of 7.5 Ah cutoff with ramps to 15 Ah, top of charge rest time was 30 min with ramps to 24 hrs, discharge current was 2.25 W constant power with ramps to 5.5 W, discharge voltage was 1.1 V, bottom of discharge rest time was 6 hrs, and testing temperature was ambient.

TABLE 56

Electrolyte no. 9-1 formulation.

| Ingredient | Wt % |
|---|---|
| $ZnBr_2$ | 42.07 |
| $H_2O$ | 27.23 |
| KBr | 6.28 |
| KCl | 10.52 |
| triethylmethylammonium chloride | 8.33 |
| tetraethylammonium bromide | 2.98 |
| MPEG 2K | 1.06 |
| MPEG 1K | 0.30 |
| neopentyl glycol | 0.84 |
| $InCl_3$ | 7 ppm |
| $SnCl_2 \cdot 2H_2O$ | 7 ppm |
| HBr | Adjust to pH 3 |
| Total: | ~100.00 |

TABLE 57

Electrolyte no. 9-2 formulation.

| Ingredient | Wt % |
|---|---|
| $ZnBr_2$ | 42.07 |
| $H_2O$ | 27.23 |
| KBr | 3.01 |
| KCl | 13.84 |
| triethylmethylammonium chloride | 8.33 |
| tetraethylammonium bromide | 2.98 |
| MPEG 2K | 1.06 |
| MPEG 1K | 0.30 |
| neopentyl glycol | 0.84 |
| $InCl_3$ | 7 ppm |
| $SnCl_2 \cdot 2H_2O$ | 7 ppm |
| HBr | Adjust to pH 3 |

TABLE 57-continued

Electrolyte no. 9-2 formulation.

| Ingredient | Wt % |
|---|---|
| Total: | ~100.00 |

TABLE 58

Electrolyte no. 9-3 formulation.

| Ingredient | Wt % |
|---|---|
| $ZnBr_2$ | 42.07 |
| $H_2O$ | 27.23 |
| KBr | 8.20 |
| KCl | 8.31 |
| triethylmethylammonium chloride | 8.33 |
| tetraethylammonium bromide | 2.98 |
| MPEG 2K | 1.06 |
| MPEG 1K | 0.30 |
| neopentyl glycol | 0.84 |
| $InCl_3$ | 7 ppm |
| $SnCl_2 \cdot 2H_2O$ | 7 ppm |
| HBr | Adjust to pH 3 |
| Total: | ~100.00 |

TABLE 59

Electrolyte no. 9-4 formulation.

| Ingredient | Wt % |
|---|---|
| $ZnBr_2$ | 42.07 |
| $H_2O$ | 27.23 |
| KBr | 6.28 |
| KCl | 10.52 |
| triethylmethylammonium chloride | 8.33 |
| trimethylpropylammonium bromide | 0.40 |
| tetraethylammonium bromide | 2.48 |
| MPEG 2K | 1.06 |
| MPEG 1K | 0.30 |
| neopentyl glycol | 0.84 |
| $InCl_3$ | 7 ppm |
| $SnCl_2 \cdot 2H_2O$ | 7 ppm |
| HBr | Adjust to pH 3 |
| Total: | ~100.00 |

Example 10

Referring to FIGS. 59-65, the following electrolyte formulations were prepared and evaluated in test cells, configured as described in FIG. 1 wherein the terminal cathode plate is formed from 0.020 inch thick TiC plate, carbon felt (G250 Avcarb®) (activated) having 6.4 mm thickness is adhesively attached to the active region of the TiC plate using an adhesive that is formulated from 60 wt % acetone, 13.92 wt % polyvinylidene fluoride resin (Kynar® 2750-00), 7.52 wt % isobutyl methacrylate resin (Elvacite® 4111), 16.16 wt % synthetic graphite (Timrex® KS6), 2 wt % sodium hexametaphosphate, and 0.4 wt % polymethylmethacrylate (PMMA). The frame member was formed of machined HDPE. The test cells were repeatedly cycled at 2.25 W constant power with ramps to 5.5 W, a charge potential of 1.95 V, a charge capacity of 7.5 Ah cutoff with ramps to 15 Ah, top of charge rest time was 30 min with ramps to 24 hrs, discharge current was 2.25 W constant power with ramps to 5.5 W, discharge voltage was 1.1 V, bottom of discharge rest time was 6 hrs, and testing temperature was ambient.

TABLE 60

Electrolyte no. 10-1 formulation.

| Ingredient | Wt % |
|---|---|
| $ZnBr_2$ | 43.10 |
| $H_2O$ | 25.64 |
| KBr | 4.58 |
| KCl | 9.05 |
| triethylmethylammonium chloride | 12.11 |
| tetraethylammonium bromide | 2.73 |
| trimethylpropylammonium bromide | 0.50 |
| MPEG 2K | 1.18 |
| MPEG 1K | 0.35 |
| neopentyl glycol | 0.71 |
| $InCl_3$ | 7 ppm |
| $SnCl_2 \cdot 2H_2O$ | 7 ppm |
| HBr | Adjust to pH 3 |
| Total: | ~100.00 |

TABLE 60

Electrolyte no. 10-2 formulation.

| Ingredient | Wt % |
|---|---|
| $ZnBr_2$ | 42.75 |
| $H_2O$ | 29.31 |
| KBr | 4.55 |
| KCl | 9.09 |
| triethylmethylammonium chloride | 9.00 |
| tetraethylammonium bromide | 2.00 |
| trimethylpropylammonium bromide | 0.53 |
| MPEG 2K | 1.18 |
| MPEG 1K | 0.36 |
| neopentyl glycol | 0.73 |
| $InCl_3$ | 7 ppm |
| $SnCl_2 \cdot 2H_2O$ | 7 ppm |
| HBr | Adjust to pH 3 |
| Total: | ~100.00 |

TABLE 61

Electrolyte no. 10-3 formulation.

| Ingredient | Wt % |
|---|---|
| $ZnBr_2$ | 42.72 |
| $H_2O$ | 29.01 |
| KBr | 4.55 |
| KCl | 9.09 |
| triethylmethylammonium chloride | 9.00 |
| tetraethylammonium bromide | 2.00 |
| trimethylpropylammonium bromide | 0.53 |
| MPEG 2K | 1.18 |
| MPEG 1K | 0.36 |
| neopentyl glycol | 0.73 |
| tetraglyme | 0.30 |
| $InCl_3$ | 7 ppm |
| $SnCl_2 \cdot 2H_2O$ | 7 ppm |
| HBr | Adjust to pH 3 |
| Total: | ~100.00 |

TABLE 62

Electrolyte no. 10-4 formulation.

| Ingredient | Wt % |
|---|---|
| $ZnBr_2$ | 42.75 |
| $H_2O$ | 28.11 |
| KBr | 3.00 |
| KCl | 8.00 |
| triethylmethylammonium chloride | 12.60 |
| tetraethylammonium bromide | 2.73 |
| trimethylpropylammonium bromide | 0.53 |
| MPEG 2K | 1.18 |
| MPEG 1K | 0.36 |
| neopentyl glycol | 0.73 |
| $InCl_3$ | 7 ppm |
| $SnCl_2 \cdot 2H_2O$ | 7 ppm |
| HBr | Adjust to pH 3 |
| Total: | ~100.00 |

TABLE 63

Electrolyte no. 10-5 formulation.

| Ingredient | Wt % |
|---|---|
| $ZnBr_2$ | 40.00 |
| $H_2O$ | 28.22 |
| KBr | 4.55 |
| KCl | 9.09 |
| triethylmethylammonium chloride | 12.60 |
| trimethylpropylammonium bromide | 0.53 |
| tetraethylammonium bromide | 2.73 |
| MPEG 2K | 1.18 |
| MPEG 1K | 0.36 |
| neopentyl glycol | 0.73 |
| $InCl_3$ | 7 ppm |
| $SnCl_2 \cdot 2H_2O$ | 7 ppm |
| HBr | Adjust to pH 3 |
| Total: | ~100.00 |

Example 11

Electrolyte 11-1 was formulated as described in Table 64:

TABLE 64

Electrolyte no. 11-1 formulation.

| Ingredient | Wt % |
|---|---|
| $ZnBr_2$ | 39.00 |
| $H_2O$ | 34.49 |
| KBr | 4.75 |
| KCl | 9.62 |
| triethylmethylammonium chloride | 6.66 |
| tetraethylammonium bromide | 2.38 |
| MPEG 2K | 1.09 |
| MPEG 1K | 0.30 |
| neopentyl glycol | 1.49 |
| tetraglyme | 0.25 |
| $InCl_3$ | 7 ppm |
| $SnCl_2 \cdot 2H_2O$ | 7 ppm |
| HBr | Adjust to pH 3 |
| Total: | ~100.00 |

Other Embodiments

It should be apparent that the foregoing relates only to the preferred embodiments of the present invention and that numerous changes and modifications may be made herein without departing from the spirit and scope of the invention as defined by the following claims and equivalents thereof.

What is claimed is:

1. An electrolyte for use in a secondary static zinc halide electrochemical cell comprising:
   from about 30.00 wt % to about 50.00 wt % of $ZnBr_2$;
   from about 22.50 wt % to about 40.00 wt % of $H_2O$;
   from about 3.00 wt % to about 9.50 wt % of KBr;
   from about 7.75 wt % to about 14.00 wt % of KCl;
   from about 0.25 wt % to about 2.25 wt % of MPEG 2K; and
   from about 0.075 wt % to about 1.25 wt % of MPEG 1K.

2. The electrolyte of claim 1, further comprising
   at least two different quaternary ammonium agents, wherein the at least two different quaternary ammonium agents are of a formula $N^+(R^A)(R^B)_3 \ X^-$, wherein $R^A$ is a $C_{1-6}$ alkyl, $R^B$ is a $C_{1-6}$ alkyl, and $X^-$ is $Br^-$ or $Cl^-$; and
   wherein an aggregate concentration of the at least two different quaternary ammonium agents is from about 3.50 wt % to about 20.00 wt %.

3. The electrolyte of claim 2, wherein one of the at least two different quaternary ammonium agents is tetraethylammonium bromide, and the tetraethylammonium bromide has a concentration of from about 0.35 wt % to about 3.75 wt %.

4. The electrolyte of claim 2, wherein one of the at least two different quaternary ammonium agents is triethylmethylammonium chloride, and the triethylmethylammonium chloride has a concentration of from about 3.50 wt % to about 15.0 wt %.

5. The electrolyte of claim 1, further comprising a quaternary ammonium agent of trimethylpropylammonium bromide, and the trimethylpropylammonium bromide has a concentration of from about 0.25 wt % to about 0.75 wt %.

6. The electrolyte of claim 1, further comprising from about 0.35 wt % to about 2.75 wt % of a glycol, wherein the glycol is selected from ethylene glycol, propylene glycol, 1,3-butylene glycol, 1,4-butylene glycol, neopentyl glycol, hexalene glycol, or any combination thereof.

7. The electrolyte of claim 1, further comprising from about 2.00 wt % to about 4.00 wt % of a glyme, wherein the glyme is selected from monoglyme, diglyme, triglyme, tetraglyme, pentaglyme, hexaglyme, or any combination thereof.

8. An electrolyte for use in a secondary static zinc halide electrochemical cell comprising:
   from about 30.00 wt % to about 50.00 wt % of $ZnBr_2$;
   from about 22.50 wt % to about 40.00 wt % of $H_2O$;
   from about 3.00 wt % to about 9.50 wt % of KBr;
   from about 7.75 wt % to about 14.00 wt % of KCl;
   from about 0.25 wt % to about 2.25 wt % of MPEG 2K;
   from about 0.075 wt % to about 1.25 wt % of MPEG 1K; and
   from about 0.50 wt % to about 3.50 wt % of a first quaternary ammonium agent,
   wherein the first quaternary ammonium agent is selected from a tetra-$C_{1-6}$ alkyl ammonium chloride or a tetra-$C_{1-6}$ alkyl ammonium bromide.

9. The electrolyte of claim 8, wherein the first quaternary ammonium agent is selected from tetramethylammonium chloride, tetraethylammonium chloride, tetrapropylammonium chloride, tetrabutylammonium chloride, tetramethylammonium bromide, tetraethylammonium bromide, tetrapropylammonium bromide, or tetrabutylammonium bromide.

10. The electrolyte of claim 8, further comprising a second quaternary ammonium agent wherein the second quaternary ammonium agent has a formula $N^+(R^A)(R^B)_3X^-$, wherein $R^A$ is a $C_{1-6}$ alkyl, $R^B$ is a $C_{1-6}$ alkyl different from $R^A$, and $X^-$ is $Br^-$ or $Cl^-$; and wherein a concentration of the second quaternary ammonium agent is from about 3.50 wt % to about 15.00 wt %.

11. The electrolyte of claim 10, wherein the second quaternary ammonium agent is selected from a chloride or bromide of trimethylethylammonium, trimethyl propylammonium, trimethylbutylammonium, triethylmethylammonium, triethylpropylammonium, triethylbutylammonium, tripropylmethylammonium, tripropylethylammonium, or tripropylbutylammonium.

12. The electrolyte of claim 10, further comprising a third quaternary ammonium agent, wherein the third quaternary ammonium agent has a formula $N^+(R^A)(R^B)_3X^-$, wherein $R^A$ is a $C_{1-6}$ alkyl, $R^B$ is a $C_{1-6}$ alkyl different from $R^A$, and $X^-$ is $Br^-$ or $Cl^-$;

the third quaternary ammonium agent is different than the second quaternary ammonium agent; and wherein a concentration of the third quaternary ammonium agent is from about 0.25 wt % to about 0.85 wt %.

13. The electrolyte of claim 12, wherein the third quaternary ammonium agent is selected from a chloride or bromide of trimethylethylammonium, trimethyl propylammonium, trimethylbutylammonium, triethylmethylammonium, triethylpropylammonium, triethylbutylammonium, tripropylmethylammonium, tripropylethylammonium, or tripropylbutylammonium.

14. The electrolyte of claim 8, further comprising from about 0.35 wt % to about 2.75 wt % of a glycol, wherein the glycol is selected from ethylene glycol, propylene glycol, 1,3-butylene glycol, 1,4-butylene glycol, neopentyl glycol, hexalene glycol, or any combination thereof.

15. The electrolyte of claim 8, further comprising from about 2.00 wt % to about 4.00 wt % of a glyme, wherein the glyme is selected from monoglyme, diglyme, triglyme, tetraglyme, pentaglyme, hexaglyme, or any combination thereof.

16. An electrolyte for use in a secondary static zinc halide electrochemical cell comprising:

from about 30.00 wt % to about 50.00 wt % of $ZnBr_2$;
from about 22.50 wt % to about 40.00 wt % of $H_2O$;
from about 3.00 wt % to about 9.50 wt % of KBr;
from about 7.75 wt % to about 14.00 wt % of KCl;
from about 0.25 wt % to about 2.25 wt % of MPEG 2K;
from about 0.075 wt % to about 1.25 wt % of MPEG 1K; and
one or more quaternary ammonium agents, wherein each quaternary ammonium agent is independently selected from a quaternary ammonium agent having a formula $N^+(R^A)(R^B)_3X^-$, wherein $R^A$ is a $C_{1-6}$ alkyl, $R^B$ is a $C_{1-6}$ alkyl, and $X^-$ is $Br^-$ or $Cl^-$, and wherein the one or more quaternary ammonium agents has an aggregate concentration of from about 3.50 wt % to about 20.00 wt %.

17. The electrolyte of claim 16, wherein the one or more quaternary ammonium agents comprises a first quaternary ammonium agent with a concentration from about 0.50 wt % to about 3.50 wt %, wherein the first quaternary ammonium agent is selected from a tetra-$C_{1-6}$ alkyl ammonium chloride or a tetra-$C_{1-6}$ alkyl ammonium bromide.

18. The electrolyte of claim 17, wherein the first quaternary ammonium agent is selected from tetramethylammonium chloride, tetraethylammonium chloride, tetrapropylammonium chloride, tetrabutylammonium chloride, tetramethylammonium bromide, tetraethylammonium bromide, tetrapropylammonium bromide, or tetrabutylammonium bromide.

19. The electrolyte of claim 17, wherein the one or more quaternary ammonium agents further comprising a second quaternary ammonium agent wherein the second quaternary ammonium agent has a formula $N+(R^A)(R^B)_3\ X^-$, wherein $R^A$ is a $C_{1-6}$ alkyl, $R^B$ is a $C_{1-6}$ alkyl different from $R^A$, and $X^-$ is $Br^-$ or $Cl^-$; and wherein a concentration of the second quaternary ammonium agent is from about 3.50 wt % to about 15.00 wt %.

20. The electrolyte of claim 19, wherein the second quaternary ammonium agent is selected from a chloride or bromide of trimethylethylammonium, trimethyl propylammonium, trimethylbutylammonium, triethylmethylammonium, triethylpropylammonium, triethylbutylammonium, tripropylmethylammonium, tripropylethylammonium, or tripropylbutylammonium.

21. The electrolyte of claim 20, wherein the second quaternary ammonium agent is triethylmethylammonium chloride or triethylmethylammonium bromide.

22. The electrolyte of claim 19, wherein the one or more quaternary ammonium agents further comprising a third quaternary ammonium agent, wherein the third quaternary ammonium agent has a formula $N^+(R^A)(R^B)_3\ X^-$, wherein $R^A$ is a $C_{1-6}$ alkyl, $R^B$ is a $C_{1-6}$ alkyl different from $R^A$, and $X^-$ is $Br^-$ or $Cl^-$;

the third quaternary ammonium agent is different than the second quaternary ammonium agent; and wherein a concentration of the third quaternary ammonium agent is from about 0.25 wt % to about 0.85 wt %.

23. The electrolyte of claim 22, wherein the third quaternary ammonium agent is selected from a chloride or bromide of trimethylethylammonium, trimethylpropylammonium, trimethylbutylammonium, triethylmethylammonium, triethylpropylammonium, triethylbutylammonium, tripropylmethylammonium, tripropylethylammonium, or tripropylbutylammonium.

24. The electrolyte of claim 16, further comprising from about 0.35 wt % to about 2.75 wt % of a glycol, wherein the glycol is selected from ethylene glycol, propylene glycol, 1,3-butylene glycol, 1,4-butylene glycol, neopentyl glycol, hexalene glycol, or any combination thereof.

25. The electrolyte of claim 16, further comprising from about 2.00 wt % to about 4.00 wt % of a glyme, wherein the glyme is selected from monoglyme, diglyme, triglyme, tetraglyme, pentaglyme, hexaglyme, or any combination thereof.

26. An electrolyte for use in a secondary static zinc halide electrochemical cell comprising:

from about 30.00 wt % to about 50.00 wt % of $ZnBr_2$;
from about 22.50 wt % to about 40.00 wt % of $H_2O$;
from about 3.00 wt % to about 9.50 wt % of KBr;
from about 7.75 wt % to about 14.00 wt % of KCl;
from about 0.25 wt % to about 2.25 wt % of MPEG 2K;
from about 0.075 wt % to about 1.25 wt % of MPEG 1K;
from about 3.50 wt % to about 15.00 wt % of a chloride or a bromide of triethylmethylammonium; and
from about 0.50 wt % to about 3.50 wt % of a chloride or a bromide of tetra-$C_{1-6}$ alkyl ammonium.

27. The electrolyte of claim 26, further comprising from about 0.25 wt % to about 0.75 wt % of a quaternary ammonium agent having a formula $N^+(R^A)(R^B)_3\ X^-$, wherein $R^A$ is a $C_{1-6}$ alkyl, $R^B$ is a $C_{1-6}$ alkyl different from $R^4$, and $X^-$ is $Br^-$ or $Cl^-$; and the quaternary ammonium agent is not a chloride or bromide of triethylmethylammonium;

wherein the quaternary ammonium agent is selected from a chloride or a bromide of trimethylethylammonium, trimethylpropylammonium, trimethylbutylammonium, triethylpropylammonium, triethylbutylammonium, tripropylmethylammonium, tripropylethylammonium, or tripropylbutylammonium.

28. The electrolyte of claim 26, further comprising from about 0.35 wt % to about 2.75 wt % of neopentyl glycol.

29. The electrolyte of claim 26, further comprising from about 2.00 wt % to about 4.00 wt % of tetraglyme.

\* \* \* \* \*